(12) United States Patent
Bildmayer et al.

(10) Patent No.: US 8,401,908 B2
(45) Date of Patent: Mar. 19, 2013

(54) ARCHITECTURAL DESIGN FOR MAKE-TO-SPECIFICATION APPLICATION SOFTWARE

(75) Inventors: Reiner Bildmayer, Bad Schoenborn (DE); Achim Clemens, Speyer (DE); Bernhard Lokowandt, Heidelberg (DE); Thomas Gross-Boelting, Walldorf (DE); Manfred Muench, Kirchardt (DE); Klaus Reinelt, Kraichtal (DE)

(73) Assignee: SAP AG, Walldorf (DE)

( * ) Notice: Subject to any disclaimer, the term of this patent is extended or adjusted under 35 U.S.C. 154(b) by 505 days.

(21) Appl. No.: 12/327,232

(22) Filed: Dec. 3, 2008

(65) Prior Publication Data

US 2010/0138276 A1    Jun. 3, 2010

(51) Int. Cl.
*G06Q 30/00* (2006.01)
(52) U.S. Cl. .................. 705/26.1; 705/26.8; 705/26.81; 705/26.82; 705/28; 705/29; 705/30
(58) Field of Classification Search .............. 705/26.1, 705/26.81, 26.82, 28, 29, 30
See application file for complete search history.

(56) References Cited

U.S. PATENT DOCUMENTS

| | | | |
|---|---|---|---|
| 4,947,321 A | 8/1990 | Spence et al. |
| 5,361,198 A | 11/1994 | Harmon et al. |
| 5,550,734 A | 8/1996 | Tarter et al. |
| 5,560,005 A | 9/1996 | Hoover et al. |
| 5,566,097 A | 10/1996 | Myers et al. |
| 5,586,312 A | 12/1996 | Johnson et al. |
| 5,590,277 A | 12/1996 | Fuchs et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Nobel et al. |

(Continued)

FOREIGN PATENT DOCUMENTS

| | | |
|---|---|---|
| WO | 00/23874 | 4/2000 |
| WO | WO 2004/083984 | 9/2004 |

(Continued)

OTHER PUBLICATIONS

"American Software Announces ASP Pricing Model for It's a-Applications Expense Business Solution"; PR Newswire; Mar. 6, 2000; 2 pages.

(Continued)

*Primary Examiner* — Ryan Zeender
*Assistant Examiner* — Milena Racic
(74) *Attorney, Agent, or Firm* — Fish & Richardson P.C.

(57) ABSTRACT

Methods, systems, and apparatus, including computer program products, for implementing a software architecture design for a software application implementing plan-driven procurement. The application is structured as multiple process components interacting with each other through service interfaces, and multiple service operations, each being implemented for a respective process component. The process components include The process components include an RFQ Processing process component, a Purchase Request Processing process component, a Purchase Order Processing process component, a Purchasing Contract Processing process component, a Supplier Invoice Processing process component, a Supply and Demand Matching process component, an External Procurement Trigger and Response process component, and a Customer Requirement Processing process component.

22 Claims, 67 Drawing Sheets

U.S. PATENT DOCUMENTS

| | | | |
|---|---|---|---|
| 5,832,218 | A | 11/1998 | Gibbs et al. |
| 5,848,291 | A | 12/1998 | Milne et al. |
| 5,867,495 | A | 2/1999 | Elliott et al. |
| 5,870,588 | A | 2/1999 | Rompaey et al. |
| 5,881,230 | A | 3/1999 | Christensen et al. |
| 5,893,106 | A | 4/1999 | Brobst et al. |
| 5,898,872 | A | 4/1999 | Richley |
| 5,918,219 | A | 6/1999 | Isherwood |
| 5,987,247 | A | 11/1999 | Lau |
| 5,991,536 | A | 11/1999 | Brodsky et al. |
| H1830 | H | 1/2000 | Petrimoulx et al. |
| 6,028,997 | A | 2/2000 | Leymann et al. |
| 6,038,393 | A | 3/2000 | Iyengar et al. |
| 6,049,838 | A | 4/2000 | Miller et al. |
| 6,067,559 | A | 5/2000 | Allard et al. |
| 6,070,197 | A | 5/2000 | Cobb et al. |
| 6,112,024 | A | 8/2000 | Almond et al. |
| 6,151,582 | A | 11/2000 | Huang et al. |
| 6,167,563 | A | 12/2000 | Fontana et al. |
| 6,167,564 | A | 12/2000 | Fontana et al. |
| 6,177,932 | B1 | 1/2001 | Galdes et al. |
| 6,182,133 | B1 | 1/2001 | Horvitz |
| 6,192,390 | B1 | 2/2001 | Berger et al. |
| 6,208,345 | B1 | 3/2001 | Sheard et al. |
| 6,237,136 | B1 | 5/2001 | Sadhiro |
| 6,256,773 | B1 | 7/2001 | Bowman-Amuah |
| 6,272,672 | B1 | 8/2001 | Conway |
| 6,289,502 | B1 | 9/2001 | Garland et al. |
| 6,311,170 | B1 | 10/2001 | Embrey |
| 6,338,097 | B1 | 1/2002 | Krenzke et al. |
| 6,424,991 | B1 | 7/2002 | Gish |
| 6,434,740 | B1 | 8/2002 | Monday et al. |
| 6,442,748 | B1 | 8/2002 | Bowman-Amuah |
| 6,445,782 | B1 | 9/2002 | Elfe et al. |
| 6,446,045 | B1 | 9/2002 | Stone et al. |
| 6,446,092 | B1 | 9/2002 | Sutter |
| 6,473,794 | B1 | 10/2002 | Guheen et al. |
| 6,493,716 | B1 | 12/2002 | Azagury et al. |
| 6,571,220 | B1 | 5/2003 | Ogino et al. |
| 6,594,535 | B1 | 7/2003 | Costanza |
| 6,601,233 | B1 * | 7/2003 | Underwood .................. 717/102 |
| 6,601,234 | B1 | 7/2003 | Bowman-Amuah |
| 6,606,744 | B1 | 8/2003 | Mikurak |
| 6,609,100 | B2 | 8/2003 | Smith et al. |
| 6,640,238 | B1 | 10/2003 | Bowman-Amuah |
| 6,671,673 | B1 | 12/2003 | Baseman et al. |
| 6,678,882 | B1 | 1/2004 | Hurley et al. |
| 6,687,734 | B1 | 2/2004 | Sellink et al. |
| 6,691,151 | B1 | 2/2004 | Cheyer et al. |
| 6,721,783 | B1 | 4/2004 | Blossman et al. |
| 6,738,964 | B1 | 5/2004 | Zink et al. |
| 6,747,679 | B1 | 6/2004 | Finch et al. |
| 6,750,885 | B1 | 6/2004 | Finch et al. |
| 6,757,837 | B1 | 6/2004 | Platt et al. |
| 6,764,009 | B2 | 7/2004 | Melick et al. |
| 6,772,216 | B1 | 8/2004 | Ankireddipally et al. |
| 6,782,536 | B2 | 8/2004 | Moore et al. |
| 6,789,252 | B1 | 9/2004 | Burke et al. |
| 6,845,499 | B2 | 1/2005 | Srivastava et al. |
| 6,847,854 | B2 | 1/2005 | Discenzo |
| 6,859,931 | B1 | 2/2005 | Cheyer et al. |
| 6,889,197 | B2 | 5/2005 | Lidow |
| 6,889,375 | B1 | 5/2005 | Chan et al. |
| 6,895,438 | B1 | 5/2005 | Ulrich |
| 6,898,783 | B1 | 5/2005 | Gupta et al. |
| 6,904,399 | B2 | 6/2005 | Cooper et al. |
| 6,907,395 | B1 | 6/2005 | Hunt et al. |
| 6,950,802 | B1 | 9/2005 | Barnes et al. |
| 6,954,736 | B2 | 10/2005 | Menninger et al. |
| 6,985,939 | B2 | 1/2006 | Fletcher et al. |
| 6,990,466 | B1 | 1/2006 | Hu |
| 7,003,474 | B2 * | 2/2006 | Lidow .................. 705/7.31 |
| 7,031,998 | B2 | 4/2006 | Archbold |
| 7,043,448 | B2 | 5/2006 | Campbell |
| 7,047,518 | B2 | 5/2006 | Little et al. |
| 7,050,056 | B2 | 5/2006 | Meyringer |
| 7,050,873 | B1 | 5/2006 | Discenzo |
| 7,051,071 | B2 | 5/2006 | Stewart et al. |
| 7,055,136 | B2 | 5/2006 | Dzoba et al. |
| 7,058,587 | B1 | 6/2006 | Horne |
| 7,069,536 | B2 | 6/2006 | Yaung |
| 7,072,855 | B1 | 7/2006 | Godlewski et al. |
| 7,076,762 | B2 | 7/2006 | Fisher |
| 7,076,766 | B2 | 7/2006 | Wirts et al. |
| 7,100,195 | B1 | 8/2006 | Underwood |
| 7,103,873 | B2 | 9/2006 | Tanner et al. |
| 7,117,447 | B2 | 10/2006 | Cobb et al. |
| 7,120,597 | B1 | 10/2006 | Knudtzon et al. |
| 7,120,896 | B2 | 10/2006 | Budhiraja et al. |
| 7,131,069 | B1 | 10/2006 | Rush et al. |
| 7,149,887 | B2 | 12/2006 | Morrison et al. |
| 7,155,403 | B2 | 12/2006 | Cirulli et al. |
| 7,155,409 | B1 | 12/2006 | Stroh |
| 7,181,694 | B2 | 2/2007 | Reiss et al. |
| 7,184,964 | B2 * | 2/2007 | Wang .................. 705/7.11 |
| 7,194,431 | B1 | 3/2007 | Land et al. |
| 7,197,740 | B2 | 3/2007 | Beringer et al. |
| 7,200,569 | B2 | 4/2007 | Gallagher et al. |
| 7,206,768 | B1 | 4/2007 | deGroeve et al. |
| 7,213,232 | B1 | 5/2007 | Knowles |
| 7,216,091 | B1 | 5/2007 | Blandina et al. |
| 7,219,107 | B2 | 5/2007 | Beringer |
| 7,222,786 | B2 | 5/2007 | Renz et al. |
| 7,225,240 | B1 | 5/2007 | Fox et al. |
| 7,249,044 | B2 | 7/2007 | Kumar et al. |
| 7,257,254 | B2 | 8/2007 | Tunney |
| 7,280,955 | B2 | 10/2007 | Martin |
| 7,283,973 | B1 | 10/2007 | Loghmani et al. |
| 7,293,254 | B2 | 11/2007 | Bloesch et al. |
| 7,299,970 | B1 | 11/2007 | Ching |
| 7,315,830 | B1 | 1/2008 | Wirtz et al. |
| 7,322,024 | B2 | 1/2008 | Carlson et al. |
| 7,324,966 | B2 | 1/2008 | Scheer |
| 7,353,180 | B1 | 4/2008 | Silverstone et al. |
| 7,356,492 | B2 | 4/2008 | Hazi et al. |
| 7,367,011 | B2 | 4/2008 | Ramsey et al. |
| 7,370,315 | B1 | 5/2008 | Lovell et al. |
| 7,376,601 | B1 * | 5/2008 | Aldridge .................. 705/28 |
| 7,376,604 | B1 | 5/2008 | Butcher |
| 7,376,632 | B1 | 5/2008 | Sadek et al. |
| 7,383,201 | B2 | 6/2008 | Matsuzaki et al. |
| 7,386,833 | B2 | 6/2008 | Granny et al. |
| 7,401,334 | B2 | 7/2008 | Fussell |
| 7,406,716 | B2 | 7/2008 | Kanamori et al. |
| 7,415,697 | B1 | 8/2008 | Houlding |
| 7,418,409 | B1 | 8/2008 | Goel |
| 7,418,424 | B2 | 8/2008 | Martin et al. |
| 7,424,701 | B2 | 9/2008 | Kendall et al. |
| 7,433,979 | B2 | 10/2008 | Need |
| 7,448,022 | B1 | 11/2008 | Ram et al. |
| 7,451,432 | B2 | 11/2008 | Shukla et al. |
| 7,460,654 | B1 | 12/2008 | Jenkins et al. |
| 7,461,030 | B2 | 12/2008 | Hibler et al. |
| 7,469,233 | B2 | 12/2008 | Shooks et al. |
| 7,493,594 | B2 | 2/2009 | Shenfield et al. |
| 7,516,088 | B2 | 4/2009 | Johnson et al. |
| 7,523,054 | B2 | 4/2009 | Tyson-Quah |
| 7,529,699 | B2 | 5/2009 | Fuse et al. |
| 7,536,325 | B2 | 5/2009 | Randell et al. |
| 7,536,354 | B2 | 5/2009 | deGroeve et al. |
| 7,546,520 | B2 | 6/2009 | Davidson et al. |
| 7,546,575 | B1 | 6/2009 | Dillman et al. |
| 7,565,640 | B2 | 7/2009 | Shukla et al. |
| 7,574,694 | B2 | 8/2009 | Mangan et al. |
| 7,624,371 | B2 | 11/2009 | Kulkarni et al. |
| 7,631,291 | B2 | 12/2009 | Shukla et al. |
| 7,640,195 | B2 | 12/2009 | Von Zimmermann et al. |
| 7,640,291 | B2 | 12/2009 | Maturana et al. |
| 7,644,390 | B2 | 1/2010 | Khodabandehloo et al. |
| 7,653,898 | B1 | 1/2010 | Ali et al. |
| 7,657,406 | B2 | 2/2010 | Tolone et al. |
| 7,657,445 | B1 | 2/2010 | Goux |
| 7,665,083 | B2 | 2/2010 | Demant et al. |

| | | | |
|---|---|---|---|
| 7,668,761 B2 | 2/2010 | Jenkins et al. | |
| 7,672,888 B2 | 3/2010 | Allin et al. | |
| 7,676,786 B2 | 3/2010 | Shenfield et al. | |
| 7,681,176 B2 | 3/2010 | Willis et al. | |
| 7,693,586 B2 | 4/2010 | Dumas et al. | |
| 7,703,073 B2 | 4/2010 | Illowsky et al. | |
| 7,739,160 B1 | 6/2010 | Ryan et al. | |
| 7,742,985 B1 | 6/2010 | Digrigoli et al. | |
| 7,747,980 B2 | 6/2010 | Illowsky et al. | |
| 7,765,156 B2 | 7/2010 | Staniar et al. | |
| 7,765,521 B2 | 7/2010 | Bryant | |
| 7,784,025 B2 | 8/2010 | Challapalli et al. | |
| 7,788,145 B2 | 8/2010 | Wadawadigi et al. | |
| 7,788,319 B2 | 8/2010 | Schmidt et al. | |
| 7,793,256 B2 | 9/2010 | Charisius et al. | |
| 7,793,258 B2 | 9/2010 | Sundararajan et al. | |
| 7,797,698 B2 | 9/2010 | Diament et al. | |
| 7,805,365 B1 | 9/2010 | Slavin et al. | |
| 7,814,142 B2 | 10/2010 | Mamou et al. | |
| 7,822,682 B2 | 10/2010 | Arnold et al. | |
| 7,835,971 B2 | 11/2010 | Stockton et al. | |
| 7,886,041 B2 | 2/2011 | Outhred et al. | |
| 7,895,568 B1 | 2/2011 | Goodwin et al. | |
| 7,904,350 B2 | 3/2011 | Ayala et al. | |
| 7,912,755 B2 | 3/2011 | Perry et al. | |
| 7,917,889 B2 | 3/2011 | Devarakonda et al. | |
| 7,925,985 B2 | 4/2011 | Moore | |
| 8,001,519 B2 | 8/2011 | Conallen et al. | |
| 8,006,224 B2 | 8/2011 | Bateman et al. | |
| 8,010,938 B2 | 8/2011 | Elaasar | |
| 8,051,332 B2 | 11/2011 | Zakonov et al. | |
| 8,078,485 B1 | 12/2011 | Kraehmueller et al. | |
| 8,086,995 B2 | 12/2011 | Luo et al. | |
| 8,091,065 B2 | 1/2012 | Mir et al. | |
| 8,112,738 B2 | 2/2012 | Pohl et al. | |
| 8,140,455 B2 | 3/2012 | Hutson et al. | |
| 2001/0052108 A1 | 12/2001 | Bowman-Amuah | |
| 2002/0026394 A1 | 2/2002 | Savage et al. | |
| 2002/0042756 A1 | 4/2002 | Kumar et al. | |
| 2002/0049622 A1* | 4/2002 | Lettich et al. ................ 705/7 | |
| 2002/0069144 A1 | 6/2002 | Palardy | |
| 2002/0073114 A1 | 6/2002 | Nicastro et al. | |
| 2002/0073396 A1 | 6/2002 | Crupi et al. | |
| 2002/0078046 A1 | 6/2002 | Uluakar et al. | |
| 2002/0082892 A1 | 6/2002 | Raffel et al. | |
| 2002/0095650 A1 | 7/2002 | Green et al. | |
| 2002/0100014 A1 | 7/2002 | Iborra et al. | |
| 2002/0103660 A1 | 8/2002 | Cramon et al. | |
| 2002/0104071 A1 | 8/2002 | Charisius et al. | |
| 2002/0107826 A1 | 8/2002 | Ramachandran et al. | |
| 2002/0120553 A1 | 8/2002 | Bowman-Amuah | |
| 2002/0133368 A1 | 9/2002 | Strutt et al. | |
| 2002/0138281 A1 | 9/2002 | Cirulli et al. | |
| 2002/0138358 A1 | 9/2002 | Scheer | |
| 2002/0143598 A1 | 10/2002 | Scheer | |
| 2002/0156695 A1 | 10/2002 | Edwards | |
| 2002/0161907 A1 | 10/2002 | Moon | |
| 2002/0165745 A1 | 11/2002 | Greene et al. | |
| 2002/0184111 A1 | 12/2002 | Swanson | |
| 2002/0188486 A1 | 12/2002 | Gil et al. | |
| 2002/0198798 A1 | 12/2002 | Ludwig et al. | |
| 2002/0198828 A1 | 12/2002 | Ludwig et al. | |
| 2003/0009754 A1 | 1/2003 | Rowley et al. | |
| 2003/0058277 A1 | 3/2003 | Bowman-Amuah | |
| 2003/0069774 A1 | 4/2003 | Hoffman et al. | |
| 2003/0074271 A1 | 4/2003 | Viswanath et al. | |
| 2003/0074360 A1 | 4/2003 | Chen et al. | |
| 2003/0083762 A1 | 5/2003 | Farrah et al. | |
| 2003/0084127 A1 | 5/2003 | Budhiraja et al. | |
| 2003/0101112 A1 | 5/2003 | Gallagher et al. | |
| 2003/0130860 A1 | 7/2003 | Datta et al. | |
| 2003/0182206 A1 | 9/2003 | Hendrix et al. | |
| 2003/0212602 A1 | 11/2003 | Schaller | |
| 2003/0233290 A1 | 12/2003 | Yang et al. | |
| 2004/0015367 A1 | 1/2004 | Nicastro et al. | |
| 2004/0034578 A1 | 2/2004 | Oney et al. | |
| 2004/0054564 A1 | 3/2004 | Fonseca et al. | |
| 2004/0093268 A1 | 5/2004 | Ramchandani et al. | |
| 2004/0093381 A1 | 5/2004 | Hodges et al. | |
| 2004/0111304 A1 | 6/2004 | Meka et al. | |
| 2004/0111639 A1 | 6/2004 | Schwartz et al. | |
| 2004/0117766 A1 | 6/2004 | Mehta et al. | |
| 2004/0128180 A1 | 7/2004 | Abel et al. | |
| 2004/0133481 A1 | 7/2004 | Schwarze et al. | |
| 2004/0153359 A1 | 8/2004 | Ho et al. | |
| 2004/0158506 A1 | 8/2004 | Wille | |
| 2004/0172510 A1 | 9/2004 | Nagashima et al. | |
| 2004/0177342 A1 | 9/2004 | Worley, Jr. | |
| 2004/0181470 A1 | 9/2004 | Grounds | |
| 2004/0181538 A1 | 9/2004 | Lo et al. | |
| 2004/0205011 A1 | 10/2004 | Northington et al. | |
| 2004/0236639 A1 | 11/2004 | Candadai et al. | |
| 2004/0236687 A1 | 11/2004 | Tyson-Quah | |
| 2004/0243489 A1 | 12/2004 | Mitchell et al. | |
| 2004/0254866 A1 | 12/2004 | Crumbach et al. | |
| 2004/0255152 A1 | 12/2004 | Kanamori et al. | |
| 2005/0010501 A1 | 1/2005 | Ward, Jr. | |
| 2005/0022160 A1 | 1/2005 | Uluakar et al. | |
| 2005/0033588 A1 | 2/2005 | Ruiz et al. | |
| 2005/0044015 A1 | 2/2005 | Bracken et al. | |
| 2005/0060235 A2 | 3/2005 | Byrne | |
| 2005/0060408 A1 | 3/2005 | McIntyre et al. | |
| 2005/0065828 A1* | 3/2005 | Kroswek et al. ................ 705/7 | |
| 2005/0108680 A1 | 5/2005 | Cheng et al. | |
| 2005/0113092 A1 | 5/2005 | Coppinger et al. | |
| 2005/0114829 A1 | 5/2005 | Robin et al. | |
| 2005/0125310 A1 | 6/2005 | Hazi et al. | |
| 2005/0144125 A1 | 6/2005 | Erbey et al. | |
| 2005/0144226 A1 | 6/2005 | Purewal | |
| 2005/0156500 A1 | 7/2005 | Birecki et al. | |
| 2005/0160104 A1 | 7/2005 | Meera et al. | |
| 2005/0165784 A1 | 7/2005 | Gomez et al. | |
| 2005/0177435 A1* | 8/2005 | Lidow ............................ 705/22 | |
| 2005/0203760 A1 | 9/2005 | Gottumukkala et al. | |
| 2005/0203813 A1 | 9/2005 | Welter et al. | |
| 2005/0209732 A1 | 9/2005 | Audimoolam et al. | |
| 2005/0209943 A1 | 9/2005 | Ballow et al. | |
| 2005/0216325 A1 | 9/2005 | Ziad et al. | |
| 2005/0216507 A1 | 9/2005 | Wright | |
| 2005/0222896 A1 | 10/2005 | Rhyne et al. | |
| 2005/0234787 A1 | 10/2005 | Wallmeier et al. | |
| 2005/0235020 A1 | 10/2005 | Gabelmann et al. | |
| 2005/0240592 A1 | 10/2005 | Mamou et al. | |
| 2005/0246250 A1 | 11/2005 | Murray | |
| 2005/0246482 A1 | 11/2005 | Gabelmann et al. | |
| 2005/0256775 A1 | 11/2005 | Schapler et al. | |
| 2005/0256882 A1 | 11/2005 | Able et al. | |
| 2005/0257125 A1 | 11/2005 | Roesner et al. | |
| 2005/0257197 A1 | 11/2005 | Herter et al. | |
| 2005/0262192 A1 | 11/2005 | Mamou et al. | |
| 2005/0262453 A1 | 11/2005 | Massasso | |
| 2005/0284934 A1 | 12/2005 | Ernesti et al. | |
| 2005/0288987 A1 | 12/2005 | Sattler et al. | |
| 2005/0289020 A1 | 12/2005 | Bruns et al. | |
| 2005/0289079 A1 | 12/2005 | Krishan et al. | |
| 2006/0004802 A1 | 1/2006 | Phillips et al. | |
| 2006/0053063 A1 | 3/2006 | Nagar | |
| 2006/0064344 A1 | 3/2006 | Lidow | |
| 2006/0074704 A1 | 4/2006 | Shukla et al. | |
| 2006/0074731 A1 | 4/2006 | Green et al. | |
| 2006/0080338 A1 | 4/2006 | Seubert et al. | |
| 2006/0085243 A1 | 4/2006 | Cooper et al. | |
| 2006/0085294 A1 | 4/2006 | Boerner et al. | |
| 2006/0085336 A1 | 4/2006 | Seubert et al. | |
| 2006/0089886 A1 | 4/2006 | Wong | |
| 2006/0095439 A1 | 5/2006 | Buchmann et al. | |
| 2006/0129978 A1 | 6/2006 | Abrari et al. | |
| 2006/0143029 A1 | 6/2006 | Akbay et al. | |
| 2006/0149574 A1 | 7/2006 | Bradley et al. | |
| 2006/0206352 A1 | 9/2006 | Pulianda | |
| 2006/0248504 A1 | 11/2006 | Hughes | |
| 2006/0274720 A1 | 12/2006 | Adams et al. | |
| 2006/0287939 A1 | 12/2006 | Harel et al. | |
| 2006/0288350 A1 | 12/2006 | Grigorovitch et al. | |
| 2007/0011650 A1 | 1/2007 | Hage et al. | |
| 2007/0022410 A1 | 1/2007 | Ban et al. | |
| 2007/0050308 A1 | 3/2007 | Latvala et al. | |
| 2007/0074150 A1 | 3/2007 | Jolfaei et al. | |

| | | |
|---|---|---|
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233545 A1 | 10/2007 | Cala et al. |
| 2007/0233574 A1 | 10/2007 | Koegler et al. |
| 2007/0233575 A1 | 10/2007 | Berger et al. |
| 2007/0233581 A1 | 10/2007 | Peter |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265860 A1 | 11/2007 | Herrmann et al. |
| 2007/0265862 A1 | 11/2007 | Freund et al. |
| 2008/0004929 A9 | 1/2008 | Raffel et al. |
| 2008/0010049 A1 | 1/2008 | Pouchak et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2008/0263152 A1 | 10/2008 | Daniels et al. |
| 2008/0300959 A1 | 12/2008 | Sinha et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1* | 7/2009 | Abraham et al. .......... 340/10.42 |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070391 A1 | 3/2010 | Storr et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

FOREIGN PATENT DOCUMENTS

WO  WO 2005/114381  12/2005

OTHER PUBLICATIONS

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Duc et al.; "Uniform Object Modeling Methodology and Reuse of Real Time System Using UML"; EMSOFT '05; Sep. 19-22, 2005; pp. 44-47.

Gomaa et al.; "Model Based Software Design and Adaption"; International Workshop on Software Engineering for Adaptive and Self-Managing Systems (SEAMS '07); IEEE; 2007; 10 pages.

Intuit Canada Ltd.; "Startup Guide—QuickBooks Basic for Windows, QuickBooks Pro for Windows, QuickBooks Premier for Windows"; 2002; 230 pages.

Lambert et al.; "Supply Chain Metrics"; International Journal of Logistics Management; vol. 12, No. 1; 2001; pp. 1-19.

Lockamy III, et al.; "Linking SCOR Planning Practices to Supply Chain Performance"; International Journal of Operationgs & Production Management; vol. 24, No. 12; pp. 1192-1218, (2004).

mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

Schultz, G.J.; "Keeping SCOR on Your Supply Chain: Basic Operations Reference Model Updates with the Times"; Information Strategy: The Executive's Journal; Summer 2003; pp. 12-20.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP™ ERP Human Capital Management"; Downloaded Mar. 24, 2010 from <http://web.archive.org/web/20060105084834/www.sap.com/solutions/business-suite/erp/hem/pdf/HCM_Time_Management.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

International Search Report and Written Opinion of the International Searching Authority issued in International Application No. PCT/EP2007/002841; Aug. 16, 2007; 12 pages.

International Preliminary Report on Patentability under Chapter I issued in International Application No. PCT/EP2007/002841; Sep. 30, 2008; 8 pages.

Office Action issued in U.S. Appl. No. 11/396,312 on Mar. 30, 2010; 23 pages.

Office Action issued in U.S. Appl. No. 11/322,611 on Mar. 31, 2010; 17 pages.

Notice of Allowance issued in U.S. Appl. No. 11/322,610 on Mar. 1, 2010; 12 pages.

Notice of Allowance issued in U.S. Appl. No. 11/322,610 on Jun. 14, 2010; 6 pages.

Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Office Action issued in U.S. Appl. No. 12/333,146 on Sep. 6, 2011; 21 pages.
Notice of Allowance issued in U.S. Appl. No. 12/233,462 on Sep. 2, 2011; 7 pages.
Office Action issued in U.S. Appl. No. 12/233,087 on Aug. 18, 2011; 42 pages.
Notice of Allowance issued in U.S. Appl. No. 11/322,382 on Jul. 25, 2011; 5 pages.

Notice of Allowance issued in U.S. Appl. No. 11/396,259 on Aug. 5, 2011; 7 pages.
Notice of Allowance issued in U.S. Appl. No. 11/322,851 on Sep. 2, 2011; 8 pages.
Notice of Allowance issued in U.S. Appl. No. 11/397,026 on Jul. 20, 2011; 8 pages.
Notice of Allowance issued in U.S. Appl. No. 12/233,417 on Sep. 14, 2011; 11 pages.
Notice of Allowance issued in U.S. Appl. No. 11/968,054 on Aug. 2; 5 pages, Aug. 2, 2011.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Notice of Allowance issued in U.S. Appl. No. 11/967,890 on Jul. 15, 2011; 7 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Huang, S. et al.; "Computer-Assisted Supply Chain Configuration Based on Supply Chain Operations Reference (SCOR) Model"; Computers & Industrial Engineering 48; 2005; pp. 377-394.
Huang et al.; "Supply Chain Configuration Based on Supply Chain Operations Reference (SCOR) Model"; Computers and Industrial Engineering; Elsevier; 2005.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; 2004; pp. 1-208.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312 on Sep. 10, 2010; 23 pages.
Office Action issued in U.S. Appl. No. 11/322,611 on Sep. 16, 2010; 21 pages.

Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Notice of Allowance issued in U.S. Appl. No. 11/968,054 on Sep. 7, 2010; 11 pages.
Notice of Allowance issued in U.S. Appl. No. 11/967,865 on Oct. 6, 2010; 6 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 11/967,483 on Aug. 20, 2010; 10 pages.
Office Action issued in U.S. Appl. No. 11/967,483 on Mar. 4, 2011; 6 pages.
Office Action issued in U.S. Appl. No. 12/327,590 on Jun. 23, 2011; 16 pages.
Notice of Allowance issued in U.S. Appl. No. 12/333,085; Sep. 13, 2010; 8 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for WINDOWS® Shipments in First Nine Months of Availability"; PR Newswire; Apr. 28, 1997.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
"Hudson's Bay Company Realizes Fast ROI with the Oracle E-Business Suite"; PR Newswire; New York; Jan. 15, 2002; p. 1.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Office Action issued in U.S. Appl. No. 11/397,029; Jul. 21, 2009; 28 pages.
Office Action issued in U.S. Appl. No. 11/323,040; Jul. 24, 2009; 35 pages.
Office Action issued in U.S. Appl. No. 11/323,590; Jul. 10, 2009; 32 pages.

Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMoS: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance in U,S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Notice of Allowance issued in U.S. Appl. No. 12/233,534 on Dec. 28, 2011; 7 pages.
Notice of Allowanced issued in U.S. Appl. No. 11/322,398 on Oct. 18, 2011; 7 pages.
Office Action issued in U.S. Appl. No. 11/322,383 on Nov. 12, 2009; 23 pages.
Examiner's Answer to Appeal Brief issued in U.S. Appl.No. 11/396,236 on Nov. 10, 2011; 19 pages.
Office Action issued in U.S. Appl. No. 11/396,288 on Oct. 17, 2011; 38 pages.
Notice of Allowance issued in U.S. Appl. No. 11/396,250 on Dec. 7, 2011; 6 pages.
Office Action issued in U.S. Appl. No. 11/396,252 on Nov. 10, 2011; 18 pages.
Notice of Allowance issued in U.S. Appl. No. 11/322,845; Nov. 13, 2011; 9 pages.
Office Action issued in U.S. Appl. No. 11/397,026; Jul. 21, 2009; 28 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Notice of Allowance issued in U.S. Appl. No. 11/967,393 on Nov. 9, 2011; 9 pages.
"IDe Partners with Journyx to Offer Customers Best-in-Class Time Management Solution"; PR Newswire; Mar. 8, 2005; Business Dateline.
"SAP NetWeaver Empowers IT to Drive Innovation into Business Processes across the Enterprise"; Canada NewsWire, 1; May 13; Retrieved on Jun. 12, 2012.
"Trakware Systems Inc. Expands Management Team: Leading To-Order Software Provider Adds Experienced Global VP Sales and Marketing to its World-Class Team"; Canada NewsWire; Apr. 9, 2008.
Business Editors/Technology Writers; "CrossWorlds Software Announces J2EE Interoperability with Open Standards Interface"; Business Wire, 1; Nov. 20; Retrieved on Jun. 12, 2012.
Kagermann, Prof. Dr. Henning & Dr. Peter Zencke; "Plug-and-Play Vision Nears Reality with BPM"; Business Times; Sep. 8, 2005; p. 9.
Kloppmann et al.; "Business Process Choreography in WebSphere: Combining the Power of BPEL and J2EE"; IBM Systems Journal; 2004.
Mani et al.; "Towards Information Networks to Support Composable Manufacturing"; PerMIS 2008.
Meseroll, Robert; "Data Mining Navy Flight"; IEEE Autotestcom 2007; Sep. 2007; pp. 476-481.
Molina et al.; "Resuable Knowledge Based Components for Building Software Applications: A Knowledged Modeling Approach"; International Journal of Software Engineering and Knowledge Engineering; vol. 9, No. 3; 1999; pp. 297-317.
Notice of Allowance in U.S. Appl. No. 12/233,462 on Apr. 5, 2012; 7 pages.
Notice of Allowance issued in U.S. Appl. No. 11/322,382 on May 21, 2012; 5 pages.
Notice of Allowance issued in U.S. Appl. No. 11/322,851 on Mar. 1, 2012; 9 pages.
Notice of Allowance issued in U.S. Appl. No. 11/323,040 on Jun. 8, 2012; 9 pages.
Notice of Allowance issued in U.S. Appl. No. 11/323,634 on Jan. 25, 2012; 5 pages.
Notice of Allowance issued in U.S. Appl. No. 11/396,250 on Jul. 10, 2012; 6 pages.
Notice of Allowance issued in U.S. Appl. No. 11/396,258 on Feb. 3, 2012; 12 pages.
Notice of Allowance issued in U.S. Appl. No. 11/396,259 on Mar. 15, 2012; 7 pages.
Notice of Allowance issued in U.S. Appl. No. 11/396,288; Apr. 27, 2012; 15 pages.
Notice of Allowance issued in U.S. Appl. No. 11/396,327 on Jun. 20, 2012; 29 pages.
Notice of Allowance issued in U.S. Appl. No. 11/397,026 on Feb. 23, 2012; 8 pages.
Notice of Allowance issued in U.S. Appl. No. 11/404,147 on Jul. 5, 2012; 17 pages.
Notice of Allowance issued in U.S. Appl. No. 12/233,075 on Mar. 22, 2012; 25 pages.
Notice of Allowance issued in U.S. Appl. No. 12/233,087 on Mar. 30, 2012; 30 pages.

Notice of Allowance issued in U.S. Appl. No. 12/233,289 on Feb. 15, 2012; 11 pages.
Notice of Allowance issued in U.S. Appl. No. 12/233,417 on Jul. 27, 2012; 10 pages.
Notice of Allowance issued in U.S. Appl. No. 12/233,457 on May 16, 2012; 7 pages.
Notice of Allowance issued in U.S. Appl. No. 12/233,458 on May 1, 2012; 17 pages.
Notice of Allowance issued in U.S. Appl. No. 12/233,534 won Jul. 18, 2012;16 pages.
Notice of Allowance issued in U.S. Appl. No. 12/233,550 on Jan. 9, 2012; 11 pages.
Notice of Allowance issued in U.S. Appl. No. 12/327,354 on Jul. 25, 2012; 17 pages.
Notice of Allowance issued in U.S. Appl. No. 12/327,590 on Jul. 19, 2012; 11 pages.
Notice of Allowance issued in U.S. Appl. No. 12/327,701 on Apr. 6, 2012; 9 pages.
Notice of Allowance issued in U.S. Appl. No. 12/327,737 on Jul. 10, 2012; 7 pages.
Notice of Allowance issued in U.S. Appl. No. 12/332,965 on Jun. 11, 2012; 21 pages.
Notice of Allowance issued in U.S. Appl. No. 11/323,039 on Jun. 7, 2012; 9 pages.
Notice of Allowanced issued in U.S. Appl. No. 11/322,398 on May 3, 2012; 7 pages.
Notice of Allowance issued in U.S. Appl. No. 11/322,383 on May 21, 2012; 14 pages.
Office Action issued in U.S. Appl. No. 11/322,482; Aug. 21, 2012; 27 pages.
Office Action issued in U.S. Appl. No. 11/322,612 on Jun. 26, 2012; 11 pages.
Office Action issued in U.S. Appl. No. 11/322,816 on Jun. 7, 2012; 12 pages.
Office Action issued in U.S. Appl. No. 11/323,041 on Jun. 7, 2012; 12 pages.
Office Action issued in U.S. Appl. No. 11/967,387 on Apr. 12, 2012; 13 pages.
Office Action issued in U.S. Appl. No. 12/233,479 on May 7, 2012; 26 pages.
Office Action issued in U.S. Appl. No. 12/233,489 on Jun. 6, 2012; 87 pages.
Office Action issued in U.S. Appl. No. 12/327,737 on Mar. 26, 2012; 14 pages.
Office Action issued in U.S. Appl. No. 12/333,146 on Feb. 2, 2012; 21 pages.
Office Action issued in U.S. Appl. No. 13/413,069 on Aug. 1, 2012; 45 pages.
Supplemental Notice of Allowance issued in U.S. Appl. No. 12/333,085; Jun. 13, 2012; 5 pages.
Trappey, Amy; "Design and Analysis of a Rule Based Knowledge"; International Journal of Manufacturing Tech; Dec. 2007; 35,3-4:385-93.
Zeng et al.; "Model Analysis for Business Event Processing"; IBM Systems Journal 2007.
Zimmermann et al.; "Service-Oriented Architecture and Business Process Choreography in an Order Management Scenario: Rationale, Concepts, Lessons Learned"; OOPLA 2005.

* cited by examiner

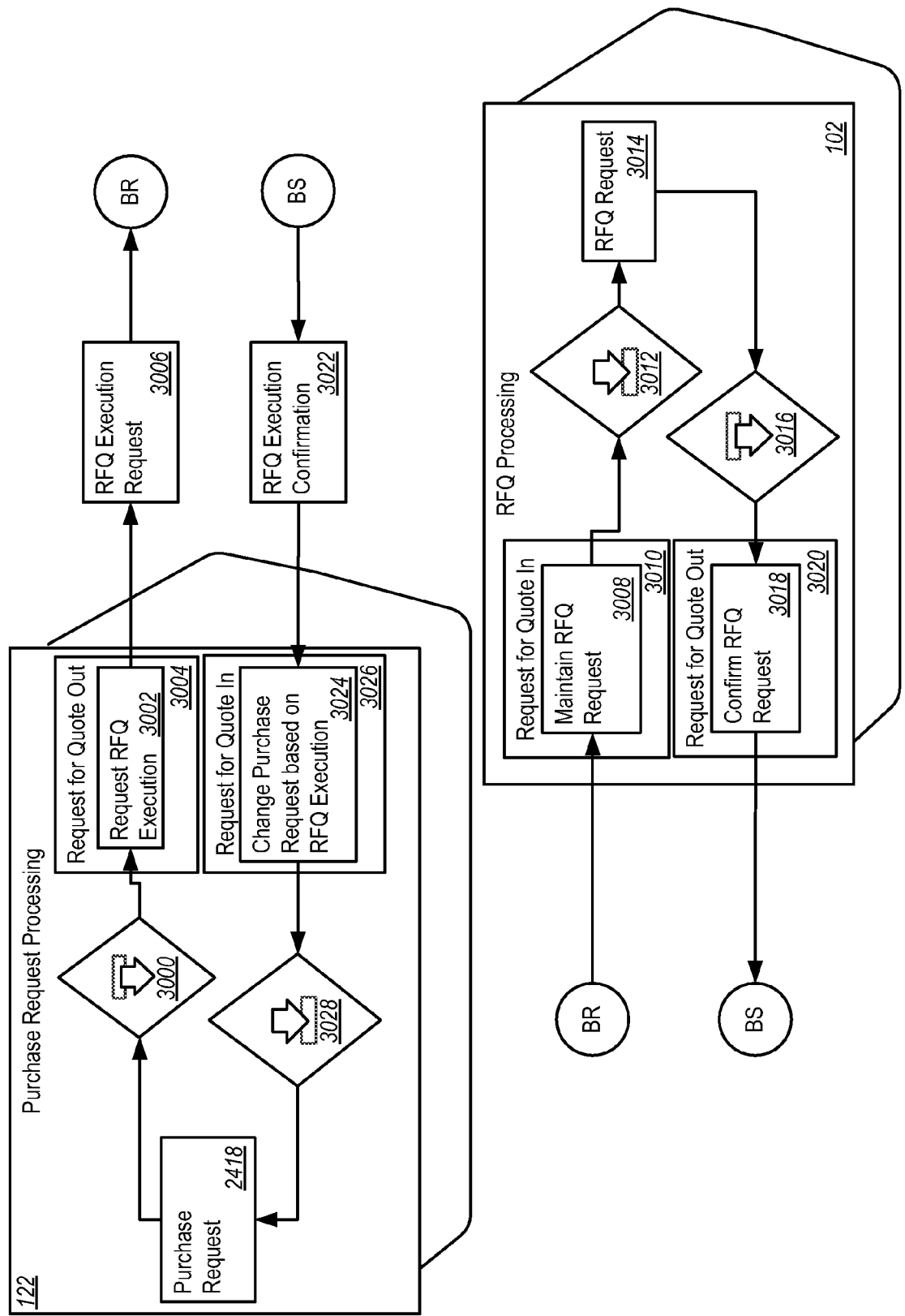

US 8,401,908 B2

ARCHITECTURAL DESIGN FOR MAKE-TO-SPECIFICATION APPLICATION SOFTWARE

BACKGROUND

The subject matter of this patent application relates to computer software architecture, and more particularly to the architecture of application software for make-to-specification services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing make-to-specification services.

In its various aspects, the present disclosure can be implemented as methods, systems, and apparatus, including computer program products, for implementing a software architecture design for a software application implementing make-to-specification services. The software application is structured as multiple process components interacting with each other through service interfaces, and multiple service operations, each being implemented for a respective process component. The process components include an RFQ Processing process component, a Purchase Request Processing process component, a Purchase Order Processing process component, a Purchasing Contract Processing process component, a Supplier Invoice Processing process component, a Supply and Demand Matching process component, an External Procurement Trigger and Response process component, a Customer Requirement Processing process component, a Logistics Execution Control process component, a Production Trigger and Response process component, a Production process component, an Inventory Processing process component, an Inbound Delivery Processing process component, a Site Logistics Processing process component, an Outbound Delivery Processing process component, a Production and Site Logistics Auxiliaries Processing process component, a Freight Documents Processing process component, a Balance of Foreign Payment Management process component, a Due Item Processing process component, a Payment Processing process component, an Accounting process component, a Customer Invoice Processing process component, a Customer Quote Processing process component, a Sales Order Processing process component, a Financial Accounting Master Data Management process component, a Production Requirement Specification Processing process component, and a Goods Tag Processing process component.

In its various aspects, the present disclosure can further be implemented as methods, systems, and apparatus, including computer program products, implementing a software architecture design for a software application that is adapted to interact with external software systems through the service operations described in reference to external process components, or a sub combination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

FIG. 30 is a block diagram showing interactions between the Purchase Request Processing process component and an RFQ Processing process component.

Like reference numbers and designations in the various drawings indicate like elements.

DETAILED DESCRIPTION

Figure 1A:
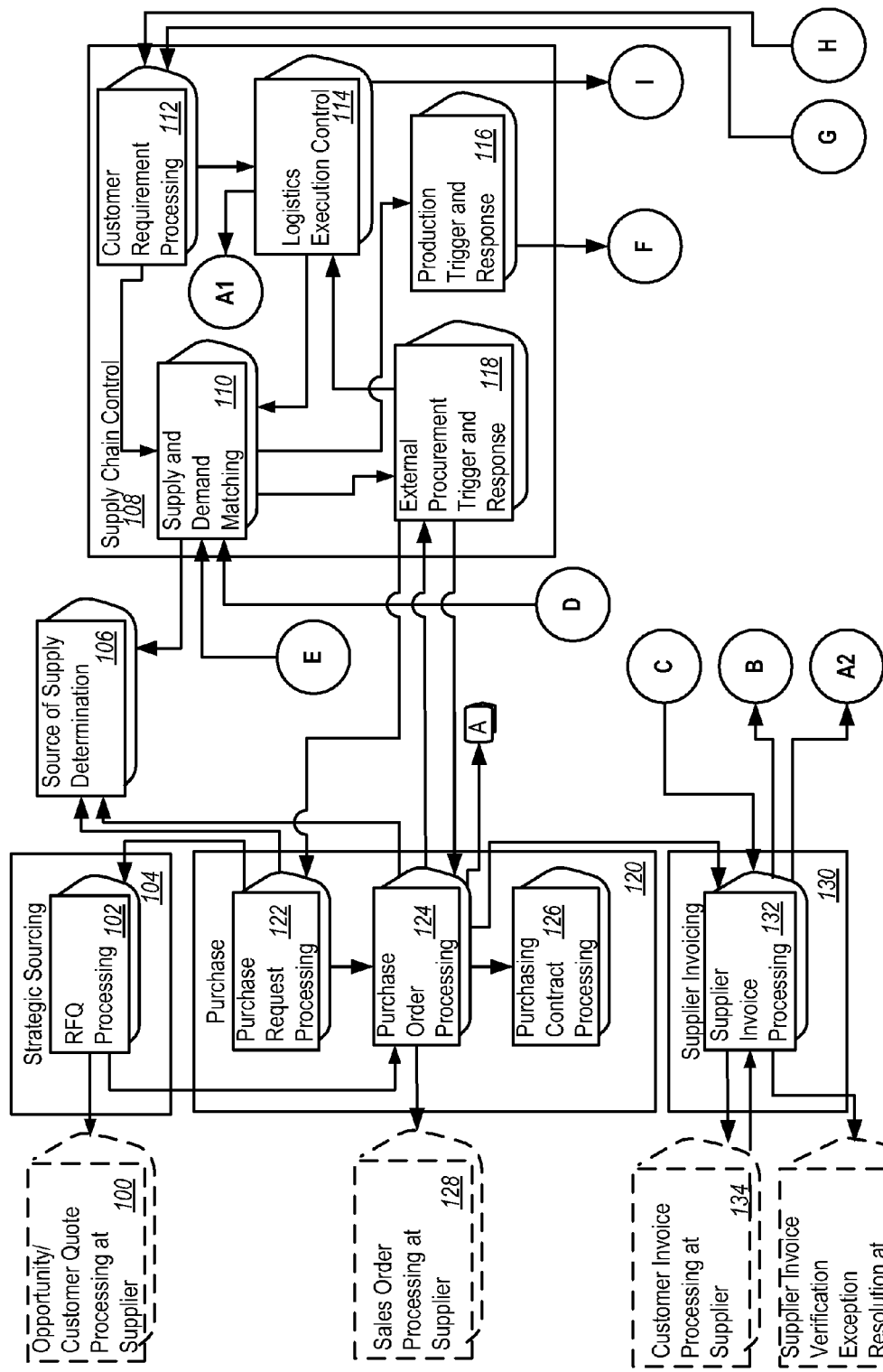
FIGS. 1A, 1B, 1C, and 1D are block diagrams collectively showing a software architectural design for a make-to-specification software application.

FIGS. 1A, 1B, 1C, and 1D collectively show the software architectural design for a make-to-specification software application. The make-to-specification application is software that implements a scenario to sell individualized materials to customers which are specified by the customer and only supplied after the sales order is received.

As shown in FIGS. 1A, 1B, 1C, and 1D, the make-to-specification design includes a Strategic Sourcing deployment unit 104, a Purchasing deployment unit 120, a Supplier Invoicing deployment unit 130, a Supply Chain Control deployment unit 108, a Production and Site Logistics Execution deployment unit 138, a Financials deployment unit 160, a Customer Invoicing deployment unit 176, a Customer Relationship Management deployment unit 182, and a Foundation deployment unit 192.

As shown in FIG. 1A, the Strategic Sourcing deployment unit 104 includes an RFQ Processing process component 102. The RFQ Processing process component 102 represents the processing of requests for quotes and supplier quotes for strategic as well as operational negotiation purposes.

The Purchase deployment unit 120 includes a Purchase Request Processing process component 122, a Purchase Order Processing process component 124, and a Purchasing Contract Processing process component 126. The Purchase Request Processing process component 122 can create, change, and process purchase requests to locate appropriate external sources of supply. The Purchase Order Processing process component 124 can create and maintain purchase orders and purchase order confirmations. The Purchasing Contract Processing process component 126 creates and maintains purchasing contracts.

The Supplier Invoicing deployment unit 130 includes a Supplier Invoice Processing process component 132. The process component 132 handles the management and volume processing of supplier invoices (e.g. exception handling and approval).

The Supply Chain Control deployment unit 108 includes a Supply and Demand Matching process component 110, an External Procurement Trigger and Response process component 118, a Customer Requirement Processing process component 112, a Logistics Execution Control process component 114, and a Production Trigger and Response process component 116. The Supply and Demand Matching process component 110 manages all the tasks necessary to ensure that sufficient material receipt elements exist to cover material demand while taking available capacity into account. The External Procurement Trigger and Response process component 118 manages all the tasks necessary for processing procurement planning and procurement release orders, and the interface to purchasing, accounting, supplier invoicing, outbound delivery, and the supplier from a supply planning and control perspective. The Customer Requirement Processing process component 112 controls customer requirements in the supply chain. For example, it can check material availability, receiving, preparing, and passing customer requirements on to supply planning and logistics, and providing feedback on fulfillment. The Logistics Execution Control process component 114 can create, control, and monitor the supply chain execution activities that are necessary for the fulfillment of an order on a macro-logistics level. For example, it can trigger the necessary site logistics activities and receives information about the supply chain execution progress. The Production Trigger and Response process component 116 handles production requisitions, receive information about the production progress, and update the planning data accordingly.

The software architectural design for a make-to-order specification software application also includes a Source of Supply Determination process component 106. The process component 106 represents the maintenance of and access to sources of supply and quota arrangements for external and internal procurement processes.

A number of external process components will be used to describe the architectural design these include an Opportunity/Customer Quote Processing at Supplier process component 100, a Sales Order Processing at Supplier process component 128, a Customer Invoice Processing at Supplier process component 134, and a Supplier Invoice Verification Exception Resolution at Processor process component 136.

Figure 1B:
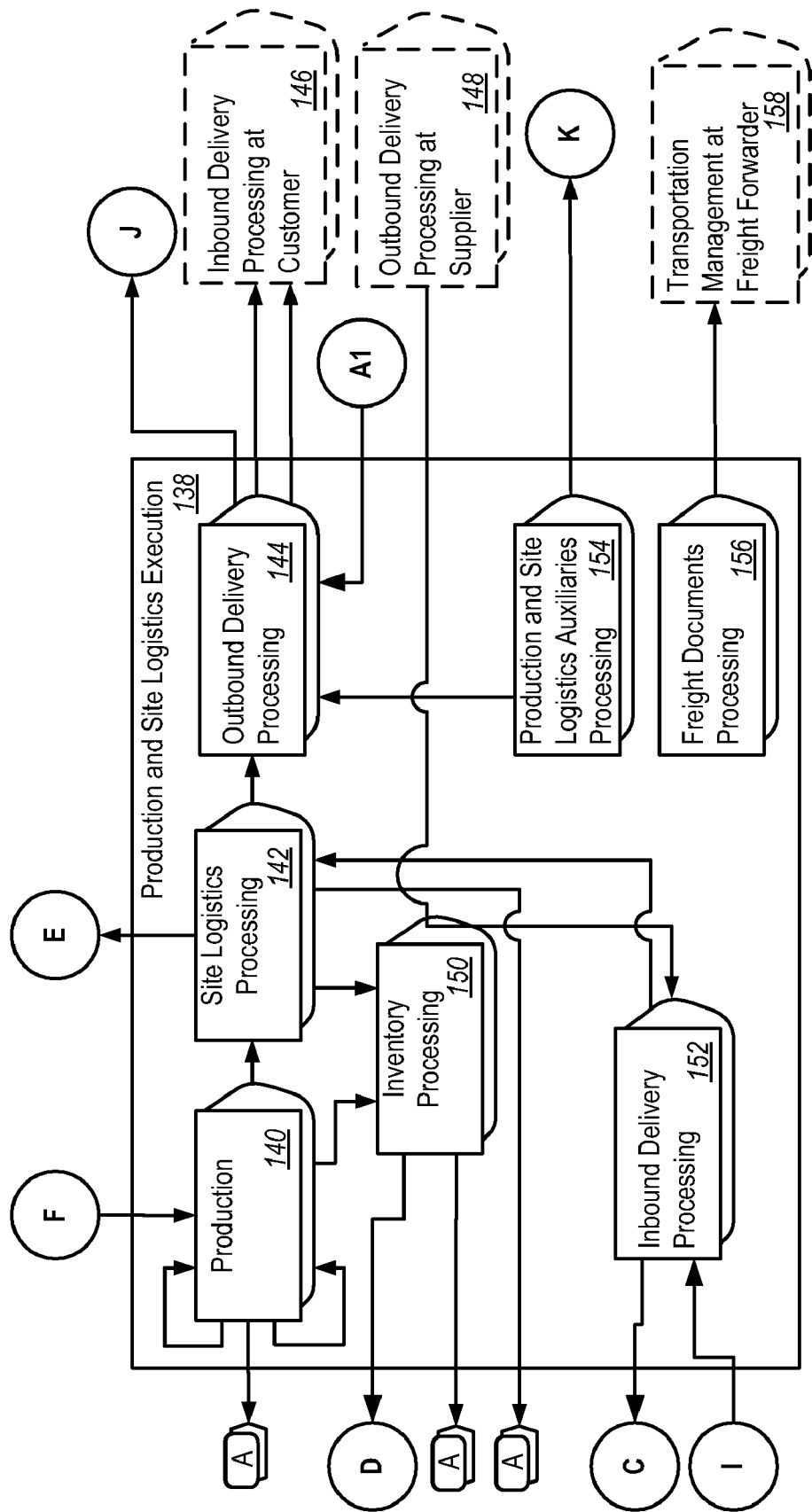

As shown in FIG. 1B, the Production and Site Logistics Execution deployment unit 138 includes a Production process component 140, a Site Logistics Processing process component 142, an Inventory Processing process component 150, an Outbound Delivery Processing process component 144, an Inbound Delivery Processing process component 152, a Production and Site Logistics Auxiliaries Processing process component 154, and a Freight Document Processing process component 156.

The Production process component 140 executes the production on the shop floor. For example, it can comprise the preparation, execution, confirmation, and completion as well as the more general functions such as scheduling, and monitoring. The Site Logistics Processing process component 142 can prepare, physically execute, and confirm the logistics processes within a site. Logistics processes, which are based on site logistics process models, include picking, shipping, and receiving. The Inventory Processing process component 150 manages the inventory and recording of inventory changes. It provides services to maintain current stock, content, and structure of logistic units and allocations. The Outbound Delivery Processing process component 144 manages and processes the outbound delivery requirements for shipping goods to a product recipient. For example, it can combine all document-based tasks for the outbound delivery process, and enable communication with the originating document (fulfillment), the product recipient, and invoicing. The Inbound Delivery Processing process component 152 manages and processes the inbound delivery requirements for received goods from a vendor. For example, it can combine all document-based tasks for the inbound delivery process, and enable communication with the originating document (fulfillment), the vendor, and invoicing. The Production and Site Logistics Auxiliaries Processing process component 154 supports the functionality valid for multiple process components in the DU Production and Site Logistics Execution. The Freight Documents Processing process component 156 can process the freight-related documents for shipping purposes.

A number of external process components will be used to describe the architectural design these include an Inbound Delivery Processing at Customer process component 146, an Outbound Delivery Processing at Supplier process component 148, and a Transportation Management at Freight Forwarder process component 158.

Figure 1C:
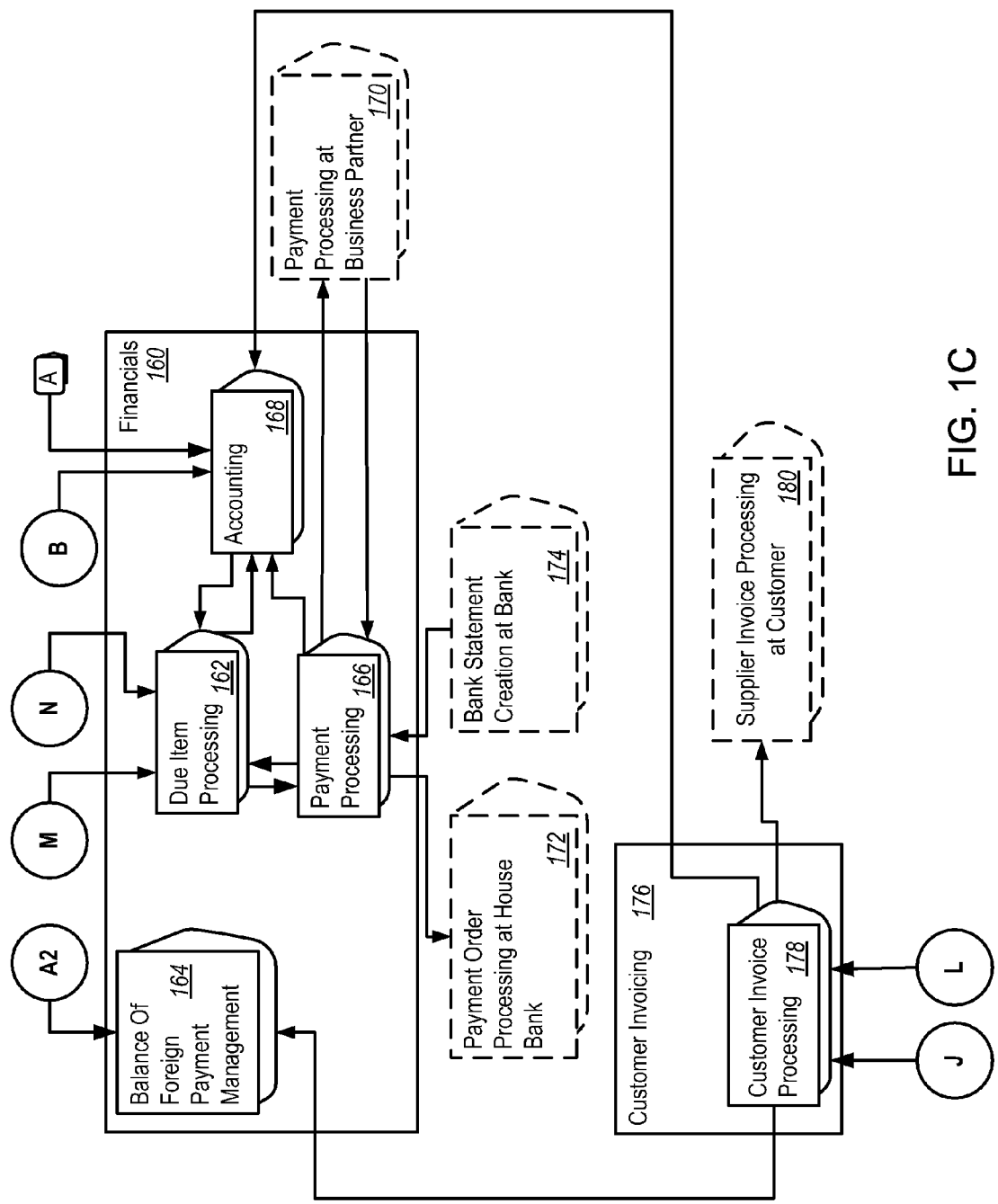

As shown in FIG. 1C, the Financials deployment unit 160 includes a Balance of Foreign Payment Management process component 164, a Due Item Processing process component 162, an Accounting process component 168, and a Payment Processing process component 166. The Balance of Foreign Payment Management process component 164 can collect, process and report the receivables and payables according to foreign trade regulations that are required by the financial authority of a country (e.g. the central bank). The Due Item Processing process component 162 can collect, manage, and monitor the trade receivables or payables and corresponding sales tax or withholding tax. The Accounting process component 168 represents the business transactions for valuation and profitability analysis. The Payment Processing process component 166 processes and manages the payments. The process component 166 is responsible for the associated communication with financial institutions such as banks, and provides the primary input for liquidity management.

The Customer Invoicing deployment unit 176 includes a Customer Invoice Processing process component 178. The process component 178 represents the invoicing of customers for the delivery of goods or the provision of services.

A number of external process components will be used to describe the architectural design these include a Payment Order Processing at House Bank process component 172, a Bank Statement Creation at Bank process component 174, a Payment Processing at Business Partner process component 170, and a Supplier Invoice Processing at Customer process component 180.

Figure 1D:
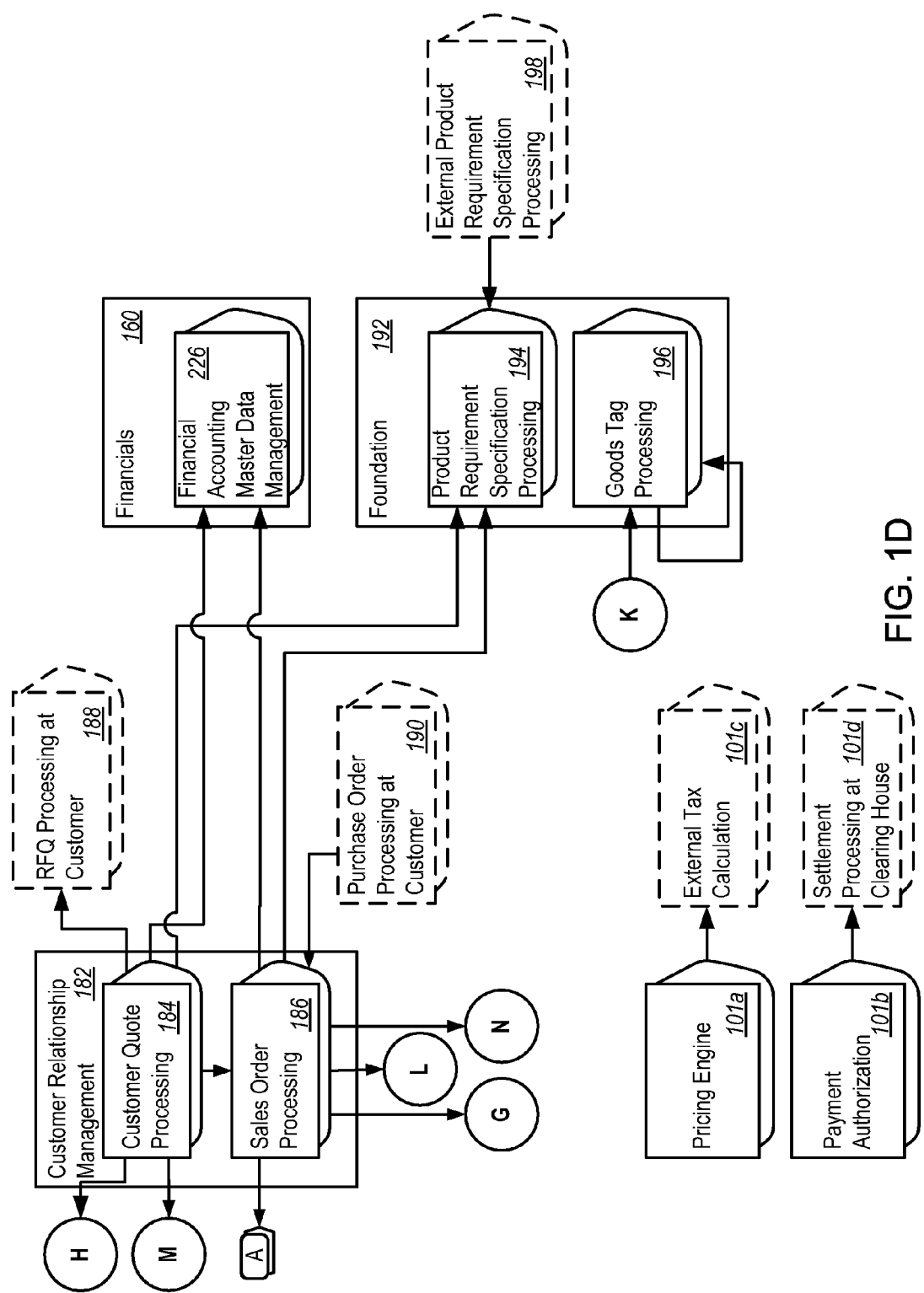

As shown in FIG. 1D, the Customer Relationship Management deployment unit 182 includes a Customer Quote Processing process component 184 and a Sales Order Processing process component 186. The Customer Quote Processing process component 184 processes the quotes to customers offering the delivery of goods according to specific terms. The Sales Order Processing process component 186 processes the customers' requests to seller for the delivery of goods, on a specific date, for a specific quantity, and for a specific price.

The Financials deployment unit 160 includes a Financial Accounting Master Data Management process component 226. The process component 226 represents the management of financial accounting master data that is used both for accounting and costing purposes.

A number of external process components, described below, will be used to describe the architectural design. These include an RFQ Processing at Customer process component 188, a Purchase Order Processing at Customer process component 190, an External Product Requirement Specification Processing process component 198, an External Tax Calculation process component 101c, and a Settlement Processing at Clearing House process component 101d.

The foundation layer, described below, includes a Pricing Engine process component 101a and a Payment Authorization process component 101b. The Pricing Engine process component 101a handles the processing of price and tax calculation. The Payment Authorization process component 101b handles the processing of an authorization request for a payment made using a payment card, at a clearing house.

The foundation layer also includes the Foundation deployment unit 192, which includes a Product Requirement Specification Processing process component 194 and a Goods Tag Processing process component 196.

Figure 2:
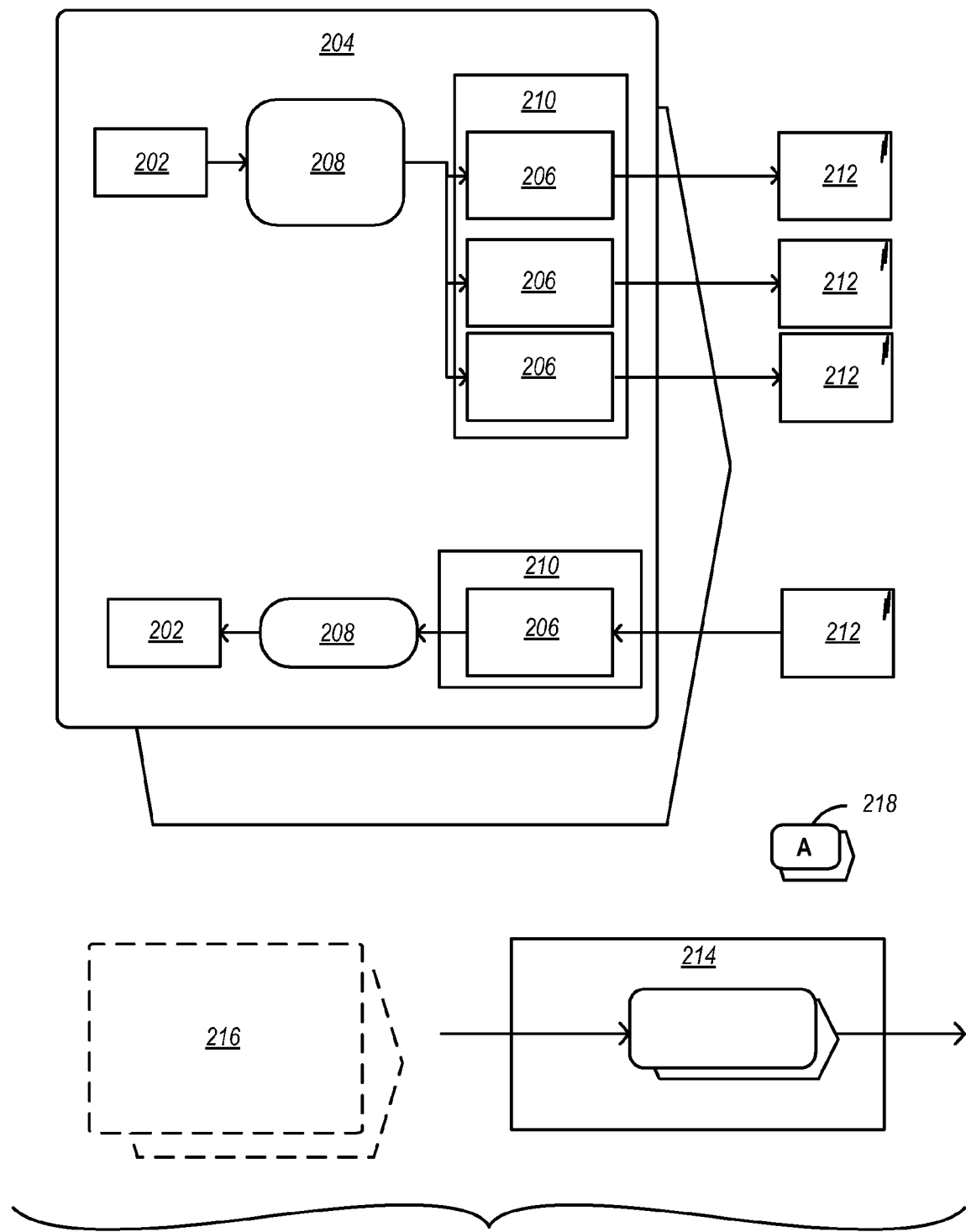
FIG. 2 illustrates the elements of the architecture as they are drawn in the figures.

FIG. 2 illustrates the elements of the architecture as they are drawn in the figures of this patent application. The elements of the architecture include the business object (drawn as icon 202), the process component (drawn as icon 204), the operation (drawn as icon 206), the process agent (drawn as icon 208), the service interface or interface (drawn as icon 210), the message (drawn as icon 212), and the deployment unit (drawn as icon 214).

Not explicitly represented in the figures is a foundation layer that contains all fundamental entities that are used in multiple deployment units. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are assigned to their respective deployment unit.

A process component of an external system is drawn as a dashed-line process component (drawn as icon 216). Such a process component may be referred to as an external process component, and it is used to represent the external system in describing interactions with the external system; however, this should be understood to require no more of the external system than that it be able to produce and receive messages as required by the process component that interacts with the external system.

The connector icon 218 is used to simplify the drawing of interactions between process components.

Interactions between process component pairs involving their respective business objects, process agents, operations, interfaces, and messages are described as process component interactions, which determine the interactions of a pair of process components across a deployment unit boundary, i.e., from one deployment unit to another deployment unit. Interactions between process components are indicated in FIGS. 1A-1D by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components, but interfaces, process agents, and business objects that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Whether an object as a type or an instance of an object is intended by the term "object" is generally clear from the context, so the distinction will be made explicitly only when necessary. Also, for convenience and brevity, an object instance may be described in this specification as being or including a real world event, activity, item, or the like; however, such description should be understood as stating that the object instance represents (i.e., contains data representing) the respective event, activity, item, or the like. Properly implemented, business objects are implemented free of redundancies.

The architectural elements also include the process component. A process component is a software package that realizes a business process and generally exposes its functionality as services. The functionality includes the ability to perform all or parts of particular kinds of business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters serving as a signature.

The architectural elements optionally include the service interface, referred to simply as the interface. An interface is a named group of operations. Each operation belongs to exactly one interface. An interface belongs to exactly one process component. A process component might implement multiple interfaces. In some implementations, an interface will have only inbound or outbound operations, but not a mixture of both. One interface can include both synchronous and asynchronous operations. All operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An outbound process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement supports the operations of the original.

Interactions Between Process Components "Customer Quote Processing" and "Customer Requirement Processing"

Figure 3:
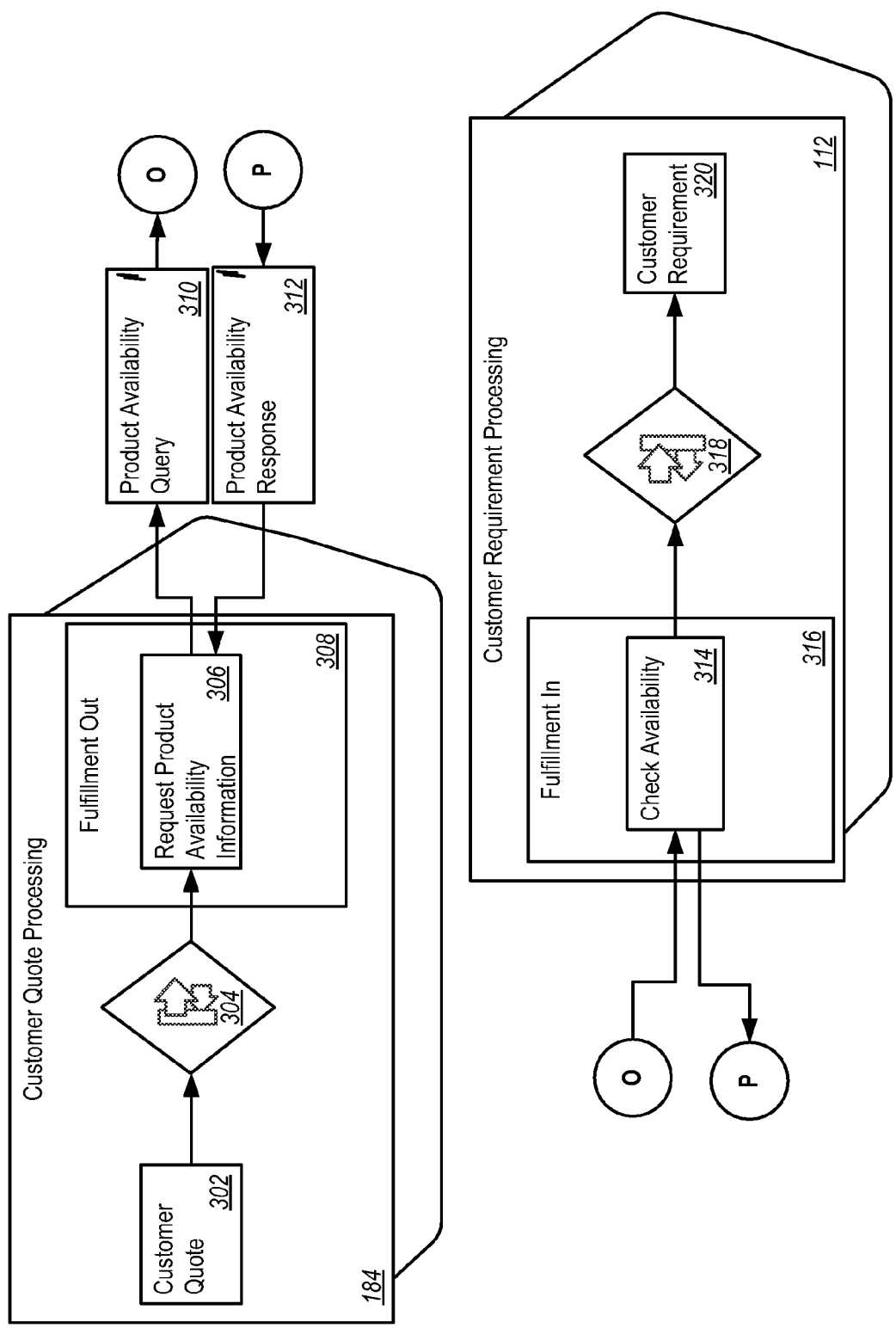
FIG. 3 is a block diagram showing interactions between a Customer Quote Processing process component and a Customer Requirement Processing process component.

FIG. 3 is a block diagram showing interactions between the Customer Quote Processing process component 184 and the Customer Requirement Processing process component 112 in the architectural design of FIGS. 1A-1D. The interaction starts when the Customer Quote Processing process component 184 requests an availability check for the desired product from the Customer Requirement Processing process component 112 (e.g., without reservation of the available quantities) when a customer quote is created or updated.

As shown in FIG. 3, the Customer Quote Processing process component 184 includes a Customer Quote business object 302. The Customer Quote business object 302 represents an offer by a seller to a customer for the delivery of goods or services according to fixed terms. For example, the offer is legally binding for the seller for a specific period of time.

The Customer Quote business object 302 uses a Synchronous Request Product Availability from Customer Quote to Customer Requirement synchronous outbound process agent 304 to invoke a Request Product Availability Information operation 306. The Request Product Availability Information operation 306 sends non-binding query for the availability of specified amounts of specified products at specified dates to request product availability information for customer quote items. The operation 306 is included in a Fulfillment Out interface 308. In this example, the Request Product Availability Information operation 306 sends a Product Availability Query message 310 to the Customer Requirement Processing process component 112.

A Check availability operation 314 receives the Product Availability Query message 310. The operation 314 is included in a Fulfillment In interface 316. The operation 314 can check the availability of certain amounts of materials at certain dates and sends this information back to the caller. In this example, the Check Availability operation 314 sends a Product Availability Response message 312 that includes non-binding information which amounts of products are available at which dates to the Customer Quote Processing process component 184. The message 312 is received by the Request Product Availability Information operation 306.

The Check Availability operation 314 uses a Check Availability synchronous inbound process agent 318 to update a Customer Requirement business object 320. The customer requirement business object 320 represents a requirement that is derived from a sales order, customer quote, service order, or that is an intra-company stock transfer requirement, and to which details on the anticipated availability date of materials required to fulfill the requirement may be added. It contains the quantities of materials required at specific dates as well as information about which materials will be available or delivered in which quantities at which dates.

Interactions Between Process Components "Site Logistics Processing" and "Accounting"

Figure 4:
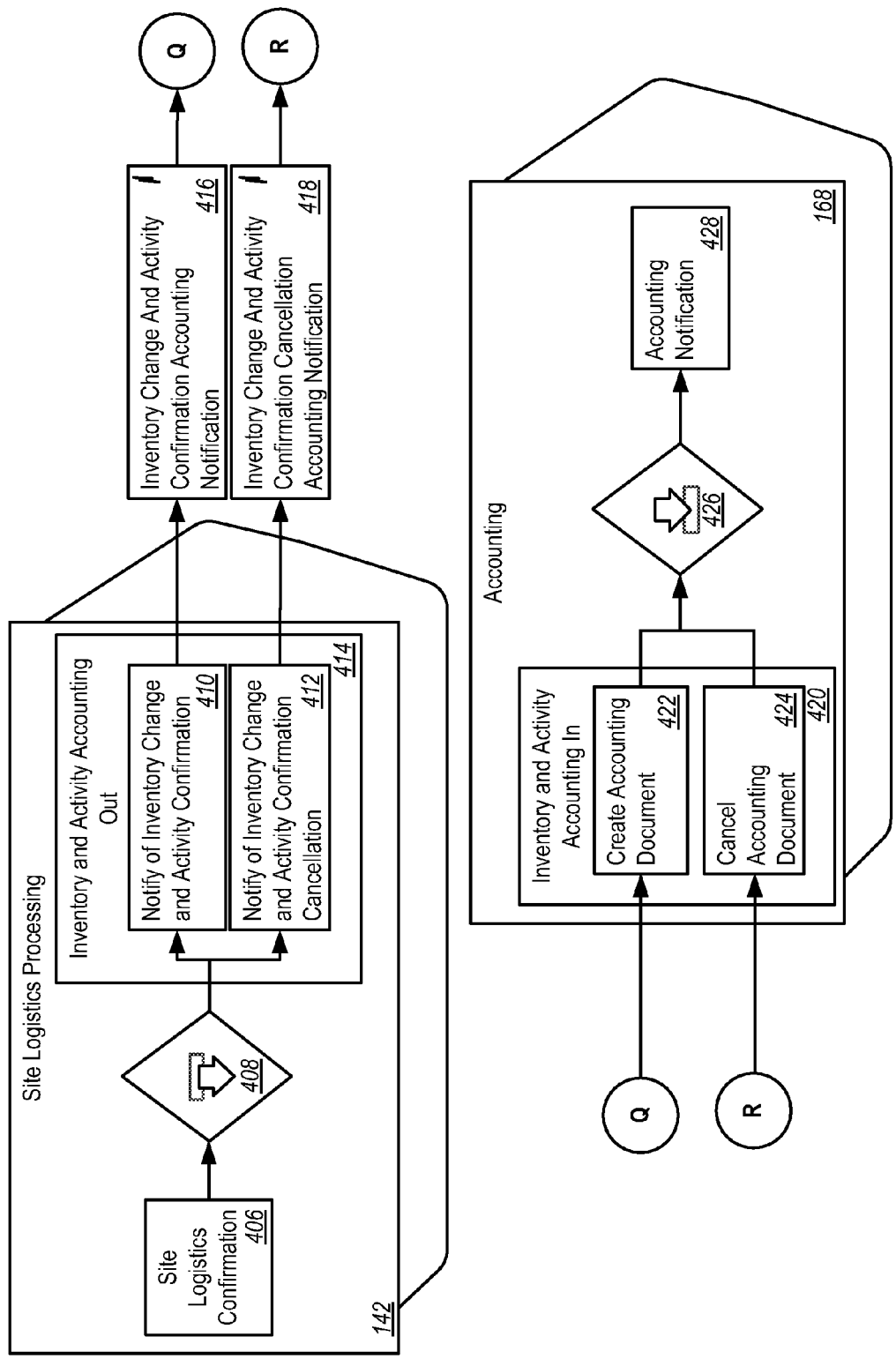
FIG. 4 is a block diagram showing interactions between a Site Logistics Processing process component and an Accounting process component.

FIG. 4 is a block diagram showing interactions between the Site Logistics Processing process component 142 and the Accounting process component 168 in the architectural design of FIGS. 1A-1D. The interaction starts when a site logistics confirmation is created. The Site Logistics Processing process component 142 notifies the Accounting process component 168 of confirmed or cancelled inventory changes. The inventory changes can be used to update the Accounting process component 168.

The Site Logistics Processing process component 142 includes a Site Logistics Confirmation business object 406. The Site Logistics Confirmation business object 406 represents a record of confirmed logistic process changes which result from the execution of a site logistics process at a specific time (e.g., inventory changes, plan adjustments, resource utilizations, or progress status changes).

The Site Logistics Confirmation business object 406 uses a Notify of Inventory Change from Site Logistics Confirmation to Accounting outbound process agent 408 to invoke a Notify of Inventory Change and Activity Confirmation operation 410 or a Notify of Inventory Change and Activity Confirmation Cancellation operation 412. The Notify of Inventory Change and Activity Confirmation operation 410 notifies the Accounting process component 168 about inventory changes, for physical goods, and activity confirmations. Additionally, the operation 410 can trigger a valuation of the relevant inventory changes and activities. The Notify of Inventory Change and Activity Confirmation Cancellation operation 412 notifies the Accounting process component 168 about a cancellation of inventory changes and activity confirmations sent earlier. Both operations 410 and 412 are included in an Inventory and Activity Accounting Out interface 414.

If the Notify of Inventory Change and Activity Confirmation operation 410 is invoked, then an Inventory Change and Activity Confirmation Accounting Notification message 416 is sent to the Accounting process component 168. If the Notify of Inventory Change and Activity Confirmation Cancellation operation 412 is invoked, then an Inventory Change and Activity Confirmation Accounting Cancellation Request Notification message 418 is sent to the Accounting process component 168. The notification message 416 is received by a Create Accounting Document operation 422. The operation 422 can create an accounting document based on inventory data received from the Site Logistics Processing process component 414. In some implementations, the received data can first be converted into an accounting notification from which one or more accounting documents are created according to the relevant sets of books.

The Activity Confirmation Accounting Cancellation Request Notification message 418 is received by a Cancel Accounting Document operation 424. The operation 424 can cancel an existing accounting document based on cancellation data received from the Site Logistics Processing process component 414. In some implementations, the received data can be converted into an accounting notification from which one or more reversal accounting documents are created according to the relevant sets of books. The operations 422 and 424 are included in an Inventory and Activity Accounting In interface 420. The operations 422 and 424 use a Maintain Accounting Document based on Inventory and Activity inbound process agent 426 to update an Accounting Notification business object 428. The Accounting Notification business object 428 represents a notification sent to the Financials deployment unit 160 by an operational component regarding a business transaction. For example, it represents this operational business transaction in a standardized form for business transaction documents and contains the data needed to valuate the business transaction.

Interactions Between Process Components "Logistics Execution Control" and "Outbound Delivery Processing"

Figure 5A:
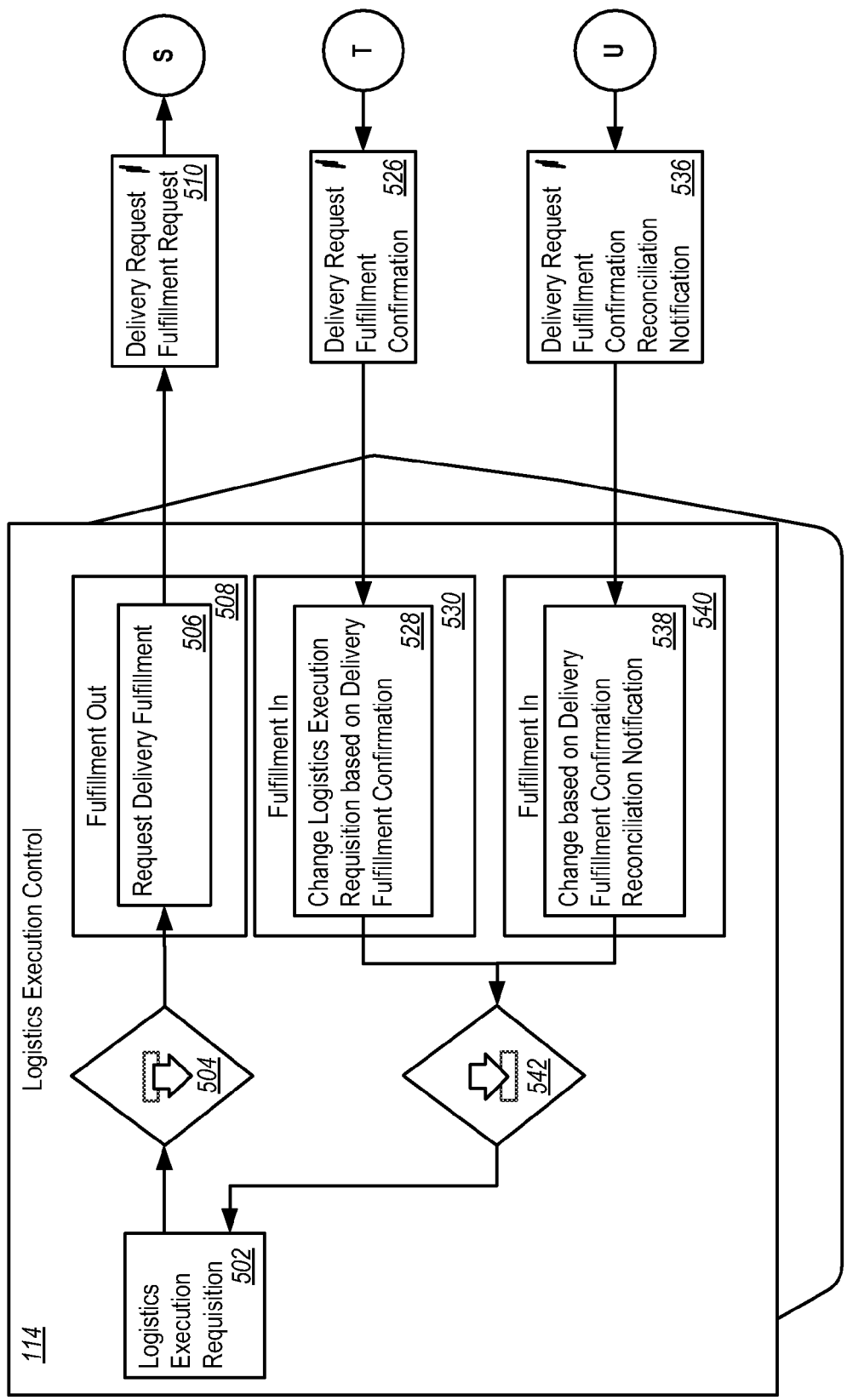
FIGS. 5A and 5B are block diagrams collectively showing interactions between a Logistics Execution Control process component and an Outbound Delivery Processing process component.
Figure 5B:
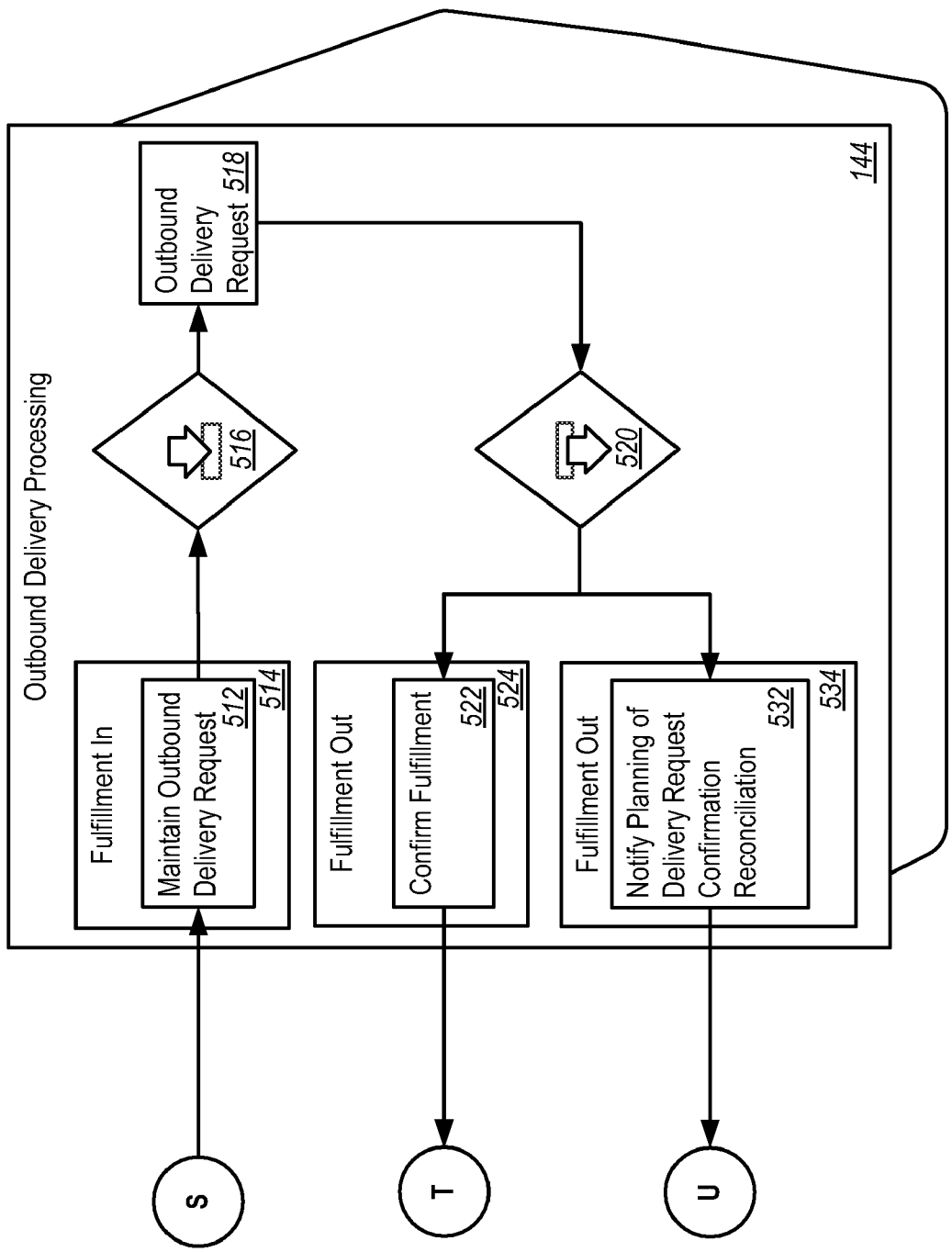

FIGS. 5A and 5B show interactions between the Logistics Execution Control process component 114 and the Outbound Delivery Processing process component 144 in the architectural design of FIGS. 1A-1D. The interaction starts with the requesting of the creation or update of an outbound delivery request(s) from the Outbound Delivery Processing process component 144 when a logistics execution requisition is released.

As shown in FIGS. 5A and 5B, the Logistics Execution Control process component 114 includes a Logistics Execution Requisition business object 502. The Logistics Execution Requisition business object 502 represents a requisition to the Logistics Execution Control process component 114 to control, trigger, and monitor the execution of a logistic process on a macro-logistics level to fulfill an order. The Logistics Execution Requisition business object 502 uses a Request Fulfillment from Logistics Execution Request to Outbound Delivery Processing outbound process agent 504 to invoke a Request Delivery Fulfillment operation 506. The operation 504 creates or updates an inbound or outbound delivery request.

The Request Delivery Fulfillment operation 506 is included in a Fulfillment Out interface 508. The operation 506 sends a Delivery Request Fulfillment message 510 to the Outbound Delivery Processing process component 144.

A Maintain Outbound Delivery Request operation 512 receives the Delivery Request Fulfillment message 510. The operation 512 is included in a Fulfillment In interface 514. The Maintain Outbound Delivery Request operation 512 receives an outbound delivery fulfillment request. The Maintain Outbound Delivery Request operation 512 uses a Maintain Outbound Delivery Request inbound process agent 516 to update an Outbound Delivery Request business object 518. The Outbound Delivery Request business object 518 represents a request to a vendor to compose goods for shipping.

The Outbound Delivery Request business object 518 uses a Confirm Fulfillment of Outbound Delivery Request to Logistics Execution Control outbound process agent 520 to invoke a Confirm Fulfillment operation 522 included in a Fulfillment Out interface 524. The Confirm Fulfillment of Outbound Delivery Request to Logistics Execution Control outbound process agent 520 can also invoke an optional Notify Planning of Delivery Request Confirmation Reconciliation Description operation 532 in a Fulfillment Out interface 534. The Confirm Fulfillment operation 522 confirms and fulfills an outbound delivery request. The optional Notify Planning of Delivery Request Confirmation Reconciliation Description operation 532 notifies the Logistics Execution Control process component 114 of a delivery request fulfillment confirmation for reconciliation purposes.

The Confirm Fulfillment operation 522 can send a Delivery Request Fulfillment Confirmation message 526 to the Logistics Execution Control process component 114. The Change Logistics Execution Requisition based on Delivery Fulfillment Confirmation operation 528 receives the message 526. The operation 528 uses a Change Logistics Execution Requisition based on Delivery Fulfillment Confirmation inbound process agent 542 to update the Logistics Execution Requisition business object 502.

The optional Notify Planning of Delivery Request Confirmation Reconciliation Description operation 532 sends a Delivery Request Fulfillment Confirmation Reconciliation Notification message 536 to the Logistics Execution Control process component 114. An optional Change Based on Delivery Fulfillment Confirmation Reconciliation Notification operation 538 receives the message 536. The operation 538 uses the Change Logistics Execution Requisition based on Delivery Fulfillment Confirmation inbound process agent 542 to update the Logistics Execution Requisition business object 502.

Interactions Between Process Components "Customer Invoice Processing" and "Accounting"

Figure 6:
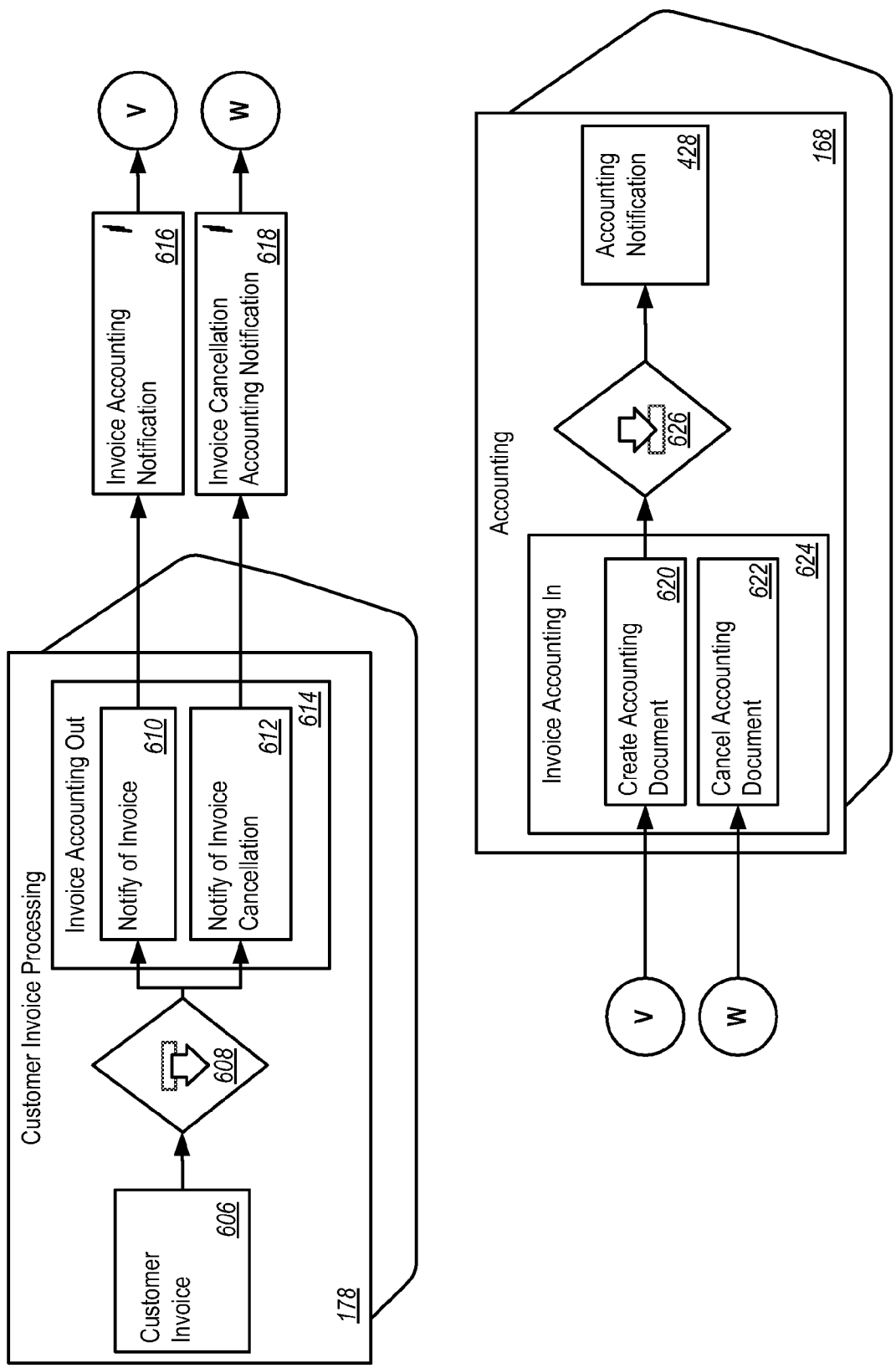
FIG. 6 is a block diagram showing interactions between a Customer Invoice Processing process component and the Accounting process component.

FIG. 6 is a block diagram showing interactions between the Customer Invoice Processing process component 178 and the Accounting process component 168 in the architectural design of FIGS. 1A-1D. The interactions start with a request to the Accounting process component 168 for the creation or cancellation of accounting documents.

As shown in FIG. 6, the Customer Invoice Processing process component 178 includes a Customer Invoice business object 606. The Customer Invoice business object 606 represents a binding statement of amounts receivable resulting, for example, from deliveries to a customer, services performed for a customer, adjustments to these receivables, or credit memos to a customer.

The Customer Invoice business object 606 uses a Notify of Customer Invoice to Accounting outbound process agent 608 to invoke a Notify of Invoice operation 610. The operation 610 informs the Accounting process component 168 about the creation of invoices or credit memos. The Notify of Customer Invoice to Accounting outbound process agent 608 can also invoke a Notify of Invoice Cancellation operation 612. The operation 612 informs the Accounting process component 168 about the cancellation of invoices or credit memos. The operations 610 and 612 are included in an Invoice Accounting Out interface 614.

If the operation 610 is invoked, it sends an Invoice Accounting Notification message 616 to the Accounting process component 168. A Create Accounting Document operation 620 receives the message 616. The operation 620 creates an accounting document based on invoice data received from the Customer Invoice Processing process component 178. In some implementations, the received data can first be converted into an accounting notification from which one or more accounting documents are created according to the relevant sets of books. The Create Accounting Document operation 620 uses a Maintain Accounting Document based on Invoice inbound process agent 626 to update the Accounting Notification business object 428. The Accounting Notification business object 428 represents a notification sent to the Financials Accounting deployment unit 160 by an operational component regarding a business transaction. For example, it represents this operational business transaction in a standardized form for business transaction documents and contains the data needed to valuate the business transaction.

If the Notify of Invoice Cancellation operation 612 is invoked, it sends an Invoice Cancellation Accounting Notification message 618 to the Accounting process component 168. A Cancel Accounting Document operation 622 receives the message 618. The operation 622 cancels an existing accounting document based on cancellation data received from the Customer Invoice Processing process component 178. In some implementations, the received data is converted into an accounting notification from which one or more reversal accounting documents are created according to the relevant sets of books. The operation 622 uses the Maintain Accounting Document based on Invoice inbound process agent 626 to update the Accounting Notification business object 428.

Interactions Between Process Components "Purchase Order Processing" and "Accounting"

Figure 7:
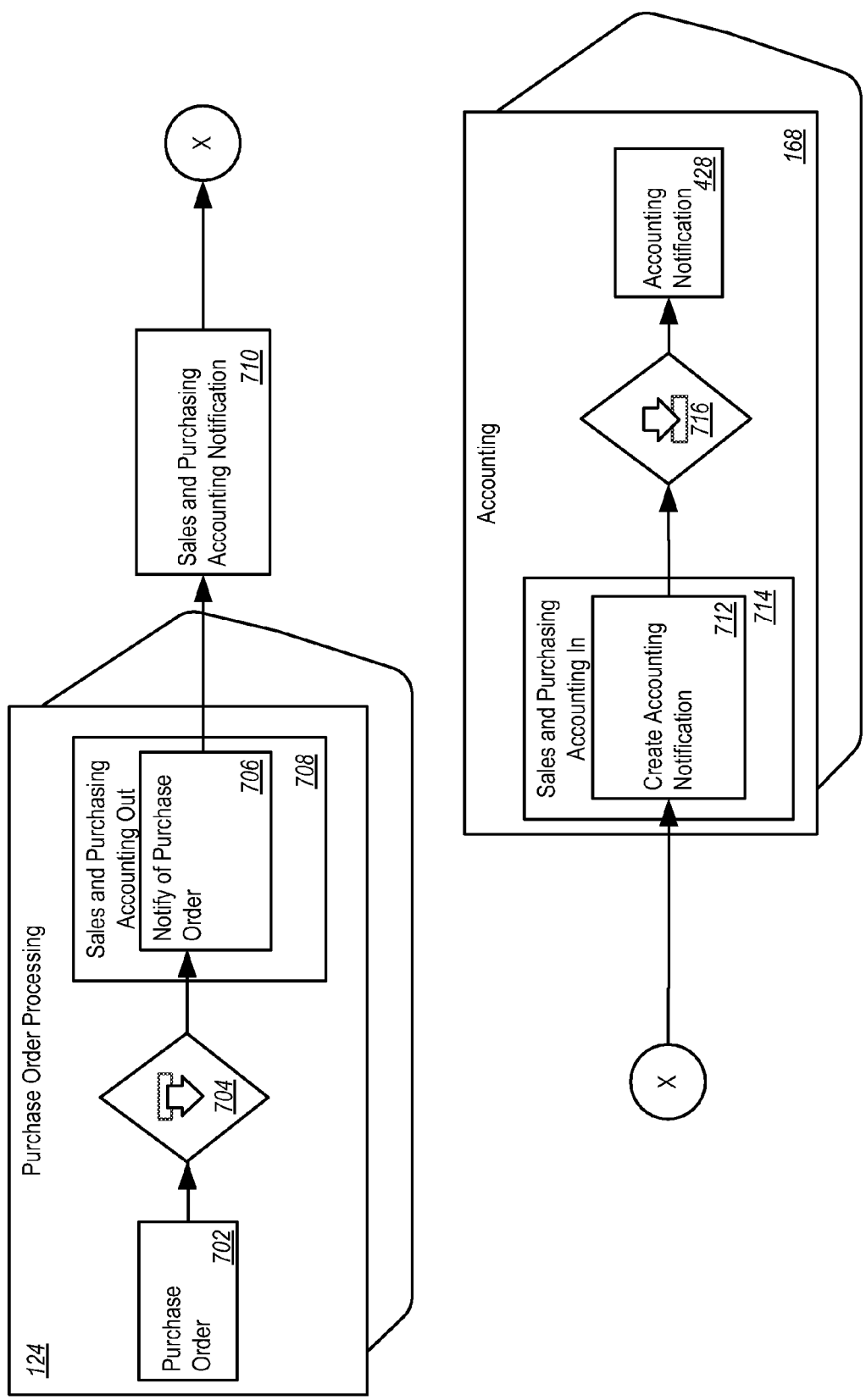
FIG. 7 is a block diagram showing interactions between a Purchase Order Processing process component and the Accounting process component.

FIG. 7 is a block diagram showing interactions between the Purchase Order Processing process component 124 and the Accounting process component 168 in the architectural design of FIGS. 1A-1D. The interaction starts when a purchase order is created or updated. The Purchase Order Processing process component 124 requests the creation or update of sub ledger account, based on purchasing, from the Accounting process component 168.

As shown in FIG. 7, the Purchase Order Processing process component 124 includes a Purchase Order business object 702. The Purchase Order business object 702 represents a request from a buyer to a seller to deliver a specified quantity of material, or perform a specified service, at a specified price within a specified time. The Purchase Order business object 702 uses a Notify of Purchase Order to Accounting outbound process agent 704 to invoke a Notify of Purchase Order operation 706. The operation 706 notifies the Accounting process component 168 that a purchase order has been created, changed, or canceled. The operation 706 is included in a Sales and Purchasing Accounting Out interface 708.

If the Notify of Purchase Order operation 706 is invoked, the operation 706 generates a Sales and Purchasing Accounting Notification message 710. The Sales and Purchasing Accounting Notification message 710 is received in a Create Accounting Notification operation 712. The Create Accounting Notification operation 712 creates an accounting notification based on order data received from the Purchase Order Processing process component 124. The operation 712 is included in a Sales and Purchasing Accounting In interface 714.

The Create Accounting Notification operation 712 uses a Maintain Sub Ledger Account based on Sales and Purchasing inbound process agent 716 to update the Accounting Notification business object 428. The Accounting Notification business object 428 represents a notification sent to the Financials Accounting deployment unit 160 by an operational component regarding a business transaction. For example, it represents this operational business transaction in a standardized form for business transaction documents and contains the data needed to valuate the business transaction.

Interactions Between Process Components "Outbound Delivery Processing" and "Inbound Delivery Processing at Customer"

Figure 8:
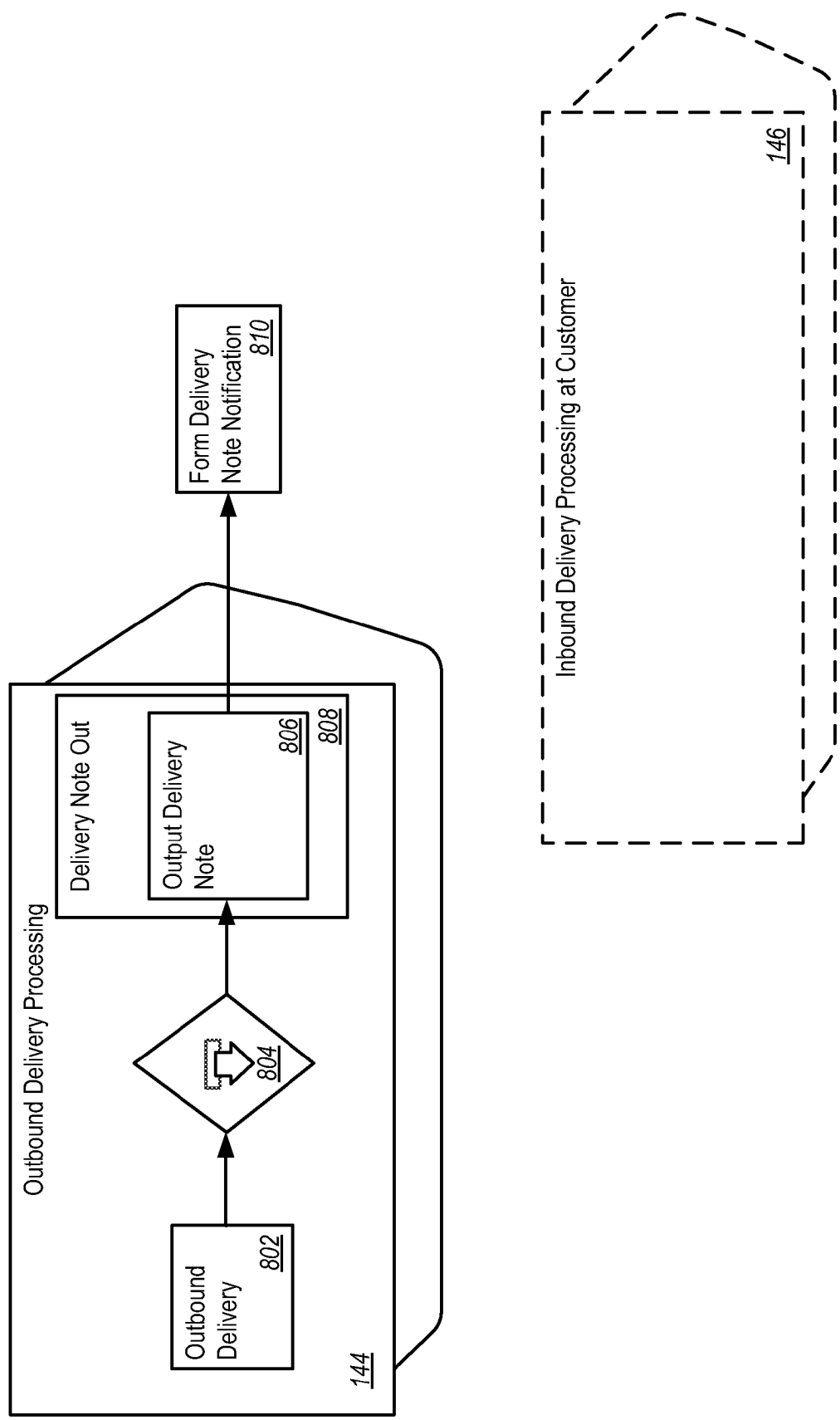
FIG. 8 is a block diagram showing interactions between the Outbound Delivery Processing process component and an Inbound Delivery Processing at Customer process component.

FIG. 8 is a block diagram showing interactions between the Outbound Delivery Processing process component 144 and the Inbound Delivery Processing at Customer external process component 146 in the architectural design of FIGS. 1A-1D. The interaction starts with the printing of a delivery note when an outbound delivery is released.

As shown in FIG. 8, the Outbound Delivery Processing process component 144 includes an Outbound Delivery business object 802. The Outbound Delivery business object 802 represents a composition of the goods that is provided for shipping by a vendor. The Outbound Delivery business object 802 uses a Notify of Outbound Delivery for Output to Inbound Delivery Processing at Customer outbound process agent 804 to invoke an Output Delivery Note operation 806. The operation 806 prints a delivery note. The Output Delivery Note operation 806 is included in a Delivery Note Out interface 808. The Output Delivery Note operation 806 sends a Form Delivery Note Notification message 810 to the Inbound Delivery Processing at Customer external process component 146.

Interactions Between Process Components "Bank Statement Creation at Bank" and "Payment Processing"

Figure 9:
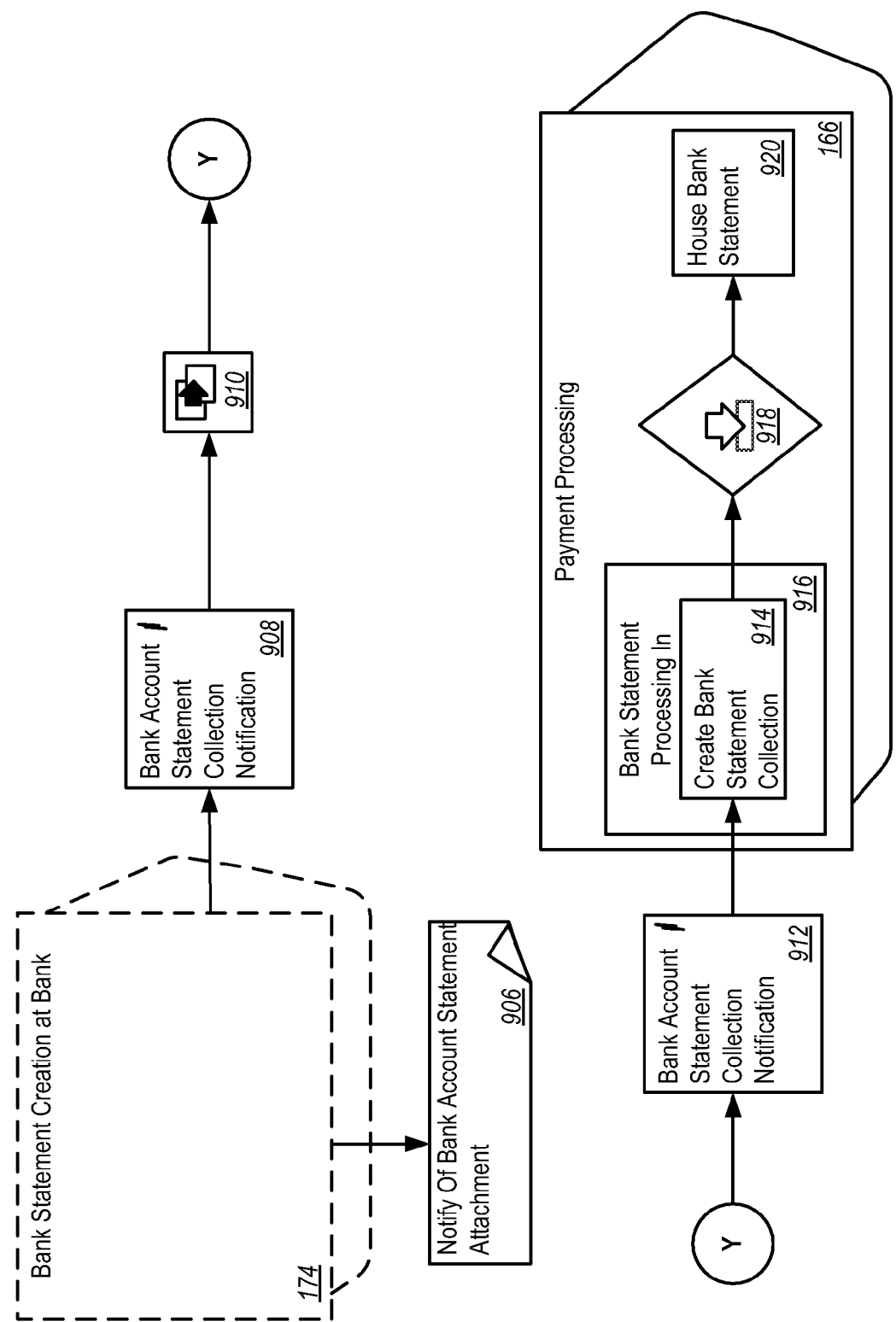
FIG. 9 is a block diagram showing interactions between a Bank Statement Creation at Bank process component and a Payment Processing process component.

FIG. 9 is a block diagram showing interactions between the Bank Statement Creation at Bank external process component 174 and the Payment Processing process component 166 in the architectural design of FIGS. 1A-1D. The interaction starts with the notification about transactions on a bank account in the United States with file format BAI2_ST to the Payment Processing process component 166.

As shown in FIG. 9, a bank statement is created at a bank and a Bank Account Statement Collection Notification message 908 is created. The Bank Account Statement Collection Notification message 908 uses a Mapping Entity 910 to transform the BAI2_ST file format message type to a to a Bank Account Statement Collection Notification message 912 that can be received by a Create Bank Statement Collection operation 914.

The Create Bank Statement Collection operation 914 is included in a Bank Statement Processing In interface 916. The Create Bank Statement Collection operation 914 creates a collection of bank statements in the Payment Processing process component 166. The operation 914 uses a Maintain Bank Statement inbound process agent 918 to update a House Bank Statement business object 920. The House Bank Statement business object 920 represents a legally binding notification from the house bank about the transactions within a specific time period a bank account with a defined starting and closing balance.

The Bank Statement Creation at Bank process component 174 receives information from a Notify of Bank Account Statement Attachment communication channel template 906. The communication channel template 1116 can define protocols and parameters used for communication with an external party.

Interactions Between Process Components "Customer Quote Processing" and "Due Item Processing"

Figure 10:
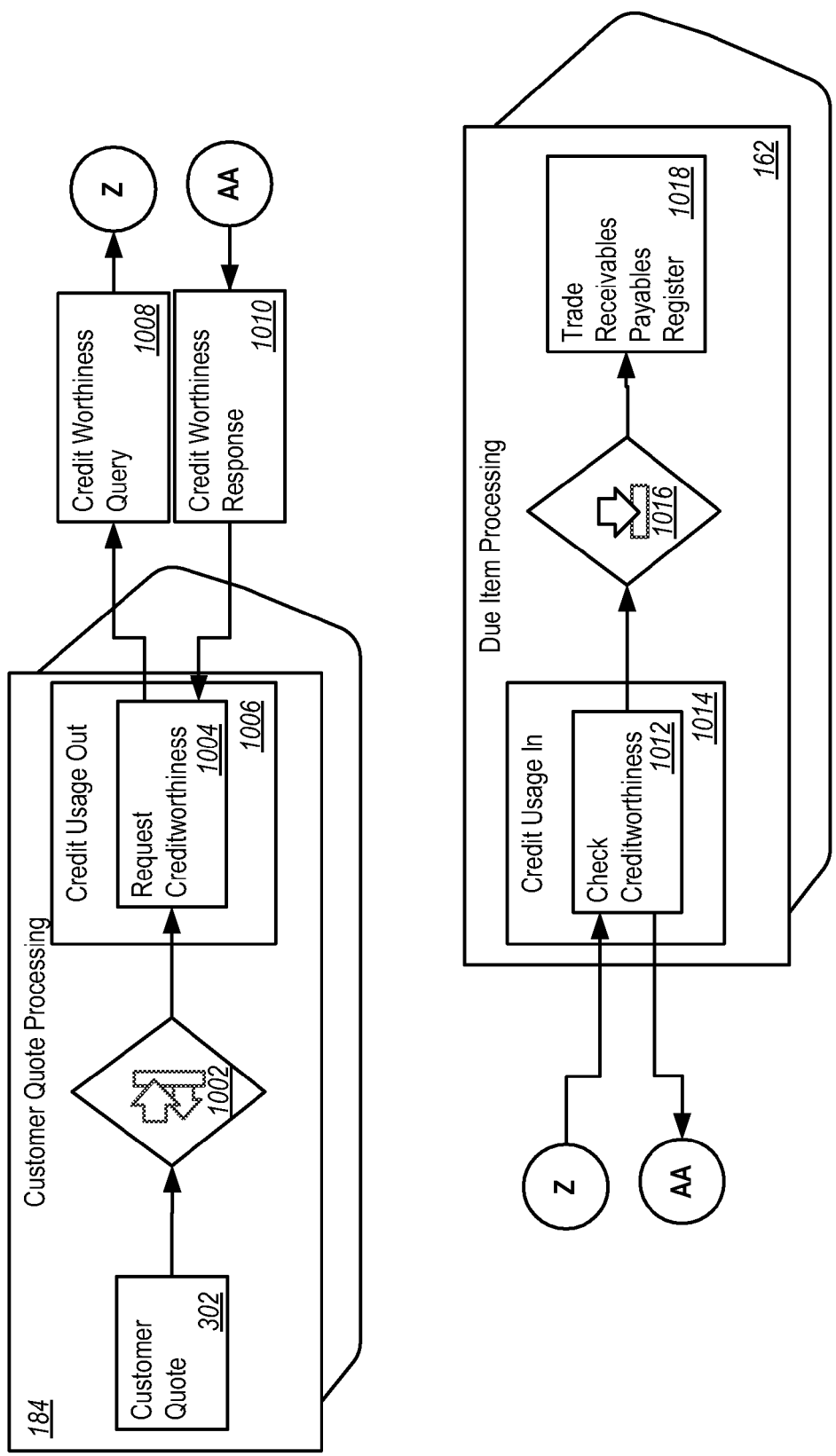
FIG. 10 is a block diagram showing interactions between the Customer Quote Processing process component and a Due Item Processing process component.

FIG. 10 is a block diagram showing interactions between the Customer Quote Processing process component 184 and the Due Item Processing process component 162 in the architectural design of FIGS. 1A-1D. The interaction starts with the request of a credit check by the Customer Quote Processing process component 184.

As shown in FIG. 10, the Customer Quote Processing process component 184 includes the Customer Quote business object 302. The Customer invoice business object 302 represents an offer by a seller to a customer for the delivery of goods or services according to fixed terms. For example, the offer is legally binding for the seller for a specific period of time.

A Synchronous Request Creditworthiness from Customer Quote to Due Item Processing outbound process agent 1002 is used to invoke a Request Creditworthiness operation 1004. The operation 1004 verifies the data or value of a current document against the actual credit standing of a customer. The operation 1004 is included in a Credit Usage Out interface 1006.

The Request Creditworthiness operation 1004 sends a Credit Worthiness Query message 1008 to the Due Item Processing process component 162. An optional Check Worthiness operation 1012 receives the message 1008. The operation 1012 initiates the execution of a credit check. The operation 1012 is included in a Credit Usage In interface 1014. The Check Worthiness operation 1012 uses a Check Creditworthiness Based on Trade Receivables Payables Register inbound process agent 1016 to update a Trade Receivables Payables Register business object 1018. The business object 1018 represents the register of all trade receivables and payables of a company from or to its business partners.

The optional Check Creditworthiness operation 1012 sends a Credit Worthiness Response message 1010 to the Request Creditworthiness operation 1004 included in the Customer Quote Processing process component 184.

Interactions Between Process Components "Customer Quote Processing" and "Financial Accounting Master Data Management"

Figure 11:
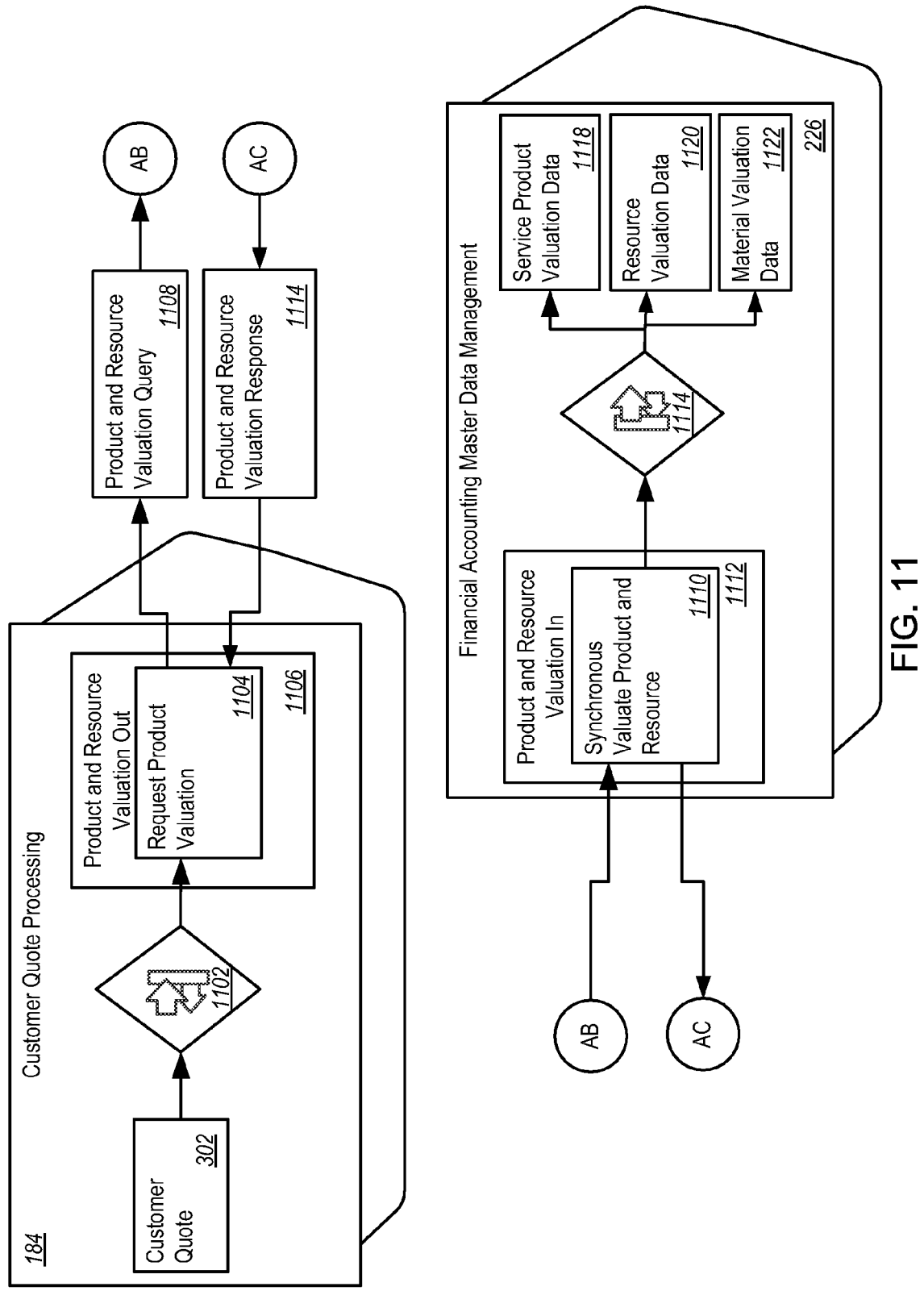
FIG. 11 is a block diagram showing interactions between the Customer Quote Processing process component and a Financial Accounting Master Data Management process component.

FIG. 11 is a block diagram showing interactions between the Customer Quote Processing process component 184 and the Financial Accounting Master Data Management process component 226 in the architectural design of FIGS. 1A-1D. The interaction starts with the request of a product valuation price from the Financial Accounting Master Data Management process component 226 when a customer quote is created or changed.

As shown in FIG. 11, the Customer Quote Processing process component 184 includes a Customer Quote business object 302. The business object 302 represents an offer by a seller to a customer for the delivery of goods or services according to fixed terms. For example, the offer is legally binding for the seller for a specific period of time.

The Customer Quote business object 302 uses a Synchronous Request Product Valuation from Customer Quote to Financial Accounting Master Data synchronous outbound process agent 1102 to invoke a Request Product Valuation operation 1104. The operation 1104 is included in a Product and Resource Valuation Out interface 1106. The Request Product Valuation operation 1104 requests a product valuation. The operation 1104 sends a Product and Resource Valuation Query message 1108 to the Financial Accounting Master Data Management process component 226. A Synchronous Valuate Product and Resource operation 1110 receives the message 1108. The operation 1110 valuates one or more products or resources with internal valuation prices or internal cost rates. For example, the product or resource is valuated as an individual object or in the context of a business transaction. The result of the valuation for a product or resources can be a price and an amount, which cab be optional, provided that a quantity was entered for the valuation. The operation 1110 is included in a Product and Resource Valuation In interface 1112.

The Synchronous Valuate Product and Resource operation 1110 uses a Synchronous Valuate Product and Resource synchronous inbound process agent 1116 to update a Service Product Valuation Data business object 1118, a Resource Valuation Data business object 1120, or a Material Valuation Data business object 1122. The Synchronous Valuate Product and Resource operation 1110 sends a Product and Resource Valuation Response message 1114 back to the Customer Quote Processing process component 184, where it is received by the Request Product Valuation operation 1104.

The Service Product Valuation Data business object 1118 represents data that references a service product or service product group for the valuation of business transactions and for cost estimates and cost accounting. For example, it contains the internal cost rates for a service product or service product group. The Resource Valuation Data business object 1120 represents data that references a resource or resource group for the valuation of business transactions and for cost estimates and cost accounting. For example, it contains the internal cost rates for a resource or resource group. The Material Valuation Data business object 1122 represents data that references a material or material group for valuating business transactions, for cost estimates, and for value-based management of material inventories. For example, it contains internal valuation prices for a material or material group.

Interactions Between Process Components "Payment Processing at Business Partner" and "Payment Processing"

Figure 12:
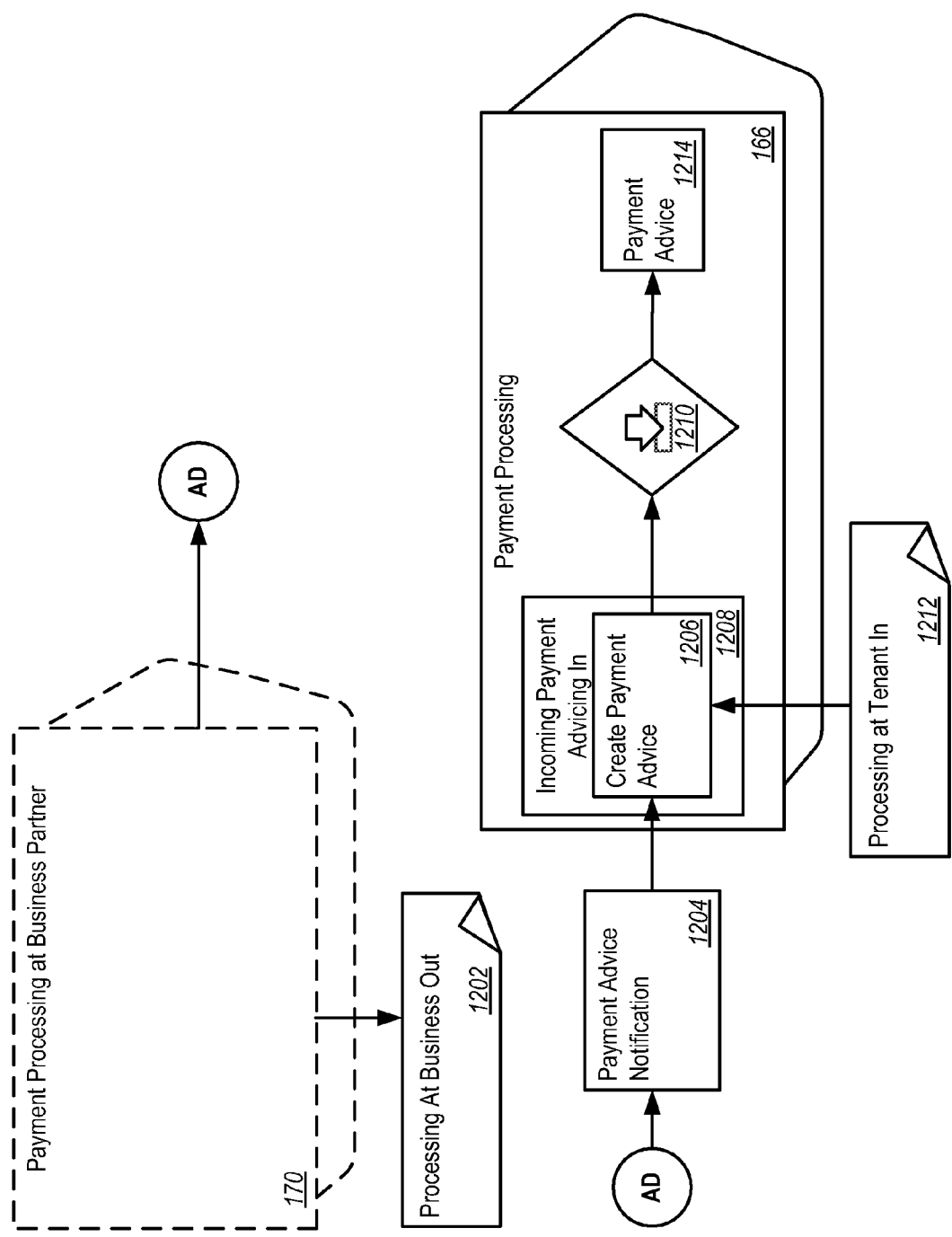
FIG. 12 is a block diagram showing interactions between a Payment Processing at Business Partner process component and the Payment Processing process component.

FIG. 12 is a block diagram showing interactions between the Payment Processing at Business Partner external process component 170 and the Payment Processing process component 166 in the architectural design of FIGS. 1A-1D. The interaction starts with the receiving of a payment advice from a business partner. As shown in FIG. 12, the Payment Processing at Business Partner process component 170 sends information to the Payment Processing process component 166 using a Processing at Business Partner Out communication channel template 1202. The communication channel template 1202 can define protocols and parameters used for communication with an external party.

The Payment Processing at Business Partner external process component 170 sends a Payment Advice Notification message 1204 to the Payment Processing process component 166. A Create Payment Advice operation 1206 receives the message 1204. The operation 1206, included in an Incoming Payment Advicing In interface 1208, creates a payment advice sent from a business partner or house bank concerning future payment transactions. The operation 1206 uses a Maintain Payment Advice inbound process agent 1210 to update a Payment Advice business object 1214. The Payment Advice business object 1214 represents an announcement of a payment transaction by a business partner to the company, specifying payment reasons.

The Payment Processing process component 166 receives information from a Processing at Tenant In communication channel template 1212. The communication channel template 1212 can define protocols and parameters used for communication with an external party.

Interactions Between Process Components "External Procurement Trigger and Response" and "Purchase Order Processing"

Figure 13:
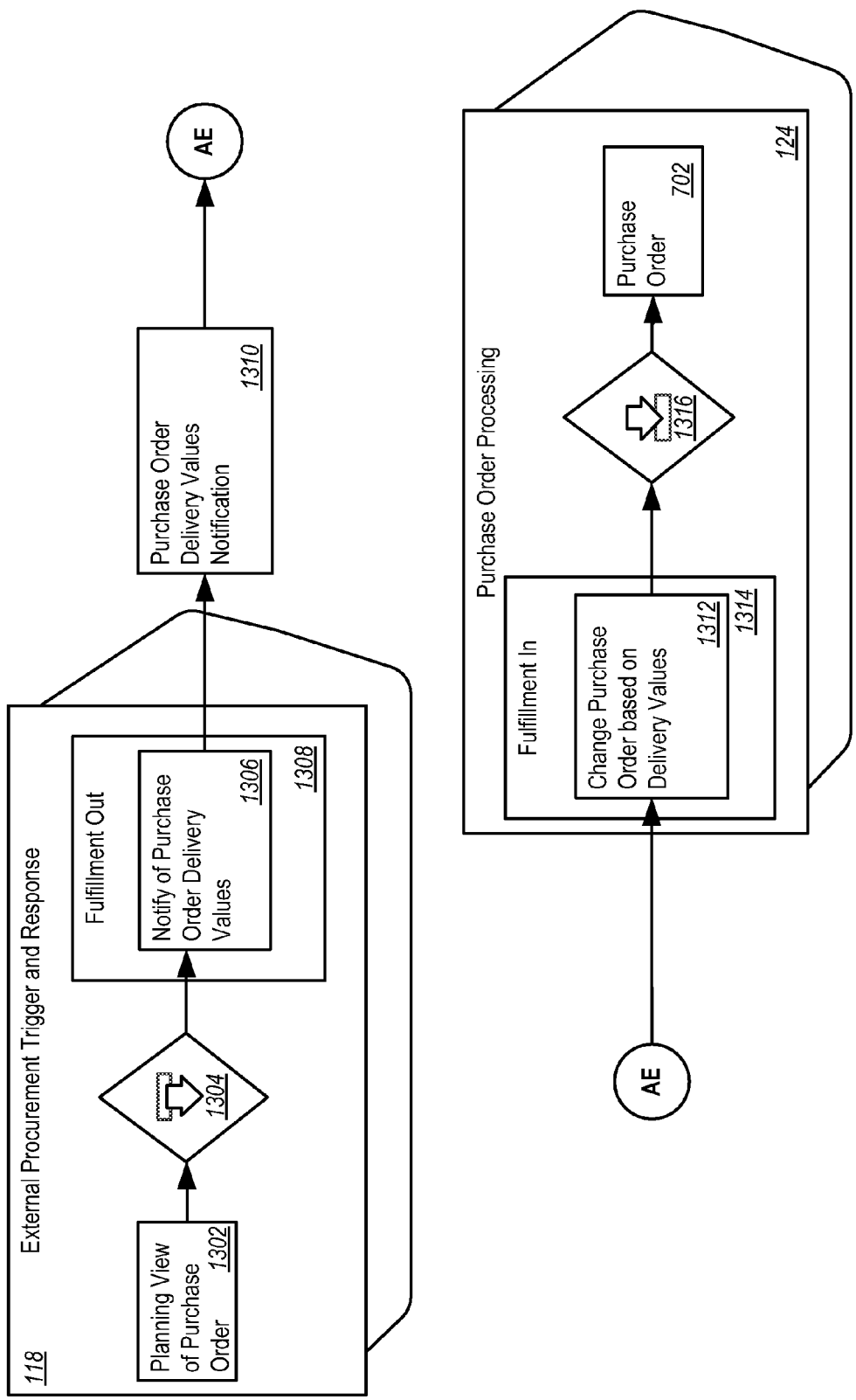
FIG. 13 is a block diagram showing interactions between an External Procurement Trigger and Response process component and the Purchase Order Processing process component.

FIG. 13 is a block diagram showing the interactions between the External Procurement Trigger and Response process component 118 and the Purchase Order Processing process component 124 in the architectural design of FIGS. 1A-1D. The interaction starts with a request for the update of a purchase order with data about the fulfillment of the purchase order.

The External Procurement Trigger and Response process component 118 includes a Planning View of Purchase Order business object 1302. The business object 1302 represents a planning view of the materials, date, quantities, delivery conditions, parties, and sources of supply of a purchase order that are relevant to planning.

The Planning View of Purchase Order business object 1302 uses a Notify of Purchase Order Delivery Values from Planning View of Purchase Order to Purchase Order Processing outbound process agent 1304 to invoke a Notify of Purchase Order Delivery Values operation 1306. The operation 1306 is included in a Fulfillment Out interface 1308. The Notify of Purchase Order Delivery Values operation 1306 notifies purchasing of the fulfillment of a purchase order. The operation 1306 uses a Purchase Order Delivery Values Notification message 1310 to notify the Purchase Order Processing process component 124 of the fulfillment of a purchase order.

A Change Purchase Order based on Delivery Values operation 1312 receives the message 1310. The operation 1312 uses a Change Purchase Order based on Delivery Values inbound process agent 1316 to update the Purchase Order business object 702. The Change Purchase Order based on Delivery Values operation 1312 updates a purchase order with data about the fulfillment of the purchase order. The Purchase Order business object 702 represents a request from a buyer to a seller to deliver a specified quantity of material, or perform a specified service, at a specified price within a specified time. Interactions Between Process Components "Production Trigger and Response" and "Production"

Figure 14A:
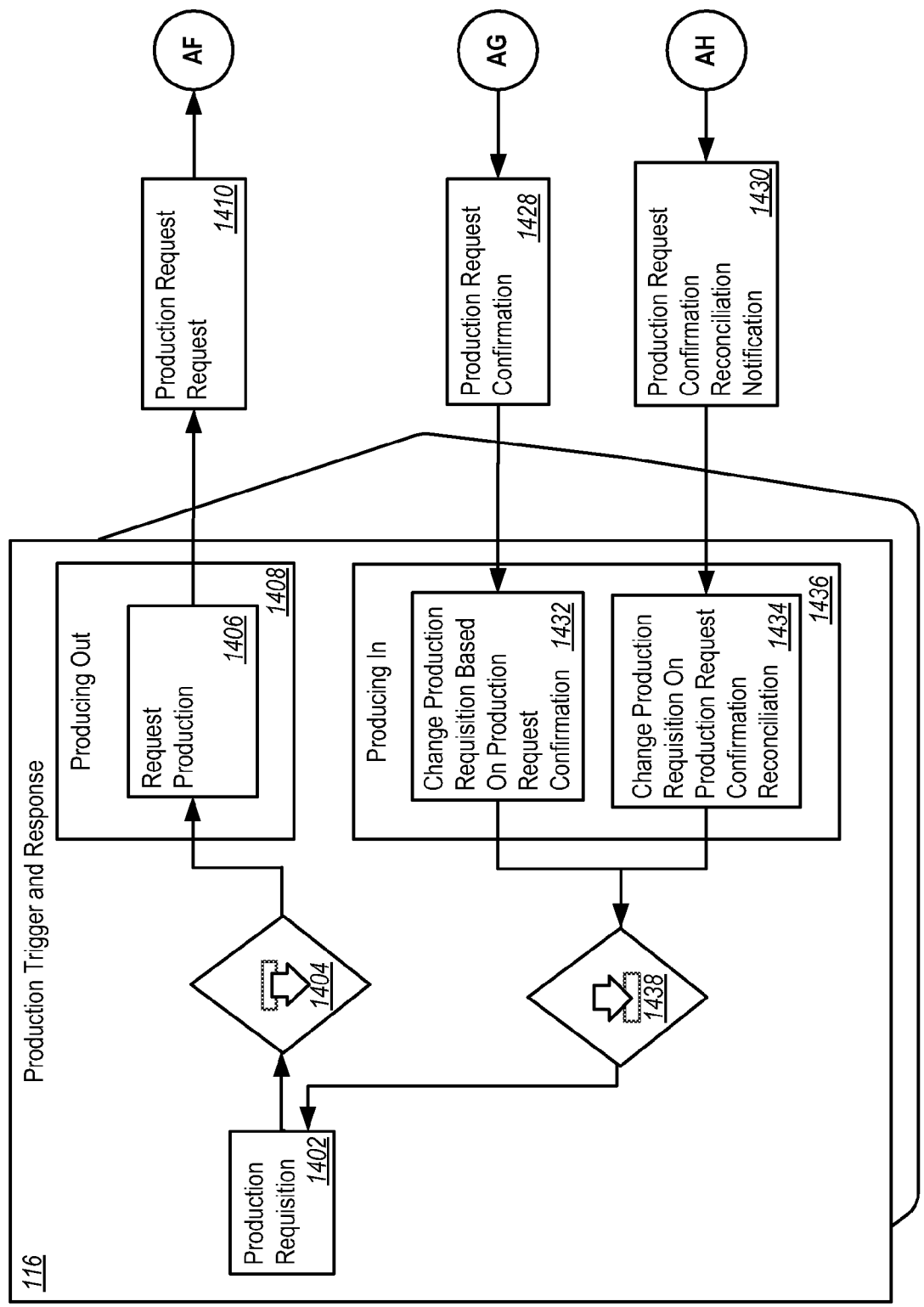
FIGS. 14A and 14B are block diagrams collectively showing interactions between a Production Trigger and Response process component and a Production process component.
Figure 14B:
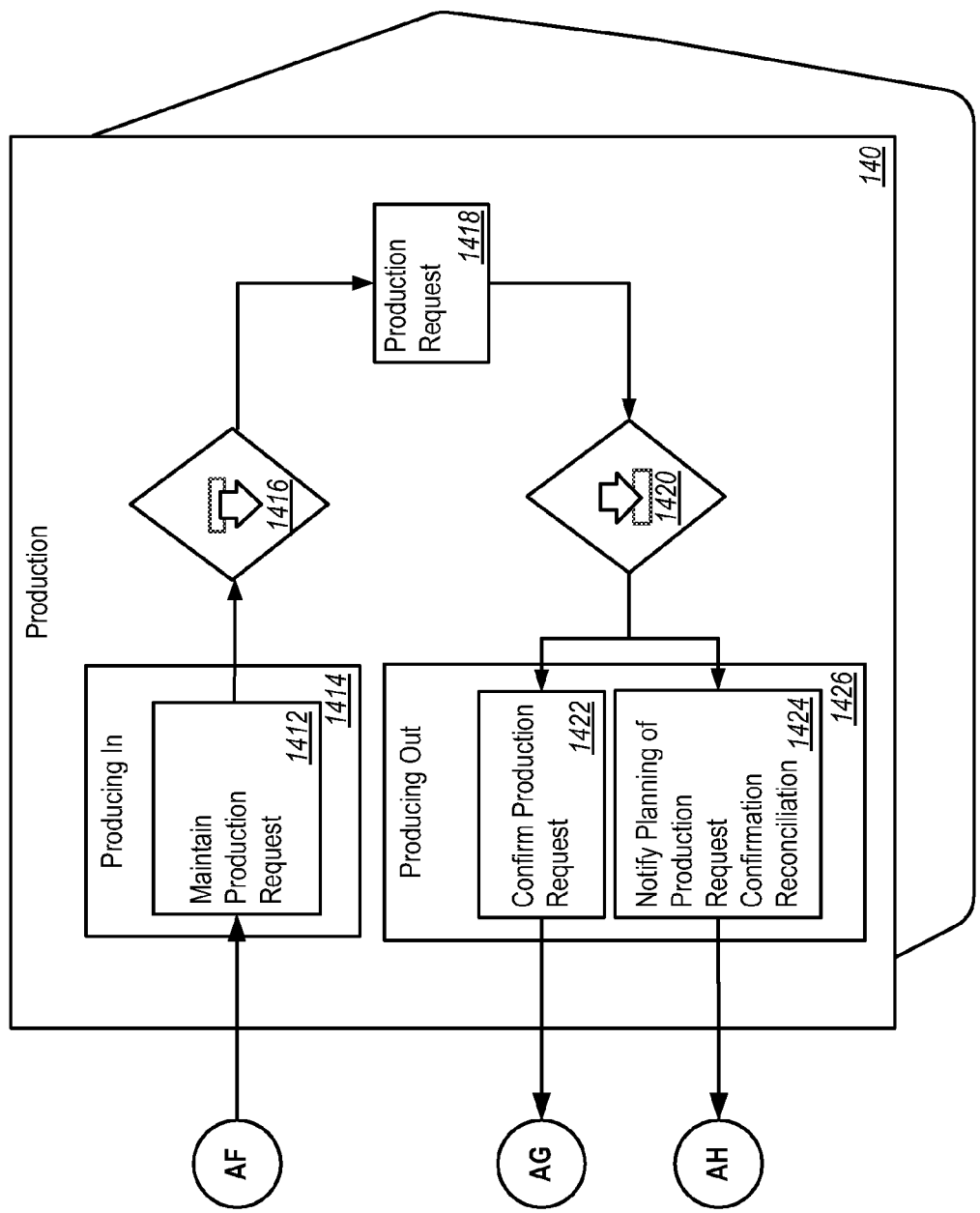

FIGS. 14A and 14B are block diagrams collectively showing interactions between the Production Trigger and Response process component 116 and the Production process component 140 in the architectural design of FIGS. 1A-1D. The interaction starts with the request for the creation of a production request in the Production process component 140 when a production requisition is created. The Production process component 140 confirms the production request and informs the Production Trigger and Response process component 116 about the production progress.

As shown in FIG. 14A, the Production Trigger and Response process component 116 includes a Production Requisition business object 1402. The Production Requisition business object 1402 represents a requisition to production execution to produce a certain quantity of a specific material by a requested due date. The Production Requisition business object 1402 uses a Request Production From Production Requisition to Production outbound process agent 1404 to invoke a Request Production operation 1406. The operation 1406 is included in a Producing Out interface 1408. The Request Production operation 1406 requests the production of a certain quantity of a specific material by a requested due date. The Request Production operation 1406 sends a Production Request Request message 1410 to the Production process component 140.

As shown in FIG. 14B, a Maintain Production Request operation 1412 receives the message 1410 from the Production Trigger and Response process component 116. The operation 1412 is included in a Producing In interface 1414. The Maintain Production Request operation 1412 creates, updates, or deletes a production request. The operation 1412 uses a Maintain Production Request inbound process agent 1416 to update a Production Request business object 1418. The Production Request business object 1418 represents a requisition to production execution to produce a certain quantity of a specific material by a requested due date. In some implementations, the requisition can also contain accepted and fulfillment data representing the response from production execution.

The Production Request business object 1418 uses a Confirm Production Request to Production Trigger and Response outbound process agent 1420 to invoke a Confirm Production Request operation 1422 or a Notify Planning of Production Request Confirmation Reconciliation operation 1424. Both operations 1422 and 1424 are included in a Producing Out interface 1426. The Confirm Production Request operation 1422 confirms the receipt of a production request and its execution progress. The Notify Planning of Production Request Confirmation Reconciliation operation 1424 notifies the planning system of a reconciliation of a production request confirmation. The Confirm Production Request operation 1422 and the Notify Planning of Production Request Confirmation Reconciliation operation 1424 send a Production Request Confirmation message 1428 and a Production Request Confirmation Reconciliation Notification message 1430, respectively.

A Change Production Requisition Based On Production Request Confirmation operation 1432 and a Change Production Requisition On Production Request Confirmation Reconciliation operation 1434 receive the messages 1428 and 1430, respectively. Both operations 1432 and 1434 are included in a Producing In interface 1436. The Change Production Requisition Based On Production Request Confirmation operation 1432 receives conformation of maintenance and execution of a production request. The Change Production Requisition On Production Request Confirmation Reconciliation operation 1434 receives reconciliation of a production request confirmation. The operations 1432 and 1434 use a Maintain Production Requisition Based On Production inbound process agent 1438 to update the Production Requisition business object 1402.

Interactions Between Process Components "Payment Processing" and "Due Item Processing"

Figure 15A:
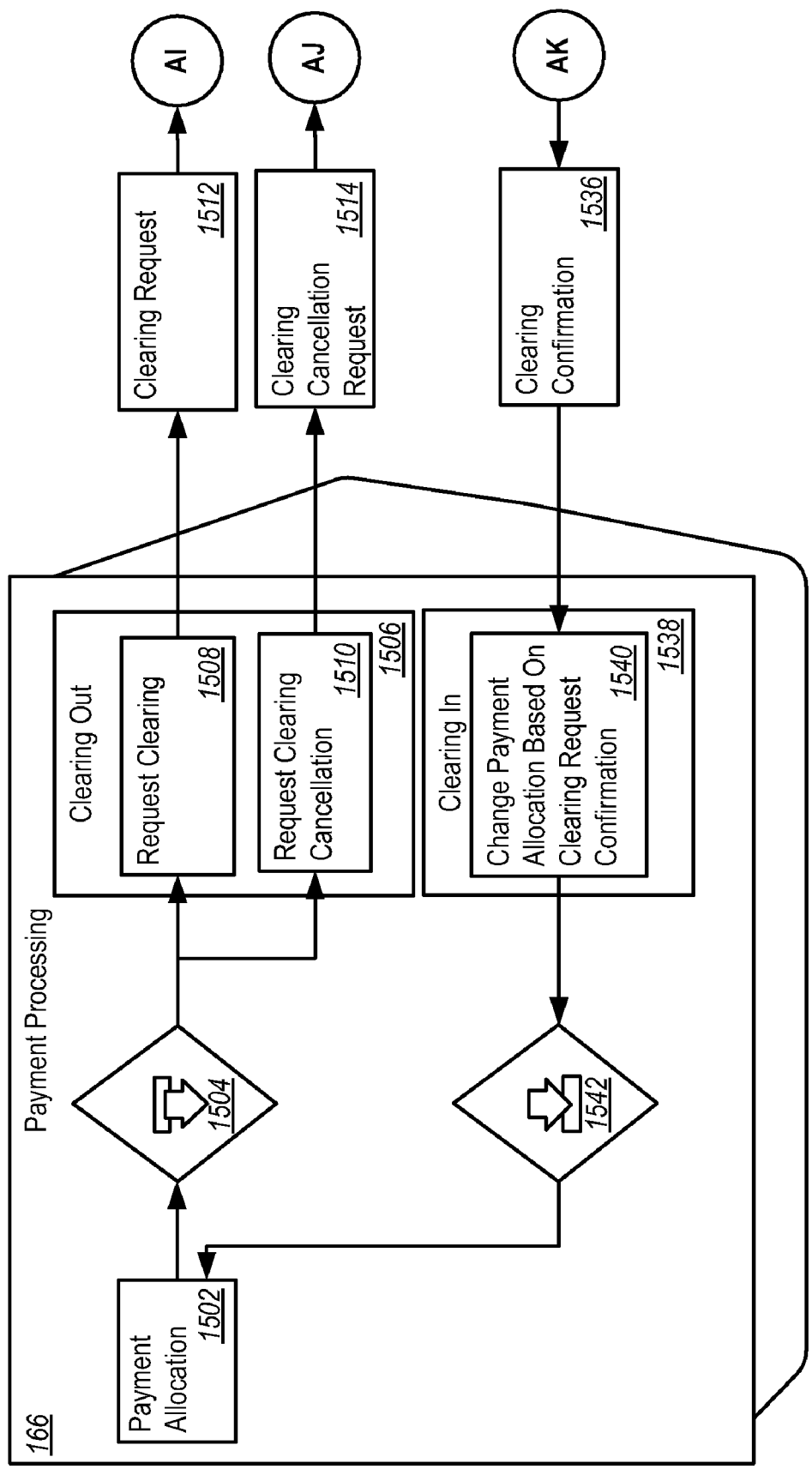
FIGS. 15A and 15B are block diagrams collectively showing interactions between the Payment Processing process component and the Due Item Processing process component.
Figure 15B:
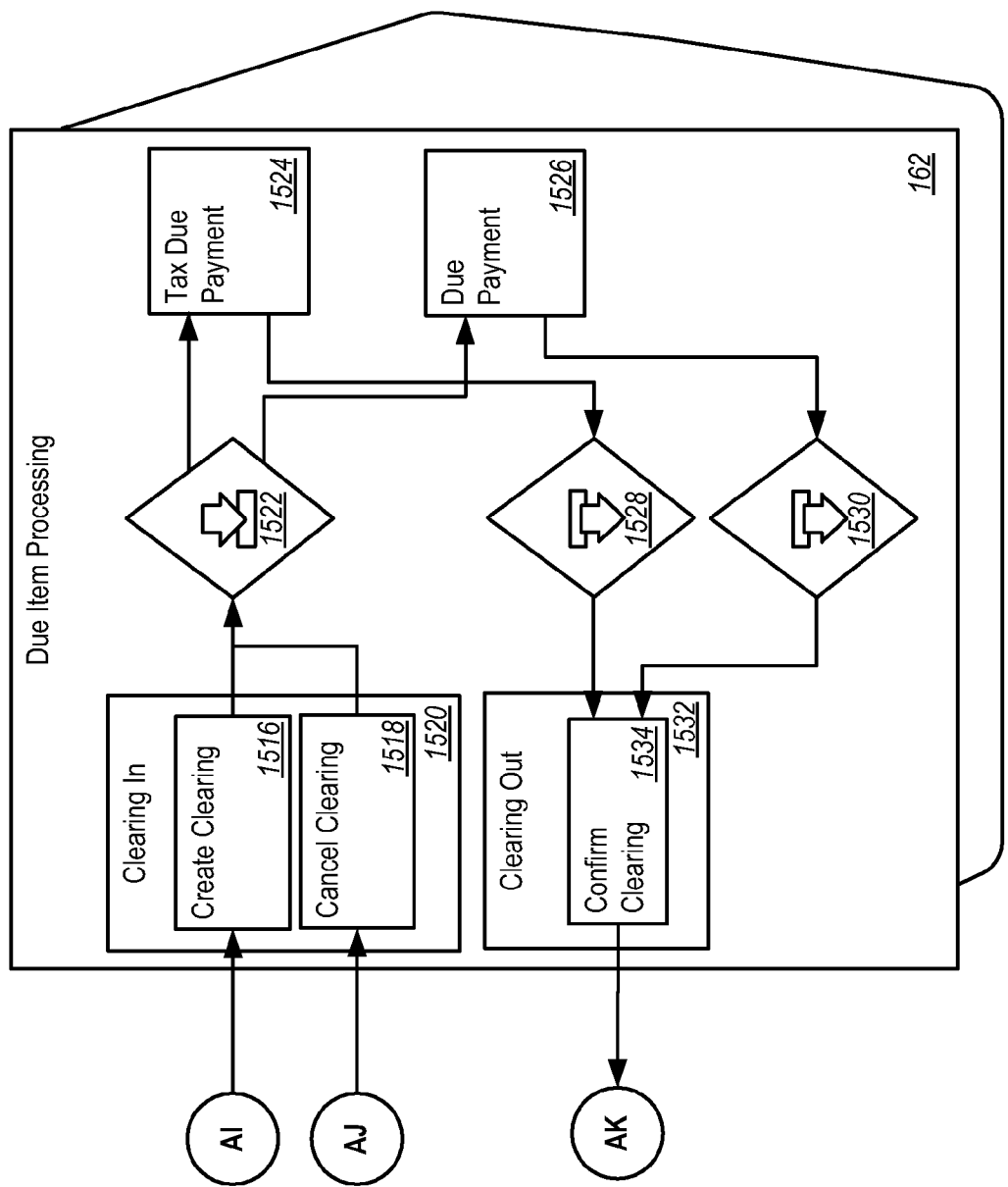

FIGS. 15A and 15B are block diagrams collectively showing interactions between the Payment Processing process component 166 and the Due Item Processing process component 162 in the architectural design of FIGS. 1A-1D. The interaction starts with the request for the clearing or the cancellation of the clearing of a payment as well as the information about the clearing result.

As shown in FIG. 15A, the Payment Processing process component 166 includes a Payment Allocation business object 1502. The Payment Allocation business object 1502 represents an assignment of a payment item to the payment reasons from which the payment item originated. The Payment Allocation business object 1502 uses a Request Clearing Maintenance from Payment Allocation to Due Item Processing outbound process agent 1504 to invoke either a Request Clearing operation 1508 to request the clearing of payments within the Due Item Processing process component 162, or a Request Clearing Cancellation operation 1510 to cancel a previously sent clearing request from the Due Item Processing process component 162 by reference. Both operations 1508 and 1510 are included in a Clearing Out interface 1506. The Request Clearing operation 1508 sends a Clearing Request message 1512 to the Due Item Processing process component 162. The Request Clearing Cancellation operation 1510 sends a Clearing Cancellation Request message 1514 to the Due Item Processing process component 162.

As shown in FIG. 15B, the Due Item Processing process component 162 includes a Create Clearing operation 1516 and a Cancel Clearing operation 1518 to receive the messages 1512 and 1514, respectively. Both operations 1516 and 1518 are included in a Clearing In interface 1520. The Create Clearing operation 1516 creates a clearing for business partner-initiated payments. The Cancel Clearing operation 1518 cancels a previously sent clearing request by reference.

The operations 1516 and 1518 use a Maintain Clearing inbound process agent 1522 to update a Tax Due Payment business object 1524 and a Due Payment business object 1526. The Tax Due Payment business object 1524 represents a payment request or payment confirmation with regard to tax payables and receivables. The Due Payment business object 1526 represents a payment request or payment confirmation for trade receivables and payables.

The Tax Due Payment business object 1524 uses a Confirm Clearing from Tax Due Payment to Payment Processing outbound process agent 1528 to invoke a Confirm Clearing operation 1534. The Due Payment business object 1526 uses a Confirm Clearing from Due Payment to Payment Processing outbound process agent 1530 to invoke the Confirm Clearing operation 1534.

The Confirm Clearing operation 1534 sends a confirmation to the Payment Processing process component 162 for a clearing request. As shown in FIG. 15A, the Confirm Clearing operation 1534 sends a Clearing Confirmation message 1536 to the Payment Processing process component 166.

A Change Payment Allocation Based On Clearing Request Confirmation operation 1540 receives the message 1536. The Change Payment Allocation Based On Clearing Request Confirmation operation 1540 confirms the execution or rejection of a sent clearing request. The operation 1540 is included in a Clearing In interface 1538. The operation 1540 uses a Change Payment Allocation Based On Clearing Request Confirmation inbound process agent 1542 to update the Payment Allocation business object 1502.

Interactions Between Process Components "Production" and "Accounting"

Figure 16A:
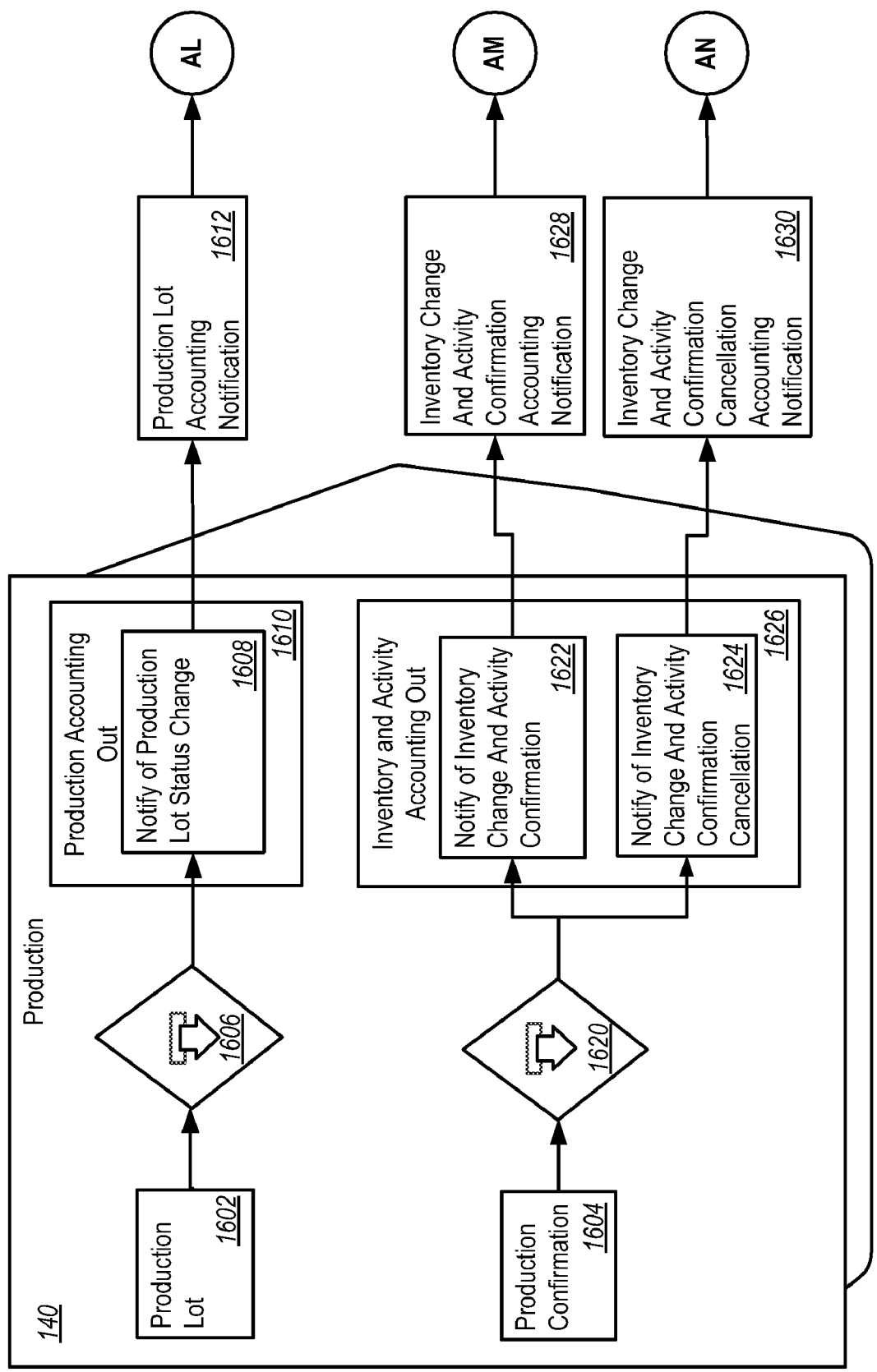
FIGS. 16A and 16B are block diagrams collectively showing interactions between the Production process component and the Accounting process component.
Figure 16B:
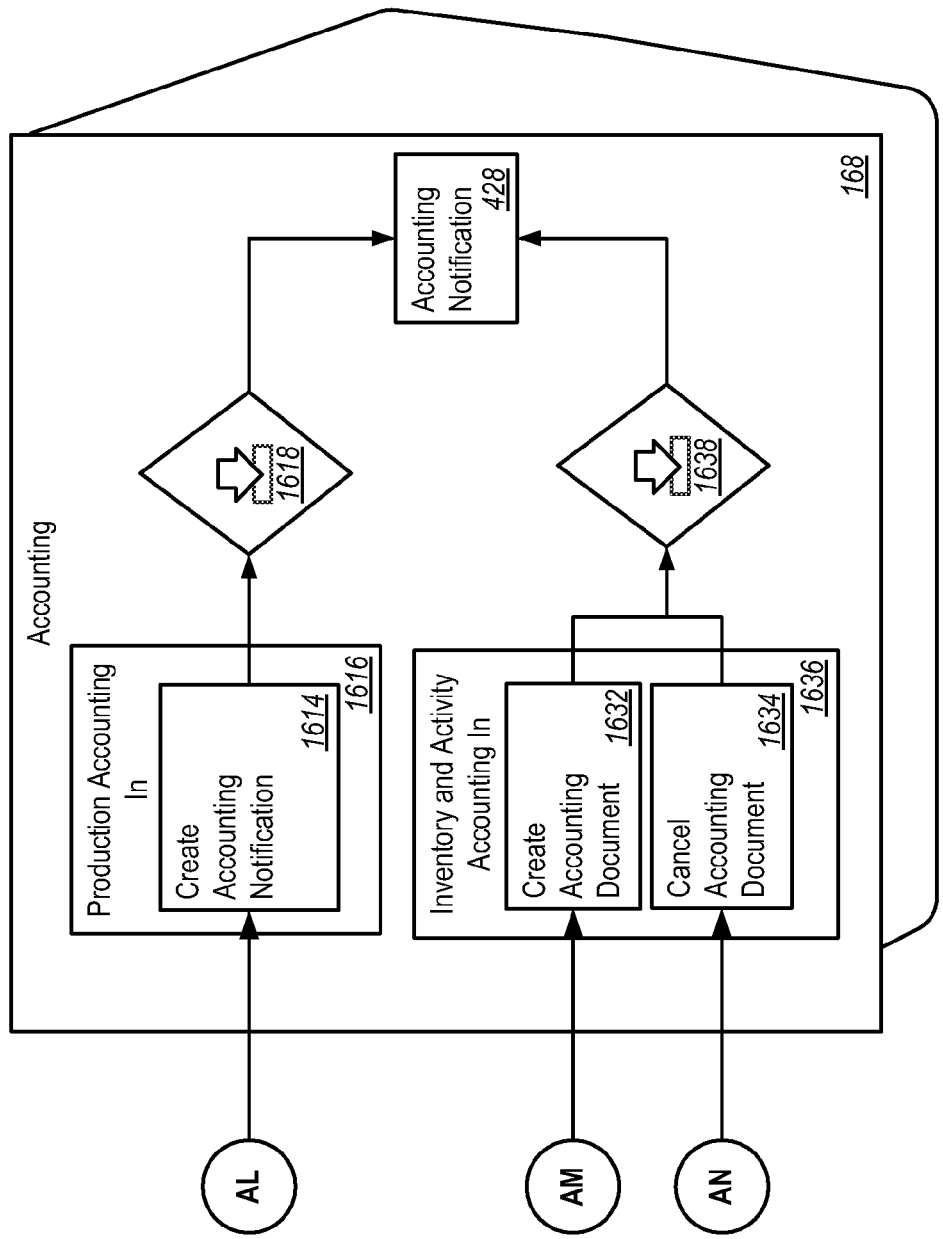

FIGS. 16A and 16B are block diagrams collectively showing interactions between the Production process component 140 and the Accounting process component 168 in the architectural design of FIGS. 1A-1D. A first interaction starts when a Production Lot is created, changed, or closed. For example, the Production process component 140 requests the creation, update, or close of a production ledger account from the Accounting process component 168. A second interaction starts when a production confirmation is created or cancelled. For example, the Production process component 140 requests the creation or cancellation of accounting documents from the Accounting process component 168.

As shown FIG. 16A, the Production process component 140 includes a Production Lot business object 1602 and a Production Confirmation business object 1604. The Production Lot business object 1602 represents a certain quantity of materials that is and has been produced as a group with reference to an order. For example, the Production Lot business object 1602 collects all the actual information during the production process that is described by operations and activities. The Production Confirmation business object 1604 represents a record of confirmed logistic process changes which result from the execution of a production process at a specific time. The Production Lot business object 1602 uses a Notify of Production Lot to Accounting outbound process agent 1606 to invoke a Notify of Production Lot Status Change operation 1608. The operation 1608 is included a Production Accounting Out interface 1610. The Notify of Production Lot Status Change operation 1608 informs the Accounting process component 168 about a status change of a production lot. The operation 1608 sends a Production Lot Accounting Notification message 1612 to the Accounting process component 168.

As shown in FIG. 16B, a Create Accounting Notification operation 1614 receives the Production Lot Accounting Notification message 1612. The a Create Accounting Notification operation 1614 is included in a Production Accounting In interface 1616. The Create Accounting Notification operation 1614 creates an accounting notification based on production order data received from the Production process component 140. The operation 1614 uses a Maintain Production Ledger Account inbound process agent 1618 to update the Account Notification business object 428. The Accounting Notification business object 428 represents a notification sent to the Financials deployment unit 160 by an operational component regarding a business transaction. For example, it represents this operational business transaction in a standardized form for business transaction documents and contains the data needed to valuate the business transaction. As shown in FIG. 16A, the Production Confirmation business object 1604 uses Notify of Production Progress from Production Confirmation to Accounting outbound process agent 1620 to invoke a Notify of Inventory Change And Activity Confirmation operation 1622 or a Notify of Inventory Change And Activity Confirmation Cancellation operation 1624. Both operations 1622 and 1624 are included in an Inventory And Activity Accounting Out interface 1626. The Notify of Inventory Change And Activity Confirmation operation 1622 notifies the Accounting process component 168 about inventory changes (e.g., for physical goods) and activity confirmations and triggers a valuation of the relevant inventory changes and activities in financial accounting. The Notify of Inventory Change and Activity Confirmation Cancellation operation 1624 notifies financial accounting about a cancellation of inventory changes and activity confirmations previously sent.

If the Notify of Inventory Change And Activity Confirmation operation 1622 is invoked, an Inventory Change And Activity Confirmation Accounting Notification message 1628 is sent to the Accounting process component 168. If the Notify of Inventory Change And Activity Confirmation Cancellation operation 1624 is invoked, an Inventory Change And Activity Confirmation Cancellation Accounting Notification message 1630 is sent to the Accounting process component 168.

As shown in FIG. 16B, the Accounting process component 168 includes a Create Accounting Document operation 1632 and a Cancel Accounting Document operation 1634 to receive the Inventory Change And Activity Confirmation Accounting Notification message 1628 and the Inventory Change And Activity Confirmation Cancellation Accounting Notification message 1630, respectively. The Create Accounting Document operation 1632 creates an accounting document based on inventory data received from the Production process component 140. For example, the received data is first converted into an accounting notification from which one or more accounting documents are created according to the relevant sets of books. The Cancel Accounting Document operation 1634 cancels an existing accounting document based on cancellation data received from the Production process component 140. For example, the received data is converted into an accounting notification from which one or more reversal accounting documents are created according to the relevant sets of books. Both operations 1632 and 1634 are included in an Inventory and Activity Accounting In interface 1636. The operations 1632 and 1634 use a Maintain Accounting Document based on Inventory and Activity inbound process agent 1638 to update the Account Notification business object 428.

Interactions Between Process Components "Sales Order Processing" and "Due Item Processing"

Figure 17:
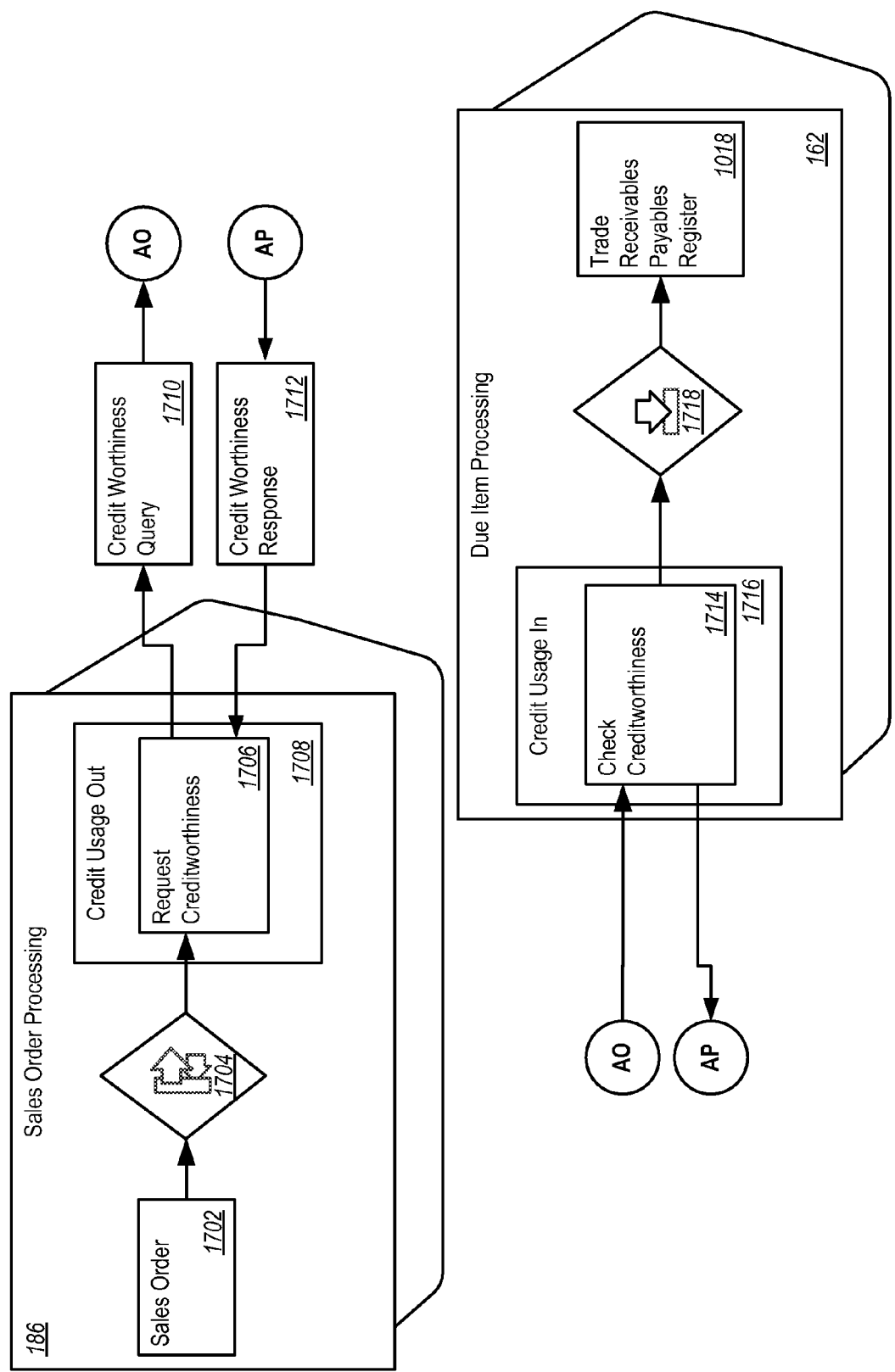
FIG. 17 is a block diagram showing interactions between a Sales Order Processing process component and the Due Item Processing process component.

FIG. 17 is a block diagram showing interactions between the Sales Order Processing process component 186 and the Due Item Processing process component 162 in the architectural design of FIGS. 1A-1D. The interactions start with the request for a credit check by the Sales Order Processing process component 186.

As shown in FIG. 17, the Sales Order Processing process component 186 includes a Sales Order business object 1702. The Sales Order business object 1702 represents an agreement between a seller and a customer concerning the sale and delivery of goods, as well as any services that are associated with these processes, on a specific date, for a specific quantity, and for a specific price. The Sales Order business object 1702 uses a Synchronous Request Creditworthiness from Sales Order to Due Item Processing outbound process agent 1704 to invoke a Request Creditworthiness operation 1706. The operation 1706, included in a Credit Usage Out interface 1708, checks whether the current sales order is covered by the current credit limit of the customer.

The Request Creditworthiness operation 1706 sends a Credit Worthiness Query message 1710 to the Due Item Processing process component 162. An optional Check Creditworthiness operation 1714 receives the message 1710. The operation 1714, included in a Credit Usage In interface 1716, initiates the execution of a credit check.

The optional Check Creditworthiness operation 1714 sends a Credit Worthiness Response message 1712 to the Request Creditworthiness operation 1706. The Check Creditworthiness operation 1714 uses a Check Creditworthiness Based on Trade Receivables Payables Register inbound process agent 1718 to update the Trade Receivables Payables Register business object 1018. The business object 1018 represents a register of all trade receivables and payables of a company from or to its business partners.

Interactions Between Process Components "Payment Processing" and "Payment Order Processing at House Bank"

Figure 18:
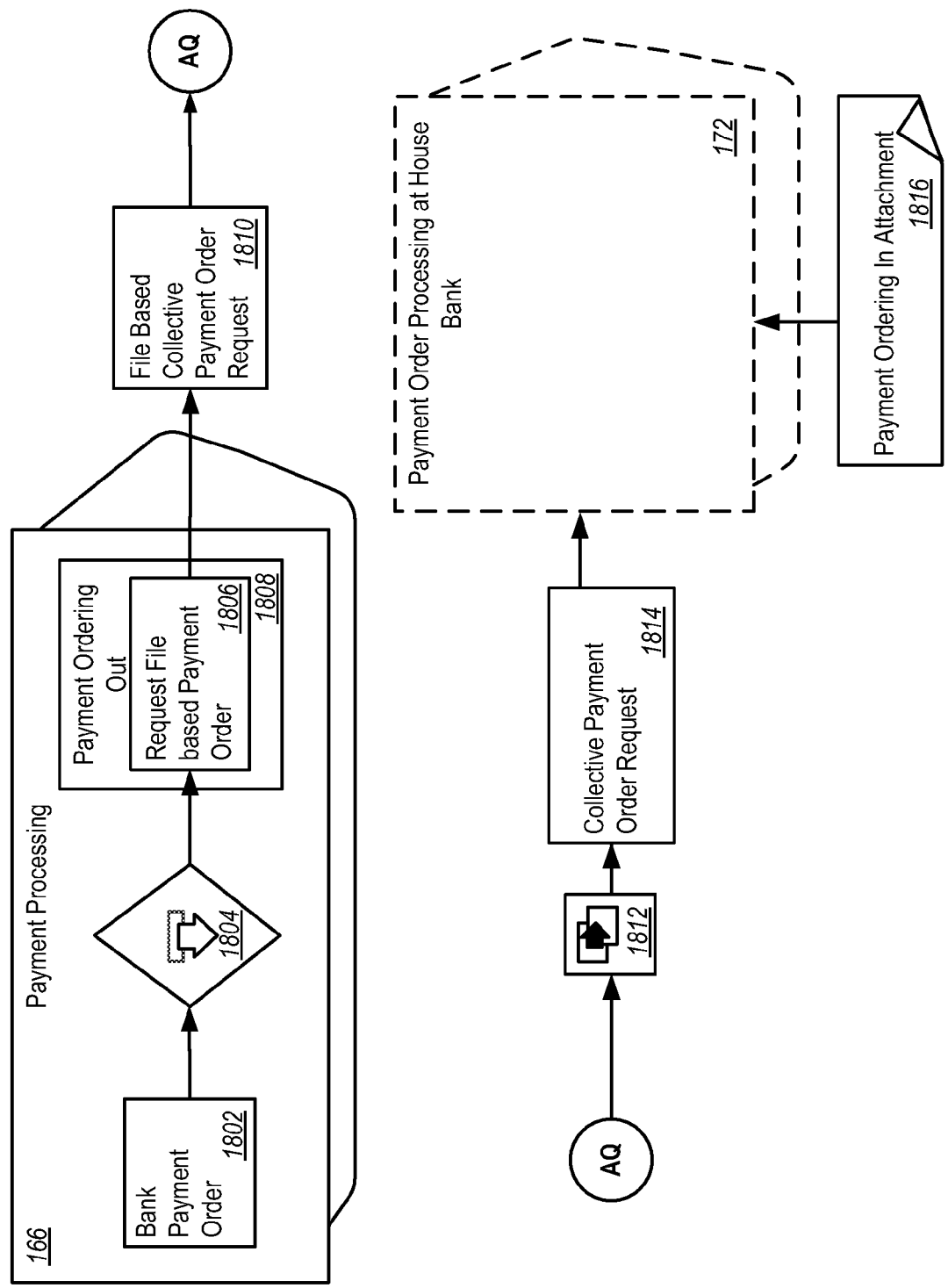
FIG. 18 is a block diagram showing interactions between the Payment Processing process component and a Payment Order Processing at House Bank process component.

FIG. 18 is a block diagram showing interactions between the Payment Processing process component 166 and the Payment Order Processing at House Bank process component 172 in the architectural design of FIGS. 1A-1D. The interactions start with the request for the execution of bank transfers for Germany with file format DTAZV. For example, the communication can either be direct or based on a file exchange.

As shown in FIG. 18, the Payment Processing process component 166 includes a Bank Payment Order business object 1802. The Bank Payment Order business object 1802 represents an order to a house bank to make a transfer or direct debit from a specified house bank account to fulfill a payment order.

The Bank Payment Order business object 1802 uses a Request File Based Payment Order from Bank Payment Order to House Bank outbound process agent 1804 to invoke a Request File based Payment Order operation 1806. The operation 1806 instructs a house bank by file to make a bank transfer, direct debit, outgoing check, or bill of exchange payable. The Request File based Payment Order operation 1806 is included a Payment Ordering Out interface 1808.

The Request File based Payment Order operation 1806 sends a File Based Collective Payment Order Request message 1810. The message 1810 uses a Mapping Entity 1812 to transform the file based message type to a Collective Payment Order Request message 1814. The message 1814 is received by the Payment Order Processing at House Bank process component 172. The Payment Processing process component 166 sends information to the Payment Order Processing at House Bank process component 172 using a Payment Ordering In Attachment communication channel template 1816. The communication channel template 1816 can define protocols and parameters used for communication with an external party.

Interactions Between Process Components "Logistics Execution Control" and "Inbound Delivery Processing"

Figure 19:
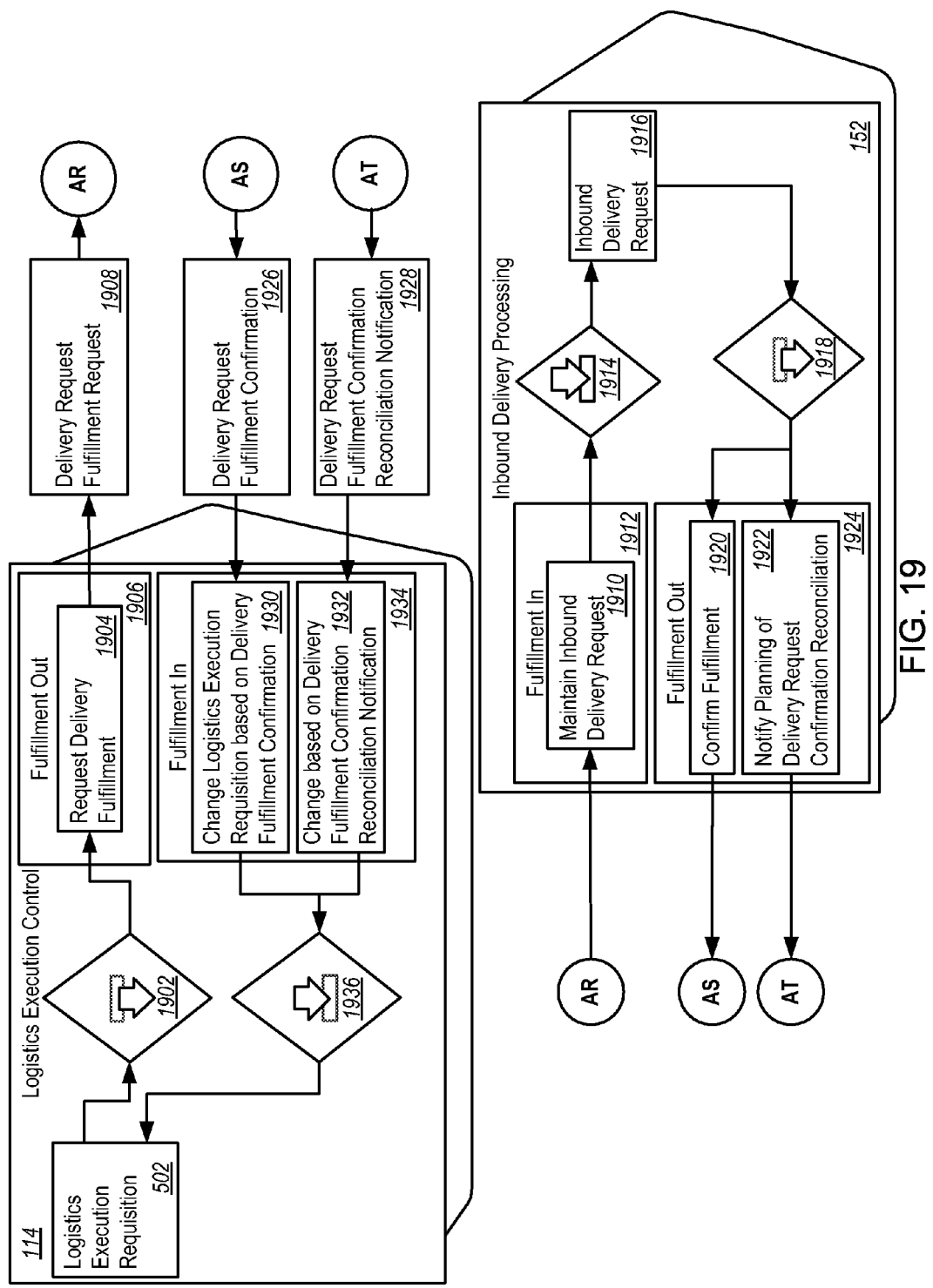
FIG. 19 is a block diagram showing interactions between the Logistics Execution Control process component and an Inbound Delivery Processing process component.

FIG. 19 is a block diagram showing interactions between the Logistics Execution Control process component 114 and the Inbound Delivery Processing process component 152 in the architectural design of FIGS. 1A-1D. The interaction starts with the request for the creation or update of an inbound delivery request when a logistics execution requisition is released.

As shown in FIG. 19, the Logistics Execution Control process component 114 includes the Logistics Execution Requisition business object 502. The business object 502 represents a requisition to the Logistics Execution Control process component 114 to control, trigger, and monitor the execution of a logistics process on a macro-logistics level to fulfill an order. The business object 502 uses a Request Fulfillment from Logistics Execution Requisition to Inbound Delivery Processing outbound process agent 1902 to invoke a Request Delivery Fulfillment operation 1904. The operation 1904, included in a Fulfillment Out interface 1906, creates or updates an inbound or outbound delivery request.

The Request Delivery Fulfillment operation 1904 sends a Delivery Request Fulfillment Request message 1908 to the Inbound Delivery Processing process component 152. A Maintain Inbound Delivery Request operation 1910 receives the message 1908. The operation 1910 is included in a Fulfillment In interface 1912. The Maintain Inbound Delivery Request operation 1910 receives an inbound delivery fulfillment request.

The Maintain Inbound Delivery Request operation 1910 uses a Maintain Inbound Delivery Request inbound process agent 1914 to update an Inbound Delivery Request business object 1916. The business object 1916 represents a request to a product recipient to receive a composition of goods.

The Inbound Delivery Request business object 1916 uses a Confirm Fulfillment of Inbound Delivery Request to Logistics Execution Control outbound process agent 1918 to invoke a Confirm Fulfillment operation 1920 or an optional Notify Planning of Delivery Request Confirmation Reconciliation operation 1922. The operations 1920, 1922 are included in a Fulfillment Out interface 1924. The Confirm Fulfillment operation 1920 confirms the fulfillment of an outbound delivery request. The optional Notify Planning of Delivery Request Confirmation Reconciliation operation 1922 notifies the Logistics Execution Control process component 114 of a delivery request fulfillment confirmation for reconciliation purposes.

The Confirm Fulfillment operation 1920 sends a Delivery Request Fulfillment Confirmation message 1926 to the Logistics Execution Control process component 114. A Change Logistics Execution Requisition based on Delivery Fulfillment Confirmation operation 1930 receives the message 1926. The optional Notify Planning of Delivery Request Confirmation Reconciliation operation 1922 sends a Delivery Request Fulfillment Confirmation Reconciliation Notification message 1928 to the Logistics Execution Control process component 114. An optional Changed based on Delivery Fulfillment Confirmation Reconciliation Notification operation 1932 receives the message 1928. The operations 1930 and 1932 are included in a Fulfillment In interface 1934. The Change Logistics Execution Requisition based on Delivery Fulfillment Confirmation operation 1930 updates a logistics execution requisition with fulfillment confirmation data from an inbound or outbound delivery request, and updates supply and demand matching with any planning-relevant inventory changes. The optional Changed based on Delivery Fulfillment Confirmation Reconciliation Notification operation 1932 reconciles a logistics execution requisition with its related outbound or inbound delivery request.

The operations 1930 and 1932 use a Change Logistics Execution Requisition based on Delivery Fulfillment Confirmation inbound process agent 1936 to update the Logistics Execution Requisition business object 502.

Interactions Between Process Components "Sales Order Processing" and "Accounting"

Figure 20:
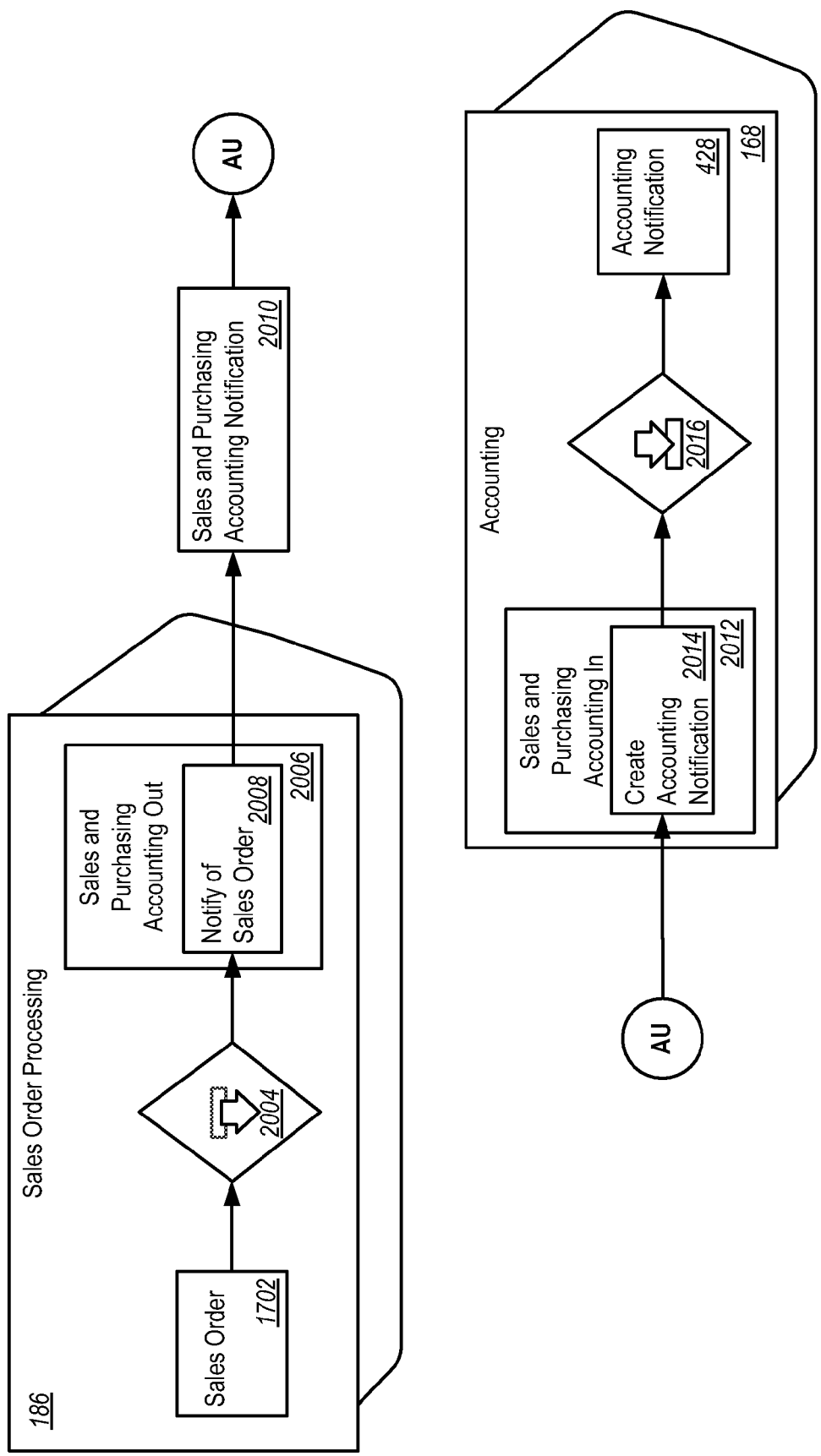
FIG. 20 is a block diagram showing interactions between the Sales Order Processing process component and the Accounting process component.

FIG. 20 is a block diagram showing interactions between the Sales Order Processing process component 186 and the Accounting process component 168 in the architectural design of FIGS. 1A-1D. The interaction starts when a sales order is created or updated. For example, the Sales Order Processing process component 186 requests the creation or update of a sub ledger account, which can be based on sales, from the Accounting process component 168. In some implementations, for service items with service provision in a sales order, upon completion or cancellation of a service item, the creation or cancellation of accounting documents is requested from the Accounting process component 168.

As shown in FIG. 20, the Sales Order Processing process component 186 includes the Sales Order business object 1702. The business object 1702 represents an agreement between a seller and a customer concerning the sale and delivery of goods, as well as any services that are associated with these processes, on a specific date, for a specific quantity, and for a specific price.

The Sales Order business object 1702 uses a Notify of Sales Order to Accounting outbound process agent 2004 to invoke a Notify of Sales Order operation 2008. The operation 2008, included in a Sales and Purchasing Accounting Out interface 2006, informs the Accounting process component 168 when a sales order is created, updated, or changed. For example, when a sales order also contains a service provision, accounting is notified when the service provision is created or cancelled.

The Notify of Sales Order operation 2008 sends a Sales and Purchasing Accounting Notification message 2010 to the Accounting process component 168. A Create Accounting Notification operation 2014 receives the message 2010. The operation 2014, included in a Sales and Purchasing Accounting In interface 2012, creates an accounting notification based on order data received from the Sales Order Processing process component 186.

The Create Accounting Notification operation 2014 uses a Maintain Subledger Account based on Sales and Purchasing inbound process agent 2016 to update the Accounting Notification business object 428. The Accounting Notification business object 428 represents a notification sent to the Financials deployment unit 160 by an operational component regarding a business transaction. For example, it represents this operational business transaction in a standardized form for business transaction documents and contains the data needed to valuate the business transaction.

Interactions Between Process Components "Supplier Invoice Processing" and "Accounting"

Figure 21:
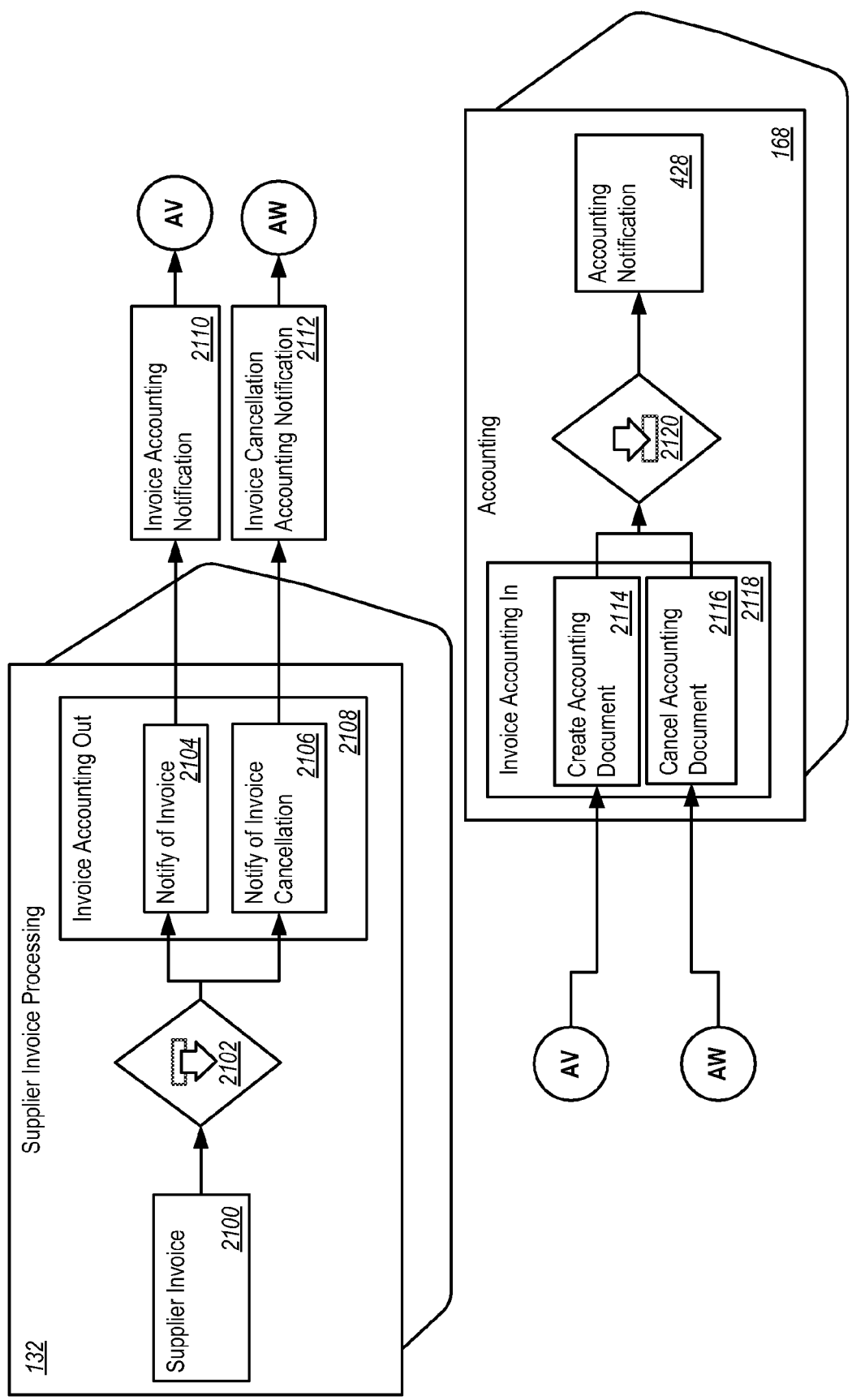
FIG. 21 is a block diagram showing interactions between a Supplier Invoice Processing process component and the Accounting process component.

FIG. 21 is a block diagram showing interactions between the Supplier Invoice Processing process component 132 and the Accounting process component 168 in the architectural design of FIGS. 1A-1D. The interaction starts when a supplier invoice is created or cancelled. For example, the Supplier Invoice Processing process component 132 requests the creation or cancellation of accounting documents from the Accounting process component 168.

As shown in FIG. 21 the Supplier Invoice Processing process component 132 includes a Supplier Invoice business object 2100. The business object 2100 represents a company's obligation to pay the supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

The Supplier Invoice business object 2100 uses a Notify of Supplier Invoice to Accounting outbound process agent 2102 to invoke a Notify of Invoice operation 2104 or a Notify of Invoice Cancellation operation 2106. The operations 2104 and 2106 are included in an Invoice Accounting Out interface 2108. The Notify of Invoice operation 2104 sends a notification about accounting-relevant data from a posted supplier invoice. The Notify of Invoice Cancellation operation 2106 sends a notification about accounting-relevant data from a previously posted supplier invoice that is canceled.

The Notify of Invoice operation 2104 sends an Invoice Accounting Notification message 2110 to the Accounting process component 168. The Notify of Invoice Cancellation operation 2106 sends an Invoice Cancellation Accounting Notification message 2112 to the Accounting process component 168. A Create Accounting Document operation 2114 and a Cancel Accounting Document operation 2116 receive the messages 2110 and 2112, respectively. The operations 2114 and 2116 are included on an Invoice Accounting In interface 2118.

The Create Accounting Document operation 2114 creates an accounting document based on invoice data received the Supplier Invoice Processing process component 132. For example, the received data is first converted into an accounting notification from which one or more accounting documents are created according to the relevant sets of books. The Cancel Accounting Document operation 2116 cancels an existing accounting document based on cancellation data received from the Supplier Invoice Processing process component 132. For example, the received data is converted into an accounting notification from which one or more reversal accounting documents are created according to the relevant sets of books.

The operations 2114 and 2116 use a Maintain Accounting Document based on Invoice inbound process agent 2120 to update the Accounting Notification business object 428. The Accounting Notification business object 428 represents a notification sent to the Financials deployment unit 160 by an operational component regarding a business transaction. For example, it represents this operational business transaction in a standardized form for business transaction documents and contains the data needed to valuate the business transaction.

Interactions in Process Component "Goods Tag Processing"

Figure 22:
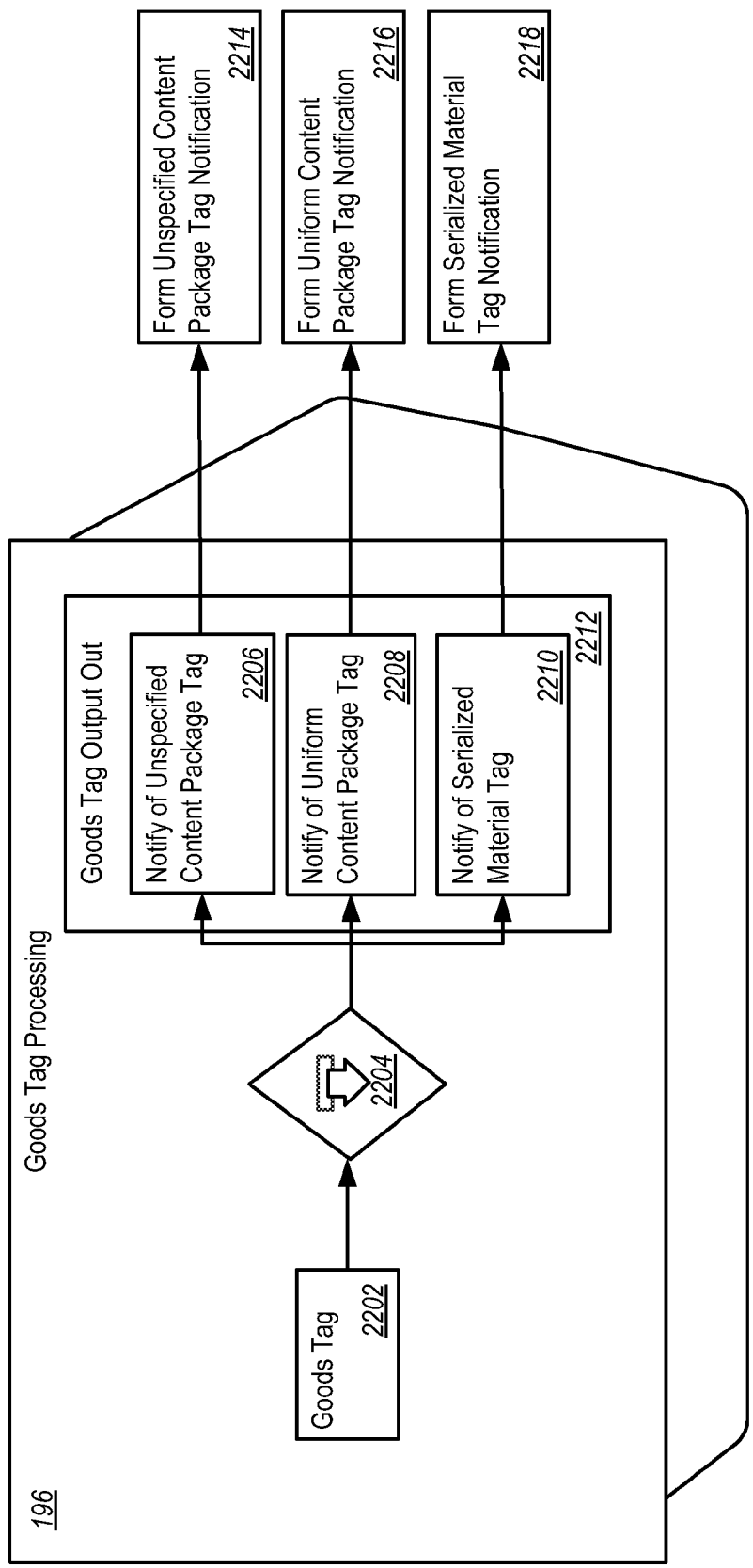
FIG. 22 is a block diagram showing interactions in a Goods Tag Processing process component.

FIG. 22 is a block diagram showing the interactions in a Goods Tag Processing process component 196 in the architectural design of FIGS. 1A-1D. The interaction starts with the request for the output of all types of goods tags.

As shown in FIG. 22 the Goods Tag Processing process component 196 includes a Goods Tag business object 2202. The business object 2202 represents an electronic device, a small piece or part, or a label that is attached to a product or package and that contains selected information about this product or package. In some implementations, its purpose is to present this information to a reader.

The Goods Tag business object 2202 uses a Notify of Goods Tag for Output outbound process agent 2204 to invoke a Notify of Unspecified Content Package Tag operation 2206, a Notify of Uniform Content Package Tag operation 2208, or a Notify of Serialized Material Tag operation 2210. The operations 2206, 2208, and 2210 are included in a Goods Tag Output Out interface 2212. The Notify of Unspecified Content Package Tag operation 2206 sends a Form Unspecified Content Package Tag Notification message 2214 to request the output of goods tags of the type "unspecified content package tag." The Notify of Uniform Content Package Tag operation 2208 sends a Form Uniform Content Package Tag Notification message 2216 to request the output of goods tags of the type "uniform content package tag." The Notify of Serialized Material Tag operation 2210 sends a Form Serialized Material Tag Notification message 2218 to request the output of goods tags of the type "serialized content package tag."

Interactions Between Process Components "Inventory Processing" and "Accounting"

Figure 23:
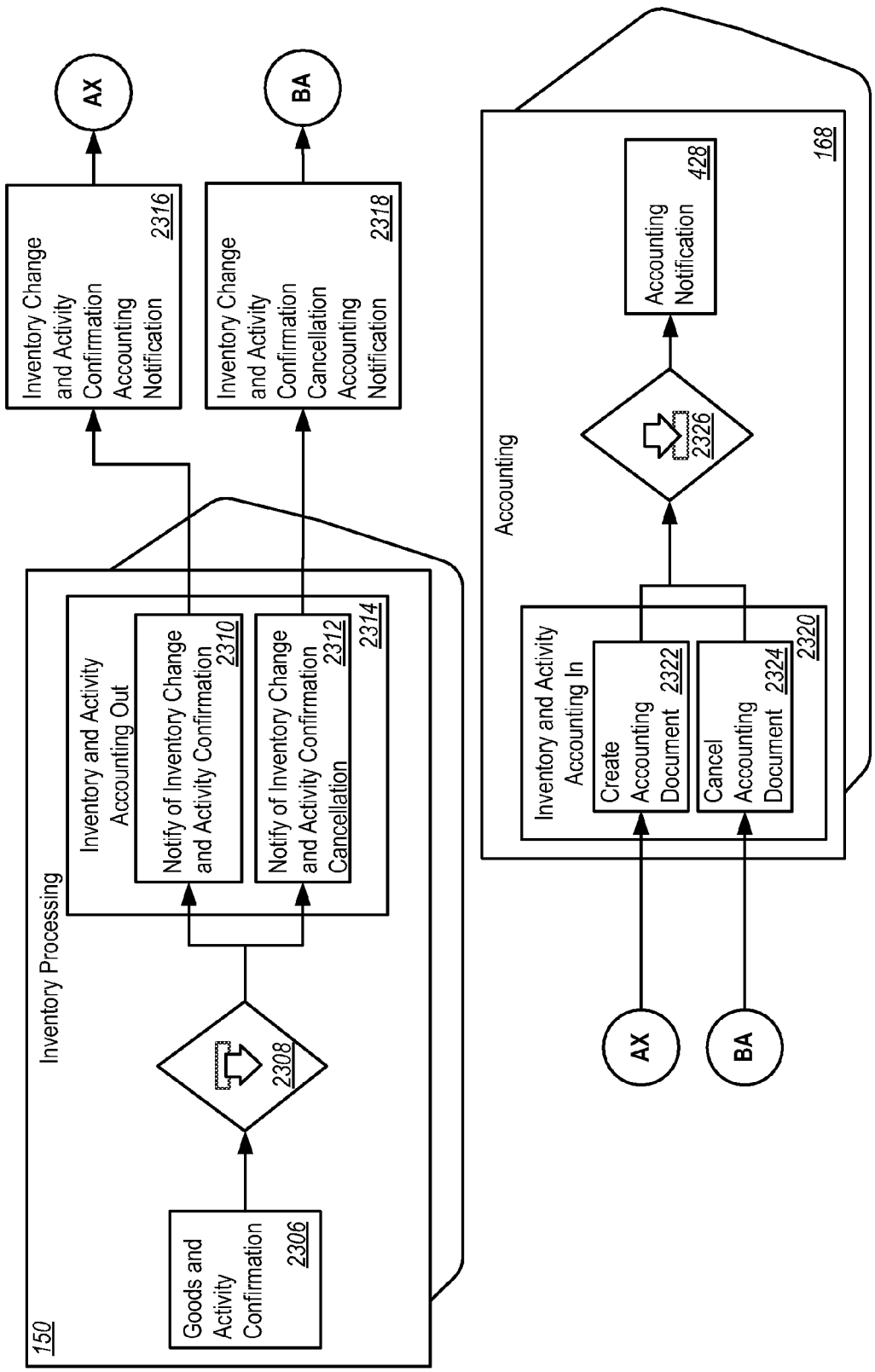
FIG. 23 is a block diagram showing interactions between an Inventory Processing process component and the Accounting process component.

FIG. 23 is a block diagram showing interactions between the Inventory Processing process component 150 and the Accounting process component 168 in the architectural design of FIGS. 1A-1D. The interaction starts when a goods and activity confirmation is created or cancelled. For example, confirmation and inventory requests the creation or cancellation of accounting documents from the Accounting process component 168.

As shown in FIG. 23, the Inventory Processing process component 150 includes the Goods and Activity Confirmation business object 2306. The Goods and Activity Confirmation business object 2306 represents a record of confirmed inventory changes that occurred at a specific time.

The Goods and Activity Confirmation business object 2306 uses a Notify of Inventory Change from Goods and Activity to Accounting outbound process agent 2308 to invoke a Notify of Inventory Change and Activity Confirmation operation 2310 or a Notify of Inventory Change and Activity Confirmation Cancellation operation 2312. The operations 2310 and 2312 are included in an Inventory and Activity Accounting Out interface 2314. If the Notify of Inventory Change and Activity Confirmation operation 2310 is invoked, an Inventory Change and Activity Confirmation Accounting Notification message 2316 is sent to the Accounting process component 168. If the Notify of Inventory Change and Activity Confirmation Cancellation operation 2312 is invoked, an Inventory Change and Activity Confirmation Cancellation Accounting Notification message 2318 is sent to the Accounting process component 168. The Notify of Inventory Change and Activity Confirmation operation 2310 notifies about inventory changes (e.g., for physical goods) and activity confirmations and triggers a valuation of the relevant inventory changes and activities. The Notify of Inventory Change and Activity Confirmation Cancellation operation 2312 notifies about a cancellation of inventory changes and activity confirmations sent earlier.

A Create Accounting Document operation 2322 receives the Inventory Change and Activity Confirmation Accounting Notification message 2316. A Cancel Accounting Document operation 2324 receives the Inventory Change and Activity Confirmation Cancellation Accounting Notification message 2318. An Inventory and Activity Accounting In interface 2320 includes the Create Accounting Document operation 2322 and the Cancel Accounting Document operation 2324. The Create Accounting Document operation 2322 creates an accounting document based on inventory data received from the Inventory Processing process component 150. For example, the received data is first converted into an accounting notification from which one or more accounting documents are created according to the relevant sets of books. The Cancel Accounting Document operation 2324 cancels an existing accounting document based on cancellation data received from the Inventory Processing process component 150. For example, the received data is converted into an accounting notification from which one or more reversal accounting documents are created according to the relevant sets of books.

The Create Accounting Document operation 2322 and the Cancel Accounting Document operation 2324 use a Maintain Accounting Document based on Inventory and Activity inbound process agent 2326 to update the Accounting Notification business object 428. The Accounting Notification business object 428 represents a notification sent to the Financials deployment unit 160 by an operational component regarding a business transaction. For example, it represents this operational business transaction in a standardized form for business transaction documents and contains the data needed to valuate the business transaction.

Interactions Between Process Components "External Procurement Trigger and Response" and "Purchase Request Processing"

Figure 24:
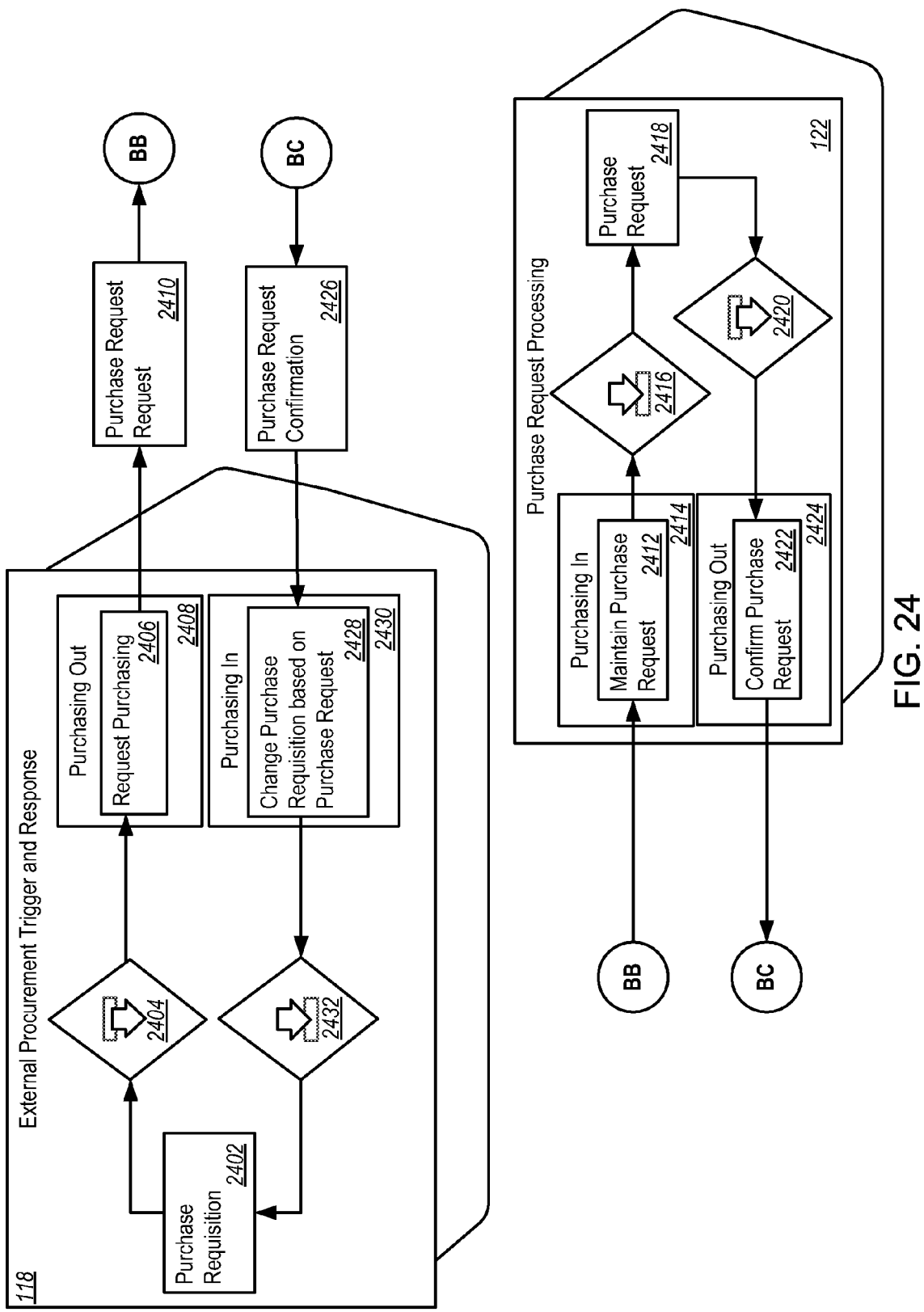
FIG. 24 is a block diagram showing interactions between the External Procurement Trigger and Response process component and a Purchase Request Processing process component.

FIG. 24 is a block diagram showing interactions between the External Procurement Trigger and Response process component 118 and the Purchase Request Processing process component 122 in the architectural design of FIGS. 1A-1D. The interactions start with the request for the creation of a purchase request, triggered by the External Procurement Trigger and Response process component 118. For example, the Purchase Request Processing process component 122 reports the creation of the purchase request back to the External Procurement Trigger and Response process component 118.

As shown in FIG. 24, the External Procurement Trigger and Response process component 118 includes a Purchase Requisition business object 2402. The business object 2402 represents a requisition to purchasing for the external procurement of materials planned in supply and demand matching. For example, the purchase requisition is derived from the procurement planning order and describes which materials are to be procured in what quantities, and at what time.

The Purchase Requisition business object 2402 uses a Request Purchasing from Purchase Requisition to Purchase Request Processing outbound process agent 2404 to invoke a Request Purchasing operation 2406 to request the creation or updating of a purchase request for the procurement of products or services. The operation 2406 is included in a Purchasing Out interface 2408. The operation 2406 sends a Purchase Request Request message 2410 to the Purchase Request Processing process component 122. A Maintain Purchase Request operation 2412 receives the message 2410. The operation 2412, included in a Purchasing In interface 2414, creates or updates a purchase request.

The Maintain Purchase Request operation 2412 uses a Maintain Purchase Request inbound process agent 2416 to update a Purchase Request business object 2418. The business object 2418 represents a request or instruction to the purchasing department to purchase specified goods or services in specified quantities at a specified price within a specified time.

The Purchase Request business object 2418 uses a Confirm Purchase Request outbound process agent 2420 to invoke a Confirm Purchase Request operation 2422. The operation 2422, included in a Purchasing Out interface 2424, confirms the creation, change, or cancellation of a purchase request to the requestor. The operation 2422 sends a Purchase Request Confirmation message 2426 to the External Procurement Trigger and Response process component 118. A Change Purchase Requisition based on Purchase Request operation 2428 receives the message 2426 and confirms to the requester the extent to which a purchase requisition has been fulfilled. The operation 2428 uses a Change Purchase Requisition based on Purchase Request inbound process agent 2432 to update the Purchase Requisition business object 2402.

Interactions Between Process Components "Outbound Delivery Processing" and "Customer Invoice Processing"

Figure 25:
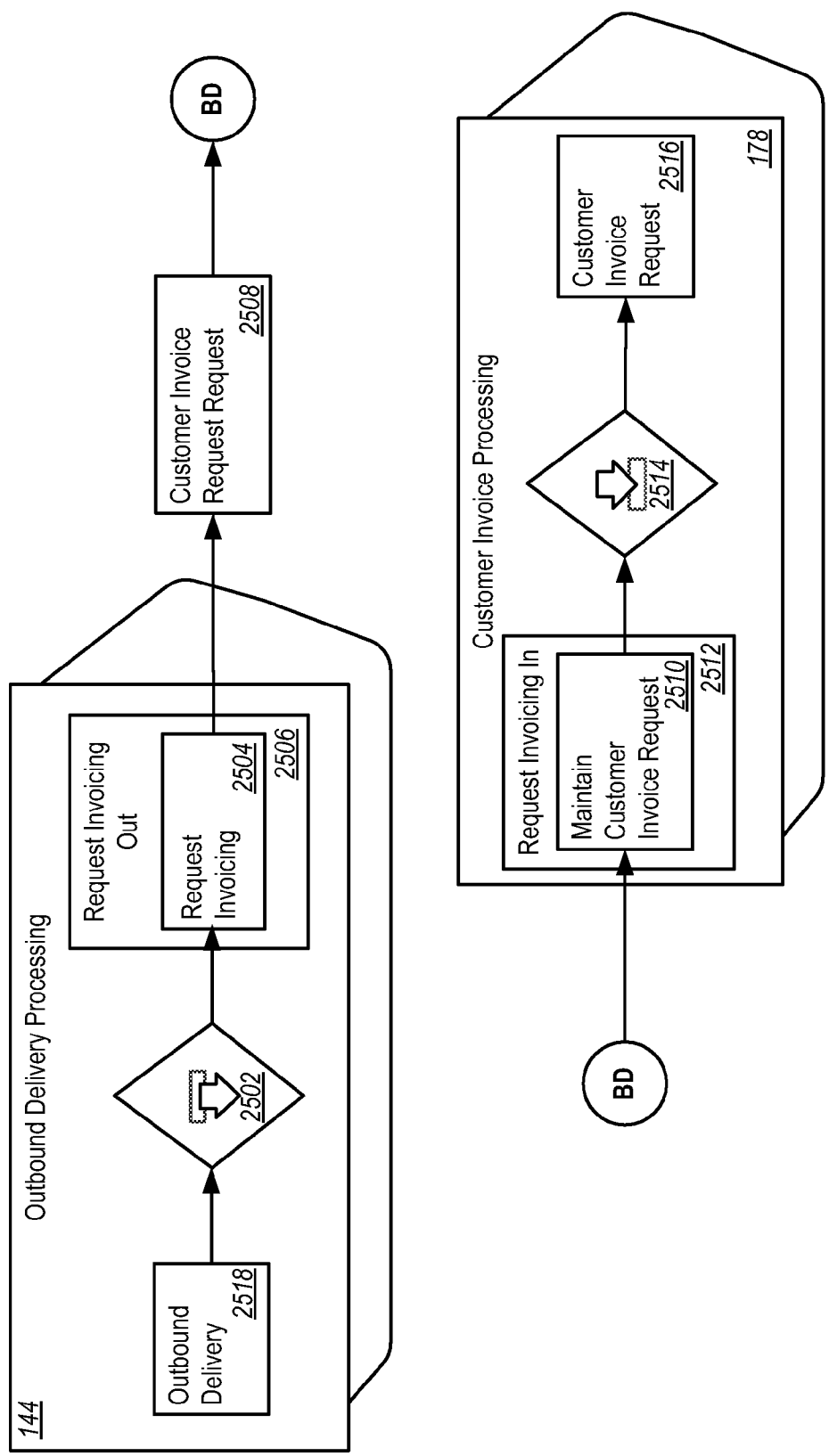
FIG. 25 is a block diagram showing interactions between the Outbound Delivery Processing process component and the Customer Invoice Processing process component.

FIG. 25 is a block diagram showing interactions between the Outbound Delivery Processing process component 144 and the Customer Invoice Processing process component 178 in the architectural design of FIGS. 1A-1D. The interaction starts when an outbound delivery is created, changed, or cancelled. The Outbound Delivery Processing process component 144 requests the creation, update, or cancellation of invoice(s) from the Customer Invoice Processing process component 178.

As shown in FIG. 25, the Outbound Delivery Processing process component 144 includes an Outbound Delivery business object 2518. The Outbound Delivery business object 2518 represents a composition of the goods that is provided for shipping by a vendor. The Outbound Delivery business object 2518 uses a Request Invoicing from Outbound Delivery to Customer Invoice Processing outbound process agent 2502 to invoke a Request Invoicing operation 2504. The operation 2504 sends a request for a customer invoice request. The Request Invoicing operation 2504 is included in a Request Invoicing Out interface 2506. The Request Invoicing operation 2504 sends a Customer Invoice Request Request message 2508 to the Customer Invoice Processing process component 178.

The Customer Invoice Processing process component 178 includes a Maintain Customer Invoice Request operation 2410 to receive the Customer Invoice Request Request message 2508. The Maintain Customer Invoice Request operation 2510 creates, updates, or cancels a customer invoice request. The operation 2510 is included in a Request Invoicing In interface 2512. The Maintain Customer Invoice Request operation 2510 uses a Maintain Customer Invoice Request inbound process agent 2514 to update a Customer Invoice Request business object 2516. The Customer Invoice Request business object 2516 represents a request to create one or several customer invoices, or to take account of the data for the underlying business document when creating a customer invoice.

Interactions Between Process Components "Purchase Order Processing" and "Accounting"

Figure 26:
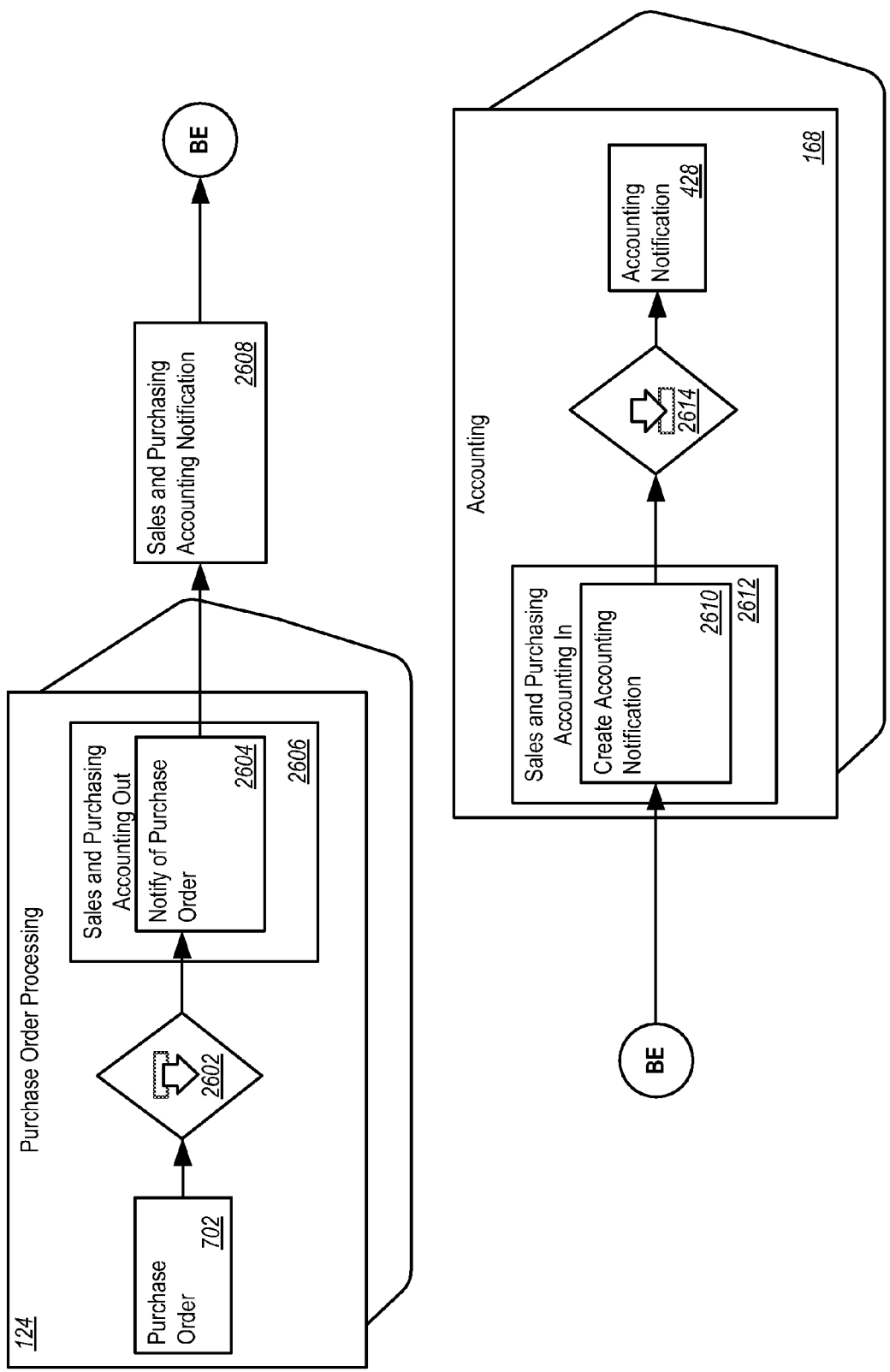
FIG. 26 is a block diagram showing interactions between the Purchase Order Processing process component and a Accounting process component.

FIG. 26 is a block diagram showing interactions between the Purchase Order Processing process component 124 and the Accounting process component 168 in the architectural design of FIGS. 1A-1D. The interaction starts when a purchase order is created or updated. For example, the Purchase Order Processing process component 124 requests the creation or update of sub ledger account, which can be based on purchasing, from the Accounting process component 168.

As shown in FIG. 26, the Purchase Order Processing process component 124 includes the Purchase Order business object 702. The business object 702 represents a request from a buyer to a seller to deliver a specified quantity of material, or perform a specified service, at a specified price within a specified time. The business object 702 uses a Notify of Purchase Order to Accounting outbound process agent 2602 to invoke a Notify of Purchase Order operation 2604. The operation 2604, included in a Sales and Purchasing Accounting Out interface 2606, notifies the Accounting process component 168 that a purchase order has been created, changed, or canceled. The operation 2404 sends a Sales and Purchasing Accounting Notification message 2608 to the Accounting process component 168. A Create Accounting Notification operation 2610 receives the message 2608. The operation 2610, included in a Sales and Purchasing Accounting In interface 2612, creates an accounting notification based on order data received from the Purchase Order Processing process component 124.

The Create Accounting Notification operation 2610 uses a Maintain Subledger Account based on Sales And Purchasing inbound process agent 2614 to update the Accounting Notification business object 428. The Accounting Notification business object 428 represents a notification sent to the Financials deployment unit 160 by an operational component regarding a business transaction. For example, it represents this operational business transaction in a standardized form for business transaction documents and contains the data needed to valuate the business transaction.

Interactions Between Process Components "Purchase Order Processing" and "Supplier Invoice Processing"

Figure 27:
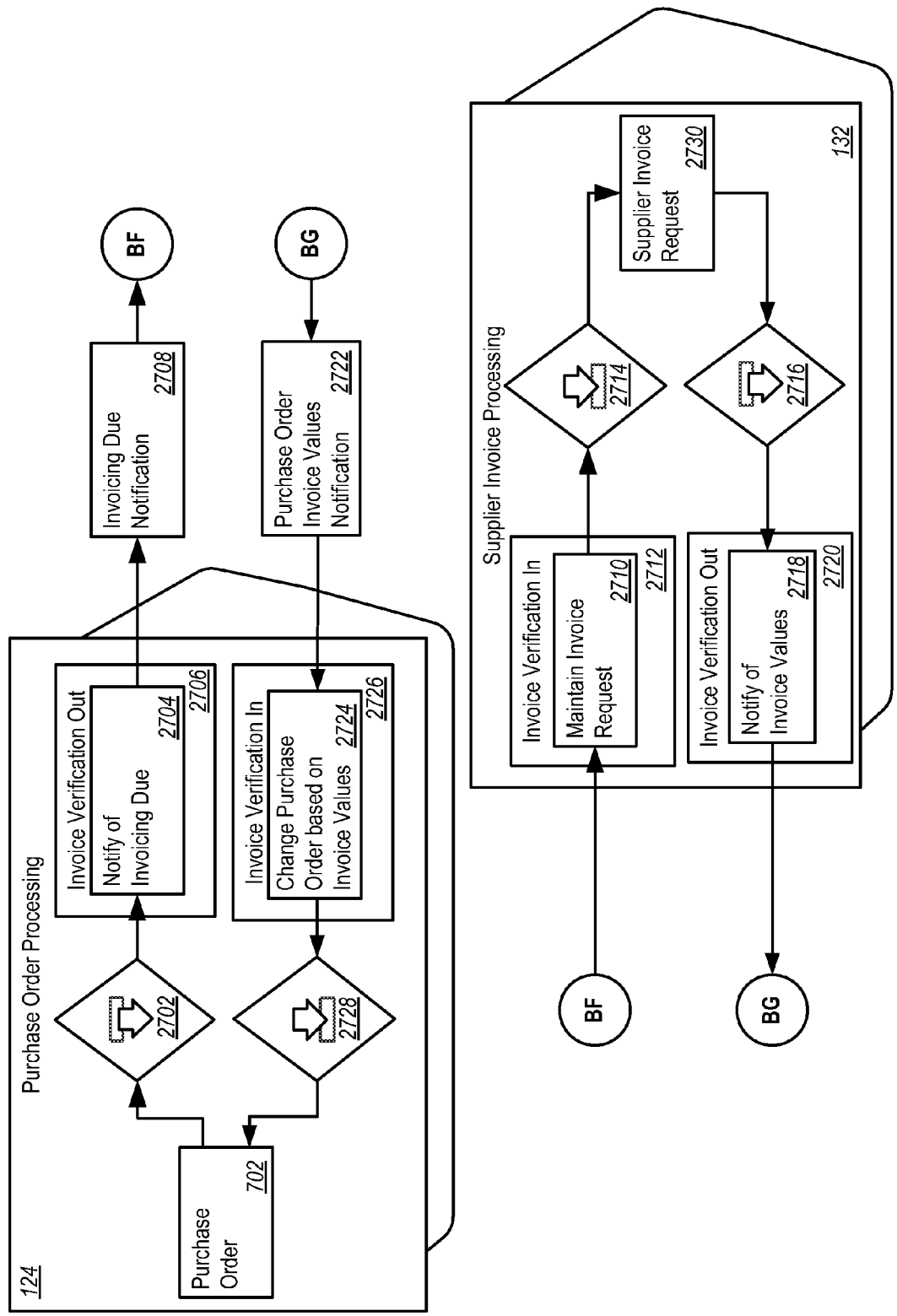
FIG. 27 is a block diagram showing interactions between the Purchase Order Processing process component and the Supplier Invoice Processing process component.

FIG. 27 is a block diagram showing interactions between the Purchase Order Processing process component 124 and the Supplier Invoice Processing process component 132 in the architectural design of FIGS. 1A-1D. The interaction starts with the sending of invoicing-relevant data from a purchase order to the Supplier Invoice Processing process component 132. In some implementations, when the supplier invoice that is based on the purchase order is saved, the Purchase Order Processing process component 124 is notified and the invoiced value and invoiced quantity in the supplier invoice are reported back.

As shown in FIG. 27, the Purchase Order Processing process component 124 includes the Purchase Order business object 702. The business object 702 represents a request from a buyer to a seller to deliver a specified quantity of material, or perform a specified service, at a specified price within a specified time. The business object 702 uses a Notify of Invoicing Due from Purchase Order to Supplier Invoice Processing outbound process agent 2702 to invoke a Notify of Invoicing Due operation 2704. The operation 2704, included in an Invoice Verification Out interface 2706, notifies the Supplier Invoice Processing process component 132 about a new, changed, or canceled purchase order. The operation 2704 sends an Invoicing Due Notification message 2708 which is received by a Maintain Invoice Request operation 2710.

The Maintain Invoice Request operation 2710, included in an Invoice Verification In interface 2712, creates, updates, deletes, or requests the cancellation of a supplier invoice request based on the invoicing-relevant data that is transferred from a purchasing system. The operation 2710 uses a Maintain Supplier Invoice Request inbound process agent 2714 to update a Supplier Invoice Request business object 2730. The business object 2730 represents a request to invoice verification advising that a supplier invoice for specified quantities and prices is expected and is to be created through evaluated receipt settlement.

The Supplier Invoice Request business object 2730 uses a Notify of Invoice Values from Supplier Invoice Processing to Purchase Order Processing outbound process agent 2716 to invoke a Notify of Invoice Values operation 2718. The operation 2718, included in an Invoice Verification Out interface 2720, sends a notification about the actual values and quantities of a supplier invoice that has been saved and contains a reference to a purchase order.

The Notify of Invoice Values operation 2718 sends a Purchase Order Invoice Values Notification message 2722 to the Purchase Order Processing process component 124. A Change Purchase Order based on Invoice Values operation 2724 receives the message 2722. The operation 2724, included in an Invoice Verification In interface 2726, uses a Change Purchase Order based on Invoice Values inbound process agent 2728 to update the Purchase Order business object 702. The Change Purchase Order based on Invoice Values operation 2724 updates a purchase order based on invoice data.

Interactions Between Process Components "Purchase Order Processing" and "Sales Order Processing"

Figure 28A:
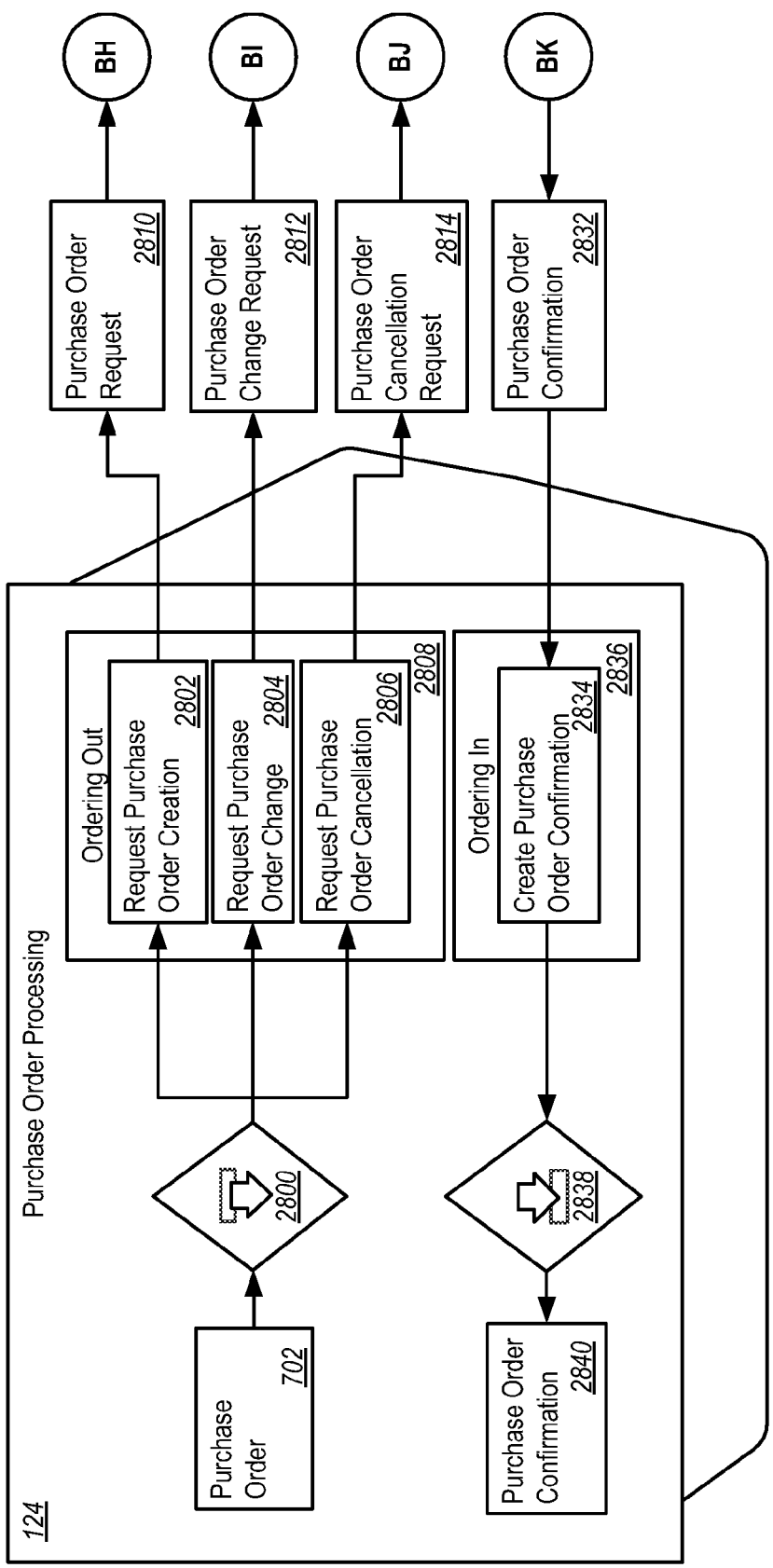
FIGS. 28A and 28B are block diagrams collectively showing interactions between the Purchase Order Processing process component and the Sales Order Processing process component.
Figure 28B:
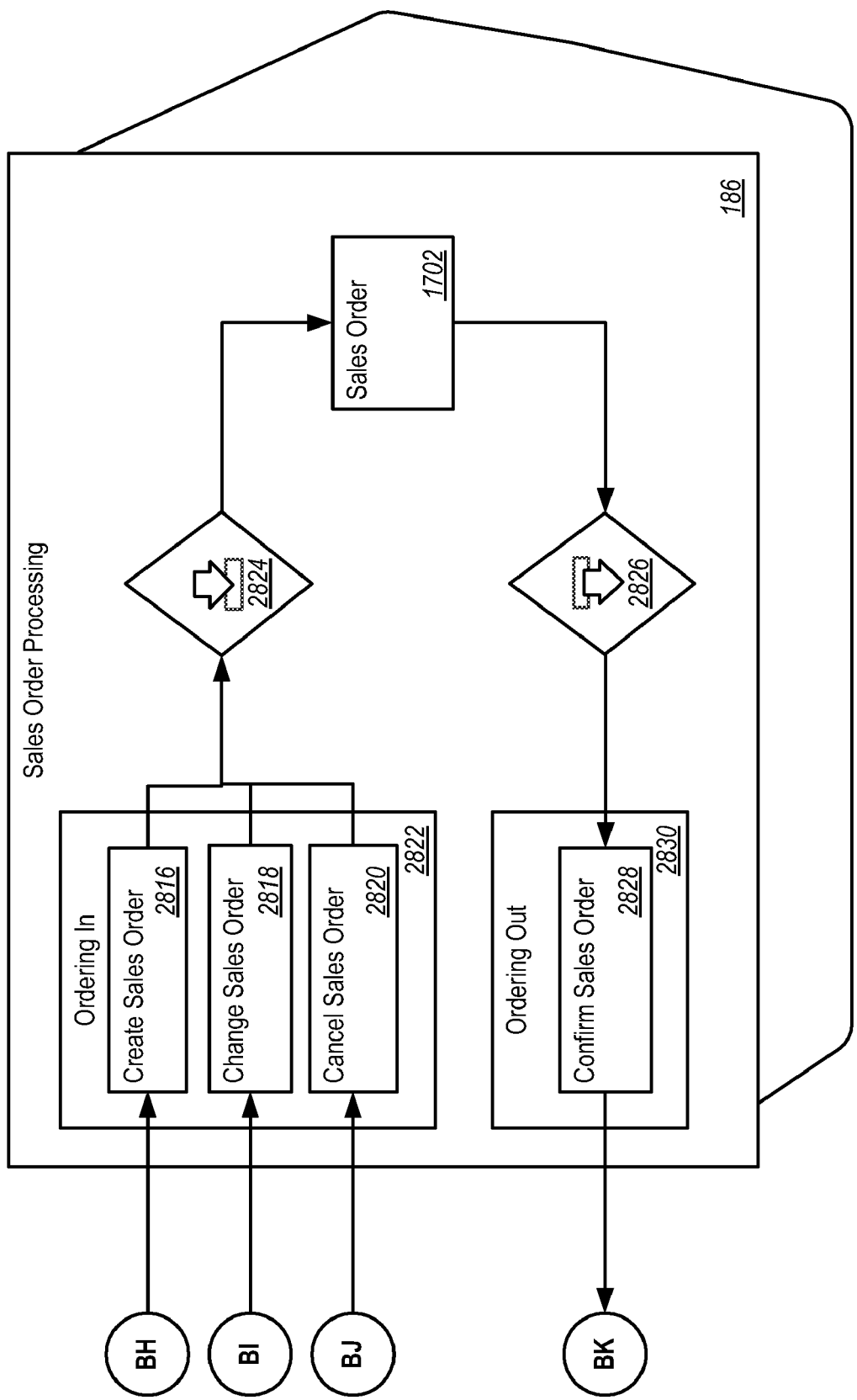

FIGS. 28A and 28B are block diagrams collectively showing interactions between the Purchase Order Processing process component 124 and the Sales Order Processing process component 186 in the architectural design of FIGS. 1A-1D. The interaction starts with the request for the creation, update, or cancellation of sales orders from the Sales Order Processing process component 186 when a purchase order on the customer's side is created, changed, or cancelled.

As shown in FIG. 28A, the Purchase Order Processing process component 124 includes the Purchase Order business object 702. The business object 702 represents a request from a buyer to a seller to deliver a specified quantity of material, or perform a specified service, at a specified price within a specified time. The business object 702 uses a Request Purchase Order to Supplier outbound process agent 2800 to invoke a Request Purchase Order Creation operation 2802, a Request Purchase Order Change operation 2804, or a Request Purchase Order Cancellation operation 2806. The operations 2802,2804, and 2806 are included in an Ordering Out interface 2808. The Request Purchase Order Creation operation 2802 sends a Purchase Order Request message 2810 to the Sales Order Processing process component 186. The Request Purchase Order Change operation 2804 sends a Purchase Order Change Request message 2812 to the Sales Order Processing process component 186. The Request Purchase Order Cancellation operation 2806 sends a Purchase Order Cancellation Request message 2814 to the Sales Order Processing process component 186. The Request Purchase Order Creation operation 2802 requests sales order processing at the supplier to process a new purchase order. The Request Purchase Order Change operation 2804 requests sales order processing at the supplier to change a previously sent purchase order. The Request Purchase Order Cancellation operation 2806 requests sales order processing at the supplier to cancel a previously sent purchase order.

As shown in FIG. 28B the messages 2810, 2812, and 2814 are received by a Create Sales Order operation 2816, a Change Sales Order operation 2818, and a Cancel Sales Order operation 2820, respectively. The operations 2816, 2818, and 2820 use a Maintain Sales Order inbound process agent 2824 to update the Sales Order business object 1702. The business object 1702 represents an agreement between a seller and a customer concerning the sale and delivery of goods, as well as any services that are associated with these processes, on a specific date, for a specific quantity, and for a specific price. The Create Sales Order operation 2816 creates the sales order based on the purchase order. The Change Sales Order operation 2818 updates the sales order based on changes from the purchase order. The Cancel Sales Order operation 2820 cancel the sales order based on the cancellation of a purchase order from the customer.

The Sales Order business object 1702 uses a Confirm Sales Order to Customer outbound process agent 2826 to invoke a Confirm Sales Order operation 2828. The operation 2828, included in an Ordering Out interface 2830, sends a Purchase Order Confirmation message 2832 to the Purchase Order Processing process component 124. The Confirm Sales Order operation 2828 confirms changes in the sales order to the customer. A Create Purchase Order Confirmation operation 2834, included in an Ordering In interface 2836, receives the Purchase Order Confirmation message 2832. The Create Purchase Order Confirmation operation 2834 creates a purchase order confirmation based on the supplier's response to a purchase order. The Create Purchase Order Confirmation operation 2834 uses a Create Purchase Order Confirmation inbound process agent 2838 to update a Purchase Order Confirmation business object 2840. The business object 2840 represents a confirmation from a seller to deliver a specified quantity of goods, or perform a specified service, at a specified price within a specified time.

Interactions Between Process Components "Sales Order Processing" and "Customer Requirement Processing"

Figure 29A:
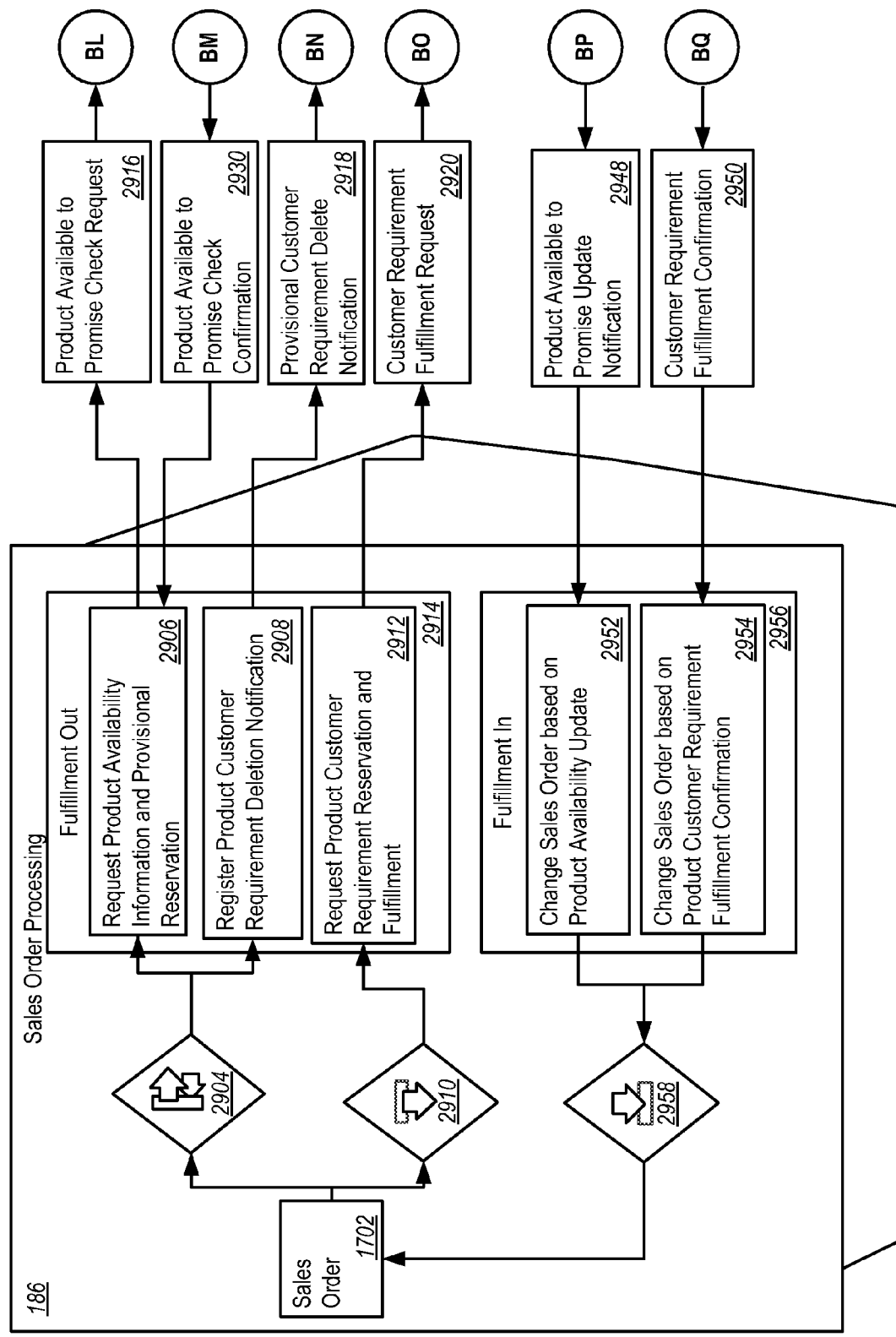
FIGS. 29A and 29B are block diagrams collectively showing interactions between the Sales Order Processing process component and the Customer Requirement Processing process component.
Figure 29B:
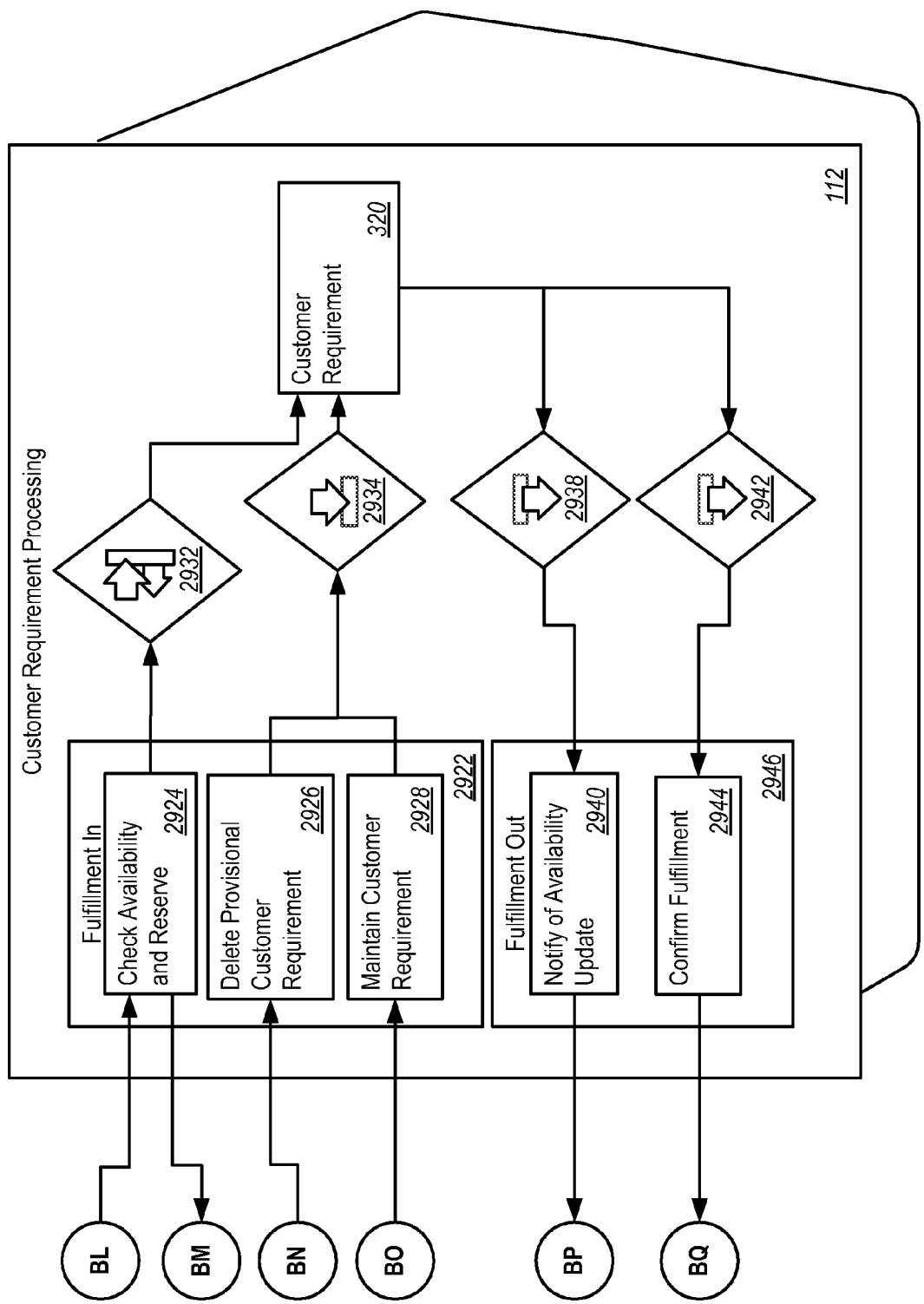

FIGS. 29A and 29B are block diagrams collectively showing interactions between the Sales Order Processing process component 186 and the Customer Requirement Processing process component 112 in the architectural design of FIGS. 1A-1D. The interaction starts when the Sales Order Processing process component 186 requests an availability check for an ordered product from the Customer Requirement Processing process component 112 when a sales order is created or updated and requests the fulfillment of the sales order when the order is saved. As shown in FIG. 29A, the Sales Order Processing process component 186 includes the Sales Order business object 1702. The Sales Order business object 1702 represents an agreement between a seller and a customer concerning the sale and delivery of goods, as well as any services that are associated with these processes, on a specific date, for a specific quantity, and for a specific price. The Sales Order business object 1702 uses a Synchronous Request Product Availability from Sales Order to Customer Requirement synchronous outbound process agent 2904 to invoke a Request Product Availability Information and Provisional Reservation operation 2906 or a Register Product Customer Requirement Deletion Notification operation 2908. The Register Product Customer Requirement Deletion Notification operation 2908 registers the provisional requirement reservation for deletion and trigger deletion in case of failure or cancellation. The Request Product Availability Information and Provisional Reservation operation 2906 requests product availability information including the creation of a provisional reservation for the customer requirement.

The Sales Order business object 1702 uses Request Requirement Reservation and Fulfillment from Sales Order to Customer Requirement outbound process agent 2910 to invoke a Request Product Customer Requirement Reservation and Fulfillment operation 2912. The Request Product Customer Requirement Reservation and Fulfillment operation 2912 requests the reservation and fulfillment of a customer requirement. The Request Product Availability Information and Provisional Reservation operation 2906, the Register Product Customer Requirement Deletion Notification operation 2908, and the Request Product Customer Requirement Reservation and Fulfillment operation 2912 are included in a Fulfillment Out interface 2914. The Request Product Availability Information and Provisional Reservation operation 2906, the Register Product Customer Requirement Deletion Notification operation 2908, and the Request Product Customer Requirement Reservation and Fulfillment operation 2912 send a Product Available To Promise Check Request message 2916, a Provisional Customer Requirement Delete Notification message 2918, and a Customer Requirement Fulfillment request message 2920, respectively to the Customer Requirement Processing process component 112.

As shown in FIG. 29B, the Customer Requirement Processing process component 112 includes a Check Availability and Reserve operation 2924, a Delete Provisional Customer Requirement operation 2926 and a Maintain Customer Requirement operation 2928 in a Fulfillment In interface 2922 to receive the messages 2916, 2918, and 2920, respectively. The Check Availability and Reserve operation 2924 receives the Product Available To Promise Check Request 2916. The operation 2924 checks and confirms the availability of a specific amount of materials. The Check Availability and Reserve operation 2924 sends a Product Available To Promise Check Confirmation message 2930 (FIG. 29A) back to the Request Product Availability Information and Provisional Reservation operation 2906.

As shown in FIG. 29B, the Check Availability and Reserve operation 2924 uses a Check Availability and Reserve synchronous inbound process agent 2932 to update the Customer Requirement business object 320. The Customer Requirement business object 320 represents a requirement that is derived from a sales order, quotation, or service order and to which details on the anticipated availability date of materials required to fulfill the requirement may be added. For example, it contains the quantities of materials required at specific dates as well as information about which materials will be available or delivered in which quantities at which dates.

The Delete Provisional Customer Requirement operation 2926 receives the Provisional Customer Requirement Delete Notification message 2918. The Delete Provisional Customer Requirement operation 2926 deletes provisional customer requirements that have been created by the Check Availability and Reserve operation 2924. The Maintain Customer Requirement operation 2928 receives the Customer Requirement Fulfillment Confirmation message 2920. The Maintain Customer Requirement operation 2928 creates or updates a customer requirement. Operation 2926 and operation 2928 use a Maintain Customer Requirement inbound process agent 2934 to update the Customer Requirement business object 320. The Customer Requirement business object 320 uses a Notify of Availability Update from Customer Requirement outbound process agent 2938 to invoke a Notify of Availability Update operation 2940 and a Confirm Fulfillment of Customer Requirement outbound process agent 2942 to Invoke a Confirm Fulfillment operation 2944. The Notify of Availability Update operation 2940 notifies about updated availability for requested materials. The Confirm Fulfillment operation 2944 confirms the partial or complete fulfillment of a customer requirement to the creator of the requirement. The operations 2940 and 2944 are included in a Fulfillment Out interface 2946.

As shown in FIG. 29A, the Notify of Availability Update operation 2940 and the Confirm Fulfillment operation 2944 send a Product Available To Promise Update Notification message 2948 and a Customer Requirement Fulfillment Confirmation message 2950, respectively, to the Sales Order Processing process component 186. A Fulfillment In interface 2956 includes a Change Sales Order based on Product Availability Update operation 2952 to receive the Product Available To Promise Update Notification message 2948, and a Change Sales Order based on Product Customer Requirement Fulfillment Confirmation operation 2954 to receive the Customer Requirement Fulfillment Confirmation message 2950.

The Change Sales Order based on Product Availability Update operation 2952 updates the sales order with availability and reservation information based on changes in fulfillment planning. The Change Sales Order based on Product Customer Requirement Fulfillment Confirmation operation 2954 updates the sales order with information from fulfillment confirmation. The operations 2952 and 2954 use a Change Sales Order based on Customer Requirement inbound process agent 2958 to update the Sales Order business object 1702.

Interactions Between Process Components "Purchase Request Processing" and "RFQ Processing"

FIG. 30 is a block diagram showing interactions between the Purchase Request Processing process component 122 and the RFQ Processing process component 102 in the architectural design of FIGS. 1A-1D. The interaction represents the requesting of the creation of a request for quote in the RFQ Processing process component 102 to find sources of supply for a purchase request.

As shown in FIG. 30, the Purchase Request Processing process component 122 includes a Purchase Request business object 2418. The business object 2418 represents a request or instruction to the purchasing department to purchase specified goods or services in specified quantities at a specified price within a specified time. The business object 2418 uses a Request RFQ Execution from Purchase Request to RFQ Processing outbound process agent 3000 to invoke a Request RFQ Execution operation 3002. The operation 3002, included in a Request for Quote Out interface 3004, requests the creation of a request for quote to find sources of supply for a purchase request.

The Request for RFQ Execution operation 3002 sends an RFQ Execution Request message 3006 to the RFQ Processing process component 102. A Maintain RFQ Request operation 3008 receives the message 3006. The operation 3008, included in a Request for Quote In interface 3010, creates an RFQ request based on business documents that trigger the bidding process (purchase request, purchasing contract). The operation 3008 uses a Maintain RFQ Request inbound process agent 3012 to update an RFQ Request business object 3014. The business object 3014 represents a request to the purchasing department to prepare a request for quote.

The RFQ Request business object 3014 uses a Confirm RFQ Request outbound process agent 3016 to invoke a Confirm RFQ Request operation 3018. The operation 3018, included in a Request for Quote Out interface 3020, confirms the creation of an RFQ request or the cancellation of RFQ request items.

The Confirm RFQ Request operation 3018 sends an RFQ Execution Confirmation message 3022 to the Purchase Request Processing process component 122. The message 3022 is received by a Change Purchase Request based on RFQ Execution operation 3024. The operation 3024, included in a Request for Quote In interface 3026, creates or updates the purchase request based on the corresponding RFQ request. The operation 3024 uses a Change Purchase Request based on RFQ Execution inbound process agent 3028 to update the Purchase Request business object 2418.

Interaction Between Process Components "Sales Order Processing" and "Financial Accounting Master Data Management"

Figure 31:
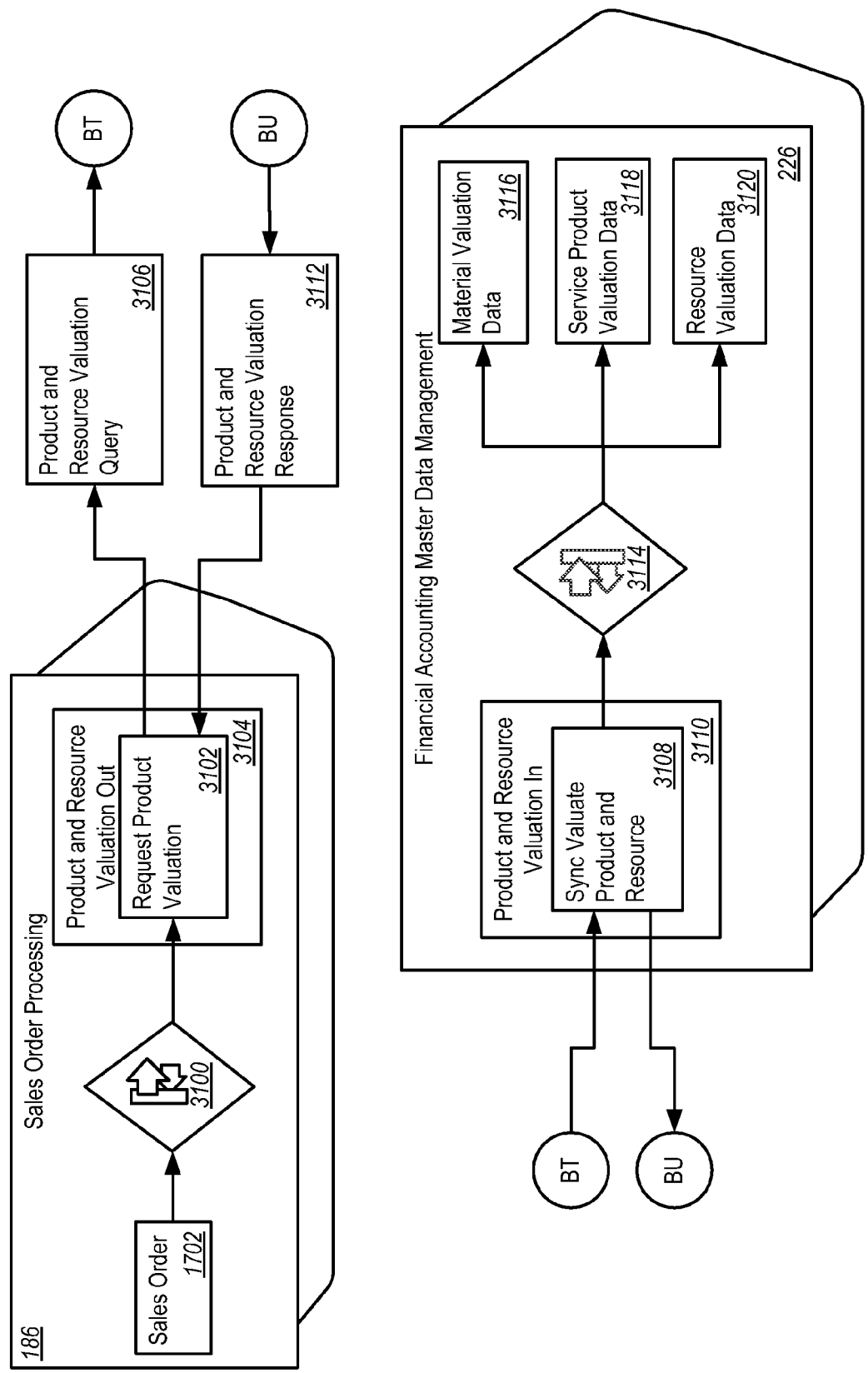
FIG. 31 is a block diagram showing interactions between the Sales Order Processing process component and the Financial Accounting Master Data Management process component.

FIG. 31 is a block diagram showing interactions between the Sales Order Processing process component 186 and the Financial Accounting Master Data Management process component 226 in the architectural design of FIGS. 1A-1D. The interaction represents the requesting of the product valuation price from the Financial Accounting Master Data Management process component 226 when a sales order is created or changed.

As shown in FIG. 31, the Sales Order Processing process component 186 includes a Sales Order business object 1702. The business object 1702 represents an agreement between a seller and a customer concerning the sale and delivery of goods, as well as any services that are associated with these processes, on a specific date, for a specific quantity, and for a specific price.

The Sales Order business object 1702 uses a Synchronous Request Product Valuation from Sales Order to Financial Accounting Master Data synchronous outbound process agent 3100 to invoke a Request Product Valuation operation 3102. The operation 3102, included in a Product and Resource Valuation Out interface 3104, sends a Product and Resource Valuation Query message 3106 to the Financial Accounting Master Data Management process component 226.

A Synchronous Valuate Product and Resource operation 3108 receives the message 3106. The operation 3108, included in a Product and Resource Valuation In interface 3110, valuates one or more products or resources with internal valuation prices or internal cost rates. For example, the product or resource is valuated as an individual object or in the context of a business transaction. The result of the valuation for a product or resources is a price and an amount (optional) provided that a quantity was entered for the valuation.

The Synchronous Valuate Product and Resource operation 3108 sends a Product and Resource Valuation Response message 3112 back to the Sales Order Processing process component 186 where is it received by the Request Product Valuation operation 3102; or the operation 3108 uses a Synchronous Valuate Product and Resource synchronous inbound process agent 3114 to update a Material Valuation Data business object 3116, a Service Product Valuation Data business object 3118, or a Resource Valuation Data business object 3120. The Material Valuation Data business object 3116 represents data that references a material or material group for valuating business transactions, for cost estimates, and for value-based management of material inventories. For example, it contains internal valuation prices for a material or material group. The Service Product Valuation Data business object 3118 represents data that references a service product or service product group for the valuation of business transactions and for cost estimates and cost accounting. For example, it contains the internal cost rates for a service product or service product group. The Resource Valuation Data business object 3120 represents data that references a resource or resource group for the valuation of business transactions and for cost estimates and cost accounting.

Interactions Between Process Components "Production" and "Production"

Figure 32:
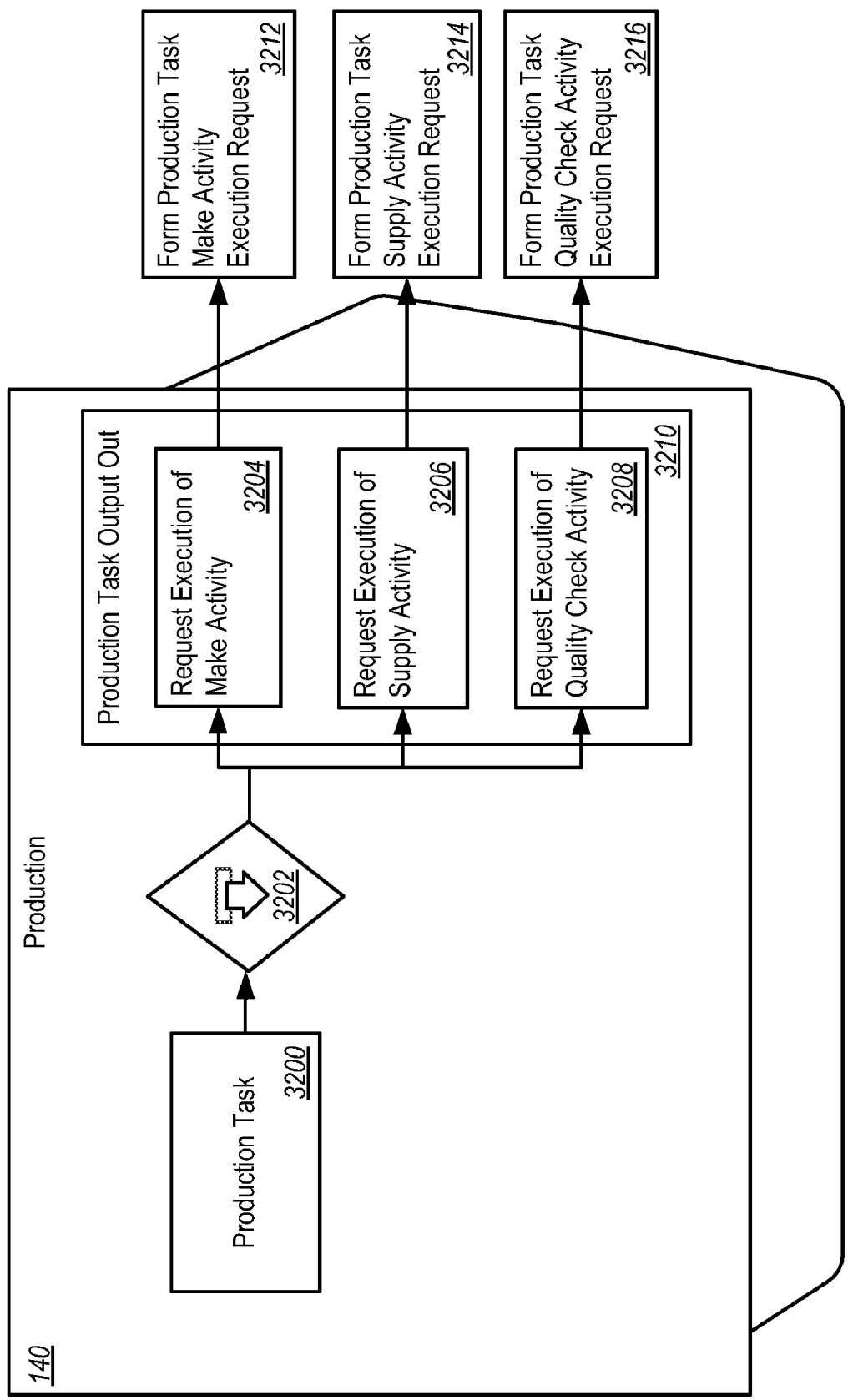
FIG. 32 is a block diagram showing interactions in the Production process component.

FIG. 32 is a block diagram showing interactions between the Production process component 140 and the Production process component 140 in the architectural design of FIGS. 1A-1D. The interaction represents the requesting of the execution of activities by printing or sending them (using e-mail or SMS).

As shown in FIG. 32, the Production process component 140 includes a Production Task business object 3200. The business object 3200 represents a task in production that a processor executes at a specific time at a predefined production step in a production process.

The Production Task business object 3200 uses a Request Production Task Execution for Output outbound process agent 3202 to invoke a Request Execution of Make Activity operation 3204, a Request Execution of Supply Activity operation 3206, or a Request Execution of Quality Check Activity operation 3208. The operations 3204, 3206, and 3208 are included in a Production Task Output Out interface 3210. The Request Execution of Make Activity operation 3204 requests the execution of a make activity or make activities by printing or sending them (e.g., using e-mail or SMS). The Request Execution of Supply Activity operation 3206 requests the execution of a supply activity or supply activities by printing or sending them (e.g., using e-mail or SMS). The Request Execution of Quality Check Activity 3208 can request the execution of a quality check activity or quality check activities by printing or sending them (e.g., using e-mail or SMS).

The Request Execution of Make Activity operation 3204 sends a Form Production Task Make Activity Execution Request message 3212. The Request Execution of Supply Activity operation 3206 sends a Form Production Task Supply Activity Execution Request message 3214. The Request Execution of Quality Check Activity 3208 sends a Form Production Task Quality Check Activity Execution Request message 3216.

Interaction Between Process Components "Purchase Order Processing" and "External Procurement Trigger and Response"

Figure 33:
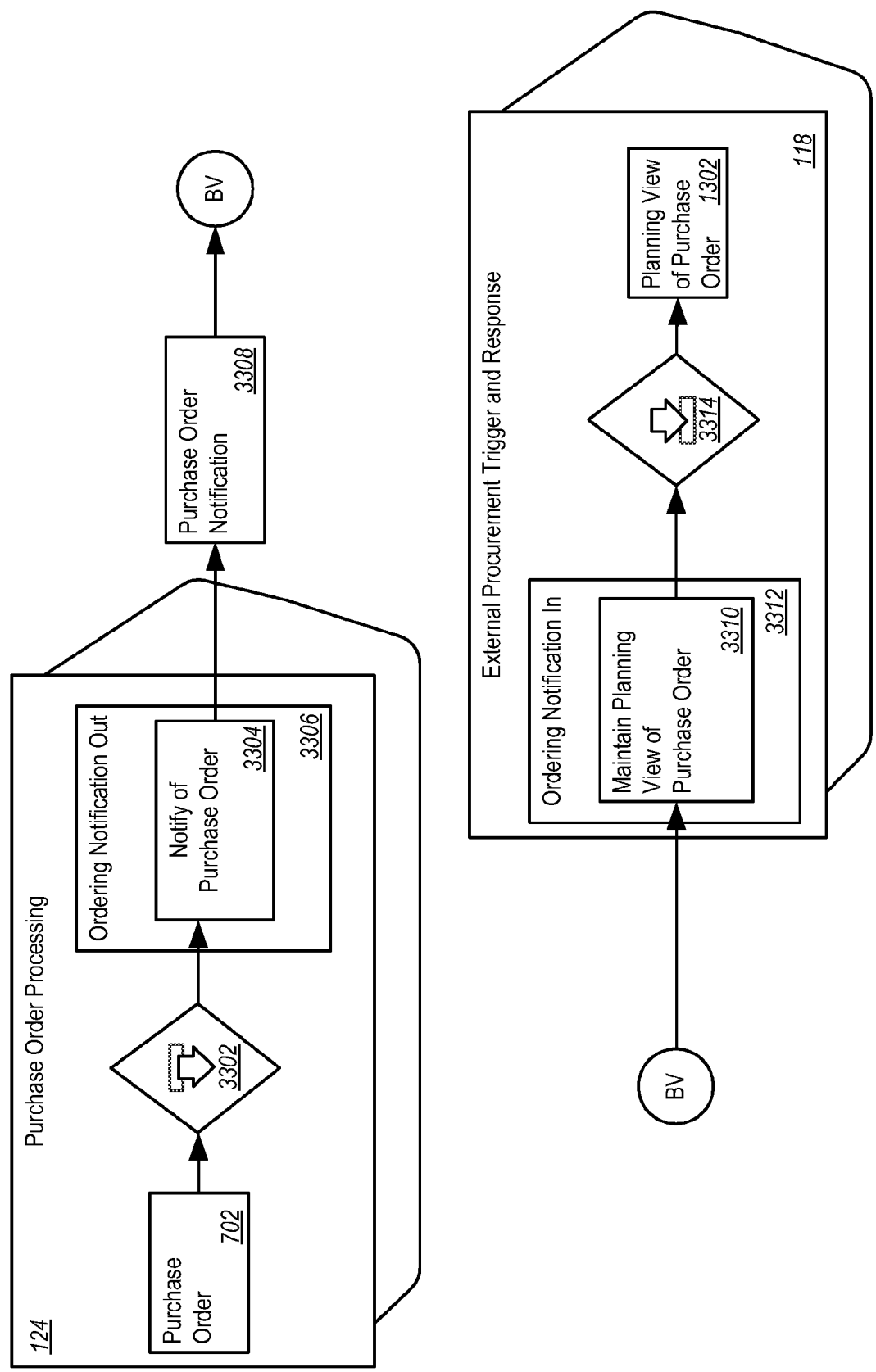
FIG. 33 is a block diagram showing interactions between the Purchase Order Processing process component and the External Procurement Trigger and Response process component.

FIG. 33 is a block diagram showing interactions between the Purchase Order Processing process component 124 and the External Procurement Trigger and Response process component 118 in the architectural designs of FIGS. 1A-1D. The interactions represent the updating of planning-relevant purchase order information in the External Procurement Trigger and Response process component 118 when a purchase order is sent or when a sent purchase order is changed.

As shown in FIG. 33, the Purchase Order Processing process component 124 includes a Purchase Order business object 702. The business object 702 represents a request from a buyer to a seller to deliver a specified quantity of material, or perform a specified service, at a specified price within a specified time. The business object 702 uses a Notify of Purchase Order to External Procurement Trigger and Response outbound process agent 3302 to invoke a Notify of Purchase Order operation 3304. The operation 3304, included in an Ordering Notification Out interface 3306, notifies the External Procurement Trigger and Response process component 118 that a purchase order has been created, changed, or canceled. The operation 3304 sends a Purchase Order Notification message 3308 to the External Procurement Trigger and Response process component 118. A Maintain Planning View of Purchase Order operation 3310 receives the message 3308.

The Maintain Planning View of Purchase Order operation 3310, included in a Ordering Notification In interface 3312, updates the planning view of purchase order data with information about new or changed purchase orders. The operation 3310 uses a Maintain Planning View of Purchase Order inbound process agent 3314 to update a Planning View of Purchase Order business object 1302. The business object 1302 represents a planning view of the materials, date, quantities, delivery conditions, parties, and sources of supply of a purchase order that are relevant to planning.

Interactions Between Process Components "Production" and "Production"

Figure 34:
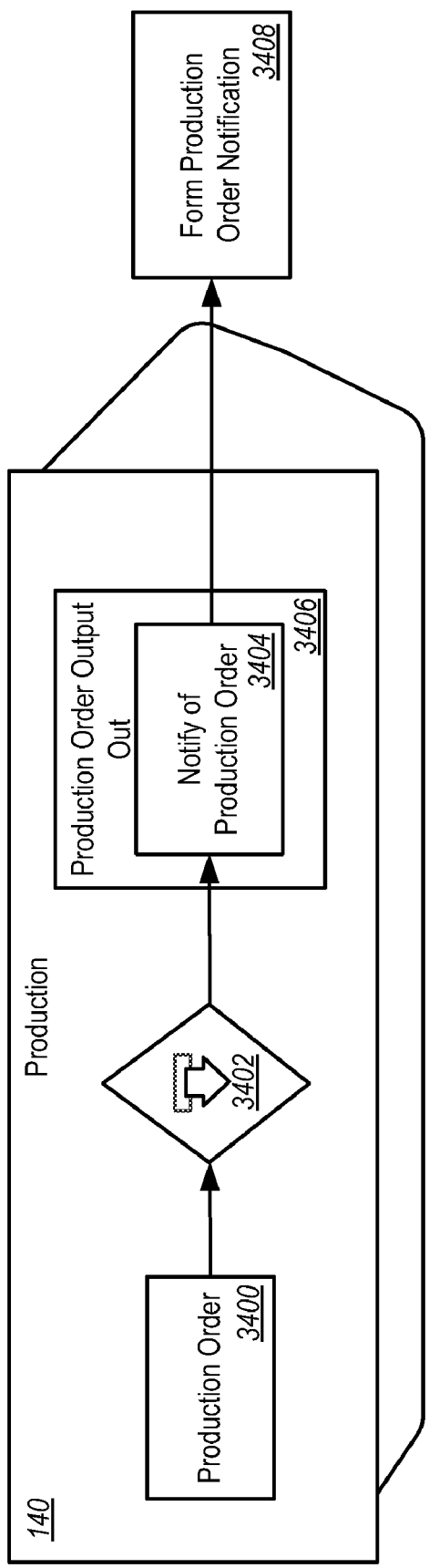
FIG. 34 is a block diagram showing further interactions in the Production process component.

FIG. 34 is a block diagram showing further interactions in the Production process component 140 in the architectural design of FIGS. 1A-1D. The interaction represents a notification about a production order by printing or sending it (e.g., using e-mail or SMS).

As shown in FIG. 34, the Production process component 140 includes a Production Order business object 3400. The business object 3400 represents an order to produce a specific quantity of material within a predefined time. For example, it contains all the information required for the actual execution of the production process.

The Production Order business object 3400 uses a Notify of Production Order for Output outbound process agent 3402 to invoke a Notify of Production Order operation 3404. The operation 3404, included in a Production Order Output Out interface 3406, creates a notification about a production order by printing or sending it (e.g., using e-mail or SMS). The operation 3404 sends a Form Production Order Notification message 3408.

Interactions Between Process Components "Site Logistics Processing" and "Supply and Demand Matching"

Figure 35:
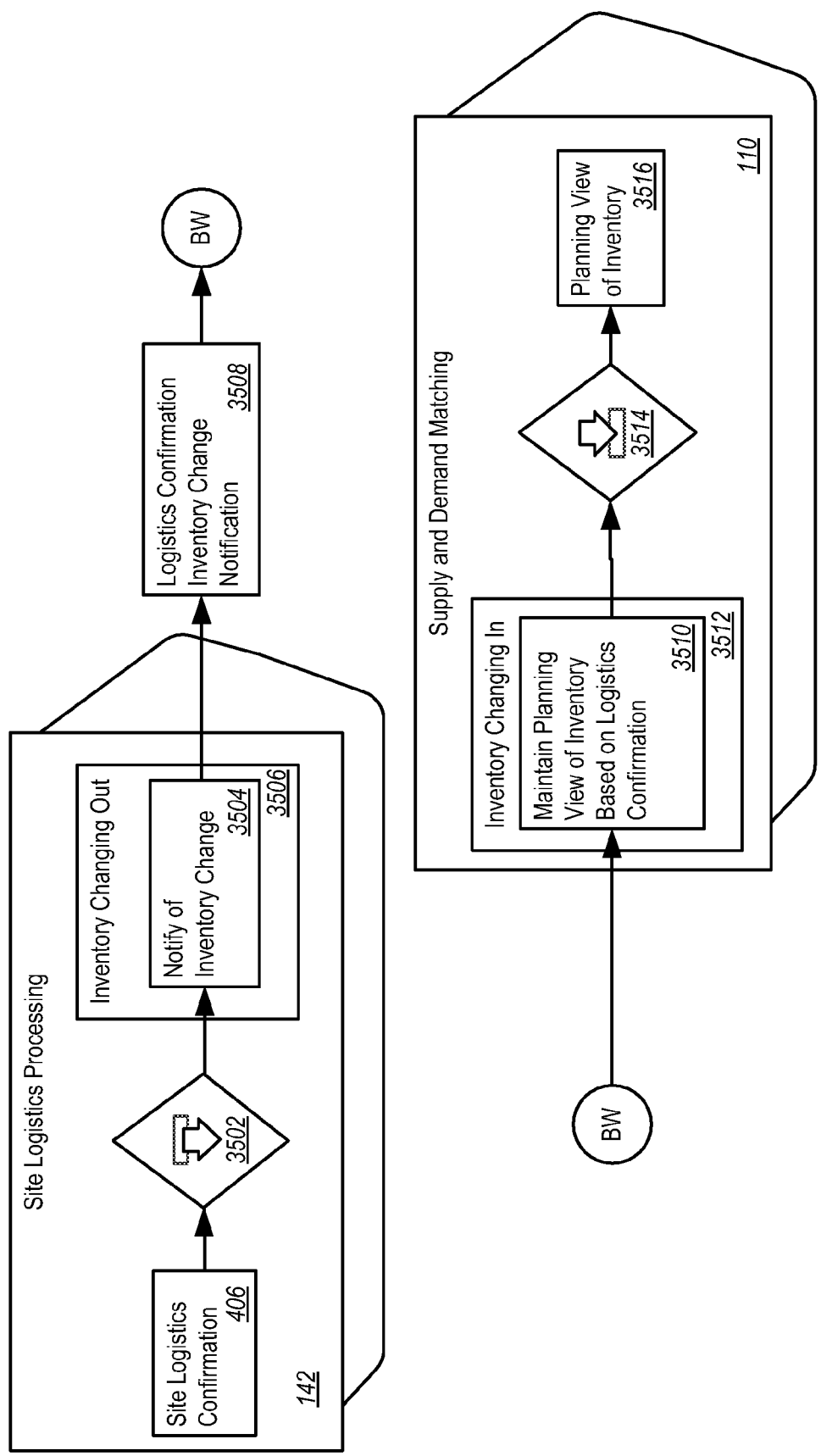
FIG. 35 is a block diagram showing interactions between the Site Logistics Processing process component and a Supply and Demand Matching process component.

FIG. 35 is a block diagram showing interactions between the Site Logistics Processing process component 142 and the Supply and Demand Matching process component 110 in the architectural design of FIGS. 1A-1D. The interactions represent the updating of the planning view on inventory in the Supply and Demand Matching process component 110 based on inventory changes in the Site Logistics Processing process component 142.

As shown in FIG. 35, the Site Logistics Processing process component 142 includes a Site Logistics Confirmation business object 406. The business object 406 represents a record of confirmed logistic process changes which result from the execution of a site logistics process at a specific time. For example, inventory changes, plan adjustments, resource utilizations, and progress status changes.

The Site Logistics Confirmation business object 406 uses a Notify Of Inventory Change From Site Logistics Confirmation To SDM (Supply and Demand Matching) outbound process agent 3502 to invoke a Notify of Inventory Change operation 3504. The operation 3504, included in an Inventory Changing Out interface 3506, sends a Logistics Confirmation Inventory Change Notification message 3508 to the Supply and Demand Matching process component 110. A Maintain Planning View of Inventory based on Logistics Confirmation operation 3510 receives the message 3508.

The Maintain Planning View of Inventory based on Logistics Confirmation operation 3510, included in an Inventory Changing In interface 3512, updates inventory quantities in supply planning when unscheduled goods movements occur. The operation 3510 uses a Maintain Planning View of Inventory based on Logistics Confirmation inbound process agent 3514 to update a Planning View of Inventory business object 3516. The business object 3516 represents a view of a material stock aggregated at the level of the supply planning area or at the level of the supply planning area and product requirement specification.

Interactions Between Process Components "Customer Invoice Processing" and "Balance of Foreign Payment Management"

Figure 36:
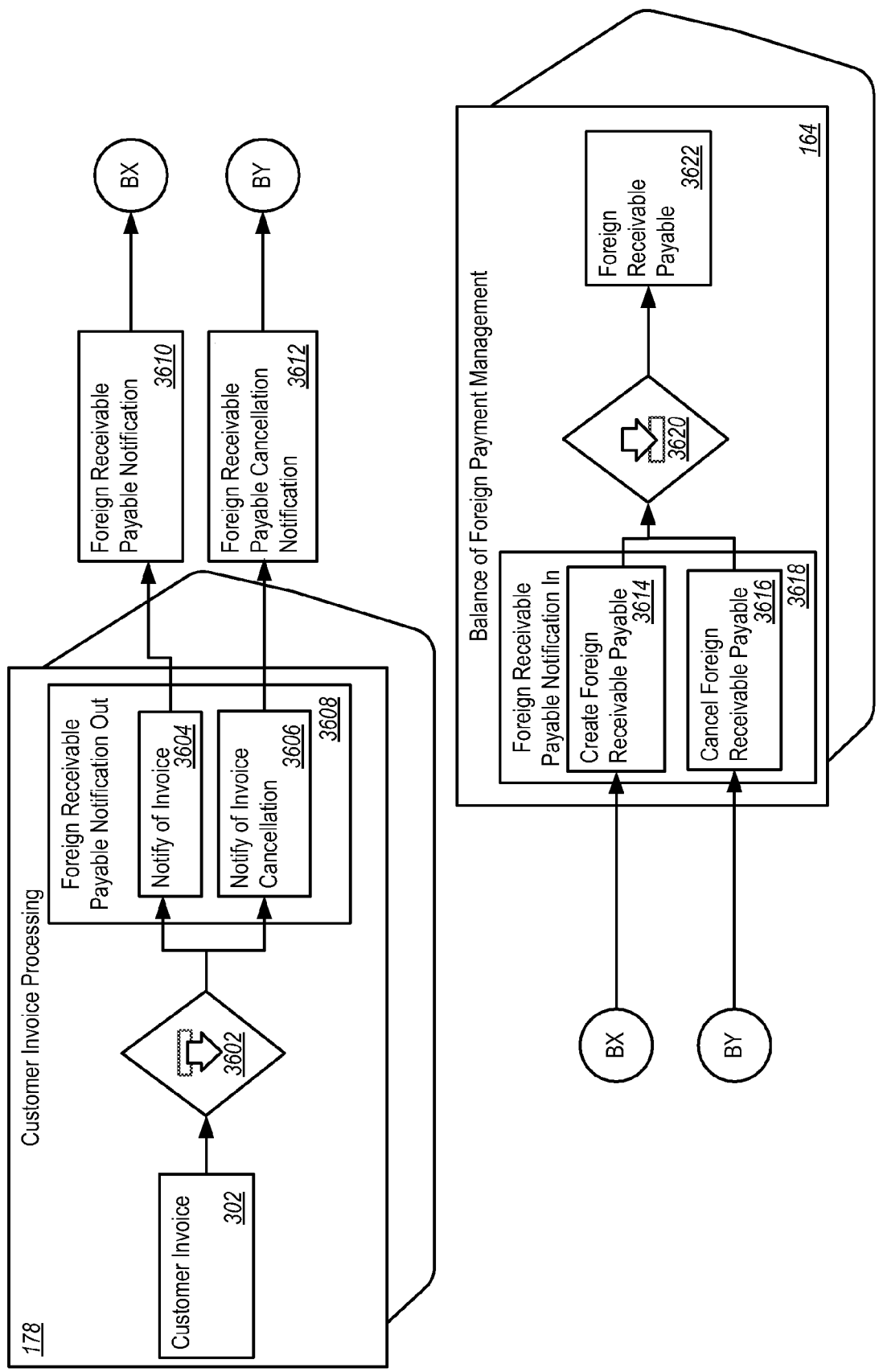
FIG. 36 is a block diagram showing interactions between the Customer Invoice Processing process component and a Balance of Foreign Payment Management process component.

FIG. 36 is a block diagram showing interactions between the Customer Invoice Processing process component 178 and the Balance of Foreign Payment Management process component 164 in the architectural design of FIGS. 1A-1D. The interactions represent the notification to the Balance of Foreign Payment Management process component 164 about the creation or cancellation of a receivable (customer invoice) related to a non-resident buyer from the Customer Invoice Processing process component 178.

As shown in FIG. 36, the Customer Invoice Processing process component 178 includes a Customer Invoice business object 302. The business object 302 represents a binding statement of amounts receivable resulting, for example, from deliveries to a customer, services performed for a customer, adjustments to these receivables, or credit memos to a customer.

The Customer Invoice business object 302 uses a Notify of Customer Invoice to Balance of Foreign Payments Management outbound process agent 3602 to invoke a Notify of Invoice operation 3604, or a Notify of Invoice Cancellation operation 3606. The operations 3604, 3606 are included in a Foreign Receivable Payable Notification Out interface 3608. The operation 3604 informs about invoice in order to track receivable from or payable to a non-resident business partner. The operation 3604 sends a Foreign Receivable Payable Notification message 3610 to the Balance of Foreign Payment Management process component 164. The operation 3606 informs about cancellation of invoice in order to also cancel information about receivable from or payable to non-resident business partner. The operation 3606 sends a Foreign Receivable Payable Cancellation Notification message 3612 to the Balance of Foreign Payment Management process component 164.

A Create Foreign Receivable Payable operation 3614 receives the message 3610. The operation 3614 creates a receivable or payable from foreign trade. A Cancel Foreign Receivable Payable operation 3616 receives the message 3612. The operation 3616 represents the notification about the cancellation of a receivable (customer invoice) related to a non-resident buyer. The operations 3614 and 3616 are included in a Foreign Receivable Payable Notification In interface 3618. The operations 3614, 3616 use a Maintain Foreign Receivable Payable inbound process agent 3620 to update a Foreign Receivable Payable business object 3622. The business object 3622 represents a receivable from or a payable to a non-resident business partner.

Interactions Between Process Components "Inventory Processing" and "Supply and Demand Matching"

Figure 37:
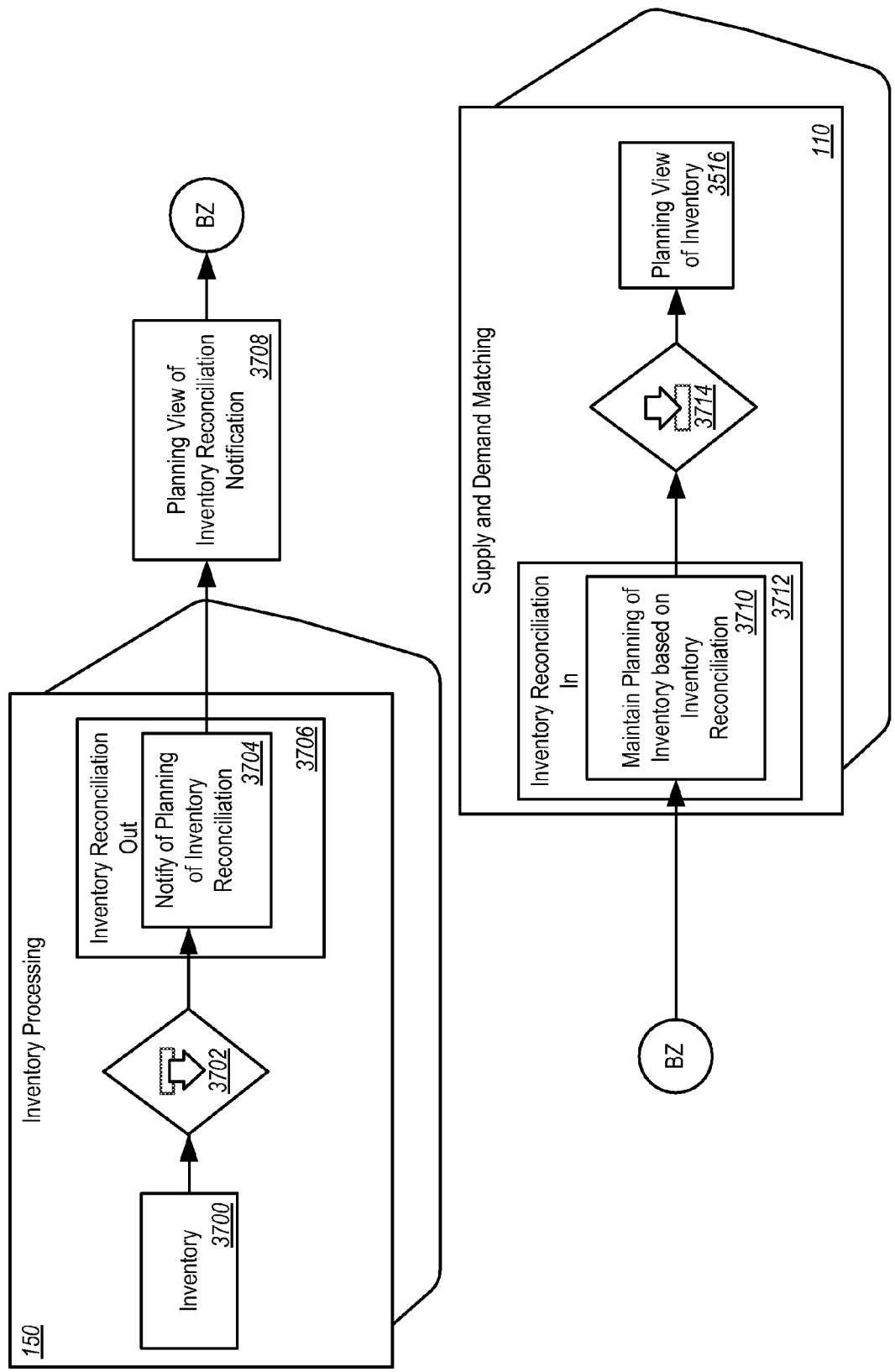
FIG. 37 is a block diagram showing interactions between the Inventory Processing process component and the Supply and Demand Matching process component.

FIG. 37 is a block diagram showing the interaction between the Inventory Processing process component 150 and the Supply and Demand Matching process component 110 in the architectural design of FIGS. 1A-1D. The interactions represent the reconciling of the actual quantities of the planning view of inventory in the Supply and Demand Matching process component 110 with the actual quantities of the original inventory in the Inventory Processing process component 150 if a deviation is detected.

As shown in FIG. 37, the Inventory Processing process component 150 includes an Inventory business object 3700. The business object 3700 represents the quantity of all the materials in a certain location including the material reservations at this location. For example, the quantities of materials can be physically grouped using identified logistic units or logistic units.

The Inventory business object 3700 uses a Notify of Inventory Reconciliation from Inventory to Supply and Demand Matching outbound process agent 3702 to invoke a Notify of Planning of Inventory Reconciliation operation 3704. The operation 3704, included in an Inventory Reconciliation Out interface 3706, notifies about the reconciliation of aggregated inventory quantities. The operation 3704 sends a Planning View of Inventory Reconciliation Notification message 3708 to the Supply and Demand Matching process component 110. A Maintain Planning of Inventory based on Inventory Reconciliation operation 3710 receives the message 3708. The operation 3710, included in an Inventory Reconciliation In interface 3712, maintains total inventory quantities in supply planning.

The Maintain Planning of Inventory based on Inventory Reconciliation operation 3710 uses a Maintain Planning View of Inventory based on Inventory Reconciliation inbound process agent 3714 to update a Planning View of Inventory business object 3516. The business object 3516 represents a view of a material stock aggregated at the level of the supply planning area or at the level of the supply planning area and product requirement specification.

Interactions Between Process Components "Inbound Delivery Processing" and "Supplier Invoice Processing"

Figure 38:
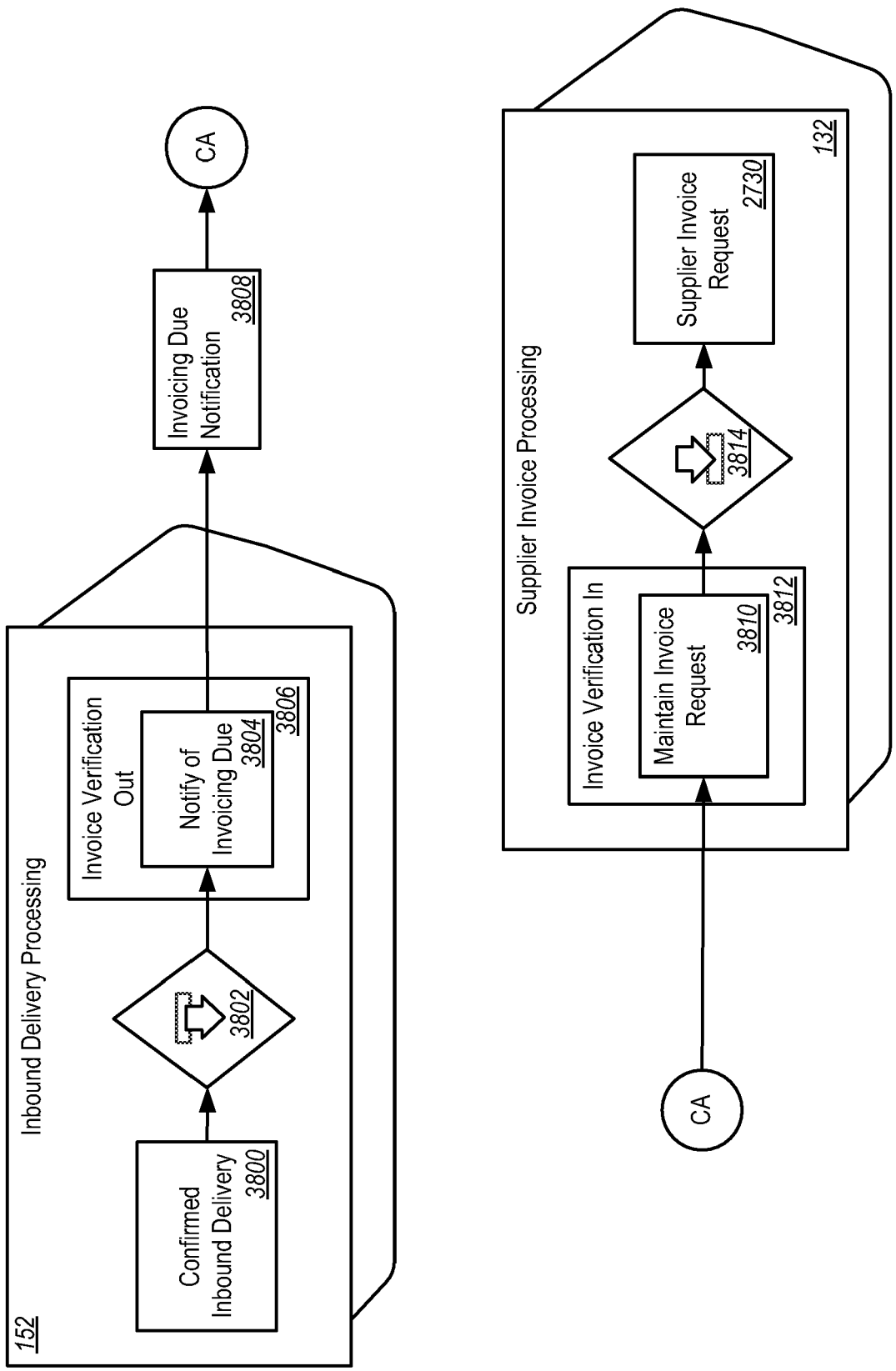
FIG. 38 is a block diagram showing interactions between the Inbound Delivery Processing process component and the Supplier Invoice Processing process component.

FIG. 38 is a block diagram showing the interaction between the Inbound Delivery Processing process component 152 and the Supplier Invoice Processing process component 132 in the architectural design of FIGS. 1A-1D. The interactions represent the sending of invoicing-relevant data from a confirmed inbound delivery to the Supplier Invoice Processing process component 132.

As shown in FIG. 38, the Inbound Delivery Processing process component 152 includes a Confirmed Inbound Delivery business object 3800. The business object 3800 represents a confirmation that a certain composition of goods has actually been received by the product recipient.

The Confirmed Inbound Delivery business object 3800 uses a Request Invoicing from Confirmed Inbound Delivery to Supplier Invoice Processing outbound process agent 3802 to invoke a Notify of Invoicing Due operation 3804. The operation 3804, included in an Invoice Verification Out interface 3806, sends a request to create, update, or cancel a supplier invoice. The operation 3804 sends a Invoicing Due Notification message 3808 to the Supplier Invoice Processing process component 132. A Maintain Invoice Request operation 3810 receives the message 3808. The operation 3810, included in a Invoice Verification In interface 3812, creates, updates, deletes, or requests the cancellation of a supplier invoice request based on the invoicing-relevant data that is transferred from a purchasing system.

The Maintain Invoice Request operation 3810 uses a Maintain Supplier Invoice Request inbound process agent 3814 to update a Supplier Invoice Request business object 2730. The business object 2730 represents a request to invoice verification advising that a supplier invoice for specified quantities and prices is expected and is to be created through evaluated receipt settlement.

Interactions Between Process Components "Customer Invoice Processing" and "Supplier Invoice Processing"

Figure 39:
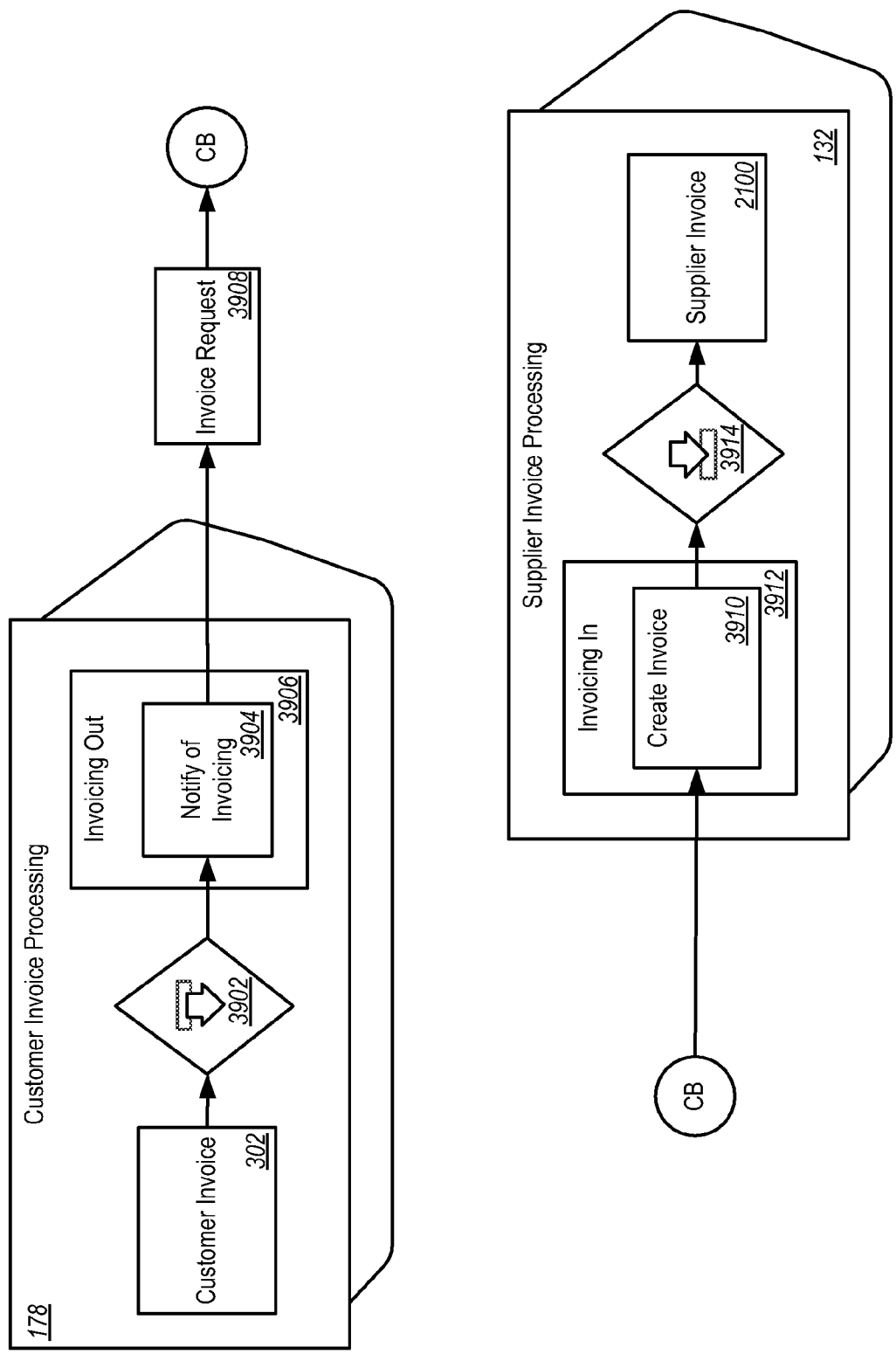
FIG. 39 is a block diagram showing interactions between the Customer Invoice Processing process component and the Supplier Invoice Processing process component.

FIG. 39 is a block diagram showing the interaction between the Customer Invoice Processing process component 178 and the Supplier Invoice Processing process component 132 in the architectural design of FIGS. 1A-1D. The interactions represent the notification of supplier invoice processing about the creation of a customer invoice.

As shown in FIG. 39, the Customer Invoice Processing process component 178 includes a Customer Invoice business object 302. The business object 302 represents a binding statement of amounts receivable resulting, for example, from deliveries to a customer, services performed for a customer, adjustments to these receivables, or credit memos to a customer.

The Customer Invoice business object 302 uses a Notify Customer of Customer Invoice outbound process agent 3902 to invoke a Notify of Invoice operation 3904. The operation 3904, included in an Invoicing Out interface 3906, informs the recipient of the customer invoice about invoicing. The operation 3904 sends an Invoice Request message 3908 to the Supplier Invoice Processing process component 132. A Create Invoice operation 3910 receives the message 3908. The operation 3910, included in an Invoicing In interface 3912, creates a supplier invoice that corresponds to a customer invoice that contains claims or liabilities for delivered goods or rendered services.

The Create Invoice operation 3910 uses a Create Supplier Invoice based on Invoice Request inbound process agent 3914 to update a Supplier Invoice business object 2100. The business object 2100 represents A company's obligation to pay the supplier for delivered goods and services. For example, if the company returns goods or complains about services, the supplier usually issues a credit memo for an amount equal to or lower than the original invoice, and refunds the money to the company.

Interactions Between Process Components "Supplier Invoice Processing" and "Balance of Foreign Payment Management"

Figure 40:
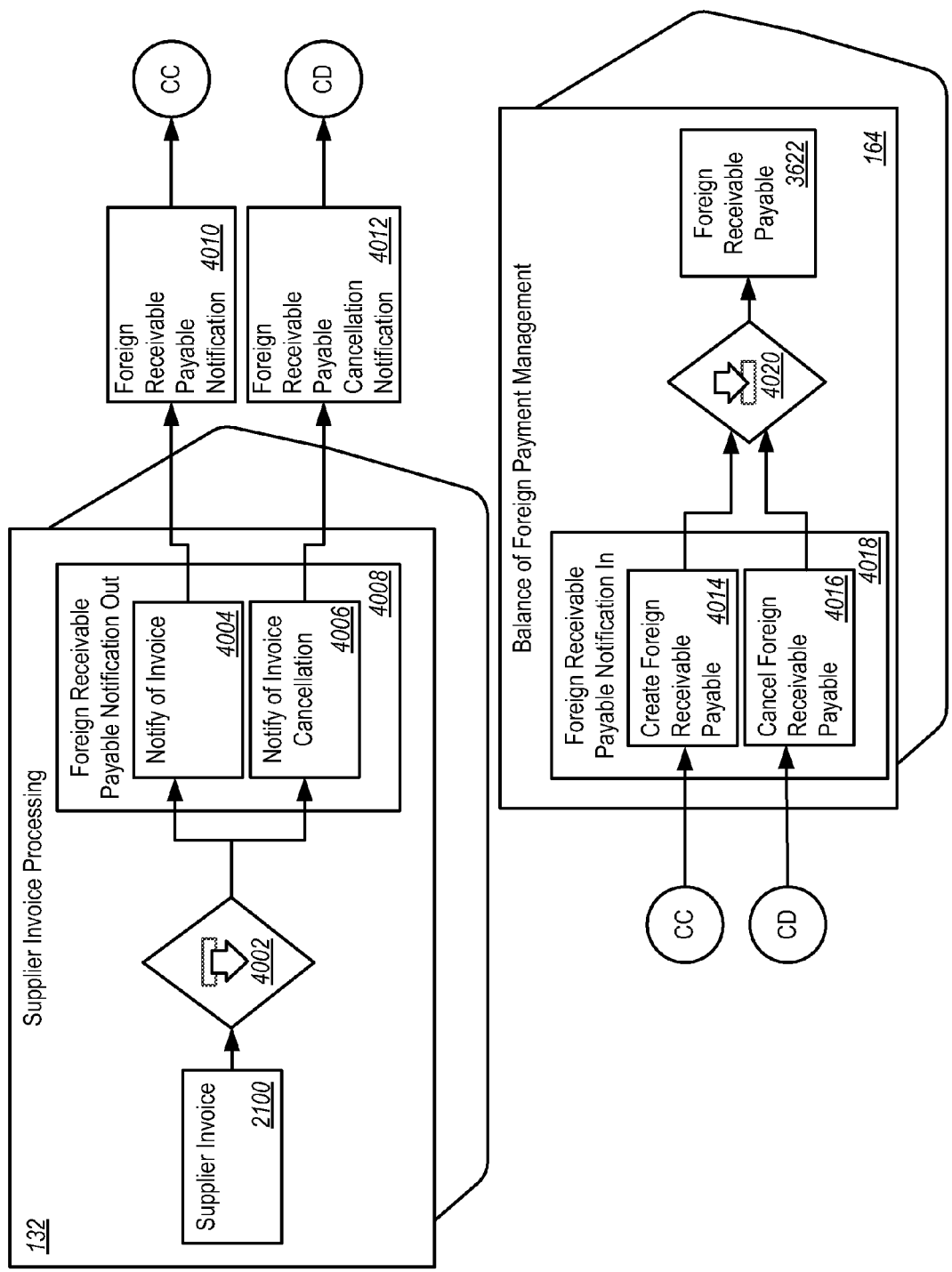
FIG. 40 is a block diagram showing interactions between the Supplier Invoice Processing process component and the Balance of Foreign Payment Management process component.

FIG. 40 is a block diagram showing interactions between the Supplier Invoice Processing process component 132 and the Balance of Foreign Payment Management process component 164 in the architectural design of FIGS. 1A-1D. The interactions represent the notification of the Balance of Foreign Payment Management process component 164 about the creation or cancellation of a payable (supplier invoice) related to a non-resident seller in the Supplier Invoice Processing process component 132.

As shown in FIG. 40, the Supplier Invoice Processing process component 132 includes a Supplier Invoice business object 2100. The business object 2100 represents a company's obligation to pay the supplier for delivered goods and services. For example, if the company returns goods or complains about services, the supplier usually issues a credit memo for an amount equal to or lower than the original invoice, and refunds the money to the company. For invoiced goods that require a duty, a customs duty invoice can be submitted by the customs authority, stating a company's obligation to pay tax on the import or export of goods.

The Supplier Invoice business object 2100 uses a Notify of Supplier Invoice to Balance of Foreign Payments Management outbound process agent 4002 to invoke a Notify of Invoice operation 4004 or a Notify of Invoice Cancellation operation 4006. The operations 4004 and 4006 are included in a Foreign Receivable Payable Notification Out interface 4008. The operation 4004 sends a notification about a posted supplier invoice. The operation 4006 sends a notification about a previously posted supplier invoice that is canceled.

The Notify of Invoice operation 4004 sends a Foreign Receivable Payable Notification message 4010, and the Notify of Invoice Cancellation operation 4006 sends a Foreign Receivable Payable Cancellation Notification message 4012, to the Balance of Foreign Payment Management process component 164, respectively. A Create Foreign Receivable Payable operation 4014 receives the message 4010 and A Cancel Foreign Receivable Payable operation 4016 receives the message 4012. The operations 4014 and 4016 are included in a Foreign Receivable Payable Notification In interface 4018.

The Create Foreign Receivable Payable operation 4014 creates a receivable or payable from foreign trade. The Cancel Foreign Receivable Payable operation 4016 represents the notification about the cancellation of a receivable (customer invoice) related to a non-resident buyer. The operations 4014 and 4016 use a Maintain Foreign Receivable Payable inbound process agent 4020 to update a Foreign Receivable Payable business object 3622. The business object 3622 represents a receivable from or a payable to a non-resident business partner.

Interactions Between Process Components "RFQ Processing" and "Purchase Order Processing"

Figure 41:
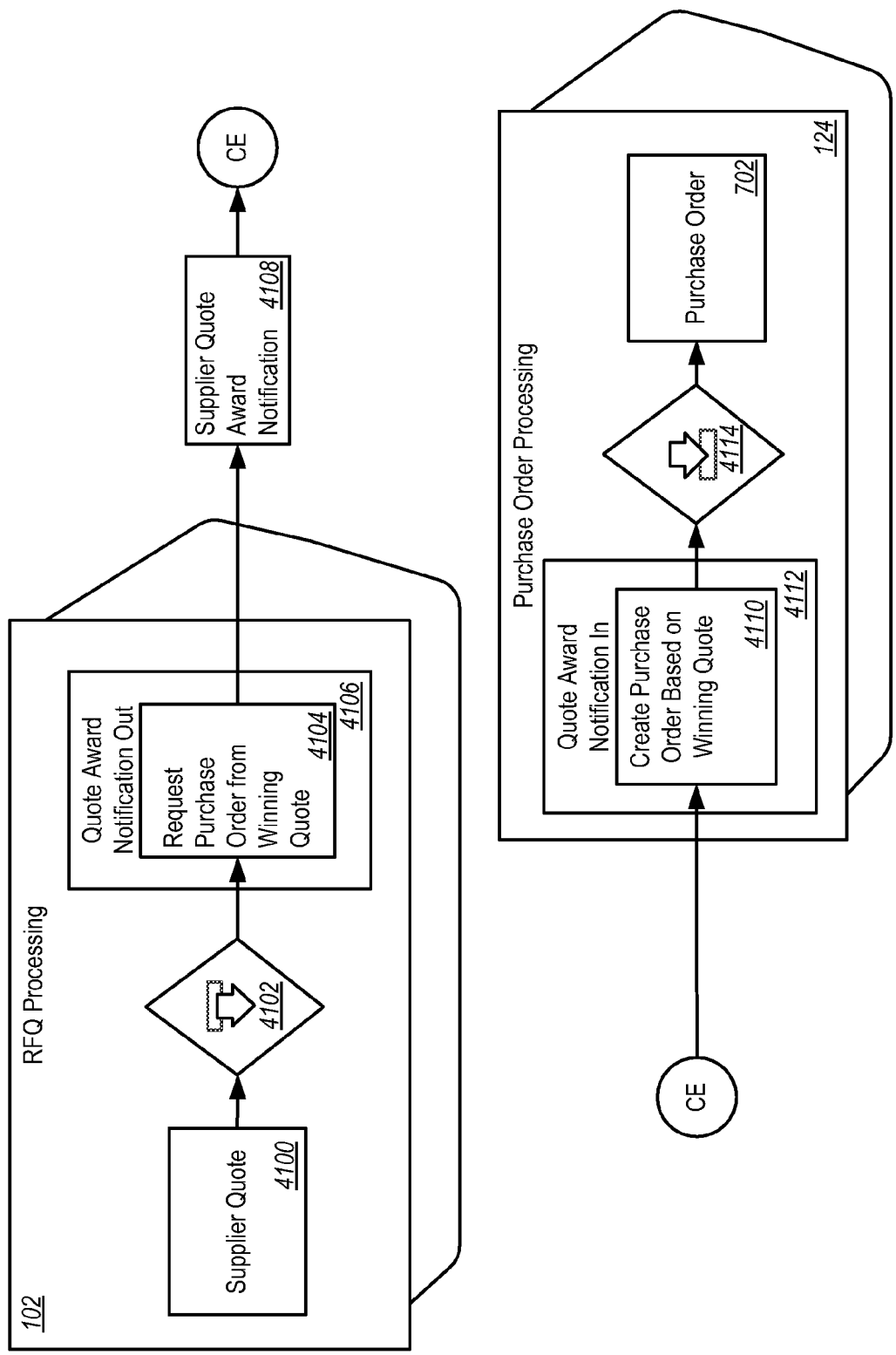
FIG. 41 is a block diagram showing interactions between the RFQ Processing process component and the Purchase Order Processing process component.

FIG. 41 is a block diagram showing interactions between the RFQ Processing process component 102 and the Purchase Order Processing process component 124 in the architectural design of FIGS. 1A-1D. The interactions represent the requesting of the creation of a purchase order in the Purchase Order Processing process component 124 based on a supplier quote.

As shown in FIG. 41, the RFQ Processing process component 102 includes a Supplier Quote business object 4100. The business object 4100 represents a response to a request for quote in which a bidder offers to sell goods and services to a buyer according to the requested criteria.

The Supplier Quote business object 4100 uses a Request Purchase Order from Supplier Quote to Purchase Order Processing outbound process agent 4102 to invoke a Request Purchase Order from Winning Quote operation 4104. The operation 4104, included in a Quote Award Notification Out interface 4106, requests the creation of a purchase order based on a winning quote. The operation 4104 sends a Supplier Quote Award Notification message 4108 to the Purchase Order Processing process component 124. A Create Purchase Order based on Winning Quote operation 4110 receives the message 4108. The operation 4110, included in a Quote Award Notification In interface 4112, creates a purchase order based on a winning quote.

The Create Purchase Order based on Winning Quote operation 4110 uses a Maintain Purchase Order based on Winning Quote inbound process agent 4114 to update a Purchase Order business object 702. The business object 702 represents a request from a buyer to a seller to deliver a specified quantity of material, or perform a specified service, at a specified price within a specified time.

Interactions Between Process Components "External Product Requirement Specification Processing" and "Product Requirement Specification Processing"

Figure 42:
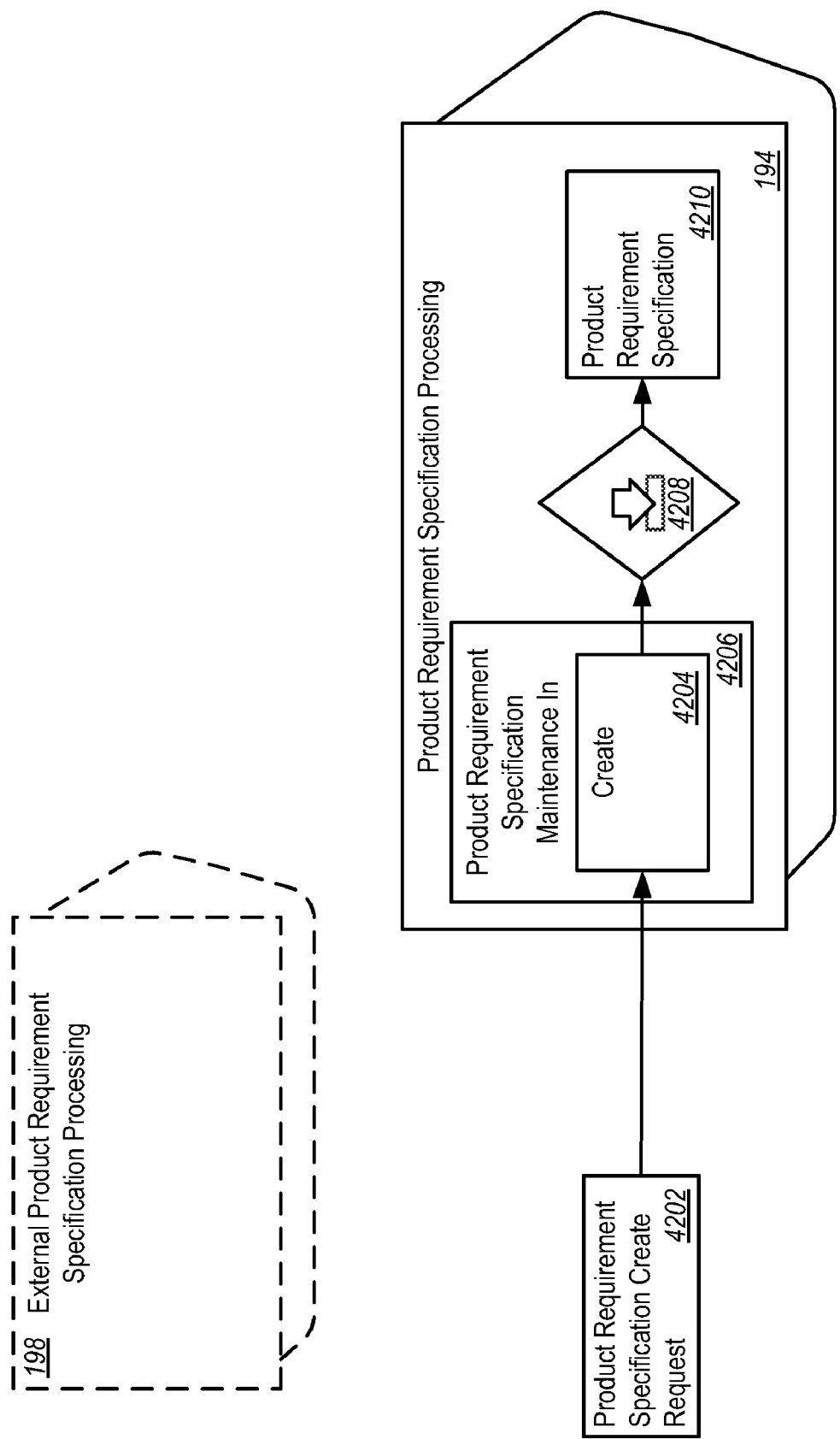
FIG. 42 is a block diagram showing interactions between an External Product Requirement Specification Processing process component and Product Requirement Specification Processing process component.

FIG. 42 is a block diagram showing interactions between the External Product Requirement Specification Processing external process component 198 and the Product Requirement Specification Processing process component 194 in the architectural design of FIGS. 1A-1D. The interactions represent the external processing of product requirement specifications.

As shown in FIG. 42, the External Product Requirement Specification Processing external process component 198 sends a Product Requirement Specification Create Request message 4202 to the Product Requirement Specification Processing process component 194. A Create operation 4204 receives the message 4202. The operation 4204, included in a Product Requirement Specification Maintenance In interface 4206, creates a new product requirement specification. The operation 4204 uses a Maintain Product Requirement Specification inbound process agent 4208 to update a Product Requirement Specification business object 4210. The business object 4210 represents a collection of requirements for a product used in a specific business context (e.g. in a prototype, development project, or sales order). The Product Requirement Specification business object 4210 may contain the corresponding specifications for fulfilling these requirements.

Interactions Between Process Components "Customer Invoice Processing at Supplier" and "Supplier Invoice Processing"

Figure 43:
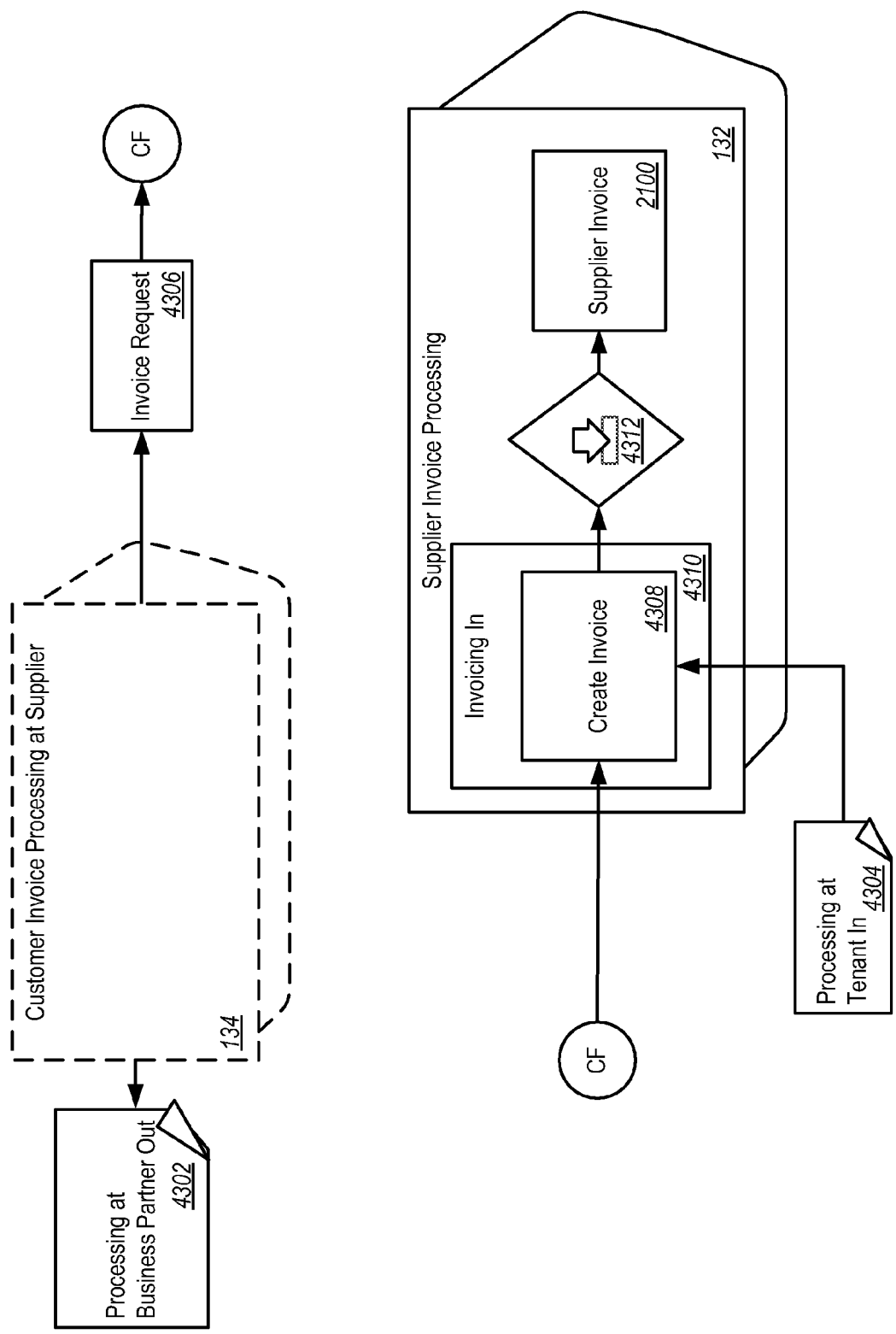
FIG. 43 is a block diagram showing interactions between a Customer Invoice Processing at Supplier process component and the Supplier Invoice Processing process component.

FIG. 43 is a block diagram showing interactions between the Customer Invoice Processing at Supplier external process component 134 and the Supplier Invoice Processing process component 132 in the architectural design of FIGS. 1A-1D. The interactions represent the requesting of the creation of a supplier invoice that corresponds to a customer invoice that has been previously created at supplier site.

As shown in FIG. 43, the Customer Invoice Processing at Supplier process component 134 receives information from a Processing at Business Partner Out communication channel template 4302. The communication channel template 4302 can define protocols and parameters used for communication with an external party. The Customer Invoice Processing at Supplier external process component 134 sends an Invoice Request message 4306 to the Supplier Invoice Processing process component 132. A Create Invoice operation 4308 receives the message. The operation 4308, included in an Invoicing In interface 4310, creates a supplier invoice that corresponds to a customer invoice that contains claims or liabilities for delivered goods or rendered services.

The Create Invoice operation 4308 uses a Create Supplier Invoice based on Invoice Request inbound process agent 4312 to update a Supplier Invoice business object 2100. The business object 2100 represents a company's obligation to pay the supplier for delivered goods and services. For example, if the company returns goods or complains about services, the supplier usually issues a credit memo for an amount equal to or lower than the original invoice, and refunds the money to the company.

The Supplier Invoice Processing process component 132 receives information using a Processing at Tenant In communication channel template 4304. The communication channel template 4304 can define protocols and parameters used for communication with an external party.

Interactions Between Process Components "Pricing Engine" and "External Tax Calculation"

Figure 44:
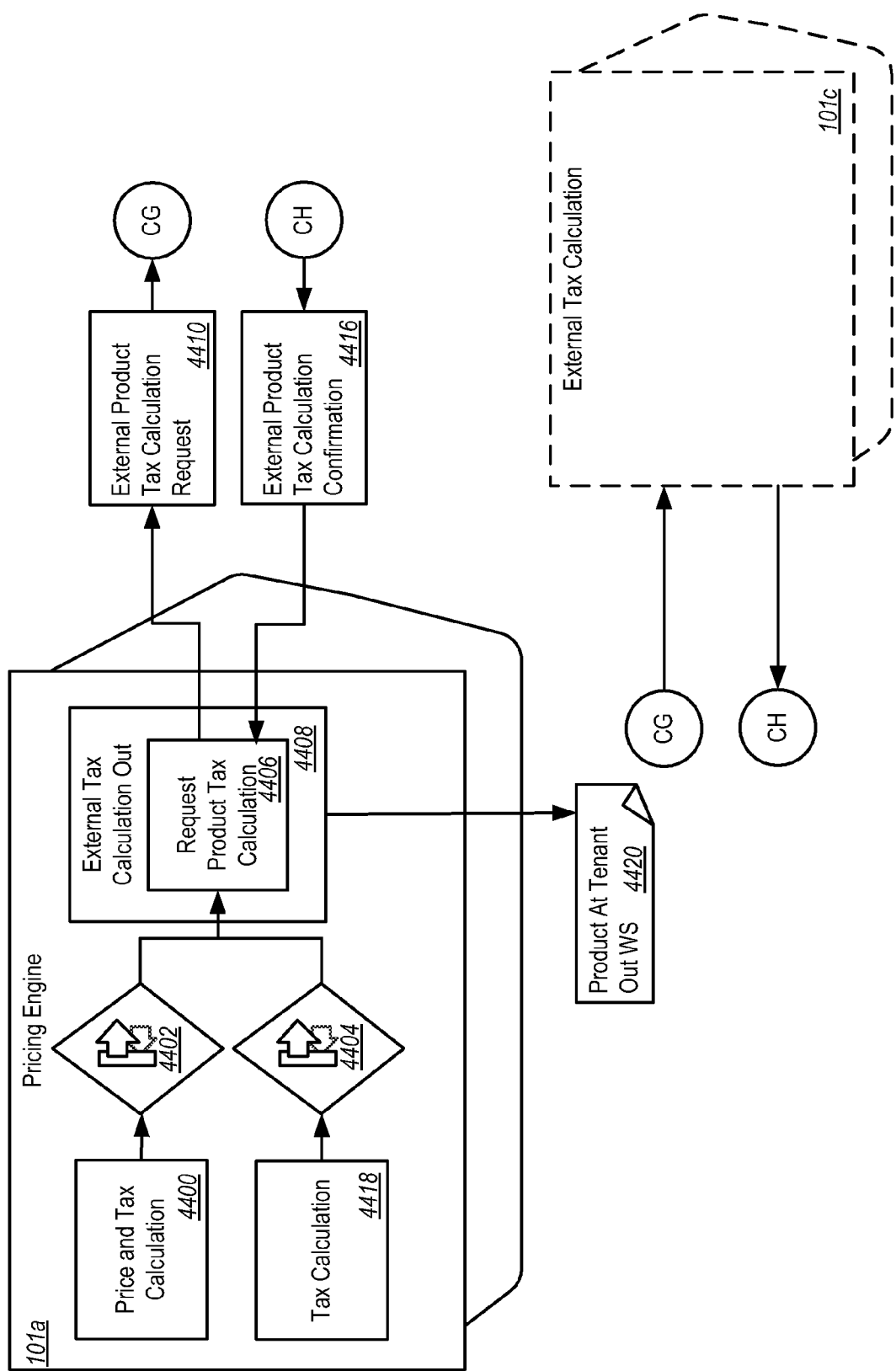
FIG. 44 is a block diagram showing interactions between a Price Engine process component and an External Tax Calculation process component.

FIG. 44 is a block diagram showing interactions between the Pricing Engine process component 101a and the External Tax Calculation process component 101c in the architectural design of FIGS. 1A-1D. The interactions represent the requesting of tax calculation from the External Tax Calculation external process component 101c.

As shown in FIG. 44, the Price Engine process component 101a includes a Price and Tax Calculation business object 4400 and a Tax Calculation business object 4418. The Prices and Tax Calculation business object 4400 represents the summary of the determined price and tax components for a business case. The business object 4400 uses a Synchronous Request Product Tax Calc from Price and Tax Calc to External Tax Calc synchronous outbound process agent 4402 to invoke a Request Product Tax Calculation operation 4406.

The Tax Calculation business object 4418 represents the summarization of the determined and calculated tax elements of a business case. The business object 4418 uses a Synchronous Request Product Tax Calc from Tax Calc to External Tax Calc synchronous outbound process agent 4404 to update the operation 4406. The operation 4406 is included in an External Tax Calculation Out interface 4408. The interface 4408 sends information to the External Tax Calculation external process component 101c using a Product at Tenant Out WS communication channel template 4420. The communication channel template 4420 can define protocols and parameters used for communication with an external party.

The Request Product Tax Calculation operation 4406 requests product tax calculation from an external tax calculation system. The operation 4406 sends an External Product Tax Calculation Request message 4410 to the External Tax Calculation external process component 101c. The External Tax Calculation external process component 101c sends an External Product Tax Calculation Confirmation message 4416 back to the Price Engine process component 101a where it is received by the operation 4406.

Interactions Between Process Components "Supplier Invoice Processing" and "Customer Invoice Processing at Supplier"

Figure 45:
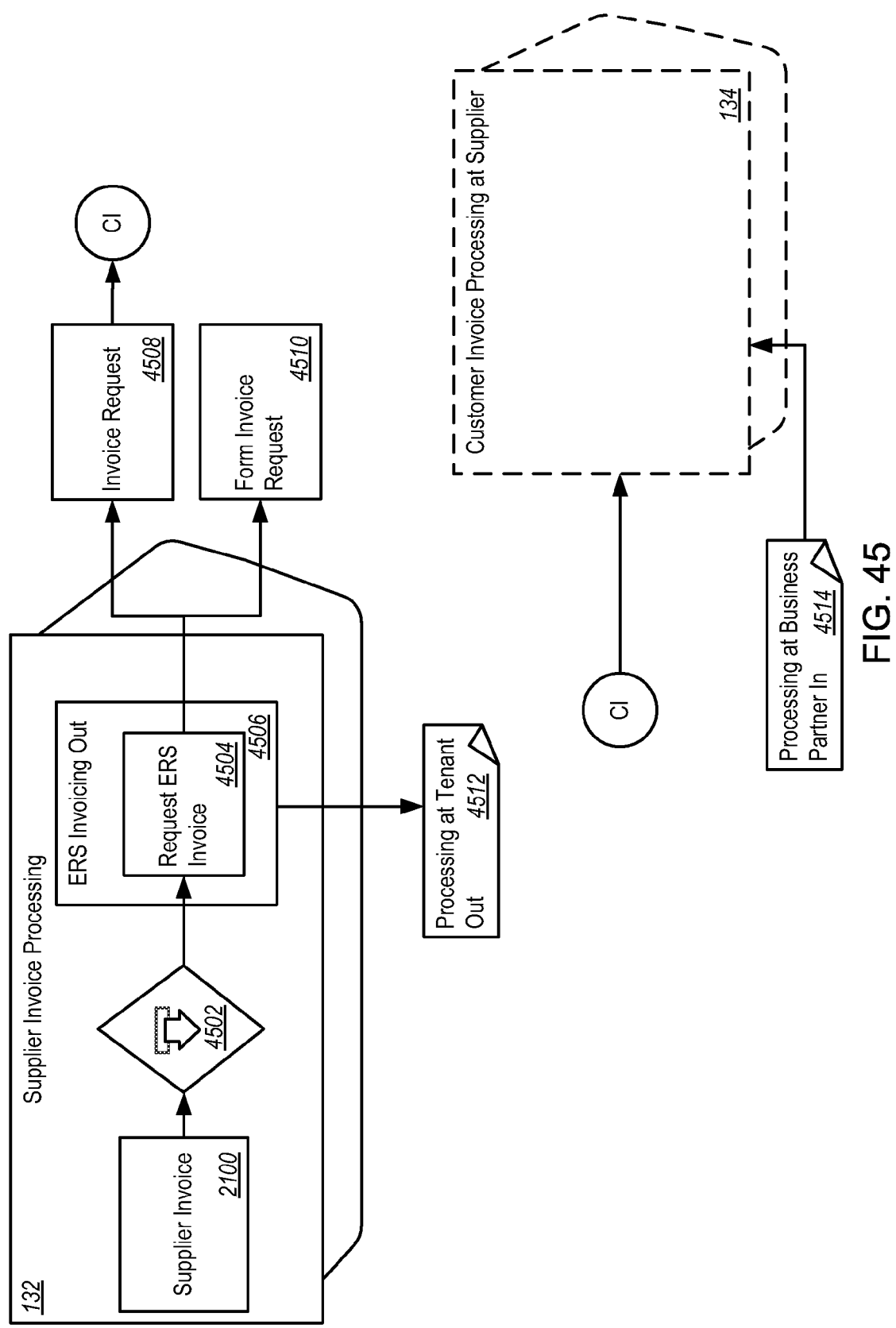
FIG. 45 is a block diagram showing the interaction between the Supplier Invoice Processing process component and the Customer Invoice Processing at Supplier process component.

FIG. 45 is a block diagram showing the interaction between the Supplier Invoice Processing process component 132 and the Customer Invoice Processing at Supplier process component 134 in the architectural design of FIGS. 1A-1D. The interactions represent the requesting of the creation of a customer invoice based on the data from an invoice that is automatically created by evaluated receipt settlement in the Supplier Invoice Processing process component 132.

As shown in FIG. 45, the Supplier Invoice Processing process component 132 includes a Supplier Invoice business object 2100. The business object 2100 represents a company's obligation to pay the supplier for delivered goods and services. If the company returns goods or complains about services, the supplier usually issues a credit memo for an amount equal to or lower than the original invoice, and refunds the money to the company. For invoiced goods that require a duty, a customs duty invoice can be submitted by the customs authority, stating a company's obligation to pay tax on the import or export of goods.

The Supplier Invoice business object 2100 uses a Request ERS Invoice to Supplier outbound process agent 4502 to invoke a Request ERS Invoice operation 4504. The operation 4504, included in an ERS Invoicing Out interface 4506, requests the creation of a customer invoice based on the data from an invoice created by evaluated receipt settlement. The Supplier Invoice Processing process component 132 sends information to the Customer Invoice Processing at Supplier external process component 134 using a Processing at Tenant Out communication channel template 4512. The communication channel template 4512 can define protocols and parameters used for communication with an external party.

The Request ERS Invoice operation 4504 sends an Invoice Request message 4508 to the Customer Invoice Processing at Supplier external process component 134. The operation 4504 also sends a Form Invoice Request message 4510 to the Customer Invoice Processing at Supplier process component 134. A Create Customer Invoice operation 4512 receives the message 4508. The operation 4512, included in an ERS Invoicing In interface 4514, creates a customer invoice based on the data from an invoice created by evaluated receipt settlement.

The Customer Invoice Processing at Supplier external process component 134 receives information from the Supplier Invoice Processing process component 132 using a Processing at Business Partner In communication channel template 4514. The communication channel template 4514 can define protocols and parameters used for communication with an external party.

Interactions Between Process Components "Freight Documents Processing" and "Transportation Management at Freight Forwarder"

Figure 46:
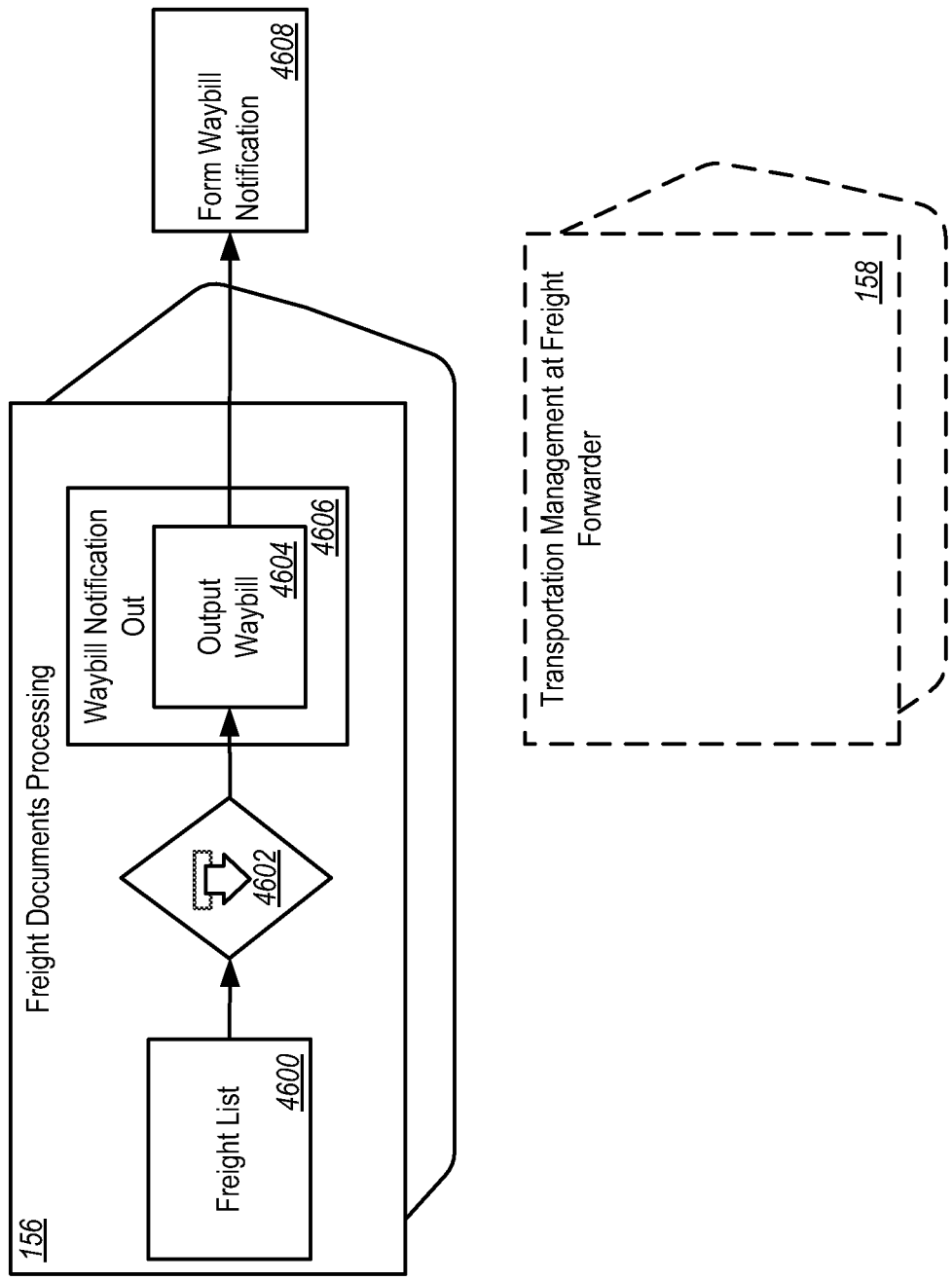
FIG. 46 is a block diagram showing interactions between a Freight Documents Processing process component and a Transportation Management at Freight Forwarder process component.

FIG. 46 is a block diagram showing interactions between the Freight Documents Processing process component 156 and the Transportation Management at Freight Forwarder process component 158 in the architectural design of FIGS. 1A-1D. The interactions represent the output of a waybill to an external freight forwarder system.

As shown in FIG. 46, the Freight Documents Processing process component 156 includes a Freight List business object 4600. The business object 4600 represents a document detailing a list of shipped goods that are to be transported, the business partners, and the mode of transportation.

The Freight List business object 4600 uses a Notify of Freight List for Output To Transportation Management at Freight Forwarder outbound process agent 4602 to invoke an Output Waybill operation 4604. The operation 4604, included in a Waybill Notification Out interface 4606, prints a waybill. The operation 4604 sends a Form Waybill Notification message 4608 to the Transportation Management at Freight Forwarder external process component 158.

Interactions Between Process Components "Supplier Invoice Processing" and "Supplier Invoice Verification Exception Resolution at Processor"

Figure 47:
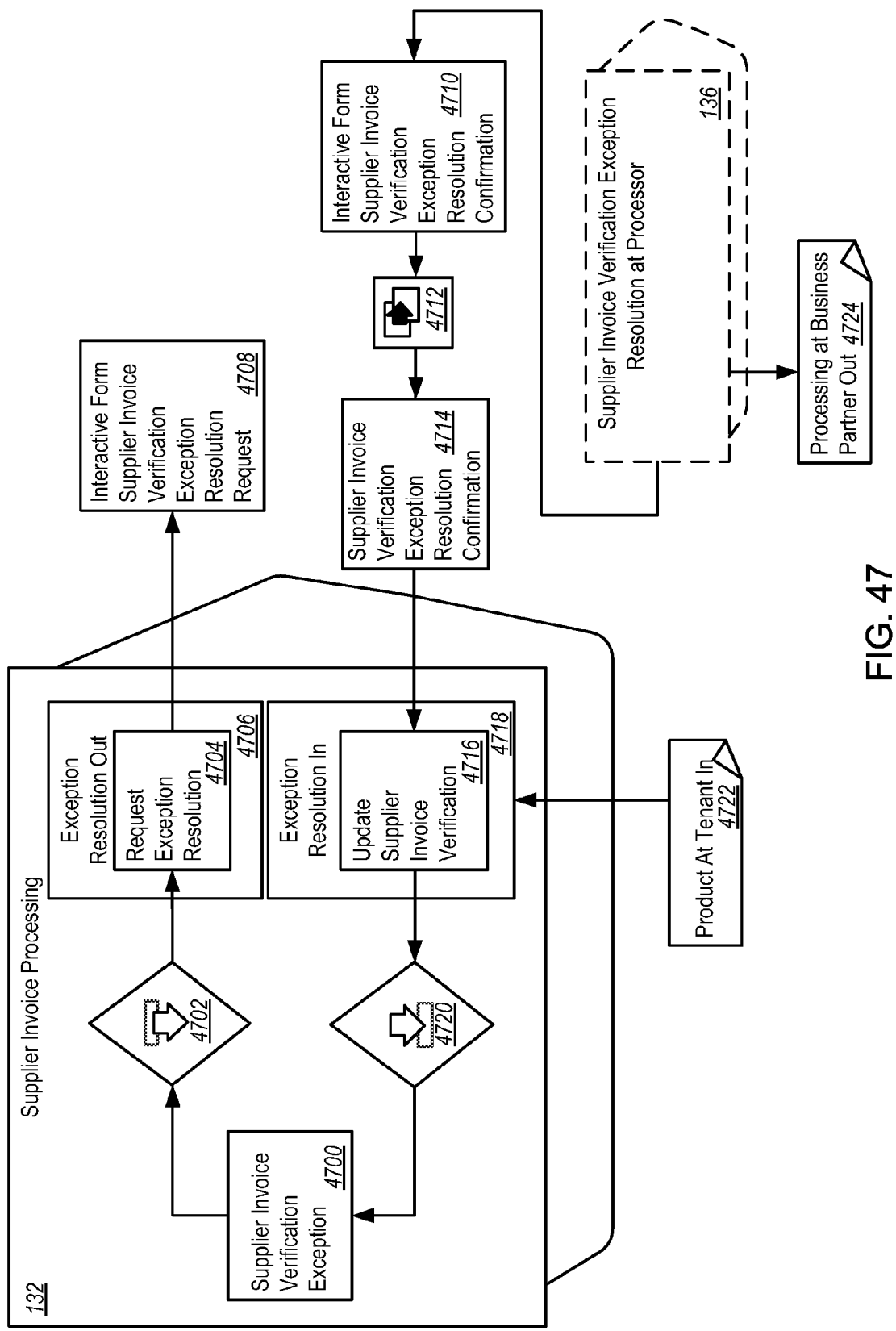
FIG. 47 is a block diagram showing interactions between the Supplier Invoice Processing process component and a Supplier Invoice Verification Exception Resolution at Processor process component.

FIG. 47 is a block diagram showing interactions between the Supplier Invoice Processing process component 132 and the Supplier Invoice Verification Exception Resolution at Processor process component 136 in the architectural design of FIGS. 1A-1D. The interactions represent the requesting of an interactive form-based clarification of a supplier invoice exception that occurred during invoice verification.

As shown in FIG. 47, the Supplier Invoice Processing process component 132 includes a Supplier Invoice Verification Exception business object 4700. The business object 4700 represents a group of related issues arising during a supplier invoice verification process. In some implementations, the issues causing the exception are bundled according to certain business criteria. A complex follow-up clarification process is used to resolve the issues.

The Supplier Invoice Verification Exception business object 4700 uses a Request Resolution from Supplier Invoice Verification Exception to Processor outbound process agent 4702 to invoke a Request Exception Resolution operation 4704. The operation 4704, included in an Exception Resolution Out interface 4706, requests the clarification of a supplier invoice verification exception from an external party.

The Request Exception Resolution operation 4704 sends an Interactive Form Supplier Invoice Verification Exception Resolution Request message 4708 to the Supplier Invoice Verification Exception Resolution at Processor external process component 136.

The Supplier Invoice Verification Exception Resolution at Processor external process component 136 sends information to the Supplier Invoice Processing process component 132 using a Processing at Business Partner Out communication channel template 4724. The communication channel template 4724 can define protocols and parameters used for communication with an external party.

The Supplier Invoice Verification Exception Resolution at Processor external process component 136 sends an Interactive Form Supplier Invoice Verification Exception Resolution Confirmation message 4710 to the Supplier Invoice Processing process component 132. The message 4710 uses a mapping entity 4712 to transform the message 4710 into a Supplier Invoice Verification Exception Resolution Confirmation message 4714. An Update Supplier Invoice Verification operation 4716 receives the message 4714. The operation 4716, included in an Exception Resolution In interface 4718, updates a supplier invoice verification exception based on the changes made by an external party.

The Update Supplier Invoice Verification operation 4716 uses an Update Supplier Invoice Verification Exception based on Resolution Confirmation inbound process agent 4720 to update the Supplier Invoice Verification Exception business object 4700.

The Supplier Invoice Processing process component 132 receives information from the Supplier Invoice Verification Exception Resolution at Processor external process component 136 using a Product at Tenant In communication channel template 4722. The communication channel template 4722 can define protocols and parameters used for communication with an external party.

The Supplier Invoice Verification Exception Resolution at Processor process component 136 receives information from a Processing at Business Partner Out communication channel template 4724. The communication channel template 4724 can define protocols and parameters used for communication with an external party.

Interactions Between Process Components "Sales Order Processing" and "Customer Invoice Processing"

Figure 48:
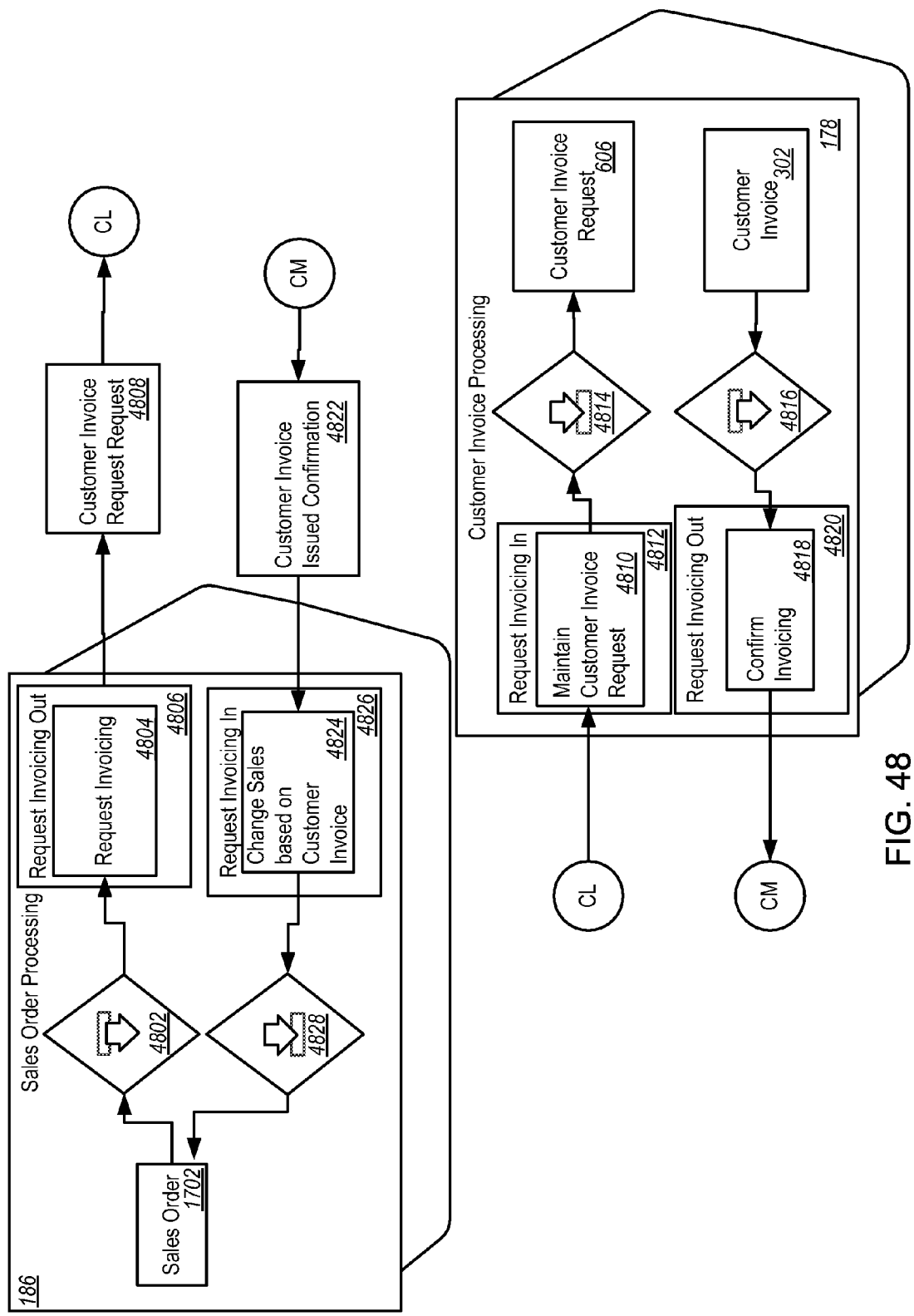
FIG. 48 is a block diagram showing interactions between the Sales Order Processing process component and the Customer Invoice Processing process component.

FIG. 48 is a block diagram showing interactions between the Sales Order Processing process component 186 and the Customer Invoice Processing process component 178 in the architectural design of FIGS. 1A-1D. The interactions represent the requesting of the creation, update, or cancellation of invoices from the Customer Invoice Processing process component 178. For example, the Customer Invoice Processing process component 178 confirms the performed action to the requestor.

As shown in FIG. 48, the Sales Order Processing process component 186 includes a Sales Order business object 1702. The business object 1702 represents an agreement between a seller and a customer concerning the sale and delivery of goods, as well as any services that are associated with these processes, on a specific date, for a specific quantity, and for a specific price. The business object 1702 uses a Request Invoicing from Sales Order to Customer Invoice Processing outbound process agent 4802 to invoke a Request Invoicing operation 4804. The operation 4804, included in a Request Invoicing Out interface 4806, requests the invoicing of sales order; point in time and dependence on other invoicing information such as delivery will be decided by invoicing process. The operation 4804 sends a Customer Invoice Request Request message 4808 to the Customer Invoice Processing process component 178. A Maintain Customer Invoice Request operation 4810 receives the message 4808. The operation 4810, included in a Request Invoicing In interface 4812, creates, updates, or cancels a customer invoice request. The operation 4810 uses a Maintain Customer Invoice Request inbound process agent 4814 to update a Customer Invoice Request business object 606. The business object 606 represents a request to create one or several customer invoices, or to take account of the data for the underlying business document when creating a customer invoice.

As shown in FIG. 48, the Customer Invoice Processing process component 178 includes the Customer Invoice business object 302. The business object 302 represents a binding statement of amounts receivable resulting, for example, from deliveries to a customer, services performed for a customer, adjustments to these receivables, or credit memos to a customer. The business object 302 uses a Confirm Customer Invoice to Sales Order Processing outbound process agent 4816 to invoke a Confirm Invoicing operation 4818. The operation 4818, included in a Request Invoicing Out interface 4820, confirms that invoicing has taken place. The operation 4818 sends a Customer Invoice Issued Confirmation message 4822 to the Sales Order Processing process component 186.

A Change Sales Order based on Customer Invoice operation 4824 receives the message 4822. The operation 4824, included in a Request Invoicing In interface 4826, updates the sales order based on changes from the customer invoice. The operation 4824 uses a Change Sales Order based on Customer Invoice outbound process agent 4828 to update the Sales Order business object 1702.

Interactions Between Process Components "RFQ Processing" and "Opportunity/Customer Quote Processing at Supplier"

Figure 49:
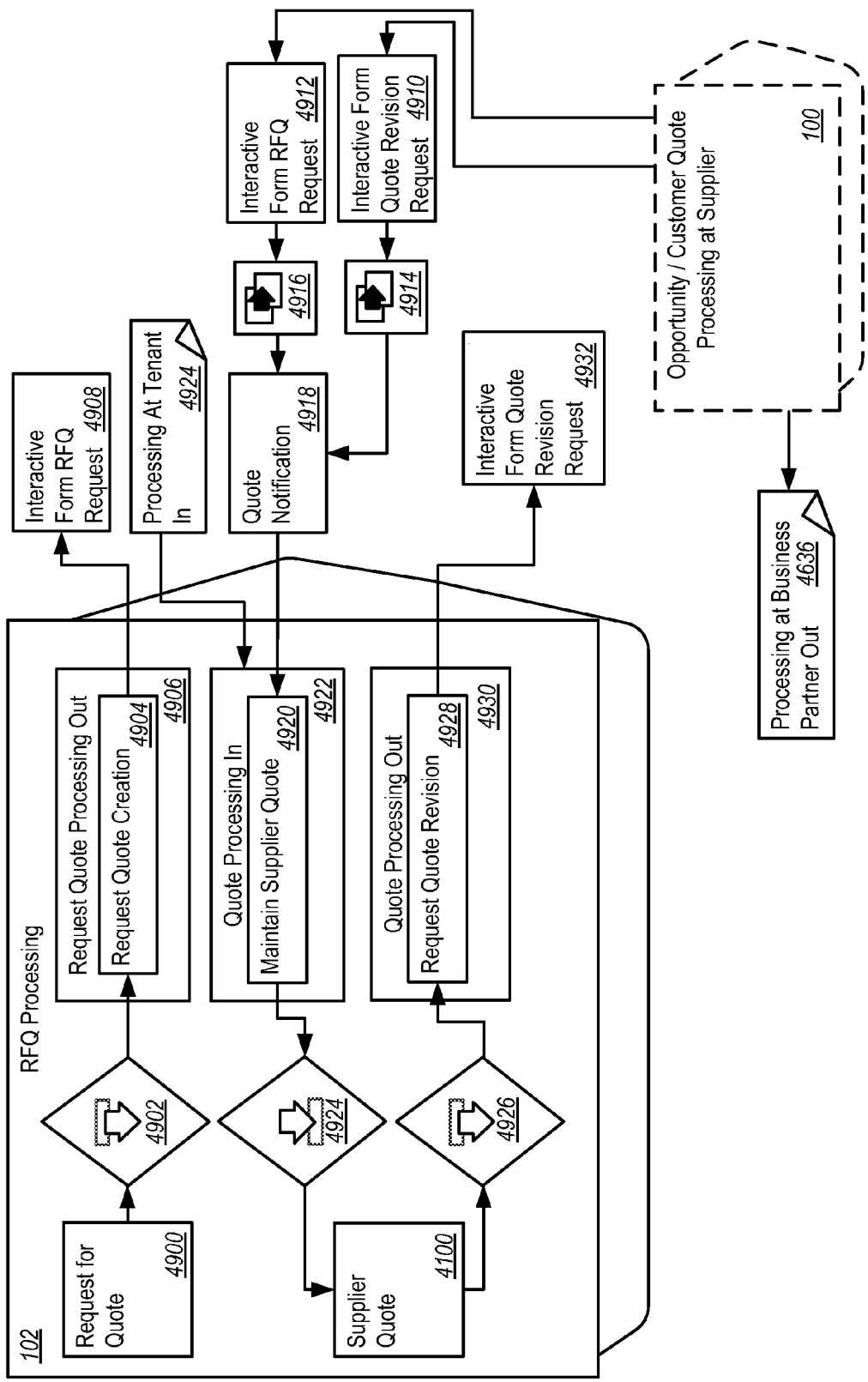
FIG. 49 is a block diagram showing interactions between the RFQ Processing process component and an Opportunity/Customer Quote Processing at Supplier process component.

FIG. 49 is a block diagram showing interactions between the RFQ Processing process component 102 and the Opportunity/Customer Quote Processing at Supplier process component 100 in the architectural design of FIGS. 1A-1D. The interactions represent the requesting of the submission of a quote from the external quote processing system of the supplier when a request for quote is created in the RFQ Processing process component 102 using interactive forms.

As shown in FIG. 49, the RFQ Processing process component 102 includes a Request for Quote business object 4900. The business object 4900 represents a request from a buyer to a bidder to submit a quote for goods or services according to specified criteria. The business object 4900 uses a Request Quote Maintenance from Request for Quote to Supplier outbound process agent 4902 to invoke a Request Quote Creation operation 4904. The operation 4904, included in a Request Quote Processing Out interface 4906, requests the revision of a quote that was received, for example, by phone, fax, or e-mail. The operation 4904 sends an Interactive Form RFQ Request message 4908 to the Opportunity/Customer Quote Processing at Supplier external process component 100.

The Opportunity/Customer Quote Processing at Supplier external process component 100 sends an Interactive Form RFQ Request message 4912 and an Interactive Form Quote Revision Request message 4910 to the RFQ Processing process component 102. The messages 4910 and 4912 use mapping entities 4914 and 4916, respectively, to transform the messages 4910 and 4912 into a Quote Notification message 4918. A Maintain Supplier Quote operation 4920 receives the message 4918.

The RFQ Processing process component 102 receives information from the Opportunity/Customer Quote Processing at Supplier external process component 102 using a Processing at Tenant In communication channel template 4934. The communication channel template 4934 can define protocols and parameters used for communication with an external party.

The Maintain Supplier Quote operation 4920, included in a Quote Processing In interface 4922, creates or updates a supplier quote based on the information contained in quotes received, for example, by phone, fax, or e-mail. The operation 4920 uses a Maintain Supplier Quote inbound process agent 4924 to update a Supplier Quote business object 4100. The business object 4100 represents a response to a request for quote in which a bidder offers to sell goods and services to a buyer according to the requested criteria.

The Supplier Quote business object 4100 uses a Notify of Supplier Quote to Supplier outbound process agent 4926 to invoke a Request Quote Revision operation 4928. The operation 4928, included in a Quote Processing Out interface 4930, requests the revision of a quote that was received, for example, by phone, fax, or e-mail. The operation 4928 sends an Interactive Form Quote Revision Request message 4932 to the Opportunity/Customer Quote Processing at Supplier external process component 100.

The Opportunity/Customer Quote Processing at Supplier external process component 100 sends information to the RFQ Processing process component 102 using a Processing at Business Partner Out communication channel template 4936. The communication channel template 4936 can define protocols and parameters used for communication with an external party.

Interactions Between Process Components "Payment Authorization" and "Settlement Processing at Clearing House"

Figure 50:
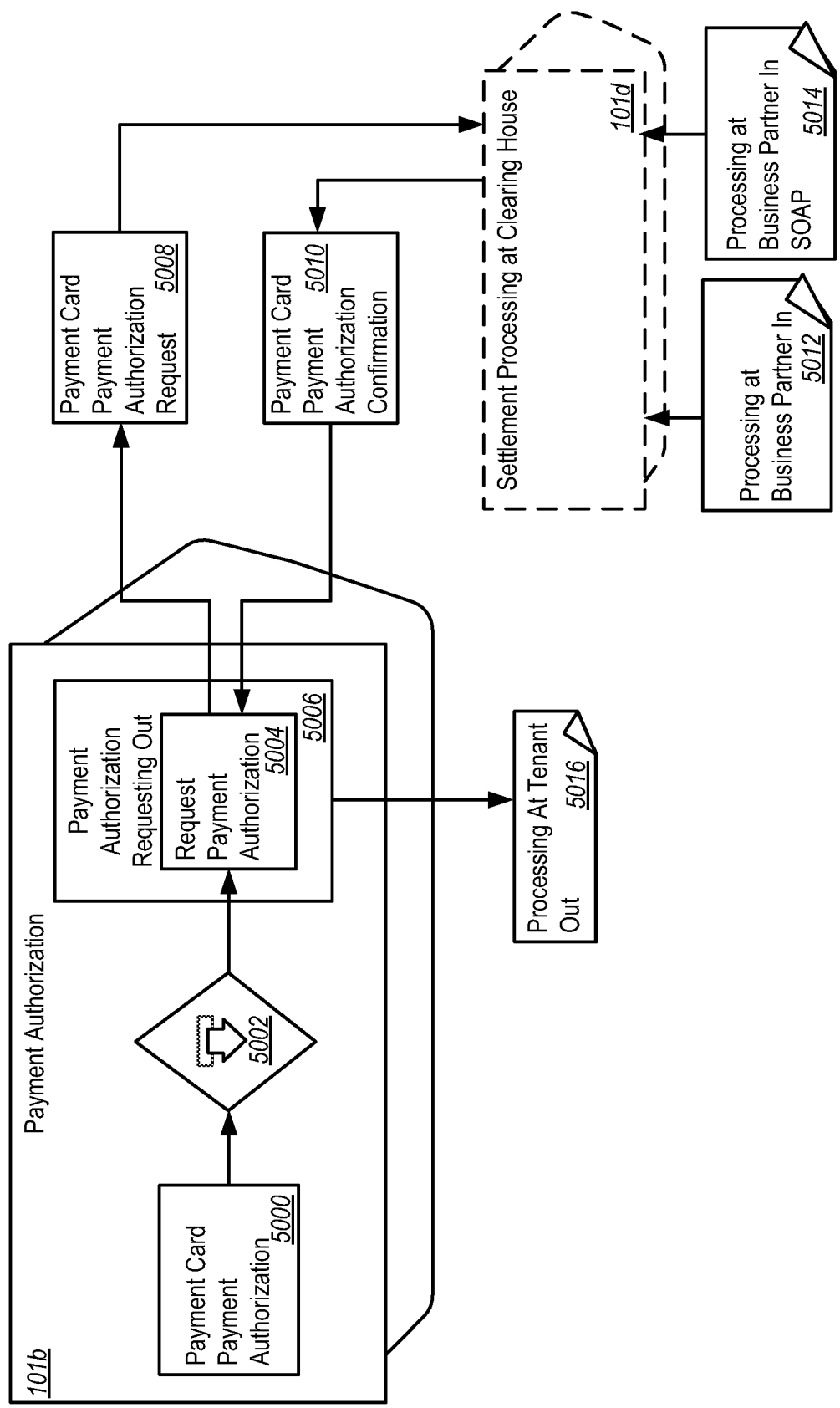
FIG. 50 is a block diagram showing interactions between a Payment Authorization process component and a Settlement Processing at Clearing House process component.

FIG. 50 is a block diagram showing interactions between the Payment Authorization process component 101b and the Settlement Processing at Clearing House external process component 101d in the architectural design of FIGS. 1A-1D. The interaction represents the requesting of payment authorization from the Settlement Processing at Clearing House external process component 101d.

As shown in FIG. 50, the Payment Authorization process component 101b includes a Payment Card Payment Authorization business object 5000. The business object 5000 represents an authorization for a payment made using a payment card. It may contain payment information including a description of the goods/services purchased, the authorization request, and the result of the authorization request based on the response from the clearing house.

The Payment Card Payment Authorization business object 5000 uses a Request Payment Card Payment Authorization outbound process agent 5002 to invoke a Request Payment Authorization operation 5004. The operation 5004, included in a Payment Authorization Requesting Out interface 5006, requests a clearing house for authorization of a payment made using a payment card. The operation 5004 sends a Payment Card Payment Authorization Request message 5008 to the Settlement Processing at Clearing House external process component 101*d*.

The Settlement Processing at Clearing House external process component 101*d* receives information using a Processing at Business Partner In communication channel template 5012 and a Processing at Business Partner In SOAP communication channel template 5014 to send information to the Payment Authorization process component 101*b*. The communication channel templates 5012 and 5014 can define protocols and parameters used for communication with an external party.

The Settlement Processing at Clearing House external process component 101*d* sends a Payment Card Payment Authorization Confirmation message 5010 to the Payment Authorization process component 101*b*.

The Payment Authorization process component 101*b* uses a Processing at Tenant Out communication channel template 5016 to send information to the Settlement Processing at Clearing House external process component 101*d*. The communication channel template 5016 can define protocols and parameters used for communication with an external party.
Interactions Between Process Components "Purchase Order Processing" and "Sales Order Processing at Supplier"

Figure 51:
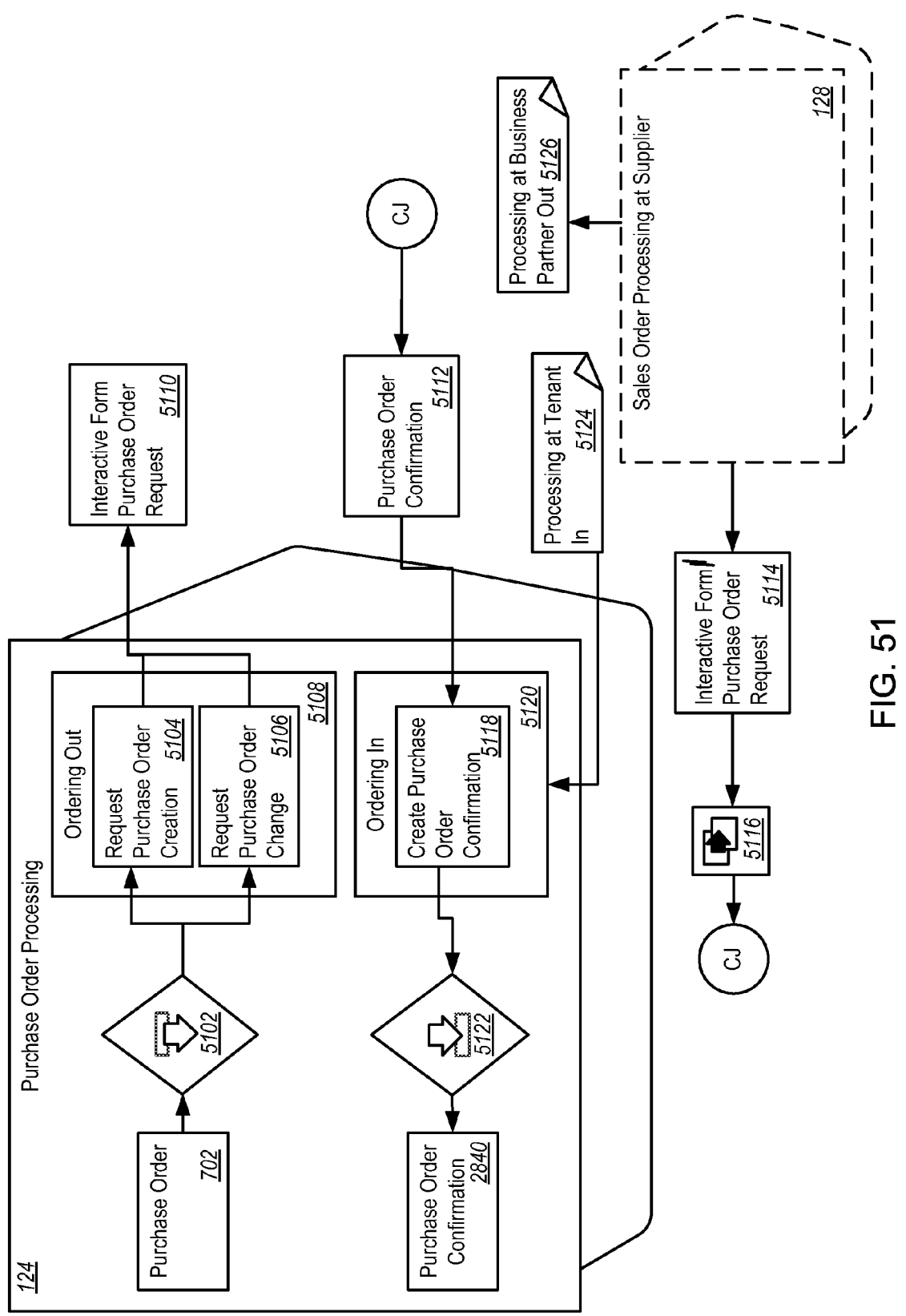
FIG. 51 is a block diagram showing interactions between the Purchase Order Processing process component and a Sales Order Processing at Supplier process component.

FIG. 51 is a block diagram showing interactions between the Purchase Order Processing process component 124 and the Sales Order Processing at Supplier external process component 128 in the architectural design of FIGS. 1A-1D. The interaction represents the requesting of the creation, update, or cancellation of a sales order in the external sales order processing system of the supplier, and the subsequent requesting of the creation, update, or cancellation of a purchase order confirmation in the Purchase Order Processing process component 124 using interactive forms.

As shown in FIG. 51, the Purchase Order Processing process component 124 includes the Purchase Order business object 702. The business object 702 represents a request from a buyer to a seller to deliver a specified quantity of material, or perform a specified service, at a specified price within a specified time. The business object 702 uses a Request Purchase Order to Supplier outbound process agent 5102 to invoke a Purchase Order Creation operation 5104 and a Request Purchase Order Change operation 5106. The operation 5104 requests sales order processing at supplier to process a new purchase order. The operation 5106 requests sales order processing at supplier to change a previously sent purchase order. The operations 5104 and 5106, both included in an Ordering Out interface 5108, send an Interactive Form Purchase Order Request message 5110 to the Sales Order Processing at Supplier external process component 128.

The Sales Order Processing at Supplier external process component 128 sends data to the Purchase Order Processing process component 124 using a Processing at Business Partner Out communication channel template 5126. The communication channel template 5126 can define protocols and parameters used for communication with an external party.

The Sales Order Processing at Supplier external process component 128 sends an Interactive Form Purchase Order Request message 5114 to the Purchase Order Processing process component 124. The message 5114 uses a mapping entity 5116 to transform the message 5114 to a Purchase Order Confirmation message 5112.

The Purchase Order Processing process component 124 receives information from the Sales Order Processing at Supplier external process component 128 using a Processing at Tenant In communication channel template 5124. The communication channel template 5124 can define protocols and parameters used for communication with an external party A Create Purchase Order Confirmation operation 5118 receives the Purchase Order Confirmation message 5112. The operation 5118, included in an Ordering In interface 5120, creates a purchase order confirmation based on the supplier's response to a purchase order.

The Create Purchase Order Confirmation operation 5118 uses a Create Purchase Order Confirmation inbound process agent 5122 to update a Purchase Order Confirmation business object 2840. The business object 2840 represents a confirmation from a seller to deliver a specified quantity of goods, or perform a specified service, at a specified price within a specified time.
Interactions Between Process Components "Customer Quote Processing" and "RFQ Processing at Customer"

Figure 52:
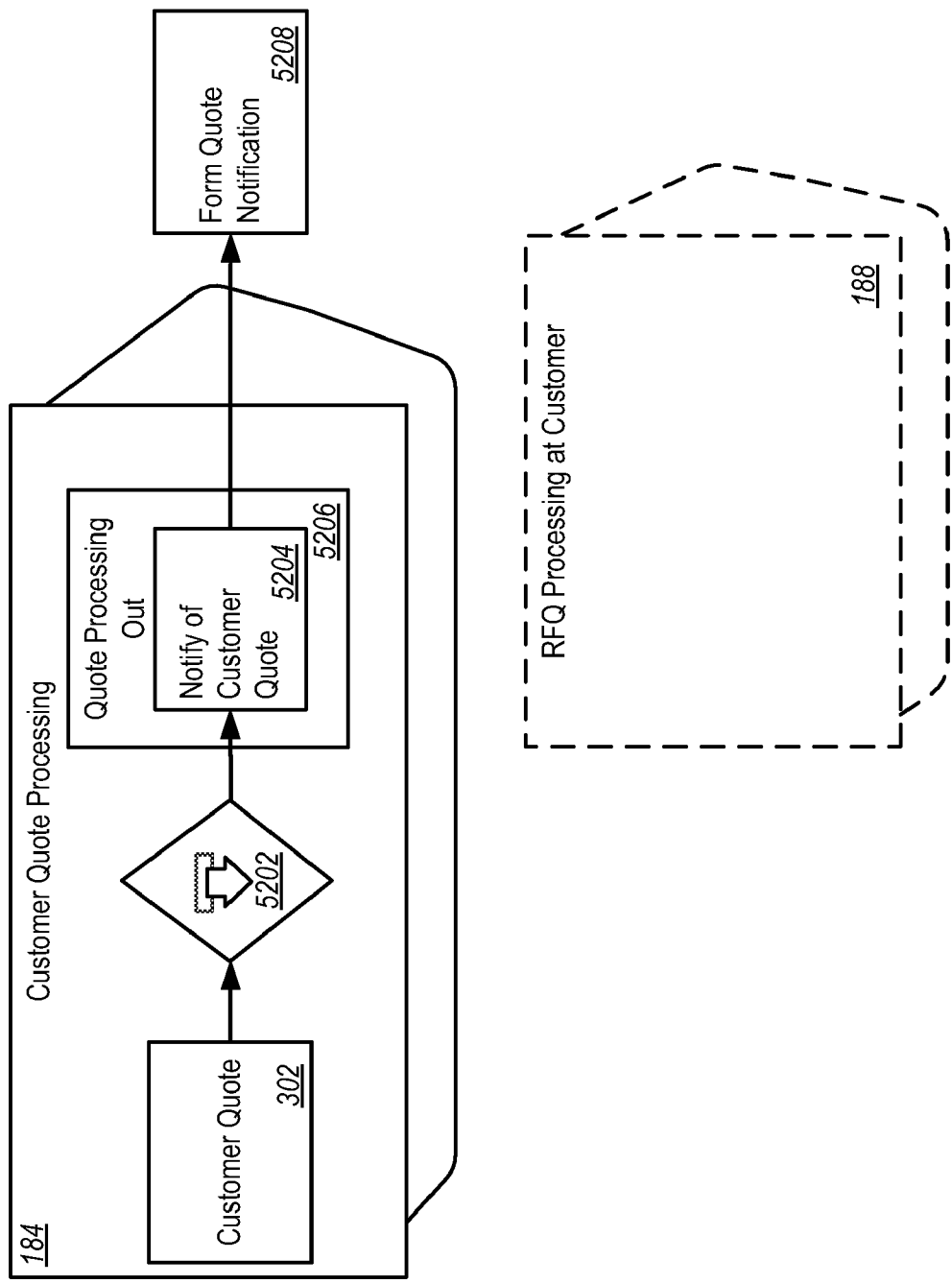
FIG. 52 is a block diagram showing interactions between the Customer Quote Processing process component and an RFQ Processing at Customer process component.

FIG. 52 is a block diagram showing interactions between the Customer Quote Processing process component 184 and the RFQ Processing at Customer external process component 188 in the architectural design of FIGS. 1A-1D. The interactions represent the sending of the customer quote by a form output message from the Customer Quote Processing process component 184 to the external purchase order system at customer.

As shown in FIG. 52, the Customer Quote Processing process component 184 includes a Customer Quote business object 302. The business object 302 represents an offer by a seller to a customer for the delivery of goods or services according to fixed terms. The offer is generally legally binding for the seller for a specific period of time.

The Customer Quote business object 302 uses a Notify Customer Quote to Customer outbound process agent 5202 to invoke a Notify of Customer Quote operation 5204. The operation 5204, included in a Quote Processing Out interface 5206, notifies the customer about the customer quote. The operation 5204 sends a Form Quote Notification message 5208 to the RFQ Processing at Customer process component 188
Interactions Between Process Components "Payment Processing" and "Payment Processing at Business Partner"

Figure 53:
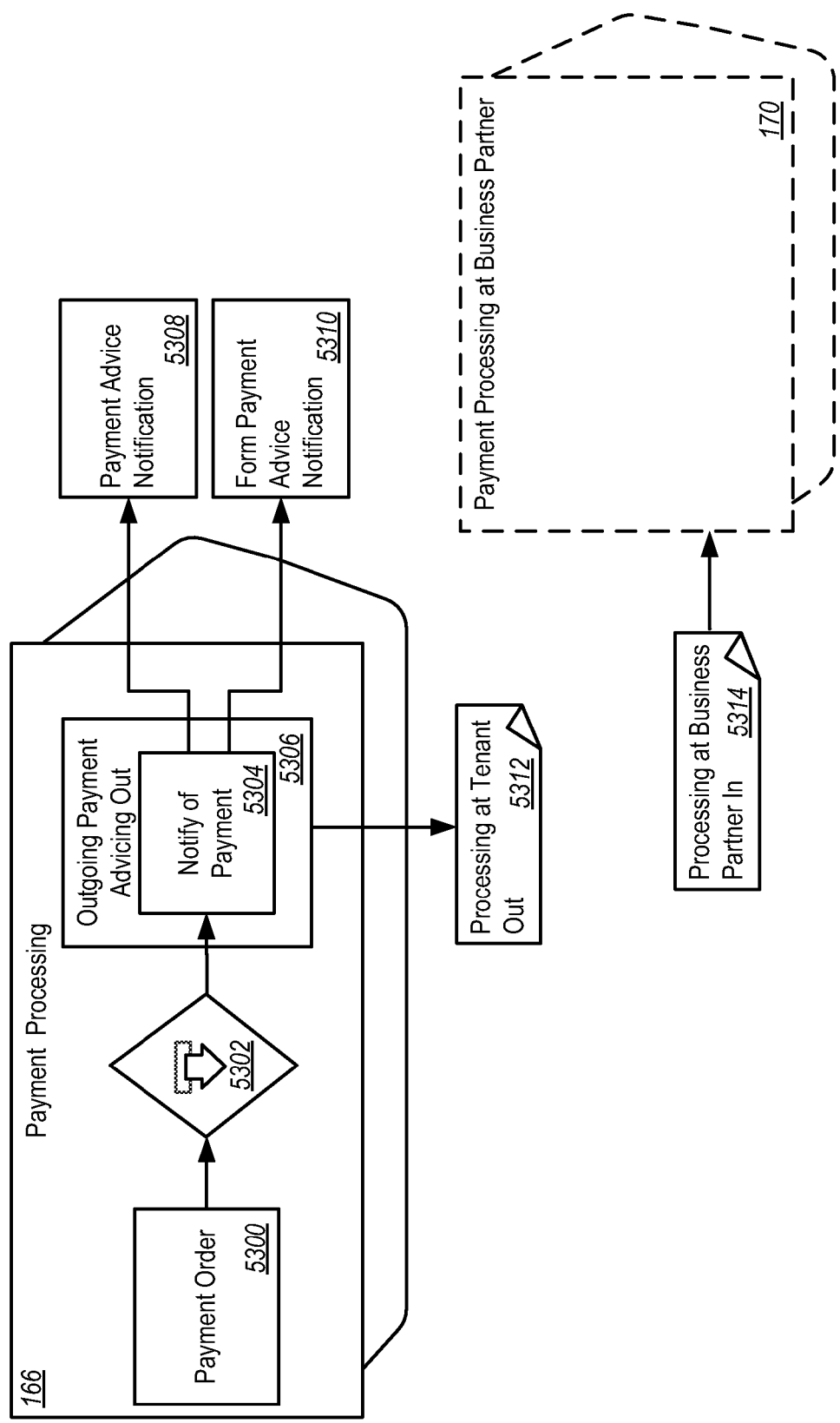
FIG. 53 is a block diagram showing interactions between the Payment Processing process component and the Payment Processing at Business Partner process component.

FIG. 53 is a block diagram showing interactions between the Payment Processing process component 166 and the Payment Processing at Business Partner external process component 170 in the architectural design of FIGS. 1A-1D. The interactions represent the sending of a payment advice to a business partner.

As shown in FIG. 53, the Payment Processing process component 166 includes a Payment Order business object 5300. The business object 5300 represents an order within a company to initiate a payment transaction to or from a business partner at a specified time. In some implementations, a payment order can be a collective order that contains several individual orders. The business object 5300 uses a Notify of Payment from Payment Order to Business Partner outbound process agent 5302 to invoke a Notify of Payment operation 5304. The operation 5304, included in an Outgoing Payment Advising Out interface 5306, sends data that allows the assignment of payments to receivables or payables at the business partner. The operation 5304 sends a Payment Advice Notification message 5308 or a Form Payment Advice Notification message 5310 to the Payment Processing at Business Partner external process component 170.

The Payment Processing process component 166 sends information to the Payment Processing at Business Partner external process component 170 using a Processing at Tenant Out communication channel template 5312. The Payment Processing at Business Partner external process component 170 receives the information using a Processing at Business Partner In communication channel template 5314. The communication channel templates 5312 and 5314 can define protocols and parameters used for communication with an external party.

Interactions Between Process Components "Payment Processing" and "Payment Processing at Business Partner"

Figure 54:
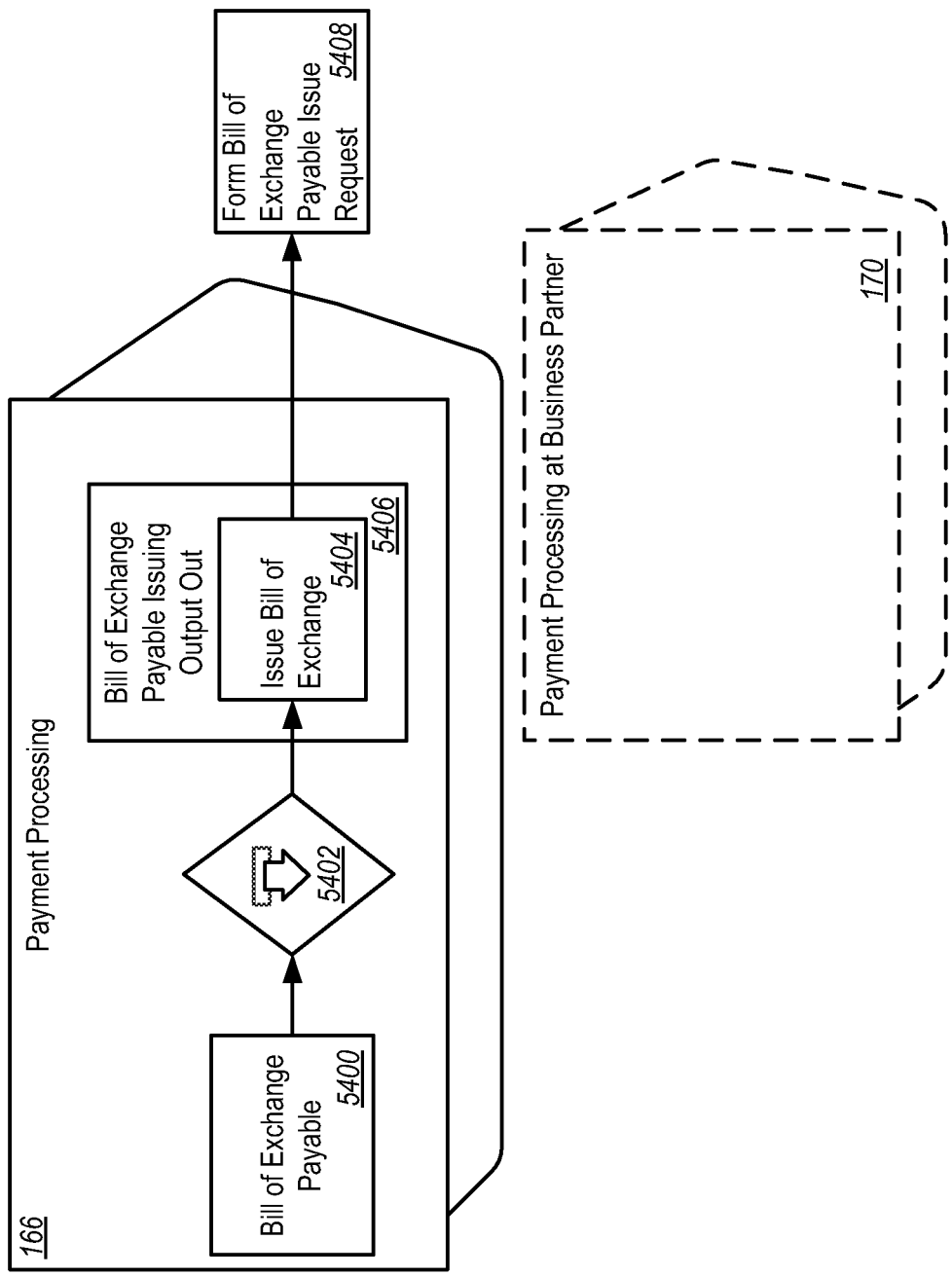
FIG. 54 is a block diagram showing further interactions between the Payment Processing process component and the Payment Processing at Business Partner process component.

FIG. 54 is a block diagram showing further interactions between the Payment Processing process component 166 and the Payment Processing at Business Partner process component 170 in the architectural design of FIGS. 1A-1D. The interaction represents the transferring of a printed bill of exchange receivable that is sent to the business partner.

As shown in FIG. 54, the Payment Processing process component 166 includes a Bill of Exchange Payable business object 5400. The business object 5400 represents a bill of exchange for an outgoing payment. The Bill of Exchange Payable business object 5400 uses an Issue Bill Of Exchange Receivable to Business Partner outbound process agent 5402 to invoke an Issue Bill of Exchange operation 5404. The operation 5404, included in a Bill Of Exchange Receivable Issuing Output Out interface 5406, requests the issuing of a bill of exchange. The operation 5404 sends a Form Bill of Exchange Payable Issue Request message 5408 to the Payment Processing at Business Partner process component 170.

Interactions Between Process Components "Payment Processing" and "Payment Processing at Business Partner"

Figure 55:
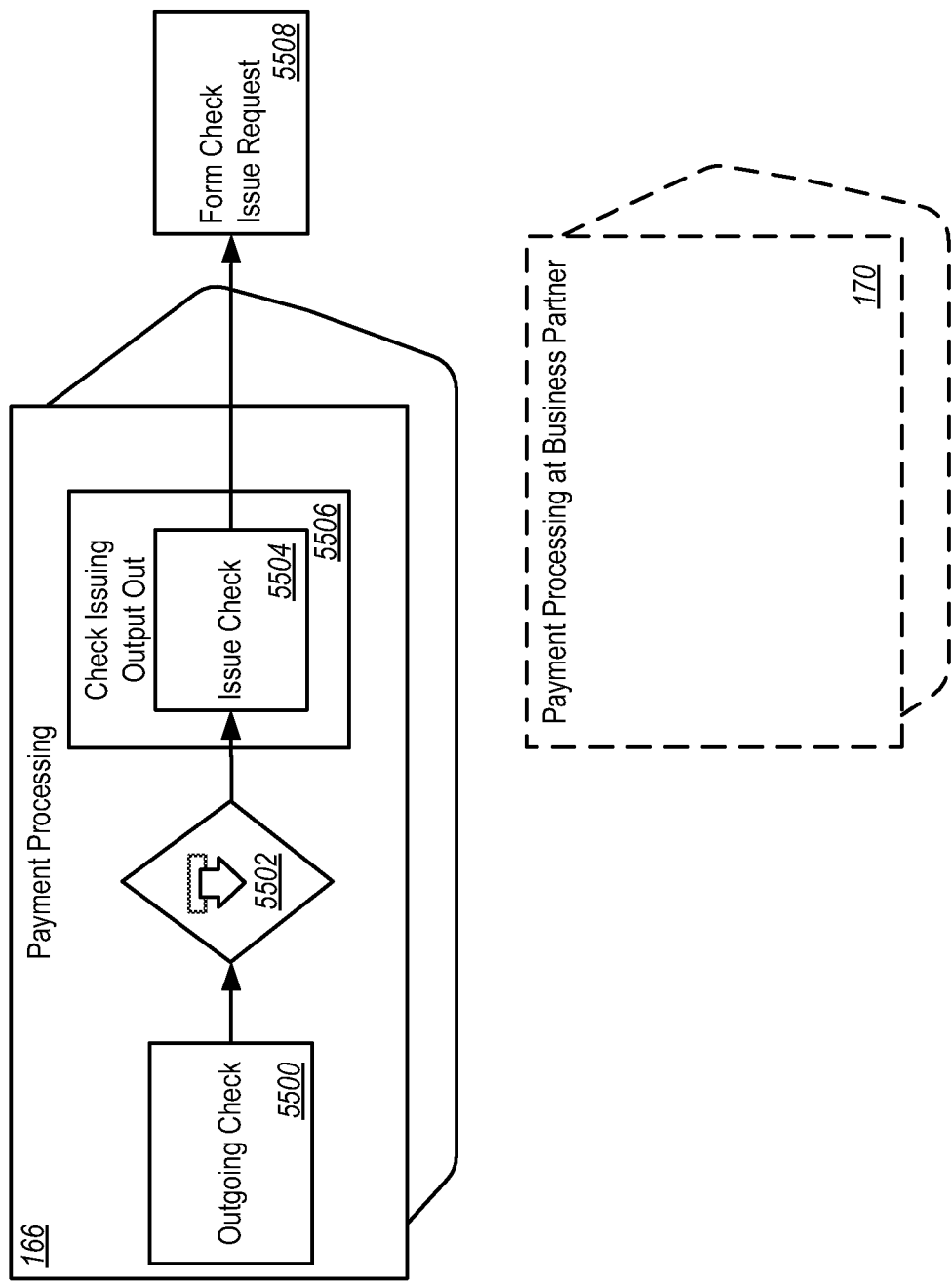
FIG. 55 is a block diagram showing further interactions between the Payment Processing process component and the Payment Processing at Business Partner process component.

FIG. 55 is a block diagram showing further interactions between the Payment Processing process component 166 and the Payment Processing at Business Partner external process component 170 in the architectural design of FIGS. 1A-1D. The interactions represent the transferring of a printed outgoing check that is sent to a business partner.

As shown in FIG. 55, the Payment Processing process component 166 includes an Outgoing Check business object 5500. The Outgoing Check business object 5500 represents a check issued by a company payable to a business partner to fulfill a payment order. The business object 5500 uses an Issue Check From Outgoing Check to Business Partner outgoing process agent 5502 to invoke an Issue Check operation 5504. The operation 5504, included in a Check Issuing Output Out interface 5506, requests the issuing of a check by creating the print form. The operation 5504 sends a Form Check Issue Request message 5508 to the Payment Processing at Business Partner external process component 170.

Interactions Between Process Components "Payment Processing" and "Payment Processing at Business Partner"

Figure 56:
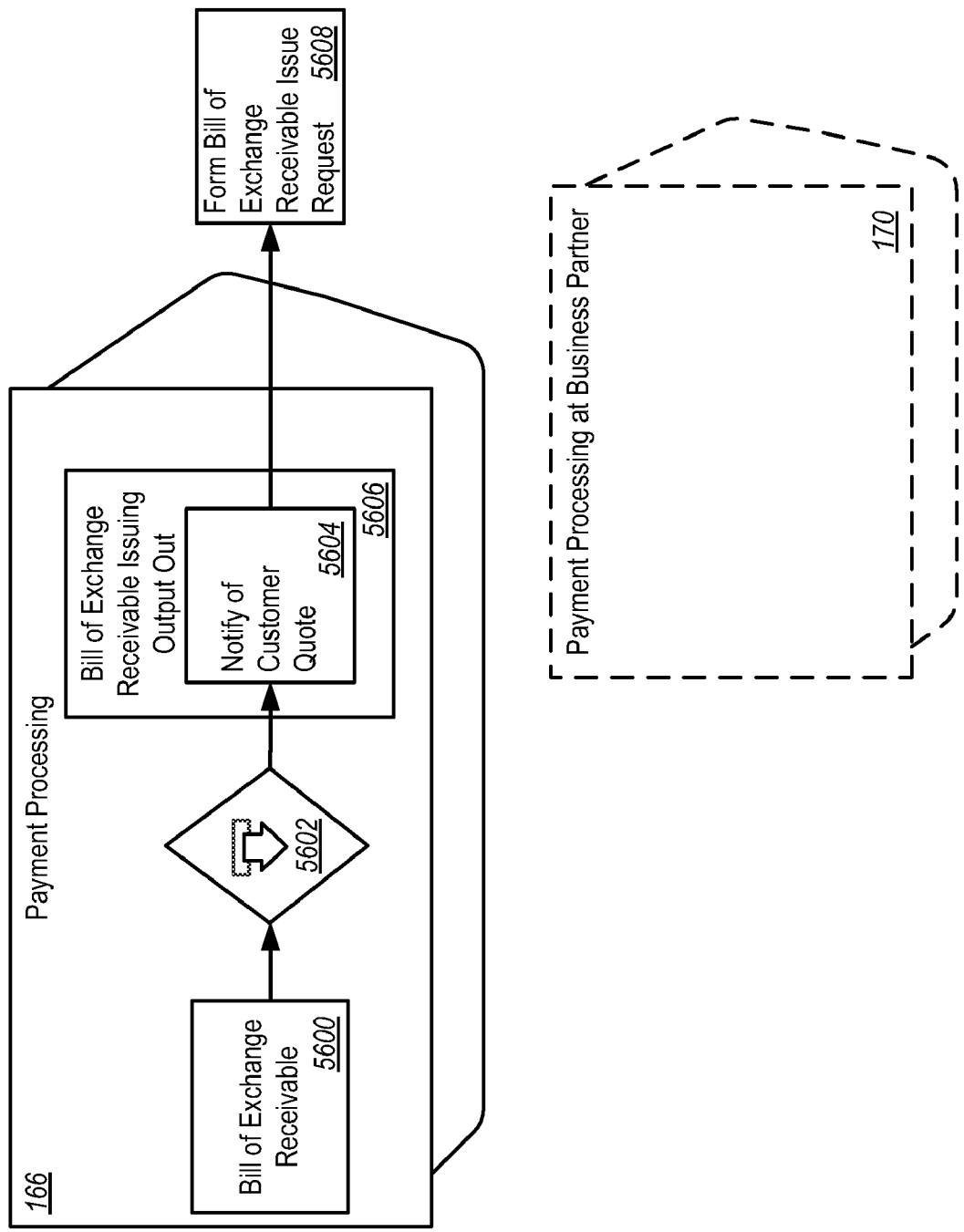
FIG. 56 is a block diagram showing further interactions between the Payment Processing process component and the Payment Processing at Business Partner process component.

FIG. 56 is a block diagram showing further interactions between the Payment Processing process component 166 and the Payment Processing at Business Partner external process component 170 in the architectural design of FIGS. 1A-1D. The interactions represent the transferring of a printed bill of exchange payable that is sent to the business partner.

As shown in FIG. 56, the Payment Processing process component 166 includes a Bill of Exchange Receivable business object 5600. The business object 5600 represents a bill of exchange for an outgoing payment. The business object 5600 uses an Issue Bill Of Exchange Payable to Business Partner outbound processing agent 5602 to invoke a Notify of Customer Quote operation 5604. The operation 5604, included in a Bill of Exchange Receivable Issuing Output Out interface 5606, requests the issuing of a bill of exchange. The operation 5604 sends a Form Bill of Exchange Receivable Issue Request message 5608 to the Payment Processing at Business Partner external process component 170.

Interactions Between Process Components "Outbound Delivery Processing at Supplier" and "Inbound Delivery Processing"

Figure 57:
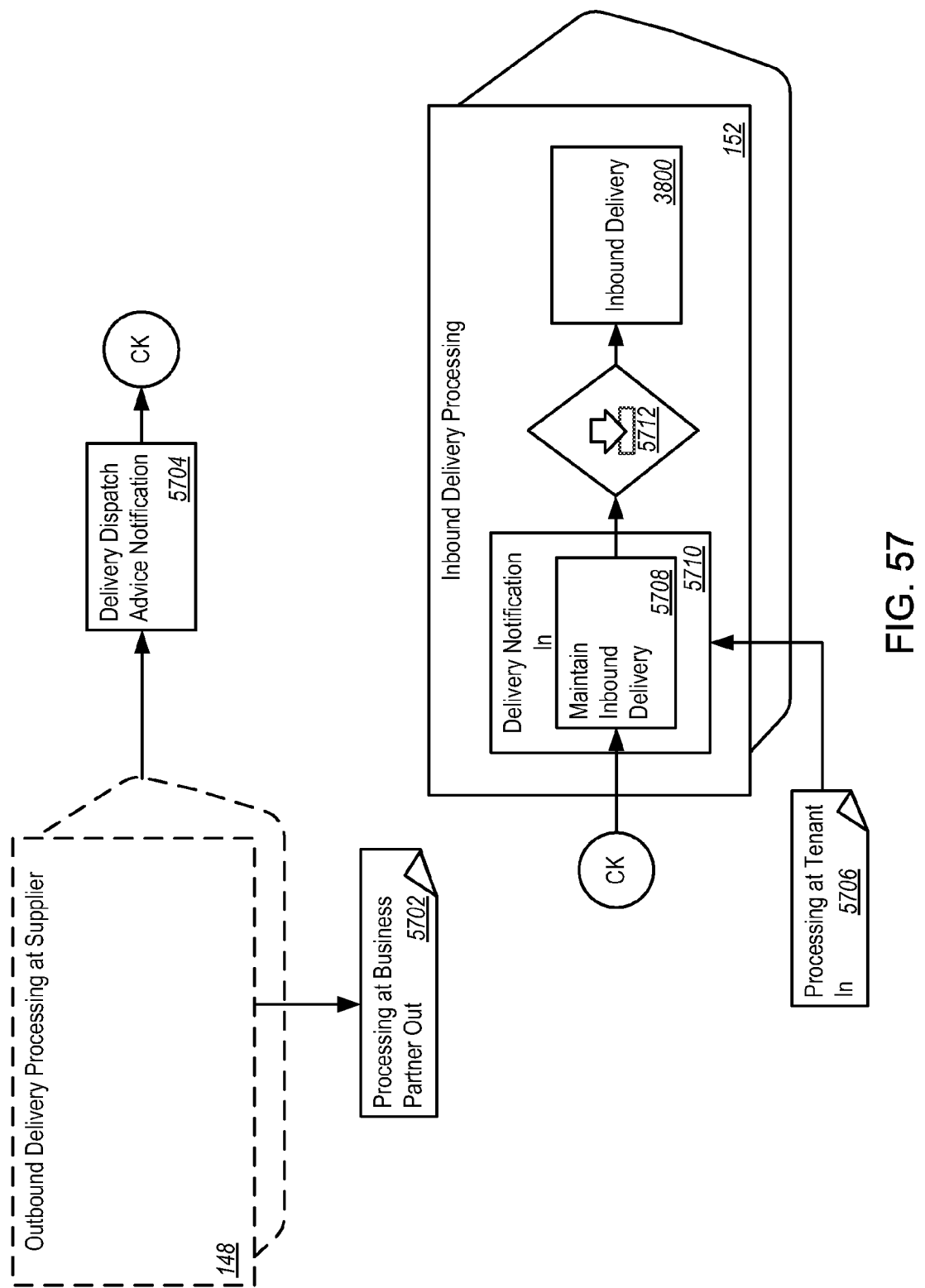
FIG. 57 is a block diagram showing interactions between an Outbound Delivery Processing at Supplier process component and the Inbound Delivery Processing process component.

FIG. 57 is a block diagram showing interactions between the Outbound Delivery Processing at Supplier external process component 148 and the Inbound Delivery Processing process component 152 in the architectural design of FIGS. 1A-1D. The interactions represent the receiving of a delivery dispatch advice notification from an external business system when inbound delivery is to be created, updated, or cancelled.

As shown in FIG. 57, the Outbound Delivery Processing at Supplier external process component 148 sends information to the Inbound Delivery Processing process component 152 using a Processing at Business Partner Out communication channel template 5702. The communication channel template 5702 can define protocols and parameters used for communication with an external party. The process component 148 sends a Delivery Dispatch Advice Notification message 5704 to the Inbound Delivery Processing process component 152.

The Inbound Delivery Processing process component 152 receives information from the Outbound Delivery Processing at Supplier external process component 148 using a Processing at Tenant In communication channel template 5706. The communication channel template 5706 can define protocols and parameters used for communication with an external party.

A Maintain Inbound Delivery operation 5708 receives the message 5704. The operation 5708, included in a Delivery Notification In interface 5710, receives a delivery dispatch advice notification from supplier. The operation 5708 uses a Maintain Inbound Delivery inbound process agent 5712 to update an Inbound Delivery business object 3800. The business object 3800 represents composition of the goods that is received by a product recipient.

Interactions Between Process Components "Outbound Delivery Processing" and "Inbound Delivery Processing at Customer"

Figure 58:
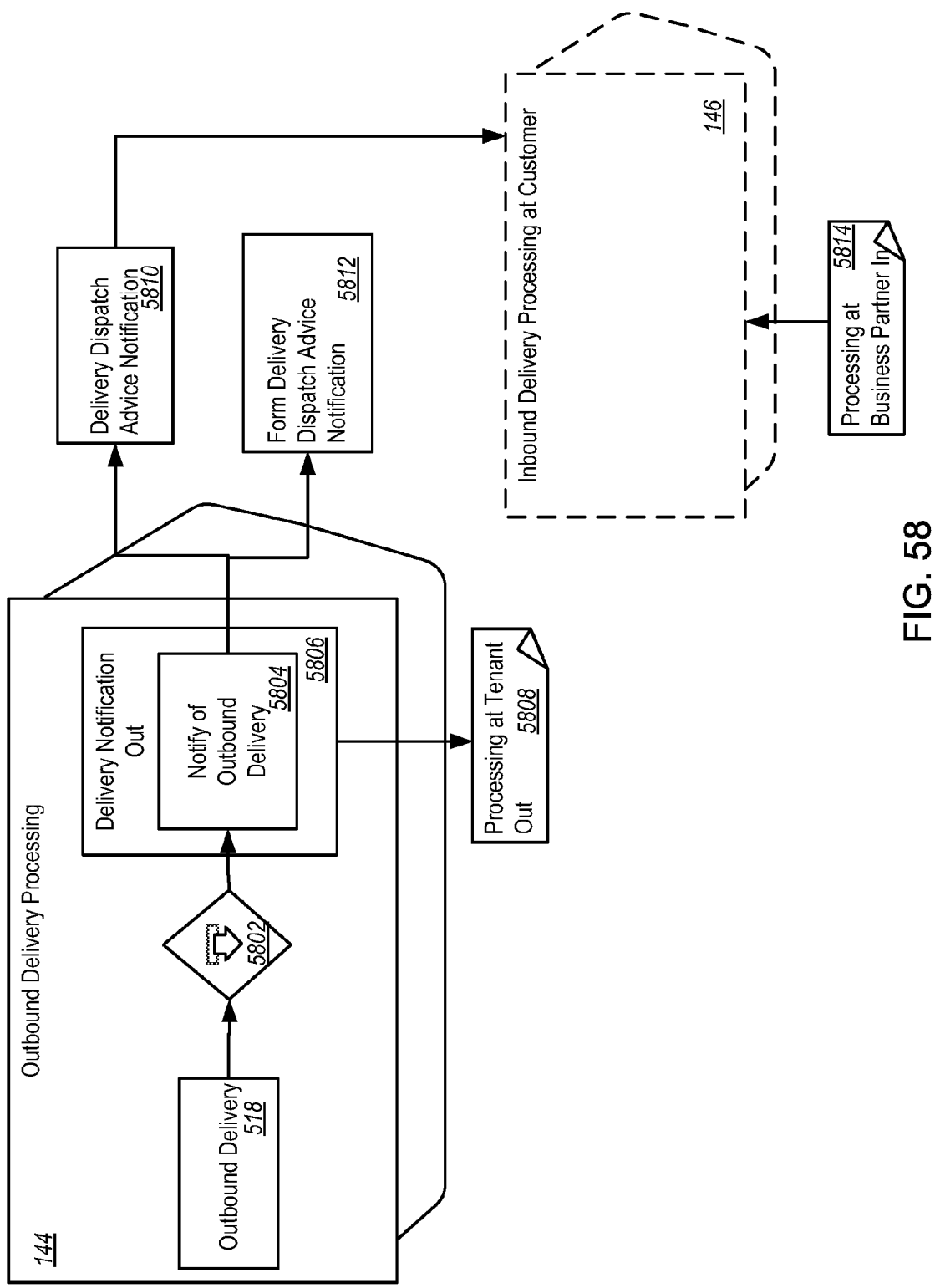
FIG. 58 is a block diagram showing interactions between the Outbound Delivery Processing process component and an Inbound Delivery at Customer process component.

FIG. 58 is a block diagram showing interactions between the Outbound Delivery Processing process component 144 and the Inbound Delivery Processing at Customer external process component 146 in the architectural design of FIGS. 1A-1D. The interactions represent the sending of a delivery dispatch advice notification when an outbound delivery is released or cancelled.

As shown in FIG. 58, the Outbound Delivery Processing process component 144 includes the Outbound Delivery business object 518. The business object 518 represents a composition of the goods that is provided for shipping by a vendor. The business object 518 uses a Notify of Outbound Delivery to Inbound Delivery Processing at Customer outbound process agent 5802 to invoke a Notify of Outbound Delivery operation 5804. The operation 5804, included in a Delivery Notification Out interface 5806, sends a delivery dispatch advice notification message to the Inbound Delivery Processing at Customer process component 146.

The Outbound Delivery Processing process component 144 sends information to the Inbound Delivery Processing at Customer external process component 146 using a Processing at Tenant Out communication channel template 5808. The communication channel template 5808 can define protocols and parameters used for communication with an external party.

The Notify of Outbound Delivery operation 5804 sends a Form Delivery Dispatch Advice Notification message 5812 or a Delivery Dispatch Advice Notification message 5810 to the Inbound Delivery Processing at Customer external process component 146.

The Inbound Delivery Processing at Customer external process component 146 receives information from the Outbound Delivery Processing process component 144 using a Processing at Business Partner In communication channel template 5814. The communication channel template 5814 can define protocols and parameters used for communication with an external party.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as an exemplification of preferred embodiments of the present disclosure. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions operable when executed by at least one processor to:

define a plurality of process components, each of the process components comprising a modular and application-independent package of reusable, granular software implementing a respective and distinct business process, the business process comprising functionality exposed by the process component via a corresponding service interface, the plurality of process components including:

a purchase request processing process component that creates, changes, and processes purchase requests to locate appropriate external sources of supply;

a purchase order processing process component that creates and maintains purchase orders and purchase order confirmations;

a supplier invoice processing process component that manages and volume processes supplier invoices, including exception handling and approval;

a supply and demand matching process component that manages all the tasks necessary to ensure that sufficient material receipt elements exist to cover material demand while taking available capacity into account;

a customer requirement processing process component that controls customer requirements in a supply chain;

a logistics execution control process component that creates, controls, and monitors the supply chain execution activities that are necessary for the fulfillment of an order on a macro-logistics level;

an external procurement trigger and response process component that manages all the tasks necessary for processing procurement planning and procurement release orders, and the interface to purchasing, accounting, supplier invoicing, outbound delivery, and a supplier from a supply planning and control perspective;

a production process component that executes production on a shop floor and comprises preparation, execution, confirmation, completion, scheduling, and monitoring;

a site logistics processing process component that prepares, physically executes, and confirms logistics processes within a site;

an outbound delivery processing process component that manages and processes the outbound delivery requirements for shipping goods to a product recipient;

an inventory processing process component that manages inventory and records inventory changes;

an inbound delivery processing process component that manages and processes the inbound delivery requirements for received goods from a vendor;

a due item processing process component that collects, manages, and monitors trade receivables or payables and corresponding sales tax or withholding tax;

a payment processing process component that processes and manages all payments;

an accounting process component that represents business transactions for valuation and profitability analysis;

a customer quote processing process component that processes quotes to customers offering delivery of goods according to specific terms;

a customer invoice processing process component that invoices customers for the delivery of goods or the provision of services;

a productions trigger and response process component that interfaces between planning and production; and a sales order processing process component that processes customers' requests to a seller for the delivery of goods, on a specific date, for a specific quantity, and for a specific price; and define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the external procurement trigger and response process component and the purchase request processing process component, where the pair-wise interaction between the external procurement trigger and response process component and the purchase request processing process component includes the transmission of:

a purchase request request message from the external procurement trigger and response process component to the purchase request processing process component, the purchase request request message comprising a request to create or update a purchase request for the procurement of products or services; and a purchase request confirmation message from the purchase request processing process component to the external procurement trigger and response process component, the purchase request confirmation message comprising a confirmation regarding creation, change, or cancellation of a purchase request to the requestor;

the purchase order processing process component and the accounting process component, where the pair-wise interaction between the purchase order processing process component and the accounting process component includes the transmission of:

a sales and purchasing accounting notification message from the purchase order processing process component to the accounting process component, the sales and purchasing accounting notification message comprising a notification to accounting that a purchase order is created, changed, or cancelled;

the purchase order processing process component and the supplier invoice processing process component, where the pair-wise interaction between the purchase order processing process component and the supplier invoice processing process component includes the transmission of:

an invoicing due notification message from the purchase order processing process component to the supplier invoice processing process component, the invoicing due notification message comprising a notification to the supplier invoice processing process component of a new, changed, or cancelled purchase order; and a purchase order invoice values notification message from the supplier invoice processing process component to the purchase order processing process component, the purchase order invoice values notification message comprising a notification regarding actual values and quantities of a supplier invoice that is saved and contains a reference to a particular purchase order;

the purchase order processing process component and the sales order processing process component, where the pair-wise interaction between the purchase order processing process component and the sales order processing process component includes the transmission of:
  a purchase order request message from the purchase order processing process component and the sales order processing process component, the purchase order request message comprising a request to process a purchase order sent to the sales order processing process component;
  a purchase order change request message from the purchase order processing process component and the sales order processing process component, the purchase order change request message comprising a request to change a previously sent purchase order;
  a purchase order cancellation request message from the purchase order processing process component and the sales order processing process component, the purchase order cancellation request message comprising a request to cancel a previously sent purchase order; and
  a purchase order confirmation message from the sales order processing process component to the purchase order processing process component, the purchase order confirmation message comprising a confirmation of a change in a particular sales order to a customer;

the purchase order processing process component and the external procurement trigger and response process component, where the pair-wise interaction between the purchase order processing process component and the external procurement trigger and response process component includes the transmission of:
  a purchase order notification message from the purchase order processing process component to the external procurement trigger and response process component, the purchase order notification message comprising a notification to the external procurement trigger and response process component that a particular purchase order is created, changed, or cancelled;

the supplier invoice processing process component and the accounting process component, where the pair-wise interaction between the supplier invoice processing process component and the accounting process component includes the transmission of:
  an invoice accounting notification message from the supplier invoice processing process component to the accounting process component, the invoice accounting notification message comprising a notification about accounting-relevant data from a posted supplier invoice; and
  an invoice cancellation accounting notification message from supplier invoice processing process component to the accounting process component, the invoice cancellation accounting notification message comprising a notification about accounting-relevant data from a previously posted supplier invoice that is cancelled;

the inbound delivery processing process component and the supplier invoice processing process component, where the pair-wise interaction between the inbound delivery processing process component and the supplier invoice processing process component includes the transmission of:
  an invoicing due notification message from the inbound delivery processing process component to the supplier invoice processing process component, the invoicing due notification message comprising a request to create, update, or cancel a particular supplier invoice;

the inventory processing process component and the supply and demand matching process component, where the pair-wise interaction between the inventory processing process component and the supply and demand matching process component includes the transmission of:
  a planning view of inventory reconciliation notification message from the inventory processing process component to the supply and demand matching process component, the planning view of inventory reconciliation notification message comprising a notification regarding reconciliation of aggregated inventory quantities;

the customer quote processing process component and the customer requirement processing process component, where the pair-wise interaction between the customer quote processing process component and the customer requirement processing process component includes the transmission of:
  a product availability query message from the customer quote processing process component to the customer requirement processing process component, the product availability query message comprising a non-binding query regarding availability of specified amounts of specified products at specified dates to request product availability information for customer quote items; and
  a product availability response message from the customer requirement processing process component to the customer quote processing process component, the product availability response message comprising a response to a product availability query message that includes non-binding information associated with which amounts of products are available at which dates;

the sales order processing process component and the customer requirement processing process component, where the pair-wise interaction between the sales order processing process component and the customer requirement processing process component includes the transmission of:
  a product available to promise check request message from the sales order processing process component to the customer requirement processing process component, the product available to promise check request message comprising a request to check and/or confirm availability of a specific amount of materials;
  a product available to promise check confirmation message from the customer requirement processing process component to the sales order processing process component, the product available to promise check confirmation message comprising a set of results associated with a check and/or confirmation of availability of a specific amount of materials;
  a provisional customer requirement delete notification message from the sales order processing process component to the customer requirement processing process component, the provisional customer requirement delete notification message comprising a request to delete provisional customer requirements created in response to a product available to promise check request message;

a customer requirement fulfillment request message from the sales order processing process component to the customer requirement processing process component, the customer requirement fulfillment request message comprising a request to create or update a particular customer requirement;

a product available to promise update notification message from the customer requirement processing process component to the sales order processing process component, the product available to promise update notification message comprising a notification for updating a sales order with availability and reservation information based on changes in fulfillment planning; and a customer requirement fulfillment confirmation message from the customer requirement processing process component to the sales order processing process component, the customer requirement fulfillment confirmation message comprising a confirmation of fulfillment for updating a particular sales order with information from fulfillment confirmation;

the logistics execution control process component and the outbound delivery processing process component, where the pair-wise interaction between the logistics execution control process component and the outbound delivery processing process component includes the transmission of:

a delivery request fulfillment request message from the logistics execution control process component to the outbound delivery processing process component, the delivery request fulfillment request message comprising a request to create or update an outbound delivery request; and a delivery request fulfillment confirmation message from the outbound delivery processing process component to the logistics execution control process component, the delivery request fulfillment confirmation message comprising a notification to the logistics execution control process component of fulfillment of a particular outbound delivery request for reconciliation purposes;

the logistics execution control process component and the inbound delivery processing process component, where the pair-wise interaction between the logistics execution control process component and the inbound delivery processing process component includes the transmission of:

a delivery request fulfillment request message from the logistics execution control process component to the inbound delivery processing process component, the delivery request fulfillment request message comprising a request to create or update an inbound delivery request; and a delivery request fulfillment confirmation message from the inbound delivery processing process component and the logistics execution control process component, the delivery request fulfillment confirmation message comprising a notification to the logistics execution control process component of fulfillment of a particular inbound delivery request for reconciliation purposes;

the production trigger and response process component and the production process component, where the pair-wise interaction between the production trigger and response process component and the production process component includes the transmission of:

a production request request message from the production trigger and response process component to the production process component, the production request request message comprising a request for production of a certain quantity of a specific material by a requested due date;

a production request confirmation message from the production process component to the production trigger and response process component, the production request confirmation message comprising a confirmation of receipt for a production request; and a production request confirmation reconciliation notification message from the production process component to the production trigger and response process component, the production request confirmation reconciliation notification message comprising a reconciliation notification of a production request confirmation;

the production process component and the accounting process component, where the pair-wise interaction between the production process component and the accounting process component includes the transmission of:

a production lot accounting notification message from the production process component to the accounting process component, the production lot accounting notification message comprising a notification to accounting regarding a status change of a production lot;

an inventory change and activity confirmation accounting notification message from the production process component to the accounting process component, the inventory change and activity confirmation accounting notification message comprising a notification to accounting of inventory changes and activity confirmations; and an inventory change and activity confirmation cancellation accounting notification message from the production process component to the accounting process component, the inventory change and activity confirmation cancellation notification message comprising a notification to accounting of cancellation of previously sent inventory changes and activity confirmations;

the site logistics processing process component and the accounting process component, where the pair-wise interaction between the site logistics processing process component and the accounting process component includes the transmission of:

an inventory change and activity confirmation accounting notification message from the site logistics processing process component to the accounting process component, the inventory change and activity confirmation accounting notification message comprising a notification to accounting regarding inventory changes for physical goods and activity confirmations;

an inventory change and activity confirmation cancellation accounting notification message from the site logistics processing process component and the accounting process component, the inventory change and activity confirmation cancellation accounting notification message comprising a notification to accounting regarding cancellation of previously sent inventory changes and activity confirmations;

the outbound delivery processing process component and the customer invoice processing process component, where the pair-wise interaction between the outbound delivery processing process component and the customer invoice processing process component includes the transmission of:

a customer invoice request request message from the outbound delivery processing process component to the customer invoice processing process component, the customer invoice request request message comprising a request from outbound delivery processing to customer invoice processing for a customer invoice request;

the inventory processing process component and the accounting process component, where the pair-wise interaction between the inventory processing process component and the accounting process component includes the transmission of:

a planning view of inventory reconciliation notification message from the inventory processing process component to the accounting process component, the planning view of inventory reconciliation notification message comprising a notification regarding reconciliation of aggregated inventory quantities;

the customer quote processing process component and the due item processing process component, where the pair-wise interaction between the customer quote processing process component and the due item processing process component includes the transmission of:

a credit worthiness query message from the customer quote processing process component to the due item processing process component, the credit worthiness query message comprising a request to verify a set of data or values of a current document against an actual credit standing of a customer; and a credit worthiness response message from the due item processing process component to the customer quote processing process component, the credit worthiness response message comprising a response to the credit worthiness query message representing results associated with the verification of the set of data or values of the current document; and the sales order processing process component and the accounting process component, where the pair-wise interaction between the sales order processing process component and the accounting process component includes the transmission of:

a sales and purchasing accounting notification message from sales order processing process component to the accounting process component the sales and purchasing accounting notification message comprising a notification to accounting when a particular sales order is created, updated, or changed.

2. The product of claim 1, wherein:

the plurality of process components further includes:

request for quote (RFQ) processing process component that requests for quotes and supplier quotes for strategic as well as operational negotiation purposes;

a purchase contract processing process component that creates and maintains purchasing contracts;

a production and site logistic auxiliaries processing process component that supports functionality valid for multiple process components in a deployment unit production and site logistics execution;

a freight documents processing process component that processes freight-related documents for shipping purposes;

a balance of foreign payment management process component that collects processes, and reports receivables and payables according to foreign trade regulations that are required by a financial authority of a country; and a financial accounting master data management process component that manages financial accounting master data that is used both for accounting and costing purposes; and the pair-wise interactions between pairs of the process components further include interactions between:

the outbound delivery processing process component and an inbound delivery processing a customer process component;

the customer invoice processing process component and the balance of foreign payment management process component;

the customer quote processing process component and the financial accounting master data management process component;

the purchase request processing process component and the RFQ processing process component;

the sales order processing process component and the financial accounting master data management process component;

the supplier invoice processing process component and the balance of foreign payment management process component;

a bank statement creation at bank process component and the payment processing process component;

the supplier invoice processing process component and the customer invoice processing at supplier process component;

the freight documents processing process component and a transportation management at freight forwarder process component;

the supplier invoice processing process component and a supplier invoice verification exception resolution at processor process component;

the RFQ processing process component and an opportunity/customer quote processing at supplier process component;

an outbound delivery processing at supplier process component and the inbound delivery processing process component;

the customer invoice processing process component and the supplier invoice processing process component;

the RFQ processing process component and the purchase order processing process component;

the customer quote processing process component and a RFQ processing at customer process component;

the payment processing process component and a payment order processing at house bank process component;

the customer invoice processing process component and a supplier invoice processing at customer process component;

the payment processing process component and a payment processing at business partner process component;

the sales order processing process component and the due item processing process component;

the sales order processing process component and the customer invoice processing process component;

the payment processing process component and the due item processing process component;

the customer invoice processing process component and the accounting process component; and the site logistics processing process component and the supply and demand matching process component.

3. The product of claim 1, wherein:

each of the plurality of process components is assigned to exactly one deployment unit among multiple deployment units, and each deployment unit is deployable on a separate computer hardware platform independent of every other deployment unit; and all interaction between a process component in one deployment unit and any other process component in any other deployment unit takes place through the respective service interfaces of the two process components.

4. The product of claim 3, wherein the deployment units comprise:

a strategic sourcing deployment unit that includes an RFQ processing process component;

a purchase deployment unit that includes the purchase request processing process component, the purchase order processing process component, and a purchase contract processing process component;

a supplier invoicing deployment unit that includes the supplier invoice processing process component;

a supply chain control deployment unit that includes the supply and demand matching process component, the customer requirement processing process component, the logistics execution control process component, the external procurement trigger and response process component, and the production trigger and response process component;

a production and site logistics execution deployment unit that includes the production process component, the site logistics processing process component, the outbound delivery processing process component, the inventory processing process component, the inbound delivery processing process component, a production and site logistics auxiliaries processing process component, and a freight document processing process component;

a financials deployment unit that includes a balance of foreign payment management process component, the due item processing process component, the accounting process component, a financials accounting master data management process component, and the payment processing process component;

a customer invoicing deployment unit that includes the customer invoice processing process component; and a customer relationship management deployment unit that includes the customer quote processing process component and the sales order processing process component.

5. The product of claim 1, wherein:

each of the process components includes at least one business object.

6. The product of claim 5, wherein the business objects comprise a business process object.

7. The product of claim 5, wherein none of the business objects included in any one of the process components is included in any of the other process components.

8. The product of claim 1, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

9. The product of claim 8, wherein each inbound process agent comprises a first inbound process agent operable to start an execution of a business process step requested in a first inbound message by creating or updating at least one business object instance.

10. The product of claim 8, wherein the outbound process agents comprise a first asynchronous outbound process agent that is called after a business object that is associated with the first outbound process agent changes.

11. The product of claim 1, wherein the operations comprise synchronous and asynchronous operations.

12. A system, comprising:

a computer system comprising at least one hardware platform for executing computer instructions, the computer instructions structured as a plurality of process components interacting with each other through service interfaces, each hardware platform including at least one processor for executing the computer instructions;

at least one memory storing a plurality of process components executable by the respective processor of the particular hardware platform, each of the process components comprising a modular and application-independent package of reusable granular software implementing a respective and distinct business process, the business process comprising functionality exposed by the process component via at least one service interface, the plurality of process components including: a purchase request processing process component that creates, changes, and processes purchase requests to locate appropriate external sources of supply;

a purchase request processing process component that creates, changes, and processes purchase requests to locate appropriate external sources of supply;

a purchase order processing process component that creates and maintains purchase orders and purchase order confirmations;

a supplier invoice processing process component that manages and volume processes supplier invoices, including exception handling and approval;

a supply and demand matching process component that manages all the tasks necessary to ensure that sufficient material receipt elements exist to cover material demand while taking available capacity into account;

a customer requirement processing process component that controls customer requirements in a supply chain;

a logistics execution control process component that creates, controls, and monitors the supply chain execution activities that are necessary for the fulfillment of an order on a macro-logistics level;

an external procurement trigger and response process component that manages all the tasks necessary for processing procurement planning and procurement release orders, and the interface to purchasing, accounting, supplier invoicing, outbound delivery, and a supplier from a supply planning and control perspective;

a production process component that executes production on a shop floor and comprises preparation, execution, confirmation, completion, scheduling, and monitoring;

a site logistics processing process component that prepares, physically executes, and confirms logistics processes within a site;

an outbound delivery processing process component that manages and processes the outbound delivery requirements for shipping goods to a product recipient;

an inventory processing process component that manages inventory and records inventory changes;

an inbound delivery processing process component that manages and processes the inbound delivery requirements for received goods from a vendor;

a due item processing process component that collects, manages, and monitors trade receivables or payables and corresponding sales tax or withholding tax;

a payment processing process component that processes and manages all payments;

an accounting process component that represents business transactions for valuation and profitability analysis;

a customer quote processing process component that processes quotes to customers offering delivery of goods according to specific terms;

a customer invoice processing process component that invoices customers for the delivery of goods or the provision of services;

a productions trigger and response process component that interfaces between planning and production; and a sales order processing process component that processes customers' requests to a seller for the delivery of goods, on a specific date, for a specific quantity, and for a specific price; and the memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the external procurement trigger and response process component and the purchase request processing process component, where the pair-wise interaction between the external procurement trigger and response process component and the purchase request processing process component includes the transmission of:

a purchase request request message from the external procurement trigger and response process component to the purchase request processing process component, the purchase request request message message comprising a request to create or update a purchase request for the procurement of products or services; and a purchase request confirmation message from the purchase request processing process component to the external procurement trigger and response process component, the purchase request confirmation message comprising a confirmation regarding creation, change, or cancellation of a purchase request to the requestor;

the purchase order processing process component and the accounting process component, where the pair-wise interaction between the purchase order processing process component and the accounting process component includes the transmission of:

a sales and purchasing accounting notification message from the purchase order processing process component to the accounting process component, the sales and purchasing accounting notification message comprising a notification to accounting that a purchase order is created, changed, or cancelled;

the purchase order processing process component and the supplier invoice processing process component, where the pair-wise interaction between the purchase order processing process component and the supplier invoice processing process component includes the transmission of:

an invoicing due notification message from the purchase order processing process component to the supplier invoice processing process component, the invoicing due notification message comprising a notification to the supplier invoice processing process component of a new, changed, or cancelled purchase order; and a purchase order invoice values notification message from the supplier invoice processing process component to the purchase order processing process component, the purchase order invoice values notification message comprising a notification regarding actual values and quantities of a supplier invoice that is saved and contains a reference to a particular purchase order;

the purchase order processing process component and the sales order processing process component, where the pair-wise interaction between the purchase order processing process component and the sales order processing process component includes the transmission of:

a purchase order request message from the purchase order processing process component and the sales order processing process component, the purchase order request message comprising a request to process a purchase order sent to the sales order processing process component;

a purchase order change request message from the purchase order processing process component and the sales order processing process component, the purchase order change request message comprising a request to change a previously sent purchase order;

a purchase order cancellation request message from the purchase order processing process component and the sales order processing process component, the purchase order cancellation request message comprising a request to cancel a previously sent purchase order; and a purchase order confirmation message from the sales order processing process component to the purchase order processing process component, the purchase order confirmation message comprising a confirmation of a change in a particular sales order to a customer;

the purchase order processing process component and the external procurement trigger and response process component, where the pair-wise interaction between the purchase order processing process component and the external procurement trigger and response process component includes the transmission of:

a purchase order notification message from the purchase order processing process component to the external procurement trigger and response process component, the purchase order notification message comprising a notification to the external procurement trigger and response process component that a particular purchase order is created, changed, or cancelled;

the supplier invoice processing process component and the accounting process component, where the pair-wise interaction between the supplier invoice processing process component and the accounting process component includes the transmission of:

an invoice accounting notification message from the supplier invoice processing process component to the accounting process component, the invoice accounting notification message comprising a notification about accounting-relevant data from a posted supplier invoice; and an invoice cancellation accounting notification message from supplier invoice processing process component to the accounting process component, the invoice cancellation accounting notification message comprising a notification about accounting-relevant data from a previously posted supplier invoice that is cancelled;

the inbound delivery processing process component and the supplier invoice processing process component, where the pair-wise interaction between the inbound delivery processing process component and the supplier invoice processing process component includes the transmission of:

an invoicing due notification message from the inbound delivery processing process component to the supplier invoice processing process component, the invoicing due notification message comprising a request to create, update, or cancel a particular supplier invoice;

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising a notification regarding reconciliation of aggregated inventory quantities;

the customer quote processing process component and the customer requirement processing process component, where the pair-wise interaction between the customer quote processing process component and the customer requirement processing process component includes the transmission of:

a product availability query message from the customer quote processing process component to the customer requirement processing process component, the product availability query message comprising a non-binding query regarding availability of specified amounts of specified products at specified dates to request product availability information for customer quote items; and a product availability response message from the customer requirement processing process component to the customer quote processing process component, the product availability response message comprising a response to a product availability query message that includes non-binding information associated with which amounts of products are available at which dates;

the sales order processing process component and the customer requirement processing process component, where the pair-wise interaction between the sales order processing process component and the customer requirement processing process component includes the transmission of:

a product available to promise check request message from the sales order processing process component to the customer requirement processing process component, the product available to promise check request message comprising a request to check and/or confirm availability of a specific amount of materials;

a product available to promise check confirmation message from the customer requirement processing process component to the sales order processing process component, the product available to promise check confirmation message comprising a set of results associated with a check and/or confirmation of availability of a specific amount of materials;

a provisional customer requirement delete notification message from the sales order processing process component to the customer requirement processing process component, the provisional customer requirement delete notification message comprising a request to delete provisional customer requirements created in response to a product available to promise check request message;

a customer requirement fulfillment request message from the sales order processing process component to the customer requirement processing process component, the customer requirement fulfillment request message comprising a request to create or update a particular customer requirement;

a product available to promise update notification message from the customer requirement processing process component to the sales order processing process component, the product available to promise update notification message comprising a notification for updating a sales order with availability and reservation information based on changes in fulfillment planning; and a customer requirement fulfillment confirmation message from the customer requirement processing process component to the sales order processing process component, the customer requirement fulfillment confirmation message comprising a confirmation of fulfillment for updating a particular sales order with information from fulfillment confirmation;

the logistics execution control process component and the outbound delivery processing process component, where the pair-wise interaction between the logistics execution control process component and the outbound delivery processing process component includes the transmission of:
  a delivery request fulfillment request message from the logistics execution control process component to the outbound delivery processing process component, the delivery request fulfillment request message comprising a request to create or update an outbound delivery request; and
  a delivery request fulfillment confirmation message from the outbound delivery processing process component to the logistics execution control process component, the delivery request fulfillment confirmation message comprising a notification to the logistics execution control process component of fulfillment of a particular outbound delivery request for reconciliation purposes;

the logistics execution control process component and the inbound delivery processing process component, where the pair-wise interaction between the logistics execution control process component and the inbound delivery processing process component includes the transmission of:
  a delivery request fulfillment request message from the logistics execution control process component to the inbound delivery processing process component, the delivery request fulfillment request message comprising a request to create or update an inbound delivery request; and
  a delivery request fulfillment confirmation message from the inbound delivery processing process component and the logistics execution control process component, the delivery request fulfillment confirmation message comprising a notification to the logistics execution control process component of fulfillment of a particular inbound delivery request for reconciliation purposes;

the production trigger and response process component and the production process component, where the pair-wise interaction between the production trigger and response process component and the production process component includes the transmission of:
  a production request request message from the production trigger and response process component to the production process component, the production request request message comprising a request for production of a certain quantity of a specific material by a requested due date;
  a production request confirmation message from the production process component to the production trigger and response process component, the production request confirmation message comprising a confirmation of receipt for a production request; and
  a production request confirmation reconciliation notification message from the production process component to the production trigger and response process component, the production request confirmation reconciliation notification message comprising a reconciliation notification of a production request confirmation;

the production process component and the accounting process component, where the pair-wise interaction between the production process component and the accounting process component includes the transmission of:
  a production lot accounting notification message from the production process component to the accounting process component, the production lot accounting notification message comprising a notification to accounting regarding a status change of a production lot;
  an inventory change and activity confirmation accounting notification message from the production process component to the accounting process component, the inventory change and activity confirmation accounting notification message comprising a notification to accounting of inventory changes and activity confirmations; and
  an inventory change and activity confirmation cancellation accounting notification message from the production process component to the accounting process component, the inventory change and activity confirmation cancellation notification message comprising a notification to accounting of cancellation of previously sent inventory changes and activity confirmations;

the site logistics processing process component and the accounting process component, where the pair-wise interaction between the site logistics processing process component and the accounting process component includes the transmission of:
  an inventory change and activity confirmation accounting notification message from the site logistics processing process component to the accounting process component, the inventory change and activity confirmation accounting notification message comprising a notification to accounting regarding inventory changes for physical goods and activity confirmations;
  an inventory change and activity confirmation cancellation accounting notification message from the site logistics processing process component and the accounting process component, the inventory change and activity confirmation cancellation accounting notification message comprising a notification to accounting regarding cancellation of previously sent inventory changes and activity confirmations;

the outbound delivery processing process component and the customer invoice processing process component, where the pair-wise interaction between the outbound delivery processing process component and the customer invoice processing process component includes the transmission of:
  a customer invoice request request message from the outbound delivery processing process component to the customer invoice processing process component, the customer invoice request request message comprising a request from outbound delivery processing to customer invoice processing for a customer invoice request;

the inventory processing process component and the accounting process component, where the pair-wise interaction between the inventory processing process component and the accounting process component includes the transmission of:
  a planning view of inventory reconciliation notification message from the inventory processing process component to the accounting process component, the planning view of inventory reconciliation notification message comprising a notification regarding reconciliation of aggregated inventory quantities;
the customer quote processing process component and the due item processing process component, where the pair-wise interaction between the customer quote processing process component and the due item processing process component includes the transmission of:
  a credit worthiness query message from the customer quote processing process component to the due item processing process component, the credit worthiness query message comprising a request to verify a set of data or values of a current document against an actual credit standing of a customer; and
  a credit worthiness response message from the due item processing process component to the customer quote processing process component, the credit worthiness response message comprising a response to the credit worthiness query message representing results associated with the verification of the set of data or values of the current document; and
the sales order processing process component and the accounting process component, where the pair-wise interaction between the sales order processing process component and the accounting process component includes the transmission of:
  a sales and purchasing accounting notification message from sales order processing process component to the accounting process component, the sales and purchasing accounting notification message comprising a notification to accounting when a particular sales order is created, updated, or changed.

13. The system of claim 12, wherein:
the plurality of process components further includes:
  request for quote (RFQ) processing process component that requests for quotes and supplier quotes for strategic as well as operational negotiation purposes;
  a purchase contract processing process component that creates and maintains purchasing contracts;
  a production and site logistic auxiliaries processing process component that supports functionality valid for multiple process components in a deployment unit production and site logistics execution;
  a freight documents processing process component that processes freight-related documents for shipping purposes;
  a balance of foreign payment management process component that collects processes, and reports receivables and payables according to foreign trade regulations that are required by a financial authority of a country; and
  a financial accounting master data management process component that manages financial accounting master data that is used both for accounting and costing purposes; and
the pair-wise interactions between pairs of the process components further include interactions between:
  the outbound delivery processing process component and an inbound delivery processing a customer process component;
  the customer invoice processing process component and the balance of foreign payment management process component;
  the customer quote processing process component and the financial accounting master data management process component;
  the purchase request processing process component and the RFQ processing process component;
  the sales order processing process component and the financial accounting master data management process component;
  the supplier invoice processing process component and the balance of foreign payment management process component;
  a bank statement creation at bank process component and the payment processing process component;
  the supplier invoice processing process component and the customer invoice processing at supplier process component;
  the freight documents processing process component and a transportation management at freight forwarder process component;
  the supplier invoice processing process component and a supplier invoice verification exception resolution at processor process component;
  the RFQ processing process component and an opportunity/customer quote processing at supplier process component;
  an outbound delivery processing at supplier process component and the inbound delivery processing process component;
  the customer invoice processing process component and the supplier invoice processing process component;
  the RFQ processing process component and the purchase order processing process component;
  the customer quote processing process component and a RFQ processing at customer process component;
  the payment processing process component and a payment order processing at house bank process component;
  the customer invoice processing process component and a supplier invoice processing at customer process component;
  the payment processing process component and a payment processing at business partner process component;
  the sales order processing process component and the due item processing process component;
  the sales order processing process component and the customer invoice processing process component;
  the payment processing process component and the due item processing process component;
  the customer invoice processing process component and the accounting process component; and
  the site logistics processing process component and the supply and demand matching process component.

14. The system of claim 12, wherein:
each of the process components includes one or more business objects.

15. The system of claim 12, wherein none of the business objects included in any one of the process components is included in any of the other process components.

16. The system of claim 12, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

17. The system of claim 12, the system comprising multiple hardware platforms, wherein:
an RFQ processing process component is deployed on a first hardware platform;
the purchase request processing process component, the purchase order processing process component, and a purchase contract processing process component are deployed on a second hardware platform;
the supplier invoice processing process component is deployed on a third hardware platform;
the supply and demand matching process component, the customer requirement processing process component, the logistics execution control process component, the external procurement trigger and response process component, and the production trigger and response process component are deployed on a fourth hardware platform;
the production process component, the site logistics processing process component, the outbound delivery processing process component, the inventory processing process component, the inbound delivery process component, a production and site logistics auxiliaries processing process component, and a freight document processing process component are deployed on a fifth hardware platform;
a balance of foreign payment management process component, the due item processing process component, the accounting process component, a financials accounting master data management process component, and the payment processing process component are deployed on a sixth hardware platform;
the customer invoice processing process component is deployed on a seventh hardware platform; and
the customer quote processing process component and the sales order processing process component are deployed on an eighth hardware platform.

18. The system of claim 17, wherein each of the first through the eighth hardware platforms are distinct and separate from each other.

19. A computer-implemented method for developing a computer software application, the method comprising the following steps performed by at least one processor:
obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable granular software implementing a respective and distinct business process, the business process comprising functionality exposed by the process component, and the design further specifying a set of process component interactions based on messages transmitted between two or more of the process components, wherein:
the specified process components include:
a purchase request processing process component that creates, changes, and processes purchase requests to locate appropriate external sources of supply;
a purchase order processing process component that creates and maintains purchase orders and purchase order confirmations;
a supplier invoice processing process component that manages and volume processes of supplier invoices, including exception handling and approval;
a supply and demand matching process component that manages all the tasks necessary to ensure that sufficient material receipt elements exist to cover material demand while taking available capacity into account;
a customer requirement processing process component that controls customer requirements in the supply chain;
a logistics execution control process component that creates, controls, and monitors the supply chain execution activities that are necessary for the fulfillment of an order on a macro-logistics level;
an external procurement trigger and response process component that manages all the tasks necessary for processing procurement planning and procurement release orders, and the interface to purchasing, accounting, supplier invoicing, outbound delivery, and the supplier from a supply planning and control perspective;
a production process component that executes production on the shop floor and comprises the preparation, execution, confirmation, and completion as well as the more general functions such as scheduling, and monitoring;
a site logistics processing process component that prepares, physically executes, and confirms logistics processes within a site;
an outbound delivery processing process component that manages and processes the outbound delivery requirements for shipping goods to a product recipient;
an inventory processing process component that manages inventory and records inventory changes;
an inbound delivery processing process component that manages and processes the inbound delivery requirements for received goods from a vendor;
a due item processing process component that collects, manages, and monitors trade receivables or payables and corresponding sales tax or withholding tax;
a payment processing process component that processes and manages all payments;
an accounting process component that represents business transactions for valuation and profitability analysis;
a customer quote processing process component that processes quotes to customers offering the delivery of goods according to specific terms;
a customer invoice processing process component that invoices customers for the delivery of goods or the provision of services;
a productions trigger and response process component that interfaces between planning and production; and
a sales order processing process component that processes customers' requests to the seller for the delivery of goods, on a specific date, for a specific quantity, and for a specific price; and
the process component interactions include interactions between:

the external procurement trigger and response process component and the purchase request processing process component, where the pair-wise interaction between the external procurement trigger and response process component and the purchase request processing process component includes the transmission of:
  a purchase request request message from the external procurement trigger and response process component to the purchase request processing process component, the purchase request request message message comprising a request to create or update a purchase request for the procurement of products or services; and
  a purchase request confirmation message from the purchase request processing process component to the external procurement trigger and response process component, the purchase request confirmation message comprising a confirmation regarding creation, change, or cancellation of a purchase request to the requestor;
the purchase order processing process component and the accounting process component, where the pair-wise interaction between the purchase order processing process component and the accounting process component includes the transmission of:
  a sales and purchasing accounting notification message from the purchase order processing process component to the accounting process component, the sales and purchasing accounting notification message comprising a notification to accounting that a purchase order is created, changed, or cancelled;
the purchase order processing process component and the supplier invoice processing process component, where the pair-wise interaction between the purchase order processing process component and the supplier invoice processing process component includes the transmission of:
  an invoicing due notification message from the purchase order processing process component to the supplier invoice processing process component, the invoicing due notification message comprising a notification to the supplier invoice processing process component of a new, changed, or cancelled purchase order; and
  a purchase order invoice values notification message from the supplier invoice processing process component to the purchase order processing process component, the purchase order invoice values notification message comprising a notification regarding actual values and quantities of a supplier invoice that is saved and contains a reference to a particular purchase order;
the purchase order processing process component and the sales order processing process component, where the pair-wise interaction between the purchase order processing process component and the sales order processing process component includes the transmission of:
  a purchase order request message from the purchase order processing process component and the sales order processing process component, the purchase order request message comprising a request to process a purchase order sent to the sales order processing process component;
  a purchase order change request message from the purchase order processing process component and the sales order processing process component, the purchase order change request message comprising a request to change a previously sent purchase order;
  a purchase order cancellation request message from the purchase order processing process component and the sales order processing process component, the purchase order cancellation request message comprising a request to cancel a previously sent purchase order; and
  a purchase order confirmation message from the sales order processing process component to the purchase order processing process component, the purchase order confirmation message comprising a confirmation of a change in a particular sales order to a customer;
the purchase order processing process component and the external procurement trigger and response process component, where the pair-wise interaction between the purchase order processing process component and the external procurement trigger and response process component includes the transmission of:
  a purchase order notification message from the purchase order processing process component to the external procurement trigger and response process component, the purchase order notification message comprising a notification to the external procurement trigger and response process component that a particular purchase order is created, changed, or cancelled;
the supplier invoice processing process component and the accounting process component, where the pair-wise interaction between the supplier invoice processing process component and the accounting process component includes the transmission of:
  an invoice accounting notification message from the supplier invoice processing process component to the accounting process component, the invoice accounting notification message comprising a notification about accounting-relevant data from a posted supplier invoice; and
  an invoice cancellation accounting notification message from supplier invoice processing process component to the accounting process component, the invoice cancellation accounting notification message comprising a notification about accounting-relevant data from a previously posted supplier invoice that is cancelled;
the inbound delivery processing process component and the supplier invoice processing process component, where the pair-wise interaction between the inbound delivery processing process component and the supplier invoice processing process component includes the transmission of:
  an invoicing due notification message from the inbound delivery processing process component to the supplier invoice processing process component, the invoicing due notification message comprising a request to create, update, or cancel a particular supplier invoice;
the inventory processing process component and the supply and demand matching process component, where the pair-wise interaction between the inventory processing process component and the supply and demand matching process component includes the transmission of:
  a planning view of inventory reconciliation notification message from the inventory processing process component to the supply and demand matching process component, the planning view of inventory reconciliation notification message comprising a notification regarding reconciliation of aggregated inventory quantities;
the customer quote processing process component and the customer requirement processing process component, where the pair-wise interaction between the customer quote processing process component and the customer requirement processing process component includes the transmission of:
  a product availability query message from the customer quote processing process component to the customer requirement processing process component, the product availability query message comprising a non-binding query regarding availability of specified amounts of specified products at specified dates to request product availability information for customer quote items; and
  a product availability response message from the customer requirement processing process component to the customer quote processing process component, the product availability response message comprising a response to a product availability query message that includes non-binding information associated with which amounts of products are available at which dates;
the sales order processing process component and the customer requirement processing process component, where the pair-wise interaction between the sales order processing process component and the customer requirement processing process component includes the transmission of:
  a product available to promise check request message from the sales order processing process component to the customer requirement processing process component, the product available to promise check request message comprising a request to check and/or confirm availability of a specific amount of materials;
  a product available to promise check confirmation message from the customer requirement processing process component to the sales order processing process component, the product available to promise check confirmation message comprising a set of results associated with a check and/or confirmation of availability of a specific amount of materials;
  a provisional customer requirement delete notification message from the sales order processing process component to the customer requirement processing process component, the provisional customer requirement delete notification message comprising a request to delete provisional customer requirements created in response to a product available to promise check request message;
  a customer requirement fulfillment request message from the sales order processing process component to the customer requirement processing process component, the customer requirement fulfillment request message comprising a request to create or update a particular customer requirement;
  a product available to promise update notification message from the customer requirement processing process component to the sales order processing process component, the product available to promise update notification message comprising a notification for updating a sales order with availability and reservation information based on changes in fulfillment planning; and
  a customer requirement fulfillment confirmation message from the customer requirement processing process component to the sales order processing process component, the customer requirement fulfillment confirmation message comprising a confirmation of fulfillment for updating a particular sales order with information from fulfillment confirmation;
the logistics execution control process component and the outbound delivery processing process component, where the pair-wise interaction between the logistics execution control process component and the outbound delivery processing process component includes the transmission of:
  a delivery request fulfillment request message from the logistics execution control process component to the outbound delivery processing process component, the delivery request fulfillment request message comprising a request to create or update an outbound delivery request; and
  a delivery request fulfillment confirmation message from the outbound delivery processing process component to the logistics execution control process component, the delivery request fulfillment confirmation message comprising a notification to the logistics execution control process component of fulfillment of a particular outbound delivery request for reconciliation purposes;
the logistics execution control process component and the inbound delivery processing process component, where the pair-wise interaction between the logistics execution control process component and the inbound delivery processing process component includes the transmission of:
  a delivery request fulfillment request message from the logistics execution control process component to the inbound delivery processing process component, the delivery request fulfillment request message comprising a request to create or update an inbound delivery request; and
  a delivery request fulfillment confirmation message from the inbound delivery processing process component and the logistics execution control process component, the delivery request fulfillment confirmation message comprising a notification to the logistics execution control process component of fulfillment of a particular inbound delivery request for reconciliation purposes;
the production trigger and response process component and the production process component, where the pair-wise interaction between the production trigger and response process component and the production process component includes the transmission of:
- a production request request message from the production trigger and response process component to the production process component, the production request request message comprising a request for production of a certain quantity of a specific material by a requested due date;
- a production request confirmation message from the production process component to the production trigger and response process component, the production request confirmation message comprising a confirmation of receipt for a production request; and
- a production request confirmation reconciliation notification message from the production process component to the production trigger and response process component, the production request confirmation reconciliation notification message comprising a reconciliation notification of a production request confirmation;

the production process component and the accounting process component, where the pair-wise interaction between the production process component and the accounting process component includes the transmission of:
- a production lot accounting notification message from the production process component to the accounting process component, the production lot accounting notification message comprising a notification to accounting regarding a status change of a production lot;
- an inventory change and activity confirmation accounting notification message from the production process component to the accounting process component, the inventory change and activity confirmation accounting notification message comprising a notification to accounting of inventory changes and activity confirmations; and
- an inventory change and activity confirmation cancellation accounting notification message from the production process component to the accounting process component, the inventory change and activity confirmation cancellation notification message comprising a notification to accounting of cancellation of previously sent inventory changes and activity confirmations;

the site logistics processing process component and the accounting process component, where the pair-wise interaction between the site logistics processing process component and the accounting process component includes the transmission of:
- an inventory change and activity confirmation accounting notification message from the site logistics processing process component to the accounting process component, the inventory change and activity confirmation accounting notification message comprising a notification to accounting regarding inventory changes for physical goods and activity confirmations;
- an inventory change and activity confirmation cancellation accounting notification message from the site logistics processing process component and the accounting process component, the inventory change and activity confirmation cancellation accounting notification message comprising a notification to accounting regarding cancellation of previously sent inventory changes and activity confirmations;

the outbound delivery processing process component and the customer invoice processing process component, where the pair-wise interaction between the outbound delivery processing process component and the customer invoice processing process component includes the transmission of:
- a customer invoice request request message from the outbound delivery processing process component to the customer invoice processing process component, the customer invoice request request message comprising a request from outbound delivery processing to customer invoice processing for a customer invoice request;

the inventory processing process component and the accounting process component, where the pair-wise interaction between the inventory processing process component and the accounting process component includes the transmission of:
- a planning view of inventory reconciliation notification message from the inventory processing process component to the accounting process component, the planning view of inventory reconciliation notification message comprising a notification regarding reconciliation of aggregated inventory quantities;

the customer quote processing process component and the due item processing process component, where the pair-wise interaction between the customer quote processing process component and the due item processing process component includes the transmission of:
- a credit worthiness query message from the customer quote processing process component to the due item processing process component, the credit worthiness query message comprising a request to verify a set of data or values of a current document against an actual credit standing of a customer; and
- a credit worthiness response message from the due item processing process component to the customer quote processing process component, the credit worthiness response message comprising a response to the credit worthiness query message representing results associated with the verification of the set of data or values of the current document; and the sales order processing process component and the accounting process component, where the pair-wise interaction between the sales order processing process component and the accounting process component includes the transmission of:
- a sales and purchasing accounting notification message from sales order processing process component to the accounting process component, the sales and purchasing accounting notification message comprising a notification to accounting when a particular sales order is created, updated, or changed; and generating, using the at least one processor on the computer system, a computer software application to perform the set of processes based on the obtained design including the specified process components and the specified process component interactions.

20. The method of claim 19, wherein:
the specified process components further include:
- request for quote (RFQ) processing process component that requests for quotes and supplier quotes for strategic as well as operational negotiation purposes;
- a purchase contract processing process component that creates and maintains purchasing contracts;
- a production and site logistic auxiliaries processing process component that supports functionality valid for multiple process components in a deployment unit production and site logistics execution;
- a freight documents processing process component that processes freight-related documents for shipping purposes;
- a balance of foreign payment management process component that collects processes, and reports receivables and payables according to foreign trade regulations that are required by a financial authority of a country; and
- a financial accounting master data management process component that manages financial accounting master data that is used both for accounting and costing purposes; and the pair-wise interactions between pairs of the process components further include interactions between:
- the outbound delivery processing process component and an inbound delivery processing a customer process component;
- the customer invoice processing process component and the balance of foreign payment management process component;
- the customer quote processing process component and the financial accounting master data management process component;
- the purchase request processing process component and the RFQ processing process component;
- the sales order processing process component and the financial accounting master data management process component;
- the supplier invoice processing process component and the balance of foreign payment management process component;
- a bank statement creation at bank process component and the payment processing process component;
- the supplier invoice processing process component and the customer invoice processing at supplier process component;
- the freight documents processing process component and a transportation management at freight forwarder process component;
- the supplier invoice processing process component and a supplier invoice verification exception resolution at processor process component;
- the RFQ processing process component and an opportunity/customer quote processing at supplier process component;
- an outbound delivery processing at supplier process component and the inbound delivery processing process component;
- the customer invoice processing process component and the supplier invoice processing process component;
- the RFQ processing process component and the purchase order processing process component;
- the customer quote processing process component and a RFQ processing at customer process component;
- the payment processing process component and a payment order processing at house bank process component;
- the customer invoice processing process component and a supplier invoice processing at customer process component;
- the payment processing process component and a payment processing at business partner process component;
- the sales order processing process component and the due item processing process component;
- the sales order processing process component and the customer invoice processing process component;
- the payment processing process component and the due item processing process component;
- the customer invoice processing process component and the accounting process component; and
- the site logistics processing process component and the supply and demand matching process component.

21. The method of claim 19, wherein each process in the set of processes is a business process transforming a defined business input into a defined business outcome.

22. The method of claim 21, wherein obtaining digital data representing the architectural design further comprises editing the design before using the design.

* * * * *